(12) United States Patent
Eichhorn et al.

(10) Patent No.: US 7,708,786 B2
(45) Date of Patent: May 4, 2010

(54) DYE MIXTURES OF FIBER-REACTIVE AZO DYES, THEIR PREPARATION AND USE

(75) Inventors: Joachim Eichhorn, Frankfurt (DE); Werner Russ, Flörsheim-Wicker (DE); Stefan Meier, Frankfurt (DE); Uwe Mrotzeck, Kelkheim (DE)

(73) Assignee: DyStar Textilfarben GmbH & Co. Deutschland KG, Frankfurt am Main (DE)

( * ) Notice: Subject to any disclaimer, the term of this patent is extended or adjusted under 35 U.S.C. 154(b) by 0 days.

(21) Appl. No.: 12/163,236

(22) Filed: Jun. 27, 2008

(65) Prior Publication Data
US 2009/0025152 A1 Jan. 29, 2009

Related U.S. Application Data

(62) Division of application No. 10/508,630, filed as application No. PCT/EP03/02836 on Mar. 18, 2003, now Pat. No. 7,455,699.

(30) Foreign Application Priority Data

| Mar. 22, 2002 | (DE) | ................................. | 102 12 769 |
| Mar. 22, 2002 | (DE) | ................................. | 102 12 770 |
| Apr. 19, 2002 | (DE) | ................................. | 102 17 476 |
| Apr. 19, 2002 | (DE) | ................................. | 102 17 478 |
| Mar. 5, 2003 | (DE) | ................................. | 103 09 406 |

(51) Int. Cl.
C09B 67/24 (2006.01)
C09B 67/26 (2006.01)
C09B 67/36 (2006.01)

(52) U.S. Cl. ........................ 8/641; 8/543; 8/549; 8/662; 8/669; 8/680; 8/681; 8/682; 8/687

(58) Field of Classification Search .................... 8/543, 8/641, 662, 669, 680, 681, 682, 687, 549
See application file for complete search history.

(56) References Cited

U.S. PATENT DOCUMENTS 2,657,205 A 10/1953 Heyna et al.

(Continued)

FOREIGN PATENT DOCUMENTS

| DE | 196 00 765 | 7/1997 |
| EP | 0 538 785 | 4/1993 |
| EP | 0 600 322 | 6/1994 |
| EP | 0 692 559 | 1/1996 |
| EP | 0 731 145 | 9/1996 |
| EP | 0 870 807 | 10/1998 |
| EP | 0 976 794 | 2/2000 |
| JP | 58160362 | 9/1983 |
| JP | 1289868 | 11/1989 |

(Continued)

OTHER PUBLICATIONS

J. Soc. Dyers and Colourists (1975) pp. 33-44.
J. Soc. Dyers and Colourists (1972) pp. 93-99.
H. Rath, Lehrbuch der Textilchemie, Springer-Verlag, 3rd Edition (1972) pp. 295-299.

Primary Examiner—Lorna M Douyon
Assistant Examiner—Amina Khan
(74) Attorney, Agent, or Firm—Connolly Bove Lodge & Hutz LLP

(57) ABSTRACT

Reactive dye mixtures comprising one or more dyes of the general formula (I),

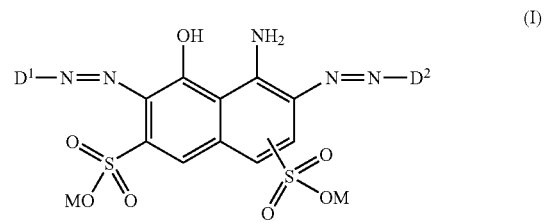

one or more dyes of the general formula (II)

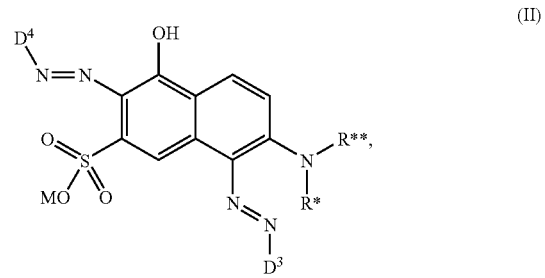

and optionally one or more dyes of the general formula (III)

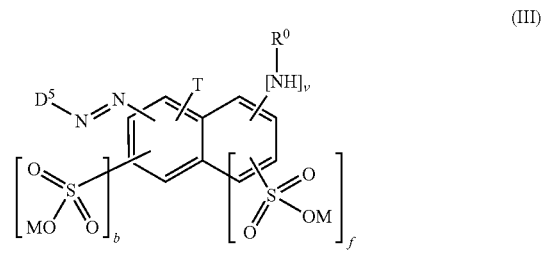

where $D^1$, $D^2$, $D^3$, $D^4$, $D^5$, $R^0$, $R^*$, $R^{}$, T, b, f, v, and M are as defined in claim 1**, the dyes of the general formulae (I)-(III) containing at least one fiber-reactive group of the formula —$SO_2$—Z or —$Z^2$, are prepared and used for dyeing hydroxyl- and/or carboxamido-containing fiber material.

6 Claims, No Drawings

U.S. PATENT DOCUMENTS

| | | |
|---|---|---|
| 4,257,770 A | 3/1981 | Nishimura et al. |
| 5,231,172 A | 7/1993 | Beck et al. |
| 5,445,654 A | 8/1995 | Hussong et al. |
| 5,529,585 A | 6/1996 | Schrell et al. |
| 5,556,435 A | 9/1996 | Russ et al. |
| 5,611,821 A | 3/1997 | Huang et al. |
| 5,690,698 A | 11/1997 | Von Der Eltz et al. |
| 5,849,887 A | 12/1998 | Lehmann et al. |
| 5,986,087 A | 11/1999 | Schrell et al. |
| 6,011,140 A * | 1/2000 | Zamponi et al. ............ 534/637 |
| 6,011,995 A | 1/2000 | Guglielmi et al. |
| 6,036,732 A | 3/2000 | Pedemonte et al. |
| 6,171,349 B1 * | 1/2001 | Lai et al. ....................... 8/549 |
| 6,537,332 B1 | 3/2003 | Tzikas et al. |

FOREIGN PATENT DOCUMENTS

| | | |
|---|---|---|
| KR | 94-2560 | 3/1994 |
| WO | WO-96/37641 | 11/1996 |
| WO | WO-96/37642 | 11/1996 |
| WO | WO 97/25377 | 7/1997 |
| WO | WO-00/06652 | 2/2000 |
| WO | WO-02/098988 | 12/2002 |
| WO | WO-03/080741 | 10/2003 |

* cited by examiner

DYE MIXTURES OF FIBER-REACTIVE AZO DYES, THEIR PREPARATION AND USE

CROSS REFERENCE TO RELATED PATENT APPLICATION

This application is a divisional of U.S. patent application Ser. No. 10/508,630, filed Oct. 13, 2004, now U.S. Pat. No. 7,455,699, which is a National Stage Application of International Application No. PCT/EP03/02836, filed Mar. 18, 2003, which claims the right of priority under 35 U.S.C. 119 (a)-(d) of German Patent Application Nos. DE 102 12 769.7, filed Mar. 22, 2002, DE 102 12 770.0, filed Mar. 22, 2002, DE 102 17 476.8, filed Apr. 19, 2002, DE 102 17 478.4, filed Apr. 19, 2002, and DE 103 09 406.7, filed Mar. 5, 2003.

The invention is situated within the technical field of the fiber-reactive azo dyes.

Mixed fiber-reactive azo dyes and their use for dyeing hydroxyl- and carboxamide-containing material in black shades are known for example from the documents U.S. Pat. No. 5,445,654, U.S. Pat. No. 5,611,821, KR 94-2560, Sho 58-160362 and EP-A-0 870 807. However, they do have certain application defects, such as for example an overly large dependence of the color yield on varying dyeing parameters in the dyeing operation, or an insufficient or unlevel color buildup on cotton (good color buildup results from the ability of a dye to provide a proportionally stronger dyeing when used in higher concentrations in the dyebath). Consequences of these defects may for example be poor reproducibilities for the dyeings that are obtainable, ultimately impacting on the economics of the dyeing operation.

Consequently, there continues to be a need for new reactive dyes and mixtures thereof with improved properties, such as high substantivity coupled with the capacity for unfixed portions to be washed off. Moreover, they must also provide good dyeing yields and possess high reactivity, and ought in particular to give dyeings with high degrees of fixation.

The present invention, then, provides dye mixtures which possess these above-described properties to a high degree. The novel dye mixtures are notable in particular for high yields of fixation and ease of wash-off of the portions not fixed on the fiber. In addition, the dyeings possess good general fastness properties, such as high light fastness and very good wet fastnesses, for example, and exhibit little tendency to stain polyamide in the case of cotton/polyamide blends.

The invention accordingly provides dye mixtures comprising one or more, such as two or three, preferably 1 or 2, dyes of the hereinbelow indicated and defined general formula (I)

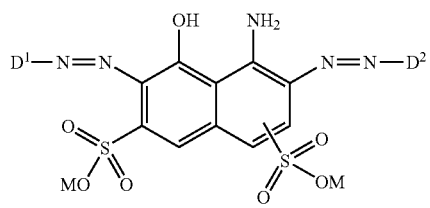

one or more, such as two or three, preferably 1 or 2, dyes of the hereinbelow indicated and defined general formula (II)

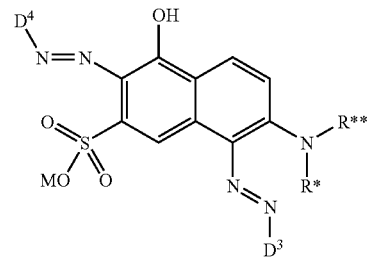

and optionally one or more, such as two or three, preferably 1 or 2, dyes of the hereinbelow indicated and defined general formula (III)

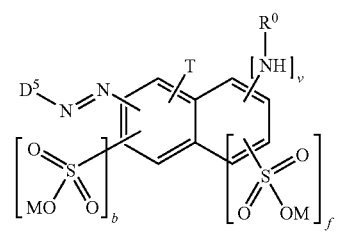

where:

$D^1$, $D^2$, $D^3$, $D^4$ and $D^5$ independently are each a group of the general formula (1)

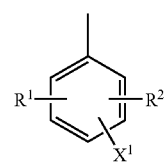

where
$R^1$ and $R^2$ independently are each hydrogen, $(C_1-C_4)$-alkyl, $(C_1-C_4)$-alkoxy, hydroxyl, sulfo, carboxyl, cyano, nitro, amido, ureido or halogen; and
$X^1$ is hydrogen or a group of the formula $-SO_2-Z$,
where
Z is $-CH=CH_2$, $-CH_2CH_2Z^1$ or hydroxyl,
where
$Z^1$ is hydroxyl or an alkali-eliminable group; or $D^1$, $D^2$, $D^3$, $D^4$ and $D^5$ independently are each a naphthyl group of the general formula (2)

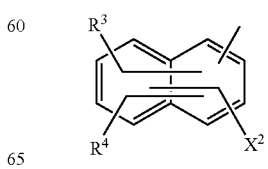

where
R³ and R⁴ independently are each hydrogen, $(C_1\text{-}C_4)$-alkyl, $(C_1\text{-}C_4)$-alkoxy, hydroxyl, sulfo, carboxyl, cyano, nitro, amido, ureido or halogen; and X² is as defined for X¹; or $D^1$, $D^2$, $D^3$, $D^4$ and $D^5$ independently are each a group of the general formula (3)

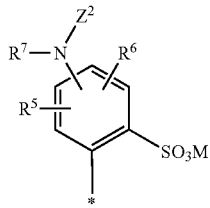
(3)

where
R⁵ and R⁶ independently each have one of the meanings of R¹ and R²;
R⁷ is hydrogen, $(C_1\text{-}C_4)$-alkyl, or phenyl which is unsubstituted or substituted by $(C_1\text{-}C_4)$-alkyl, $(C_1\text{-}C_4)$-alkoxy, sulfo, halogen or carboxyl; and
Z² is a group of the general formula (4) or (5) or (6)

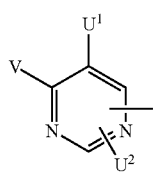
(4)

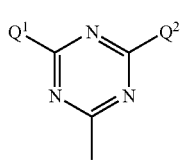
(5)

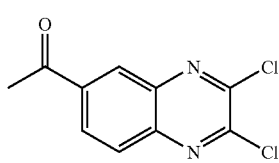
(6)

where
V is fluoro or chloro;
U¹ and U² independently are each fluoro, chloro or hydrogen; and
Q¹ and Q² independently are each chloro, fluoro, cyanamido, hydroxyl, $(C_1\text{-}C_6)$-alkoxy, phenoxy, sulfophenoxy, mercapto, $(C_1\text{-}C_6)$-alkylmercapto, pyridino, carboxypyridino, carbamoylpyridino or a group of the general formula (7) or (8)

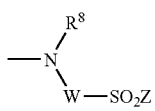
(7)

-continued

(8)

where
R⁸ is hydrogen or $(C_1\text{-}C_6)$-alkyl, sulfo-$(C_1\text{-}C_6)$-alkyl, or phenyl which is unsubstituted or substituted by $(C_1\text{-}C_4)$-alkyl,
$(C_1\text{-}C_4)$-alkoxy, sulfa, halogen, carboxyl, acetamido or ureido;
R⁹ and R¹⁰ independently each have one of the meanings of R⁸ or form a cyclic ring system of the formula $-(CH_2)_j-$ where j is 4 or 5, or alternatively $(CH_2)_2\text{-}E\text{-}(CH_2)_2-$, where E is oxygen, sulfur, sulfonyl or $-NR^{11}$, where $R^{11}$ is $(C_1\text{-}C_6)$-alkyl;
W is phenylene which is unsubstituted or substituted by 1 or 2 substituents, such as $(C_1\text{-}C_4)$-alkyl, $(C_1\text{-}C_4)$-alkoxy, carboxyl, sulfa, chloro or bromo, or is $(C_1\text{-}C_4)$-alkylene-arylene or $(C_2\text{-}C_6)$-alkylene which may be interrupted by oxygen, sulfur, sulfonyl, amino, carbonyl or carboxamido, or is phenylene-CONH-phenylene which is unsubstituted or substituted by $(C_1\text{-}C_4)$-alkyl, $(C_1\text{-}C_4)$-alkoxy, hydroxyl, sulfo, carboxyl, amido, ureido or halogen, or is naphthylene which is unsubstituted or substituted by one or two sulfo groups; and
Z is as defined above; or $D^1$, $D^2$, $D^3$, $D^4$ and $D^5$ independently are each a group of the general formula (9)

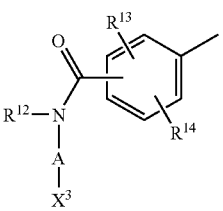
(9)

where
R¹² is hydrogen, $(C_1\text{-}C_4)$-alkyl, aryl or a substituted aryl radical;
R¹³ and R¹⁴ independently are each hydrogen, $(C_1\text{-}C_4)$-alkyl, $(C_1\text{-}C_4)$-alkoxy, hydroxyl, sulfo, carboxyl, cyano, nitro, amido, ureido or halogen; and
A is a phenylene group of the general formula (10)

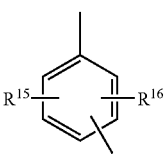
(10)

where
R¹⁵ and R¹⁶ independently are each hydrogen, $(C_1\text{-}C_4)$-alkyl, $(C_1\text{-}C_4)$-alkoxy, hydroxyl, sulfo, carboxyl, cyano, nitro, amido, ureido or halogen; or A is a naphthylene group of the general formula (11)

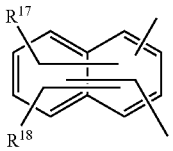

where
R$^{17}$ and R$^{18}$ independently are hydrogen, (C$_1$-C$_4$)-alkyl, (C$_1$-C$_4$)-alkoxy, hydroxyl, sulfo, carboxyl, cyano, nitro, amido, ureido or halogen; or A is a polymethylene group of the general formula (12)

$$—(CR^{19}R^{20})_k—\qquad(12)$$

where
k is an integer greater than 1 and
R$^{19}$ and R$^{20}$ independently are each hydrogen, (C$_1$-C$_4$)-alkyl, (C$_1$-C$_4$)-alkoxy, hydroxyl, cyano, amido, halogen or aryl; and X$^3$ has one of the meanings of X$^1$; and
R$^0$ is a group of the general formula (4) or (5) or is a group of the general formula (13)

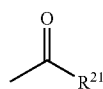

where;
R$^{21}$ is (C$_1$-C$_6$)-alkyl, sulfo-(C$_1$-C$_6$)-alkyl, carboxy-(C$_1$-C$_6$)-alkyl or phenyl which is unsubstituted or substituted by (C$_1$-C$_4$)-alkyl, (C$_1$-C$_4$)-alkoxy, sulfo, halogen, carboxyl, acetamido or ureido; and b, f and v independently are each 0 or 1; and R*, and R** independently are each hydrogen, (C$_1$-C$_4$)-alkyl or a group of the formula (14)

$$—CH_2—SO_3M\qquad(14);$$

T is hydroxyl or NH$_2$, and if T is NH$_2$ v is 0, and

M is hydrogen, an alkali metal or an equivalent of an alkaline earth metal, with the exception of mixtures composed of dyes of the general formula (I-a)

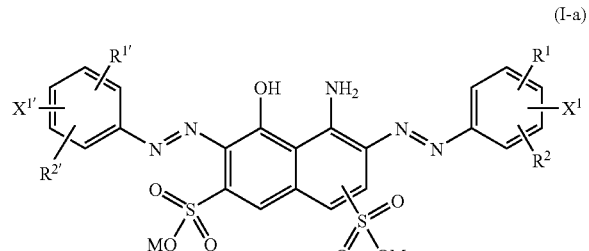

where R$^1$ and R$^2$ and R$^{1'}$ and R$^{2'}$ independently are each hydrogen or sulfo and X$^1$ and X$^{1'}$ are a group of the formula —SO$_2$Z where Z is as defined above, and of dyes of the general formula (II), where R* and R** independently are each hydrogen or
(C$_1$-C$_4$)-alkyl.

The dyes of the general formula (I)-(III) contain at least one fiber-reactive group of the formula —SO$_2$—Z or —Z$^2$.

The individual symbols in the general formulae above and below may have identical or different meanings within their definitions, irrespective of whether the symbols bear the same or a different designation.

(C$_1$-C$_4$)-alkyl R may be straight-chain or branched and is in particular methyl, ethyl, n-propyl, isopropyl, n-butyl, isobutyl, sec-butyl or tert-butyl. Methyl and ethyl are preferred. The same logic applies to (C$_1$-C$_4$)-alkoxy groups.

Aryl R is in particular phenyl. Substituted aryl R$^8$ to R$^{10}$, R$^{12}$ or R$^{21}$ is in particular phenyl substituted by one, two or three independent groups selected from (C$_1$-C$_4$)-alkyl, (C$_1$-C$_4$)-alkoxy, hydroxyl, sulfo, carboxyl, amido and halogen.

Halogen R is in particular fluoro, chloro or bromo, and fluoro and chloro are preferred.

Alkali-eliminable Z$^1$ in the β-position of the ethyl group of Z includes for example halogen atoms, such as chloro and bromo, ester groups of organic carboxylic and sulfonic acids, such as alkylcarboxylic acids, unsubstituted or substituted benzenecarboxylic acids and unsubstituted or substituted benzenesulfonic acids, such as alkanoyloxy of 2 to 5 carbon atoms, especially acetyloxy, benzoyloxy, sulfobenzoyloxy, phenylsulfonyloxy, and tolylsulfonyloxy, also acidic ester groups of inorganic acids, such as of phosphoric acid, sulfuric acid, and thiosulfuric acid (phosphate, sulfato, and thiosulfato groups), and also dialkylamino groups with alkyl groups each of 1 to 4 carbon atoms, such as dimethylamino and diethylamino.

Z is preferably vinyl, β-chloroethyl, and, with particular preference β-sulfatoethyl.

The groups "sulfo", "carboxyl", "thiosulfato", "phosphato", and "sulfato" include not only their acid form but also their salt form. Accordingly, sulfo groups are groups conforming to the general formula —SO$_3$M, thiosulfato groups are groups conforming to the general formula —S—SO$_3$M, carboxyl groups are groups conforming to the general formula —COOM, phosphate groups are groups conforming to the general formula —OPO$_3$M$_2$, and sulfato groups are groups conforming to the general formula —OSO$_3$M, in each of which M is as defined above.

The dyes of the general formulae (I) to (III) may possess different fiber-reactive groups —SO$_2$Z within the definition of Z. In particular, the fiber-reactive groups —SO$_2$Z may on the one hand be vinylsulfonyl groups and on the other hand be —CH$_2$CH$_2$Z$^1$, groups, preferably β-sulfatoethylsulfonyl groups. If the dyes of the general formulae (I) to (III) contain vinylsulfonyl groups in some instances, then the fraction of the respective dye with the vinylsulfonyl group is up to about 30 mol %, based on the respective total dye quantity.

Alkali M is in particular lithium, sodium or potassium. M is preferably hydrogen or sodium.

R* and R** in the general formula (II) are independently each preferably hydrogen, methyl or a group of the formula (14), more preferably hydrogen or a group of the formula (14).

R$^1$ and R$^2$ are preferably hydrogen, (C$_1$-C$_4$)-alkyl, (C$_1$-C$_4$)-alkoxy, sulfo or carboxyl, and more preferably hydrogen, methyl, methoxy or sulfo.

R$^3$ to R$^6$ and R$^{12}$ to R$^{20}$ are preferably hydrogen, and R$^3$ to R$^6$ and R$^{17}$ and R$^{18}$ are preferably sulfo, moreover.

$R^7$ to $R^{10}$ are preferably hydrogen or methyl, $R^7$ and $R^8$ are preferably also phenyl, and $R^9$ and $R^{10}$ are preferably 2-sulfoethyl, 2-, 3- or 4-sulfophenyl, or $R^9$ and $R^{10}$ form a cyclic ring system which is preferably of the formula —(CH$_2$)$_2$—O—(CH$_2$)$_2$—.

Examples of groups $D^1$ to $D^5$ of the general formulae (1) and (2) are 2-(β-sulfatoethylsulfonyl)phenyl, 3-(β-sulfatoethylsulfonyl)phenyl, 4-(β-sulfatoethylsulfonyl)phenyl, 2-carboxy-5-(β-sulfatoethylsulfonyl)phenyl, 2-chloro-4-(β-sulfatoethylsulfonyl)phenyl, 2-chloro-5-(β-sulfatoethylsulfonyl)phenyl, 2-bromo-4-(β-sulfatoethylsulfonyl)phenyl, 2-sulfo-4-(β-sulfatoethylsulfonyl)phenyl, 2-sulfo-5-(β-sulfatoethylsulfonyl)phenyl, 2-methoxy-5-(β-sulfatoethylsulfonyl)phenyl, 2-ethoxy-5-(β-sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl, 2-methyl-4-(β-sulfatoethylsulfonyl)phenyl, 2- or 3- or 4-(β-thiosulfatoethylsulfonyl)phenyl, 2-methoxy-5-(β-thiosulfatoethylsulfonyl)phenyl, 2-sulfo-4-(β-phosphatoethylsulfonyl)phenyl, 2- or 3- or 4-vinylsulfonylphenyl, 2-sulfo-4-vinylsulfonylphenyl, 2-chloro-4-(β-chloroethylsulfonyl)phenyl, 2-chloro-5-(β-chloroethylsulfonyl)phenyl, 3- or 4-(β-aetoxyethylsulfonyl)phenyl, 6- or 8-(β-sulfatoethylsulfonyl)naphth-2-yl, 6-(β-sulfatoethylsulfonyl)1-sulfonaphth-2-yl and 8-(β-sulfatoethylsulfonyl)6-sulfonaphth-2-yl, preferably 3-(β-sulfatoethylsulfonyl)phenyl, 4-(β-sulfatoethylsulfonyl)phenyl, 2-sulfo-4-(β-sulfatoethylsulfonyl)phenyl, 2-methoxy-5-(β-sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl and 3- or 4-vinylsulfonylphenyl, or $D^1$ to $D^5$ correspond to a group of the general formula (3) or (9), where $R^5$ to $R^7$ and $R^{12}$ to $R^{14}$ possess the preferred definitions described above.

Where $D^1$ to $D^5$ are a group of the general formula (1) and $X^1$ is —SO$_2$Z, the SO$_2$Z-group is preferably positioned meta or para to the diazo group, and, where $D^1$ to $D^5$ are a group of the general formula (2), the bond leading to the diazo group preferably attaches to the naphthalene nucleus in the β-position.

Where A is phenylene and $X^3$ is —SO$_2$Z, the SO$_2$Z group is preferably positioned meta or para to the nitrogen atom. In the group of the general formula (9) the carboxamido group is preferably positioned para or meta to the diazo group. Where A is naphthylene the bond leading to the nitrogen atom preferably attaches to the naphthalene nucleus in the β-position.

Examples of substituents A are, in particular, 1,2-phenylene, 1,3-phenylene, 1,4-phenylene, 2-chloro-1,4-phenylene, 2-chloro-1,5-phenylene, 2-bromo-1,4-phenylene, 2-sulfo-1,4-phenylene, 2-sulfo-1,5-phenylene, 2-methoxy-1,5-phenylene, 2-ethoxy-1,5-phenylene, 2,5-dimethoxy-1,4-phenylene, 2-methoxy-5-methyl-1,4-phenylene, 2-methyl-1,4-phenylene, 2,6-naphthylene, 2,8-naphthylene, 1-sulfo-2,6-naphthylene, 6-sulfo-2,8-naphthylene, or 1,2-ethylene and 1,3-propylene.

More preferably, A is 1,3-phenylene, 1,4-phenylene, 2-sulfo-1,4-phenylene, 2-methoxy-1,5-phenylene, 2,5-dimethoxy-1,4-phenylene, 2-methoxy-5-methyl-1,4-phenylene or 1,2-ethylene and 1,3-propylene, and, in the case of the two last-mentioned alkylene groups, the radical R is preferably phenyl or 2-sulfophenyl. k is preferably the number 2 or 3.

W is preferably 1,3-phenylene, 1,4-phenylene, 2-sulfo-1,4-phenylene, 2-methoxy-1,5-phenylene, 2,5-dimethoxy-1,4-phenylene, 2-methoxy-5-methyl-1,4-phenylene, 1,2-ethylene, 1,3-propylene.

Examples of the groups $Q^1$ and $Q^2$ in the general formula (5) are independently fluoro, chloro, hydroxyl, methoxy, ethoxy, phenoxy, 3-sulfophenoxy, 4-sulfophenoxy, methylmercapto, cyanamido, amino, methylamino, ethylamino, morpholino, piperidino, phenylamino, methylphenylamino, 2-sulfophenylamino, 3-sulfophenylamino, 4-sulfophenylamino, 2,4-disulfophenylamino, 2,5-disulfophenylamino, 2-sulfoethylamino, N-methyl-2-sulfoethylamino, pyridino, 3-carboxypyridino, 4-carboxypyridino, 3-carbamoylpyridino, 4-carbamoylpyridino, 2-(2-sulfatoethylsulfonyl)phenylamino, 3-(2-sulfatoethylsulfonyl)phenylamino, 4-(2-sulfatoethylsulfonyl)phenylamino, N-ethyl-3-(2-sulfatoethylsulfonyl)phenylamino, N-ethyl-4-(2-sulfatoethylsulfonyl)phenylamino, 2-carboxy-5-(2-sulfatoethylsulfonyl)phenylamino), 2-chloro-4-(2-sulfatoethylsulfonyl)phenylamino, 2-chloro-5-(2-sulfatoethylsulfonyl)phenylamino, 2-bromo-4-(2-sulfatoethylsulfonyl)phenylamino, 2-sulfo-4-(2-sulfatoethylsulfonyl)phenylamino, 2-sulfo-5-(2-sulfatoethylsulfonyl)phenylamino, 2-methoxy-5-(2-sulfatoethylsulfonyl)phenylamino, 2,5-dimethoxy-4-(2-sulfatoethylsulfonyl)phenylamino, 2-methoxy-5-methyl-4-(2-sulfatoethylsulfonyl)phenylamino, 2-methyl-4-(2-sulfatoethylsulfonyl)phenylamino, 2-(vinylsulfonyl) phenylamino, 3-(vinylsulfonyl)phenylamino, 4-(vinylsulfonyl)phenylamino), N-ethyl-3-(vinylsulfonyl)phenylamino, N-ethyl-4-(vinylsulfonyl)phenylamino, 6-(2-sulfatoethylsulfonyl)naphth-2-ylamino, 8-(2-sulfatoethylsulfonyl)naphth-2-ylamino, 8-(2-sulfatoethylsulfonyl)-6-sulfo-naphth-2-ylamino, 3-(2-(2-sulfatoethylsulfonyl) ethylcarbamoyl)phenylamino, 4-(2-(2-sulfatoethylsulfonyl) ethylcarbamoyl)phenylamino, 3-(2-(vinylsulfonyl) ethylcarbamoyl)phenylamino, 4-(2-(2-vinylsulfonyl) ethylcarbamoyl)phenylamino, 4-(N-methyl-2-(2-sulfatoethylsulfonyl)ethylcarbamoyl)phenylamino, 4-(N-phenyl-2-(2-sulfatoethylsulfonyl)ethylcarbamoyl) phenylamino, 4-(3-(2-sulfatoethylsulfonyl) phenylcarbamoyl)phenylamino, 4-(4-(2-sulfatoethylsulfonyl)phenylcarbamoyl)phenylamino, 3-(3-(2-sulfatoethylsulfonyl)phenylcarbamoyl)phenylamino, 3-(4-(2-sulfatoethylsulfonyl)phenylcarbamoyl)phenylamino, 3-(2-sulfatoethylsulfonyl)propylamino, N-methyl-N-(2-(2-sulfatoethylsulfonyl)ethyl)-amino, N-phenyl-N-(2-(2-sulfatoethylsulfonyl)ethyl)-amino, or N-phenyl-N-(2-(2-sulfatoethylsulfonyl)propyl)-amino.

Preferably, the groups $Q^1$ and $Q^2$ in the general formula (5) are independently fluoro, chloro, cyanamido, morpholino, 2-sulfophenylamino, 3-sulfophenylamino, 4-sulfophenylamino, N-methyl-2-sulfoethylamino, 3-carboxypyridino, 4-carboxypyridino, 3-carbamoylpyridino, 4-carbamoylpyridino, 3-(2-sulfatoethylsulfonyl)phenylamino, 4-(2-sulfatoethylsulfonyl)phenylamino, 3-(vinylsulfonyl)phenylamino, 4-(vinylsulfonyl)phenylamino), 4-(3-(2-sulfatoethylsulfonyl)phenylcarbamoyl)phenylamino, 4-(4-(2-sulfatoethylsulfonyl)phenylcarbamoyl)phenylamino, 3-(3-(2-sulfatoethylsulfonyl)phenylcarbamoyl)phenylamino, 3-(4-(2-sulfatoethylsulfonyl)phenylcarbamoyl)phenylamino, N-methyl-N-(2-(2-sulfatoethylsulfonyl)ethyl)-amino, or N-phenyl-N-(2-(2-sulfatoethylsulfonyl)ethyl)-amino.

More preferably, the groups $Q^1$ and $Q^2$ in the general formula (5) are independently fluoro, chloro, cyanamido, morpholino, 2-sulfophenylamino, 3-sulfophenylamino, 4-sulfophenylamino, 3-(2-sulfatoethylsulfonyl)phenylamino, 4-(2-sulfatoethylsulfonyl)phenylamino, 3-(vinylsulfonyl) phenylamino, 4-(vinylsulfonyl)phenylamino), N-methyl-N-(2-(2-sulfatoethylsulfonyl)ethyl)-amino, or N-phenyl-N-(2-(2-sulfatoethylsulfonyl)ethyl)-amino.

Examples of the group $Z^2$ are 2,4-difluoropyrimidin-6-yl, 4,6-difluoropyrimidin-2-yl, 5-chloro-2,4-difluoropyrimidin-6-yl, 5-chloro-4,6-difluoropyrimidin-2-yl, 4,5-difluoropyrimidin-6-yl, 5-chloro-4-fluoropyrimidin-6-yl, 2,4,5-trichloropyrimidin-6-yl, 4,5-dichloropyrimidin-6-yl, 2,4-dichloropyrimidin-6-yl, 4-fluoropyrimidin-6-yl, 4-chloropyrimidin-6-yl, or a group of the general formula (5) with the above-indicated examples for $Q^1$ and $Q^2$, or a group of the general formula (6).

Preferably, $Z^2$ is 2,4-difluoropyrimidin-6-yl, 4,6-difluoropyrimidin-2-yl, 5-chloro-2,4-difluoropyrimidin-6-yl, 5-chloro-4,6-difluoropyrimidin-2-yl or a group of the general formula (5) having the above-indicated preferred groups $Q^1$ and $Q^2$.

More preferably, $Z^2$ is 2,4-difluoropyrimidin-6-yl, 5-chloro-2,4-difluoropyrimidin-6-yl or a group of the general formula (5) having the above-indicated particularly preferred groups $Q^1$ and $Q^2$.

In formula (III) T is preferably hydroxyl or amino, attached α to the naphthalene nucleus, hydroxyl being very preferred.

b and v are preferably 1 and f is preferably 0.

$R^0$ especially preferably is acetyl, 2,4-dichloro-1,3,5-triazin-6-yl or 2,4-difluoropyrimidin-6-yl.

The dye mixtures of the invention contain disazo dyes of the general formula (I) in an amount of 30 to 95% by weight, preferably 50 to 90% by weight, and dyes of the general formulae (II) and (III) independently each in an amount of 1 to 70% by weight, preferably 5 to 50% by weight.

Optionally, the dye mixtures of the invention may also contain one or more monoazo dyes of the general formula (15) to (18) in an amount of up to 10% by weight, preferably up to 5% by weight,

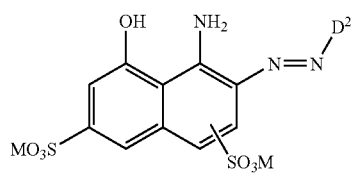
(15)

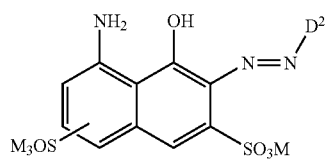
(16)

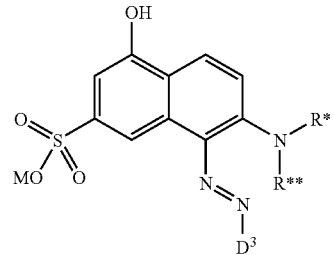
(17)

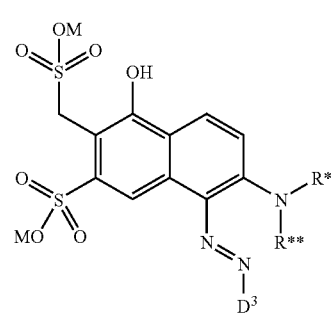
(18)

where $D^2$, $D^3$, M, R* and R** are each as defined above.

Preferably, $D^2$ and $D^3$ independently are each 3-(β-sulfatoethylsulfonyl)phenyl, 4-(β-sulfatoethylsulfonyl)phenyl, 2-sulfo-4-(β-sulfatoethylsulfonyl)phenyl, 2-methoxy-5-(β-sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl, 3- or 4-vinylsulfonyl-phenyl, 2-sulfo-4-(vinylsulfonyl)phenyl, 2-methoxy-5-(vinylsulfonyl)phenyl, 2,5-dimethoxy-4-(vinylsulfonyl)phenyl or 2-methoxy-5-methyl-4-(vinylsulfonyl)phenyl.

The dye mixtures of the invention may where appropriate further contain one or more, such as two or three, preferably 1 or 2, dyes having, for example, the hereinbelow indicated and defined general formulae (Ga)-(Gf), as further mixing or shading components

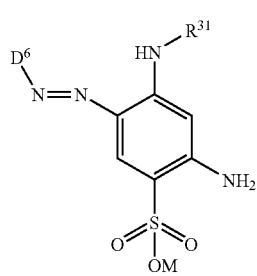
(Ga)

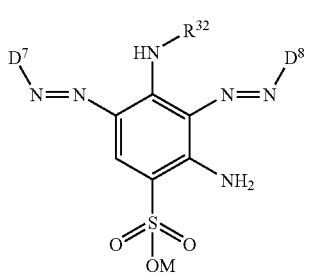
(Gb)

-continued

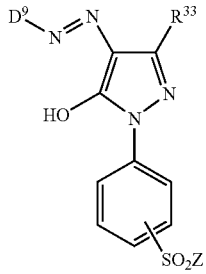 (Gc)

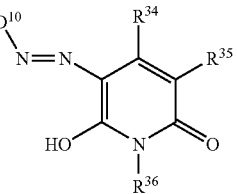 (Gd)

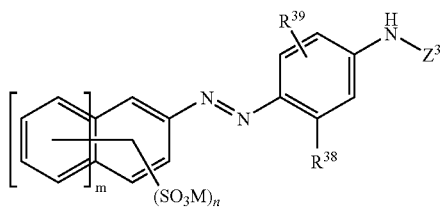 (Ge)

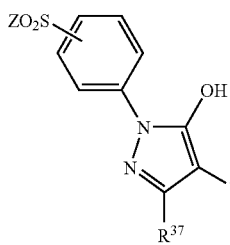 (Gf)

where
D⁶, D⁷, D⁸, D⁹ and D¹⁰ possess one of the meanings of D¹, D², D³, D⁴ or D⁵, where D⁶, if R³¹ is not a group of the general formula (4) or (5), and also D⁷ or D⁸ and D¹⁰ contain at least one fiber-reactive group of the formula —SO₂Z or Z²;

R³¹ is hydrogen, acetyl, carbamoyl, sulfomethyl, or a group of the general formula (4-1) or (5-1)

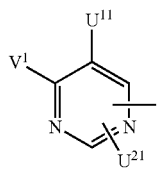 (4-1)

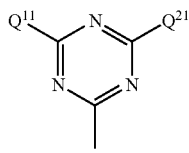 (5-1)

where
V¹ is fluoro or chloro;
U¹¹ and U²¹ independently are each fluoro, chloro or hydrogen; and
Q¹¹ and Q²¹ independently are each chloro, fluoro, cyanamido, hydroxyl, (C₁-C₆)-alkoxy, phenoxy, sulfophenoxy, mercapto, (C₁-C₆)-alkylmercapto, pyridino, carboxypyridino, carbamoylpyridino or a group of the general formula (7-1) or (8-1)

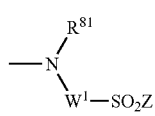 (7-1)

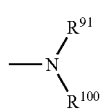 (8-1)

where
R⁸¹ is hydrogen or (C₁-C₆)-alkyl, sulfo-(C₁-C₆)-alkyl, or phenyl which is unsubstituted or substituted by (C₁-C₄)-alkyl, (C₁-C₄)-alkoxy, sulfo, halogen, carboxyl, acetamido or ureido;

R⁹¹ and R¹⁰⁰ independently each have one of the meanings of R⁸¹ or form a cyclic ring system of the formula —(CH₂)ⱼ— where j is 4 or 5, or alternatively —(CH₂)₂ -E-(CH₂)₂—, where E is oxygen, sulfur, sulfonyl or —NR¹¹, where R¹¹ is (C₁-C₆)-alkyl;

W¹ is phenylene which is unsubstituted or substituted by 1 or 2 substituents, such as (C₁-C₄)-alkyl, (C₁-C₄)-alkoxy, carboxyl, sulfa, chloro or bromo, or is (C₁-C₄)-alkylene-arylene or (C₂-C₆)-alkylene which may be interrupted by oxygen, sulfur, sulfonyl, amino, carbonyl or carboxamido, or is phenylene-CONH-phenylene which is unsubstituted or substituted by $(C_1-C_4)$-alkyl, $(C_1-C_4)$-alkoxy, hydroxyl, sulfo, carboxyl, amido, ureido or halogen, or is naphthylene which is unsubstituted or substituted by one or two sulfo groups; and Z is as defined above, and $R^{32}$ is hydrogen or sulfomethyl, $R^{33}$ is methyl, carboxyl or carboxyalkyl with $C_1$- to $C_4$-alkyl, $R^{34}$ is hydrogen or methyl, $R^{35}$ is hydrogen, cyano, carbamoyl, carboxyl or sulfomethyl, $R^{36}$ is methyl, ethyl or β-sulfoethyl, $R^{37}$ is methyl, carboxyl or carboxyalkyl with $C_1$- to $C_4$-alkyl, $R^{38}$ is acetamido, ureido or methyl, $R^{39}$ is hydrogen, methyl or methoxy, m is 0 or 1, n is 1, 2 or 3, $Z^3$ has one of the meanings of $Z^2$, and M and Z have one of the abovementioned meanings, with the exception of mixtures composed of dyes of the general formula (I-a)

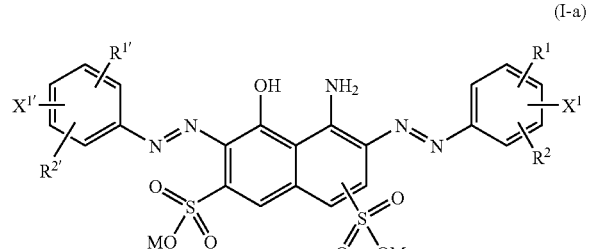

(I-a)

where $R^1$ and $R^2$ and $R^{1'}$ and $R^{2'}$ independently are each hydrogen or sulfo and $X^1$ and $X^{1'}$ are a group of the formula —SO$_2$Z, where Z is as defined above, of dyes of the general formula (II), where R* and R** independently are each hydrogen or $(C_1-C_4)$-alkyl, and of dyes of the general formula (Gb), where $R^{32}$ is hydrogen.

Preferred dye mixtures comprise one or more, such as two or three, preferably 1 or 2 dyes of the hereinbelow indicated and defined general formula (I)

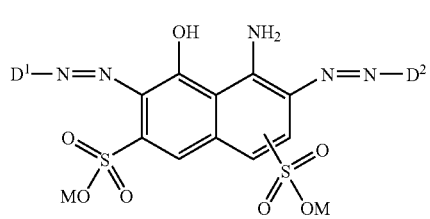

(I)

one or more dyes of the hereinbelow indicated and defined general formula (II)

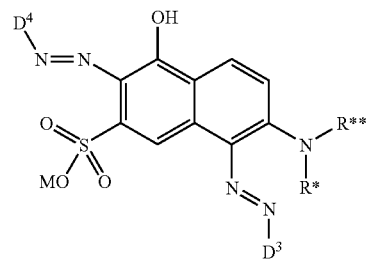

(II)

and one or more dyes of the hereinbelow indicated and defined general formula (III-a)

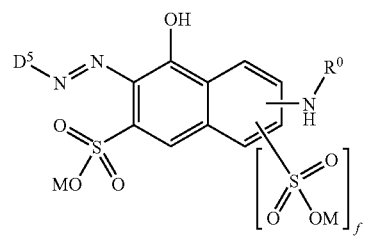

(III-a)

where $D^1, D^2, D^3, D^4, D^5, R^*, R^*, R^{**}$, f and M are as defined above.

Additionally, preferred dye mixtures are those comprising one or more, such as two or three, preferably 1 or 2, dyes of the hereinbelow indicated and defined general formula (I)

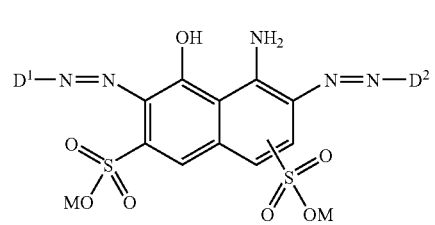

(I)

and one or more, such as two or three, preferably 1 or 2, dyes of the hereinbelow indicated and defined general formula (II-b)

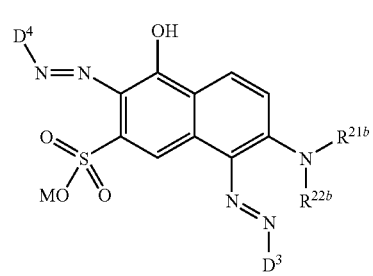

(II-b)

where $R^{21b}$ and $R^{22b}$ independently are each hydrogen or $(C_1-C_4)$-alkyl, $D^1$, $D^2$, $D^3$, $D^4$, and M are as defined above, excepting from the general formula (I) the dyes of the general formula (I-a)

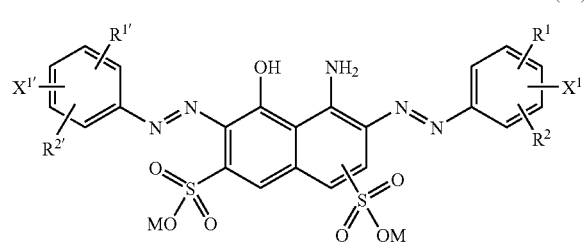

(I-a)

where $R^1$ and $R^2$ and $R^{1\,'}$ and $R^{2\,'}$ independently are each hydrogen or sulfo and $X^1$ and $X^{1'}$ are a group of the formula —$SO_2Z$, where Z is as defined above.

Additionally, preferred mixtures comprise one or more dyes of the general formula (I)

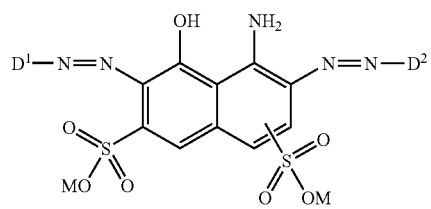

(I)

where $D^1$, $D^2$, and M are as defined above and one or more dyes of the general formula (II)

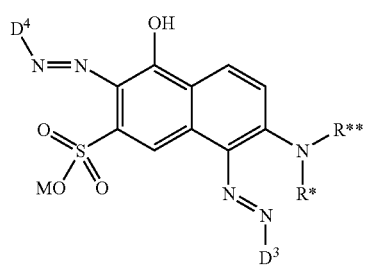

(II)

where $D^3$, $D^4$, $R^*$, $R^{**}$ and M are as defined above, and also one or more dyes of the general formulae (Ga) to (Gf).

Further preferred dye mixtures comprise one or more, such as two or three, preferably 1 or 2, dyes of the hereinbelow indicated and defined general formula (I),

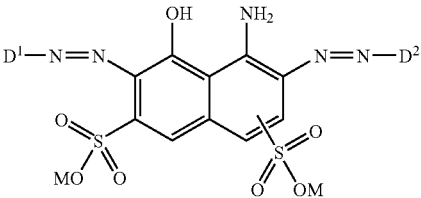

(I)

and one or more, such as two or three, preferably 1 or 2, dyes of the hereinbelow indicated and defined general formula (II-a)

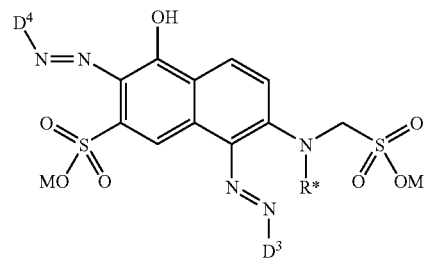

(II-a)

where $D^1$, $D^2$, $D^3$, $R^*$ and M are as defined above.

With particular preference $D^1$, $D^2$, $D^3$, and $D^4$ independently are each 3-(β-sulfatoethylsulfonyl)phenyl, 4-(β-sulfatoethylsulfonyl)phenyl, 2-sulfo-4-(β-sulfatoethylsulfonyl)phenyl, 2-methoxy-5-(β-sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl, 3- or 4-vinylsulfonylphenyl, 2-sulfo-4-(vinylsulfonyl)phenyl, 2-methoxy-5-(vinylsulfonyl)phenyl, 2,5-dimethoxy-4-(vinylsulfonyl)phenyl or 2-methoxy-5-methyl-4-(vinylsulfonyl)phenyl.

Further preferred reactive dye mixtures of the invention comprise at least one dye of the general formula (I-b)

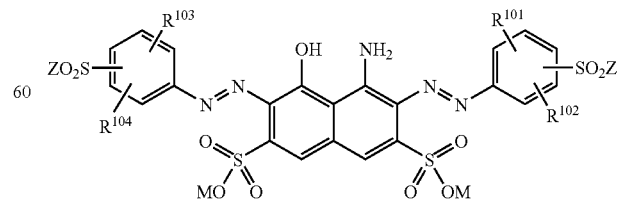

(I-b)

and at least one dye of the general formula (II-c)

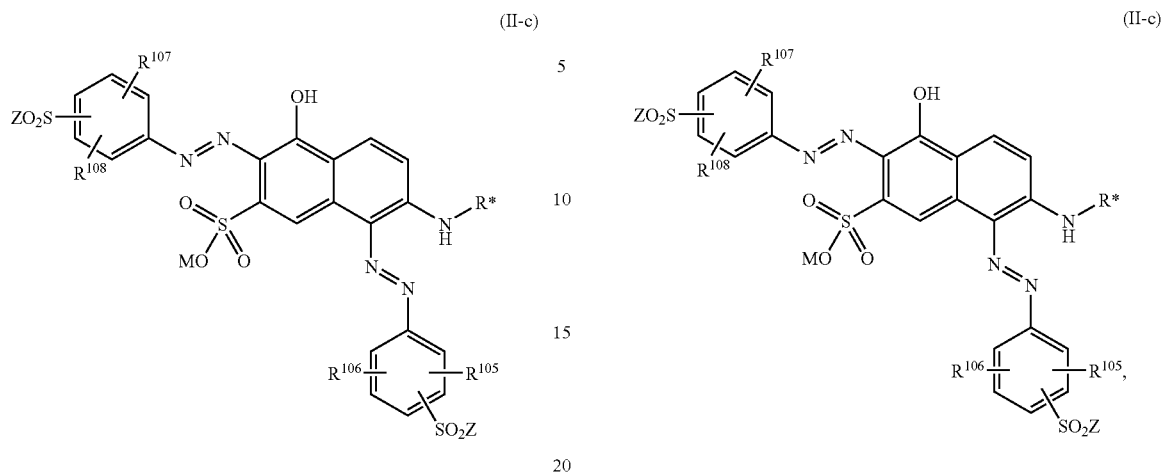

where, if R* is hydrogen or $C_1$ to $C_4$ alkyl, in the general formula (I-b) $R^{101}$ and $R^{102}$ independently are each hydrogen or sulfo if $R^{103}$ is hydrogen, $C_1$-$C_4$-alkyl, $C_1$-$C_4$-alkoxy, carboxyl or halogen and $R^{104}$ is $C_1$-$C_4$-alkyl, $C_1$-$C_4$-alkoxy, carboxyl or halogen, or $R^{103}$ and $R^{104}$ independently are each hydrogen or sulfo if $R^{101}$ is hydrogen, $C_1$-$C_4$-alkyl, $C_1$-$C_4$-alkoxy, carboxyl or halogen and $R^{102}$ is $C_1$-$C_4$-alkyl, $C_1$-$C_4$-alkoxy, carboxyl or halogen; furthermore, in the general formula (I-b) $R^{101}$ to $R^{104}$ are preferably independently each $C_1$-$C_4$-alkyl, $C_1$-$C_4$-alkoxy, carboxyl or halogen. In formula (II-c) $R^{105}$ to $R^{108}$ independently are each preferably hydrogen, $C_1$-$C_4$-alkyl, $C_1$-$C_4$-alkoxy, sulfo, carboxyl or halogen, R* is as defined above, and Z in formula (I-b) and (II-c) is vinyl or β-sulfatoethyl.

Moreover, preferred dye mixtures are those which comprise at least one dye of the general formula (I-b)

and at least one dye of the general formula (III-b)

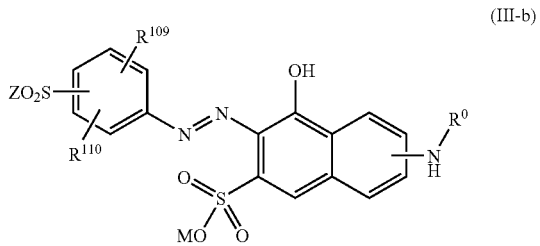

where M, Z, R* and $R^0$ are as defined above and $R^{101}$ to $R^{110}$ independently are each hydrogen, methyl, methoxy or sulfo.

Particularly preferred mixtures of the invention comprise one or more dyes of the general formula (I-b)

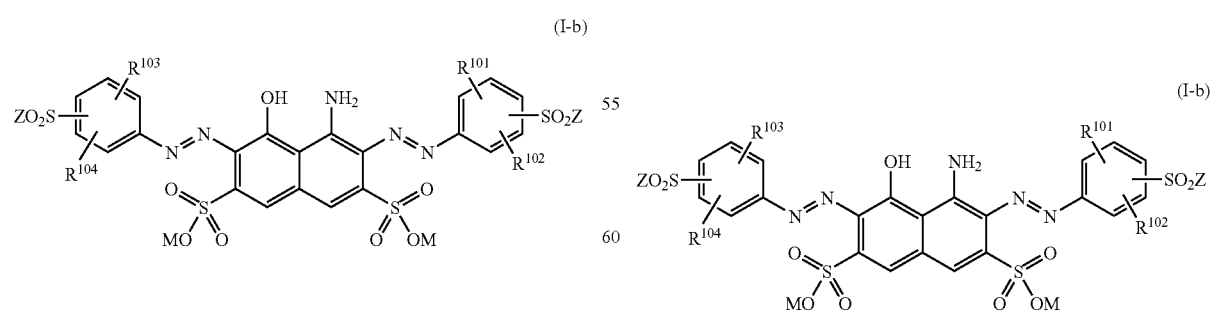

at least one dye of the general formula (II-c)

one or more dyes of the general formula (II-d)

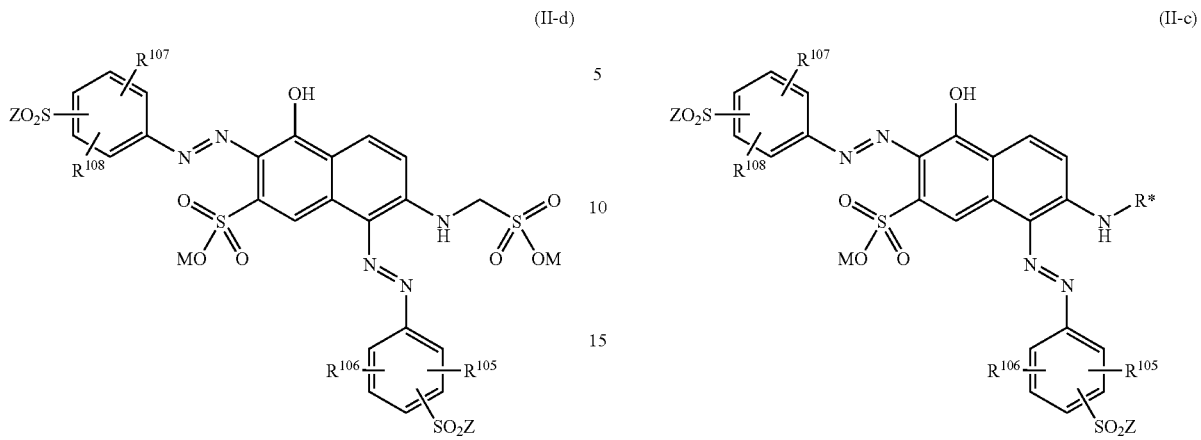

(II-d)

and one or more dyes of the general formula (III-b)

(II-c)

at least one dye of the general formula (II-c)

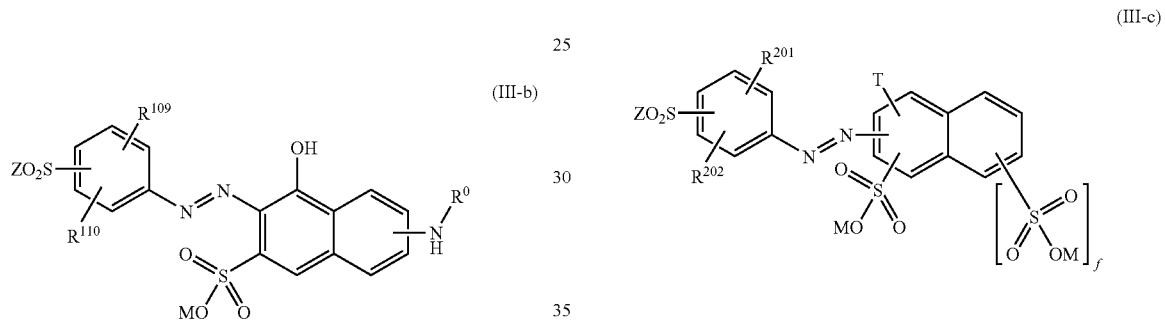

(III-b)

(III-c)

In the general formulae (I-b), (II-d) and (III-b), M and Z are as defined above.

In the general formulae (I-b), (II-d), and (III-b) $R^{101}$ to $R^{110}$ independently are each preferably hydrogen, $C_1$-$C_4$-alkyl, $C_1$-$C_4$-alkoxy, sulfo, carboxyl or halogen and Z is vinyl or β-sulfatoethyl; with very particular preference, in the formulae (I-b), (II-d), and (III-b) $R^{101}$ to $R^{110}$ independently are each hydrogen, methyl, methoxy or sulfo and Z is vinyl or β-sulfatoethyl.

In the general formula (III-b) $R^0$ is as defined above.

Further preferred dye mixtures comprise at least one dye of the general formula (I-b)

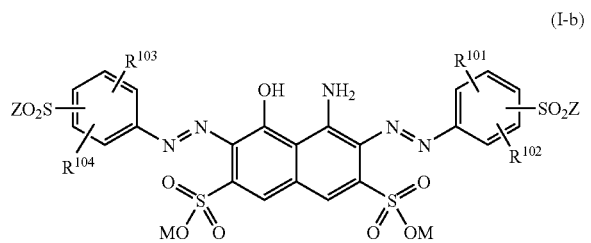

(I-b)

at least one dye of the general formula (II-c)

and at least one dye of the general formulae (Ga) to (Gf), where M, Z, R*, T and f are as defined above, $R^{101}$ to $R^{108}$ and $R^{201}$ and $R^{202}$ independently are each hydrogen, methyl, methoxy or sulfo, and $D^6$ to $D^{10}$, $R^{31}$ to $R^{39}$, m, n, and $Z^3$ are as defined above.

The dye mixtures of the invention can be present as a preparation in solid or liquid (dissolved) form. In solid form they contain, to the extent necessary, the electrolyte salts customary in the case of water-soluble and especially fiber-reactive dyes, such as sodium chloride, potassium chloride, and sodium sulfate, and may further include the auxiliaries customary in commercial dyes, such as buffer substances capable of setting a pH in aqueous solution of between 3 and 7, such as sodium acetate, sodium citrate, sodium borate, sodium hydrogencarbonate, sodium dihydrogenphosphate, and disodium hydrogenphosphate, and also dyeing auxiliaries, dustproofing agents, and small amounts of siccatives; when they are present in a liquid, aqueous solution (including a content of thickeners of the type customary in print pastes) they may also include substances which ensure a long life for these preparations, such as mold preventatives, for example.

In solid form, the dye mixtures of the invention are generally present as powders or granules which contain electrolyte salt (and which will hereinbelow generally be referred to as preparations) wilt or without one or more of the abovementioned auxiliaries. Within the preparations the dye mixture is present at 20 to 90% by weight, based on the preparation comprising it. The buffer substances are generally present in a total amount of up to 5% by weight, based on the preparation.

When the dye mixtures of the invention are present in aqueous solution, the total dye content of these aqueous solutions is up to about 50% by weight, such as between 5 and 50% by weight, for example, and the electrolyte salt content of these aqueous solutions is preferably below 10% by weight, based on the aqueous solution; the aqueous solutions (liquid preparations) may contain the aforementioned buffer substances in an amount which is generally up to 5% by weight, preferably up to 2% by weight.

Dyes of the general formula (1) are described in large numbers in the literature and are known, for example, from the U.S. Pat. No. 2,657,205 and from the Japanese published patent application Sho-58-160 362, and also from the U.S. Pat. No. 4,257,770 and the literature cited therein, while dyes of the general formula (II) are described in DE 196 00 765 A1. Dyes of the general formula (III) are likewise described in large numbers and obtainable by standard synthesis methods. Dyes of the general formulae (15) to (18) are formed in some cases during the synthesis of dyes of the general formulae (I) and (II) and are likewise obtainable by standard synthesis methods. Dyes of the general formula (15) and (16) are normally employed as shading components. Dyes of the formula (Ga)-(Gf) are known from the literature and obtainable by standard methods.

The dye mixtures of the invention are preparable in a conventional manner, as by mechanical mixing of the individual dyes, either in the form of their dye powders or granules or of their synthesis solutions, or in the form of aqueous solutions of the individual dyes generally, which may additionally include customary auxiliaries, or by conventional diazotization and coupling of suitable mixtures of diazo components and coupling components in the desired proportions.

For example, when the diazo components bearing the groups $D^1$, $D^4$, and $D^5$ as per the general formulae (I), (II), and (III) possess the same definitions ($D^1=D^4=D^5$) an amine of the general formula (19)

$$D^1\text{-}NH_2 \quad (19),$$

where $D^1$ is as defined above, can be diazotized in conventional manner and the resulting diazonium compound then reacted with an aqueous solution or suspension of a mixture in definable proportion of a monoazo dye of the general formula (15), a monoazo dye of the general formula (17), and a coupling component of the general formula (20)

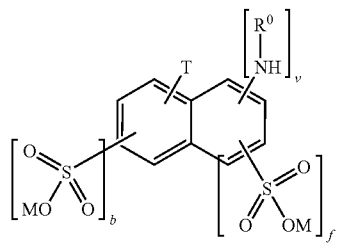

(20)

where T, $R^0$, M, b, f and v are as defined above.

Where the groups $D^2$ and $D^3$ and also $D^1$, $D^4$, and $D^5$ as per the general formulae (I), (II) and (III) possess the same definition ($D^2=D^3$ and $D^1=D^4=D^5$) the dye mixture of the invention may be prepared by conventionally diazotizing an amine of the general formula (21)

$$D^2\text{-}NH_2 \quad (21),$$

where $D^2$ is as defined above, and coupling the product to a mixture of the coupling components of the general formulae (22) and (23)

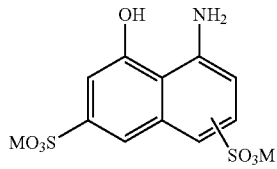

(22)

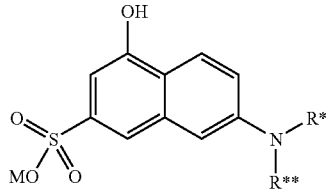

(23)

where M, R*, and R** are as defined above, at a pH below 3 in a first stage, adding a further coupling component of the general formula (20) to the resultant reaction mixture, and then diazotizing an amine of the general formula (19) and coupling the product to the resultant mixture of the monoazo dyes of the general formulae (15) and (17) and also the coupling component of the general formula (20).

Alternatively, where the groups $D^1$ to $D^5$ as per the general formulae (I), (II) and (III) possess the same definition ($D^1=D^2=D^3=D^4=D^5$), the dye mixture of the invention can be prepared by conventionally diazotizing an amine of the general formula (19) and coupling the product to a mixture in defined proportion of the coupling components of the general formulae (20), (22), and (23) first at a pH below 3 in a first stage to give a mixture of the monoazo dyes of the general formulae (15) and (17) and also the coupling component of the general formula (20), and subsequently raising the pH to carry out the second coupling to give the mixture of the dyes of the general formulae (I), (II), and (III).

The dye mixture of the invention is isolated in conventional manner by salting out for example with sodium chloride or potassium chloride or by spray drying or evaporative concentration.

Likewise, the solutions obtained during the synthesis of the dyes of the general formulae (I), (II), and (III) may be used directly as liquid preparations for dyeing, where appropriate following addition of a buffer substance and where appropriate following concentration.

Dye mixtures which as well as β-chloroethylsulfonyl or β-thiosulfatoethylsulfonyl or β-sulfatoethylsulfonyl groups contain vinylsulfonyl groups as reactive radicals as well can be synthesized not only starting from appropriately substituted vinylsulfonyl anilines or naphthylamines but also by reaction of a dye mixture where Z is β-chloroethyl, β-thiosulfatoethyl, or β-sulfatoethyl with an amount of alkali required for the desired fraction, and conversion of the aforementioned β-substituted ethylsulfonyl groups into vinylsulfonyl groups. This conversion is effected in the manner familiar to the skilled worker.

The dye mixtures of the invention possess useful performance properties. They are used for dyeing or printing hydroxyl- and/or carboxamido-containing materials, in the form for example of sheetlike structures, such as paper and leather or of films, composed for example of polyamide, or in bulk, as for example polyamide and polyurethane, but especially for dyeing and printing these materials in fiber form. Similarly, the as-synthesized solutions of the dye mixtures of the invention can be used directly as a liquid preparation for dyeing, where appropriate following addition of a buffer substance and also, where appropriate, following concentration or dilution.

The present invention accordingly also provides for the use of the dye mixtures of the invention for dyeing or printing these materials, or methods of dyeing or printing such materials in conventional ways, which comprise using a dye mixture of the invention or its individual components (dyes) individually together as colorant(s). The materials are preferably employed in the form of fiber materials, particularly in the form of textile fibers, such as woven fabrics or yarns, as in the form of hanks or wound packages.

Hydroxyl-containing materials are those of natural or synthetic origin, such as cellulose fiber materials or their regenerated products and polyvinyl alcohols, for example. Cellulose fiber materials are preferably cotton, but also other vegetable fibers, such as linen, hemp, jute, and ramie fibers; regenerated cellulose fibers are for example stable viscose and filament viscose and also chemically modified cellulose fibers, such as aminated cellulose fibers or fibers as described for example in WO 96/37641 and WO 96/37642 and also in EP-A-0 538 785 and EP-A-0 692 559.

Examples of carboxamide-containing materials include synthetic and natural polyamides and polyurethanes, particularly in the form of fibers, for example, wool and other animal hairs, silk, leather, nylon-6,6, nylon-6, nylon-11, and nylon-4.

The dye mixtures of the invention can be applied to and fixed on the substrates mentioned, especially the fiber materials mentioned, by the application techniques known for water-soluble dyes and especially for fiber-reactive dyes. For instance, on cellulose fibers they produce by the exhaust method from a long liquor and also from a short liquor—for example, in a liquor to goods ratio of 5:1 to 100:1, preferably 6:1 to 30:1—using various acid-binding agents and optionally neutral salts as far as is necessary, such as sodium chloride or sodium sulfate, dyeings having very good color yields. Dyeing is effected preferably in an aqueous bath at temperatures between 40 and 105° C., if desired at a temperature of up to 130° C. under superatmospheric pressure, but preferably at 30 to 95° C., especially 45 to 65° C., in the presence or absence of customary dyeing auxiliaries. One possible procedure here is to introduce the material into the warm bath and gradually to heat the bath to the desired dyeing temperature and complete the dyeing operation at that temperature. The neutral salts which accelerate the exhaustion of the dyes may also if desired not be added to the bath until after the actual dyeing temperature has been reached.

Padding processes likewise provide excellent color yields and a very good color buildup on cellulose fibers, the dyes being fixable in conventional manner by batching at room temperature or elevated temperature, at up to 60° C. approximately, for example, or continuously, for example by means of a pad dry-pad steam process, by steaming, or using dry heat.

Similarly, the customary printing processes for cellulose fibers, which can be carried out in one step, by printing for example with a print paste containing sodium bicarbonate or some other acid-binding agent and by subsequent steaming at 100 to 103° C., or in two steps, by printing for example with a neutral to weakly acidic print color and then fixing either by passing the printed material through a hot, electrolyte-containing alkaline bath or by overpadding with an alkaline, electrolyte-containing padding liquor and subsequent batching or steaming or dry heat treatment of the alkali-overpadded material, produced strong prints with well-defined contours and a clear white ground. The outcome of the prints is little affected, if at all, by variations in the fixing conditions.

When fixing by means of dry heat in accordance with the customary thermofix processes, hot air at 120 to 200° C. is used. As well as the customary steam at 101 to 103° C. it is also possible to use superheated steam and high-pressure steam at temperatures of up to 160° C.

The agents which bind acid and effect the fixation of the dyes of the dye mixtures of the invention on the cellulose fibers are, for example, water-soluble basic salts of alkali metals and likewise alkaline earth metals of organic or inorganic acids or compounds which liberate alkali in the heat, and also alkali metal silicates. Mention may be made in particular of the alkali metal hydroxides and alkali metal salts of weak to medium organic or inorganic acids, the preferred alkali metal compounds being the sodium and potassium compounds.

Examples of such acid-binding agents include sodium hydroxide, potassium hydroxide, sodium carbonate, sodium bicarbonate, potassium carbonate, sodium formate, sodium hydrogen phosphate, disodium hydrogenphosphate, sodium trichloroacetate, trisodium phosphate or waterglass or mixtures thereof, such as mixtures of sodium hydroxide solution and waterglass, for example.

When employed in the dyeing and printing processes, the dye mixtures of the invention are distinguished by outstanding color strength on the cellulose fiber materials, this performance being achievable in some cases even in the absence of or presence of only very small amounts of alkali metal or alkaline earth metal compounds. In these special cases a low depth of shade requires no electrolyte salt, a moderate depth of shade no more than 5 g/l of electrolyte salt, and for deep shades not more than 10 g/l of electrolyte salt.

A shallow depth of shade refers here to the use of 2% by weight of dye based on the substrate to be dyed, a moderate depth of shade refers to the use of from 2 to 4% by weight of dye based on the substrate to be dyed, and a deep shade refers to the use of from 4 to 10% by weight of dye based on the substrate to be dyed.

The dyeings and prints obtainable with the dye mixtures of the invention possess bright shades; more particularly, the dyeings and prints on cellulose fiber materials possess good light fastness and, in particular, good wetfastnesses, such as fastness to washing, milling, seawater, crossdyeing, and acidic and alkaline perspiration, also good fastness to pleating, hot pressing, and rubbing. Furthermore, the cellulose dyeings obtained following the customary aftertreatment of rinsing to remove unfixed dye portions exhibit excellent wet fastnesses, especially since unfixed dye portions are easily washed off on account of their ready solubility in cold water.

Furthermore, the dye mixtures of the invention can also be used for the fiber-reactive dyeing of wool. Moreover, wool which has been given a nonfelting or low-felting finish (cf., for example, H. Rath, Lehrbuch der Textilchemie, Springer-Verlag, $3^{rd}$ edition (1972), pp. 295-299, especially finished by the Hercosett process (p. 298); J. Soc. Dyers and Colorists 1972, 93-99, and 1975, 33-44) can be dyed with very good fastness properties. The process of dyeing on wool takes place here in a conventional manner from an acidic medium. For instance, acetic acid and/or ammonium sulfate or acetic acid and ammonium acetate or sodium acetate can be added to the dyebath to obtain the desired pH. To obtain a dyeing of acceptable levelness it is advisable to add customary leveling agents, such as agents based on a reaction product of cyanuric chloride with three times the molar amount of an aminobenzenesulfonic acid and/or of an aminonaphthalenesulfonic acid or based on a reaction product of, for example, stearylamine with ethylene oxide. For example, the dye mixture of the invention is preferably subjected to the exhaust process initially from an acid dyebath having a pH of about 3.5 to 5.5 with pH monitoring and then the pH, toward the end of the dyeing time, is shifted into the mutual and optionally weakly alkaline range up to a pH of 8.5 to bring about, especially for very deep dyeings, the full reactive bond between the dyes of the dye mixtures of the invention and the fiber. At the same time, the fraction of dye which has not been reactively bound is removed.

The procedure described here also applies to the production of dyeings on fiber materials composed of other natural polyamides or of synthetic polyamides and polyurethanes. Generally speaking, the material to be dyed is introduced into the bath at a temperature of about 40° C., agitated therein for some time, the dyebath is then adjusted to the weakly acidic, preferably weakly acetic acid, pH, and the actual dyeing is carried out at a temperature of between 60 and 98° C. However, the dyeings can also be carried out at boiling temperature or in closed dyeing apparatus at temperatures of up to 106° C. Since the water solubility of the dye mixtures of the invention is very good they can also be used with advantage in customary continuous dyeing processes. The color strength of the dye mixtures of the invention is very high.

On the aforementioned materials, preferably fiber materials, the dye mixtures of the invention provide dyeings in navy to jet black shades which have very good fastness properties.

The examples hereinbelow serve to illustrate the invention. Parts and percentages are by weight unless otherwise noted. Parts by weight relate to parts by volume as the kilogram relates to the liter. The compounds described by formula in the examples are written in the form of the sodium salts, since they are generally prepared and isolated in the form of their salts, preferably sodium or potassium salts, and are used in the form of their salts for dyeing. The starting compounds specified in the examples below, especially the tabular examples, can be employed in the synthesis in the form of the free acid or likewise in the form of their salts, preferably alkali metal salts, such as sodium or potassium salts.

EXAMPLE 1

70 parts of an electrolyte-containing dye powder containing the navy disazo dye of the formula (I-1)

in a 75% fraction, 18 parts of an electrolyte-containing dye powder containing the scarlet disazo dye of the formula (II-1)

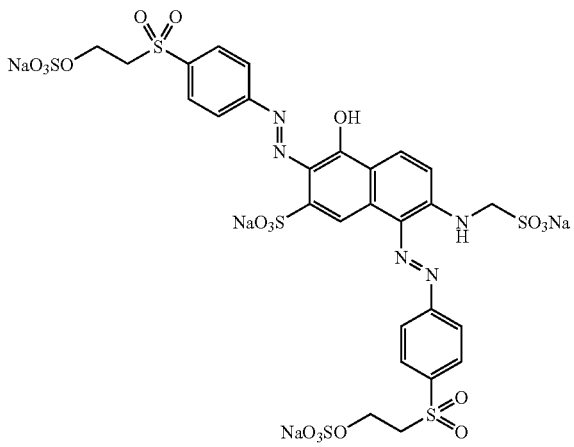

in a 70% fraction, and 12 parts of an electrolyte-containing dye powder containing the orange-colored azo dye of the formula (III-1)

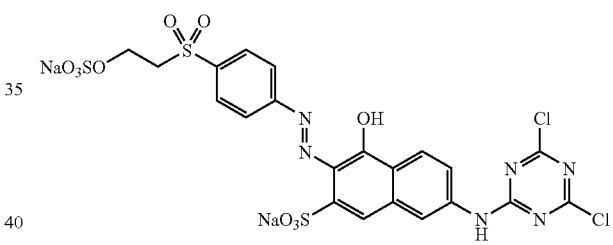

in a 75% fraction are mixed mechanically with one another.

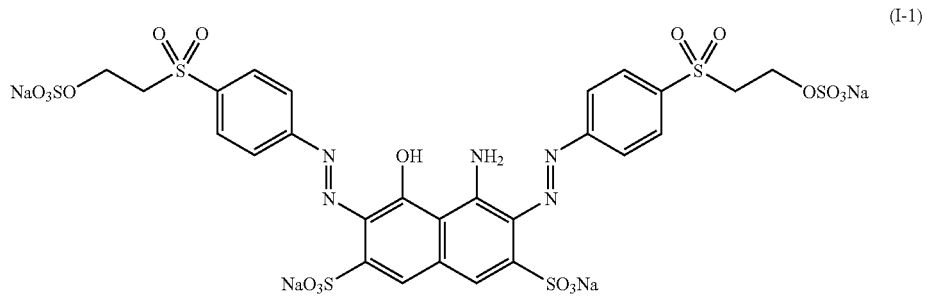

The resultant dye mixture of the invention provides jet black dyeings and prints, on cotton for example, under the dyeing conditions customary for reactive dyes.

EXAMPLE 2

75 parts of an electrolyte-containing dye powder containing the navy disazo dye of the formula (I-1) in a 70% fraction, 15 parts of an electrolyte-containing dye powder containing the scarlet disazo dye of the formula (II-2)

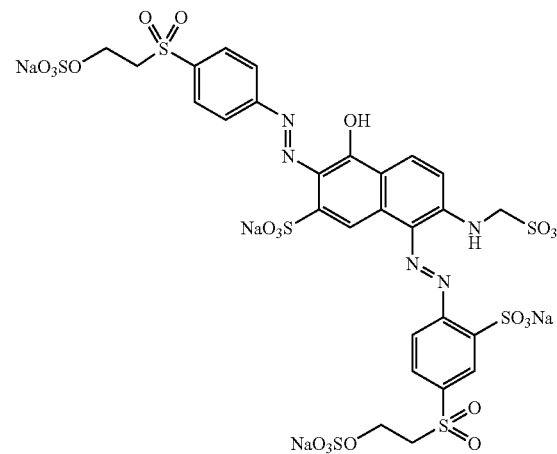

(II-2)

in a 75% fraction, and 10 parts of an electrolyte-containing dye powder containing the orange-colored azo dye of the formula (III-1) in an 80% fraction are dissolved in 700 parts of water and the dye solution obtained is adjusted to a pH of 5.5-6.5. Concentrating this dye solution gives a dye mixture which provides jet black dyeings and prints on cotton under the dyeing conditions customary for reactive dyes.

EXAMPLE 3

580 parts of 4-(β-sulfatoethylsulfonyl)aniline are suspended in 1400 parts of ice-water and 371 parts of 30% hydrochloric acid and diazotized by dropwise addition of 357 parts of 40% sodium nitrite solution. The excess nitrite is removed with amidosulfonic acid, and then 210 parts of 1-amino-8-hydroxynaphthalene-3,6-disulfonic acid and 67 parts of 4-hydroxy-7-(sulfomethylamino)naphthalene-2-sulfonic acid, prepared by reacting 48 parts of 7-amino-4-hydroxynaphthalene-2-sulfonic acid with 32 parts of formaldehyde-sodium bisulfite in an aqueous medium at a pH of 5.5-6 and at 45° C., are added, and coupling is first carried out in a first stage at a pH of 1 to 1.5 and at below 20° C. to give a mixture of two monoazo dyes conforming to the formulae (15-1) and (17-1). The stated pH range is set and maintained during the coupling reaction by adding solid sodium hydrogen carbonate.

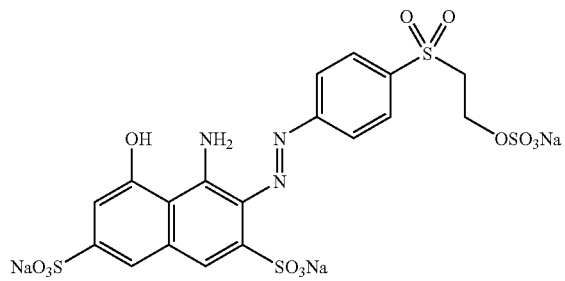

(15-1)

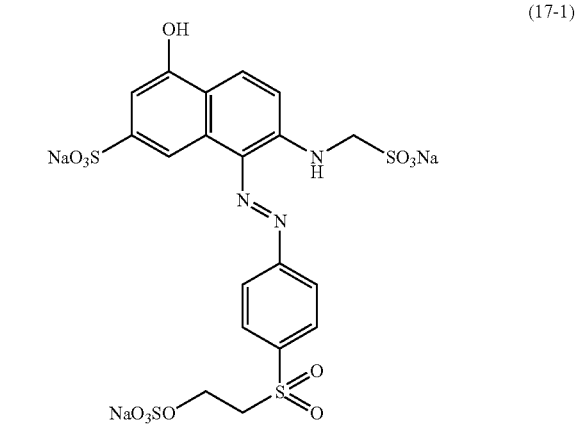

(17-1)

After the end of the first coupling, the resultant mixture is admixed with 76 parts of 7-acetylamino-4-hydroxynaphthalene-2-sulfonic acid and adjusted to a pH of 5.5-6.5 using sodium carbonate at below 25° C. The 65:20:15 mixture of the three azo dyes (I-1), (II-1), and (III-2) formed after the end of the second coupling reaction is isolated by spray drying.

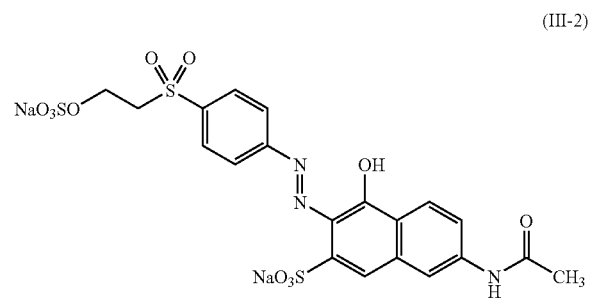

(III-2)

Alternatively, the dye solution obtained can also be buffered at a pH of 5.5-6 by adding a phosphate buffer and adjusted by further dilution or concentration as a liquid brand of defined strength.

The resultant dye mixture of the invention dyes cotton in black shades.

EXAMPLE 4

515 parts of 4-(β-sulfatoethylsulfonyl)aniline are suspended in 1200 parts of ice-water and 330 parts of 30% hydrochloric acid and diazotized by dropwise addition of 318 parts of 40% sodium nitrite solution. The excess nitrite is removed with amidosulfonic acid, and then 210 parts of 1-amino-8-hydroxynaphthalene-3,6-disulfonic acid are added and coupling is carried out in a first stage at a pH of from 1 to 1.5 and at below 20° C. to give a red monoazo dye of the formula (15-1). The stated pH range is adjusted and maintained during the coupling reaction by adding solid sodium hydrogen carbonate.

After the end of the first coupling, the reaction mixture is admixed with 76 parts of 6-acetylamino-4-hydroxynaphthalene-2-sulfonic acid and with an aqueous solution of 143 parts of the scarlet monoazo dye of the formula (17-2),

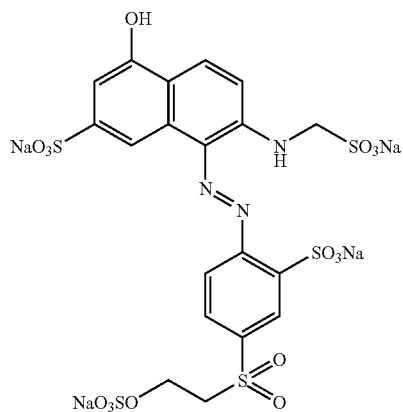

(17-2)

which was obtained by diazotizing 65 parts of 2-amino-5-β-sulfatoethylsulfonyl)benzenesulfonic acid with 31.5 parts of 40% sodium nitrite solution in an acidic medium and then coupling the product to 60 parts of 4-hydroxy-7-(sulfomethylamino)naphthalene-2-sulfonic acid at a pH of 1-2. Subsequently, at below 25° C., a pH of 5.5-6.5 is set using sodium carbonate, and the 65:20:15 mixture of the three dyes (I-1), (II-2), and (III-3) obtained after the end of the coupling reaction is isolated by concentration under reduced pressure or by spray drying.

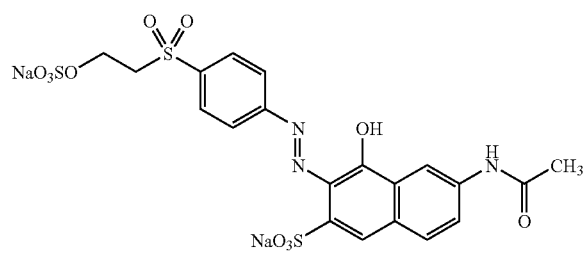

(III-3)

The resultant dye mixture of the invention dyes cotton in black shades.

EXAMPLE 5 a) 230 parts of 4-(β-sulfatoethylsulfonyl)aniline are suspended in 550 parts of ice-water and 148 parts of 30% hydrochloric acid and diazotized by dropwise addition of 142 parts of 40% sodium nitrite solution. The excess nitrite is removed with amidosulfonic acid, and then 187 parts of 1-amino-8-hydroxynaphthalene-3,6-disulfonic acid and 64 parts of 4-hydroxy-7-(sulfomethylamino)naphthalene-2-sulfonic acid, prepared as indicated in Example 3, are added, and coupling is carried out in a first stage at a pH of from 1 to 1.5 and at below 20° C. to give a mixture of the two monoazo dyes conforming to the formulae (15-1) and (17-1). The stated pH range is set and maintained during the coupling reaction by adding solid sodium hydrogen carbonate. After the end of the first coupling reaction, this mixture is admixed with 120 parts of a coupler of the formula (20-1).

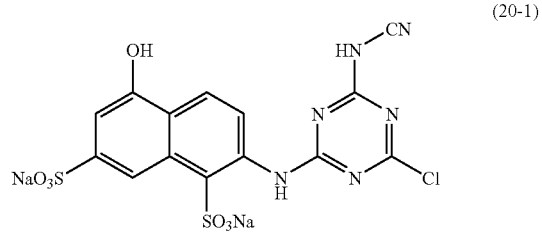

(20-1)

b) In a second, separate reaction vessel, 316 parts of 2-methoxy-5-β-sulfatoethylsulfonyl)aniline are suspended in 950 parts of ice-water and 183 parts of 30% hydrochloric acid and diazotized by dropwise addition of 177 parts of 40% sodium nitrite solution. The excess nitrite is then removed with amidosulfonic acid solution and the diazo suspension obtained is pumped into the coupler mixture from a).

A pH of 5.5-6.5 is then set using sodium carbonate at below 25° C., and the 60:20:20 mixture of the three dyes (I-2), (II-3), and (III-4) formed after the end of the second coupling reaction is isolated by concentration under reduced pressure or by spray drying.

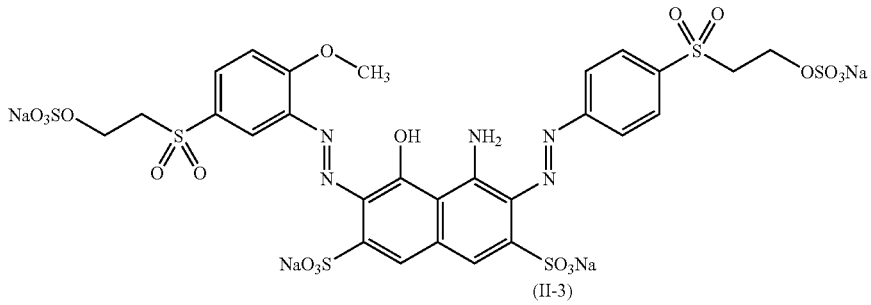

(I-2)

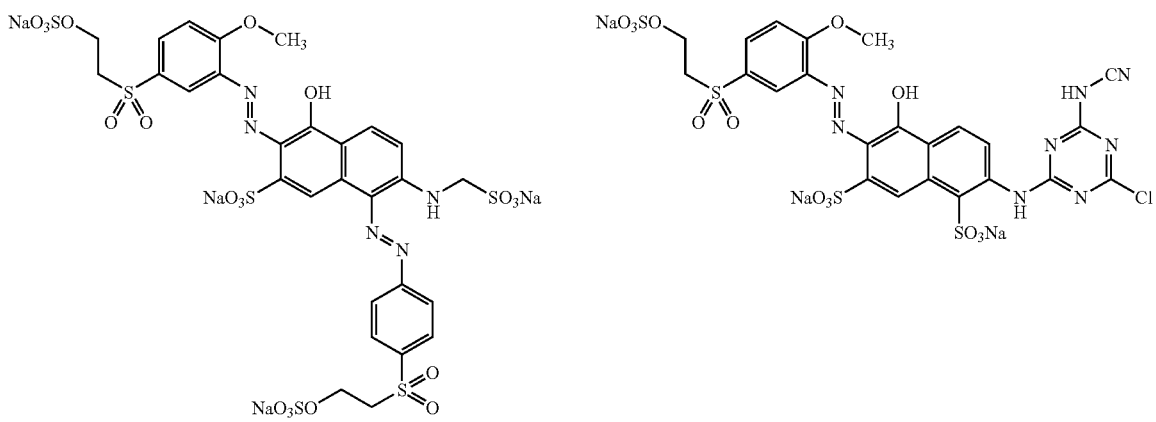

(II-3)    (III-4)

The resultant dye mixture of the invention dyes cotton in black shades.

EXAMPLE 6 a) 351 parts of 4-(β-(sulfatoethylsulfonyl)aniline are suspended in 850 parts of ice-water and 225 parts of 30% hydrochloric acid and diazotized by dropwise addition of 216 parts of 40% sodium nitrite solution. 319 parts of 1-amino-8-hydroxy-naphthalene-3,6-disulfonic acid and 83 parts of 4-hydroxy-7-(sulfomethylamino)naphthalene-2-sulfonic acid, prepared as indicated in Example 3, are added and coupling is carried out in a first stage at a pH of from 1 to 1.5 and at below 20° C. to give a mixture of the two monoazo dyes conforming to the formulae (15-1) and (17-1). The stated pH range is set and maintained during the coupling reaction by adding solid sodium hydrogen carbonate.

b) In a second, separate reaction vessel, 427 parts of 2,5-dimethoxy-4-(β-sulfatoethylsulfonyl)aniline are suspended in 1200 parts of ice-water and 226 parts of 30% hydrochloric acid and diazotized by dropwise addition of 217 parts of 40% sodium nitrite solution. The excess nitrite is then removed with amidosulfonic acid solution and the resultant diazo suspension, when the first coupling is at an end, is pumped into the solution of the two monoazo dyes from a).

The pH is then adjusted to 5-6 at below 25° C. using sodium carbonate and the dye solution obtained after the end of the second coupling reaction is admixed with 250 parts of an orange-colored dye of the formula (III-5). The resultant 67:17:16 mixture of the three azo dyes (I-3), (II-4), and (III-5) can be isolated by concentration under reduced pressure or by spray drying.

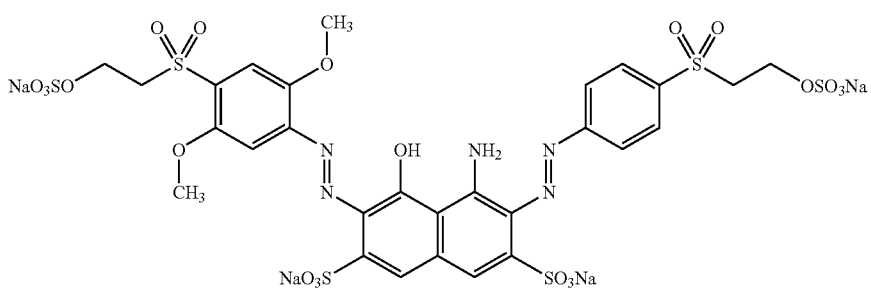

(I-3)

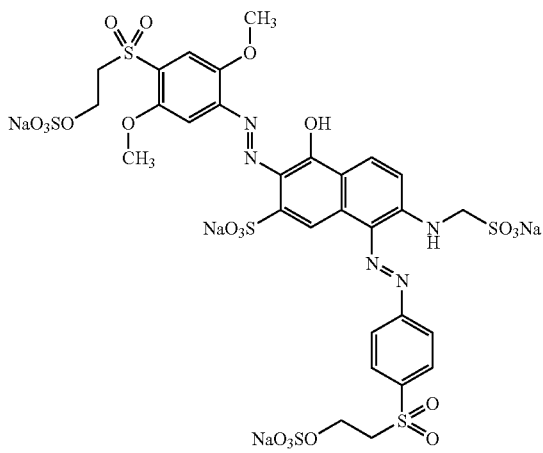

(II-4)

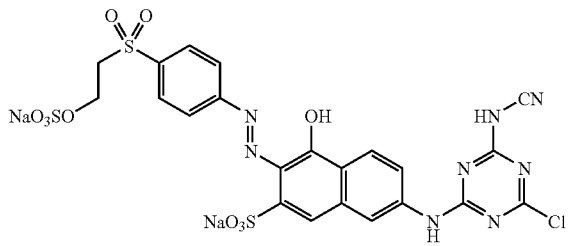

(III-5)

The resultant dye mixture of the invention dyes cotton in black shades.

EXAMPLE 7

50 parts of an electrolyte-containing dye powder containing the greenish navy disazo dye of the formula (I-4)

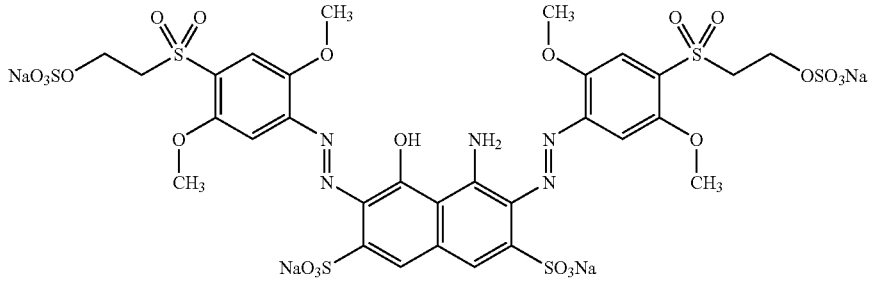

(I-4)

in a 70% fraction, 25 parts of an electrolyte-containing dye powder containing the navy disazo dye of the formula (I-1) in a 75% fraction, 20 parts of an electrolyte-containing dye powder containing the scarlet disazo dye of the formula (II-2) likewise in a 75% fraction, and 5 parts of an electrolyte-containing dye powder containing the orange-colored azo dye of the formula (III-1) in an 80% fraction are dissolved in 500 parts of water and the dye solution obtained is adjusted to a pH of 5.5-6.5 and is buffered with phosphate buffer. Concentrating this solution gives a dye mixture which provides jet black dyeings and prints on cotton under the dyeing conditions customary for reactive dyes.

EXAMPLE 8

65 parts of an electrolyte-containing dye powder containing the greenish navy disazo dye of the formula (I-5)

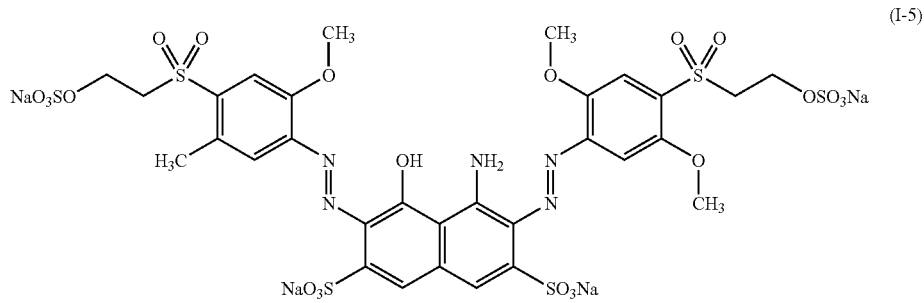

(I-5)

in a 70% fraction, 20 parts of an electrolyte-containing dye powder containing the scarlet disazo dye of the formula (II-5)

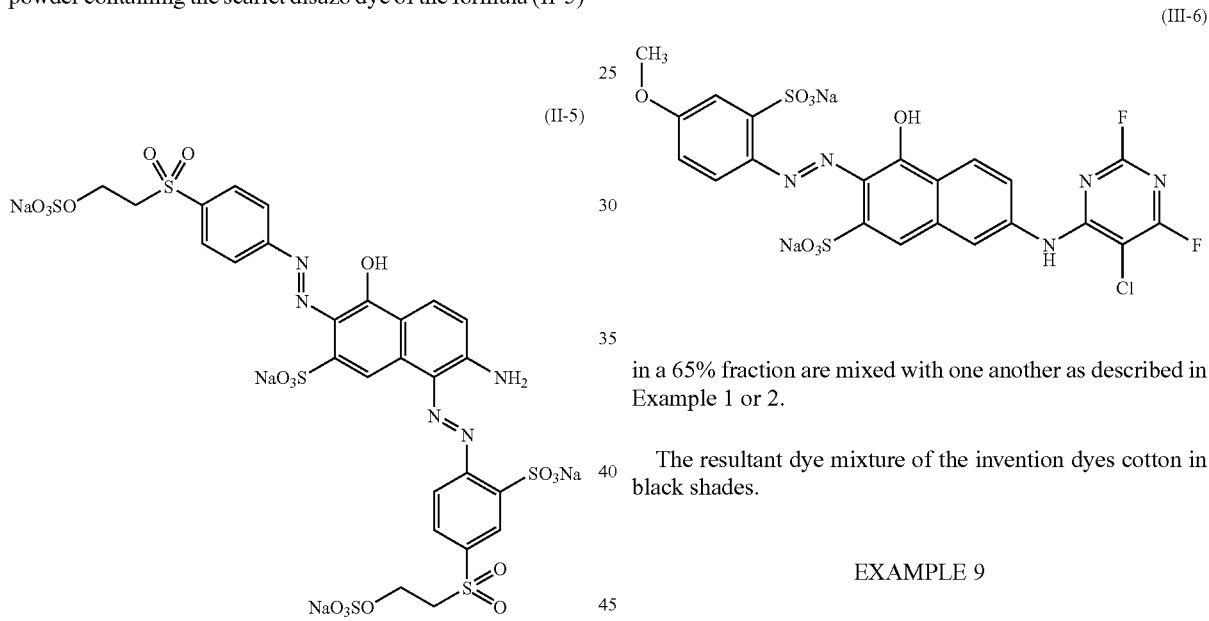

(II-5)

(III-6)

in a 65% fraction are mixed with one another as described in Example 1 or 2.

The resultant dye mixture of the invention dyes cotton in black shades.

EXAMPLE 9

70 parts of an electrolyte-containing dye powder containing the navy disazo dye of the formula (I-6)

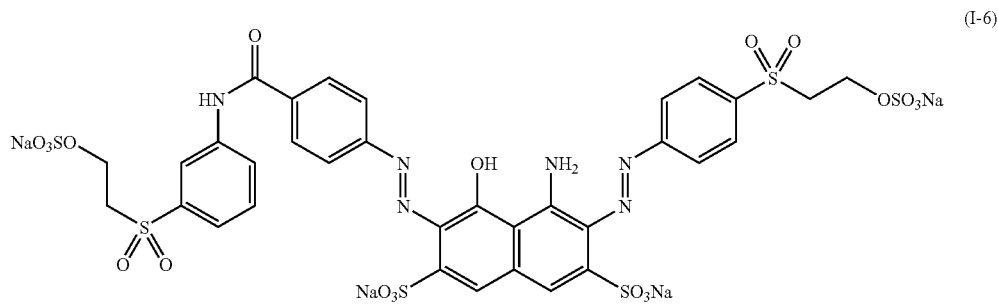

(I-6)

in a 75% fraction, and 15 parts of an electrolyte-containing dye powder containing the scarlet azo dye of the formula (III-6)

in a 70% fraction, 18 parts of an electrolyte-containing dye powder containing the scarlet disazo dye of the formula (II-1) in a 75% fraction, and 12 parts of an electrolyte-containing dye powder containing the orange-colored azo dye of the formula (III-1) in a 70% fraction are mixed with one another as described in Example 1 or 2.

The resultant dye mixture of the invention provides jet black dyeings, on cotton for example, under the dyeing conditions customary for reactive dyes and also with an amount of salt reduced as compared with the standard process.

EXAMPLE 10

A binary mixture, prepared by a procedure generally in line with that described in Example 4, of 680 parts of the navy disazo dye of the formula (I-7) and 150 parts of the scarlet disazo dye of the formula (II-6) is admixed with 170 parts of the orange-colored disazo dye of the formula (III-7), the mixture is adjusted to a pH of 5.5-6.5, and the product is isolated by concentrating the aqueous solution. The resultant dye mixture of the invention dyes cotton in black shades.

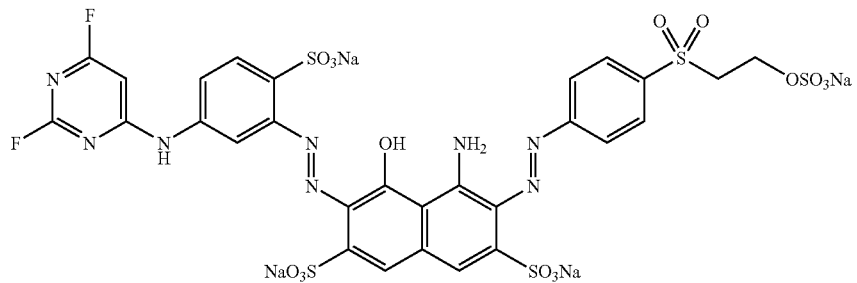
(I-7)

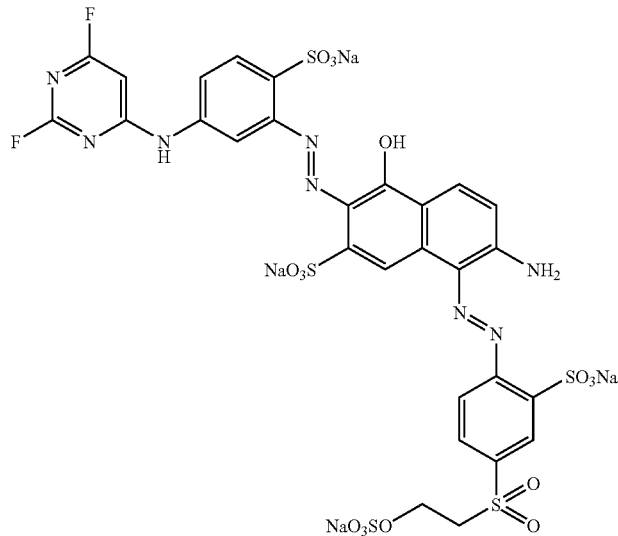
(II-6)

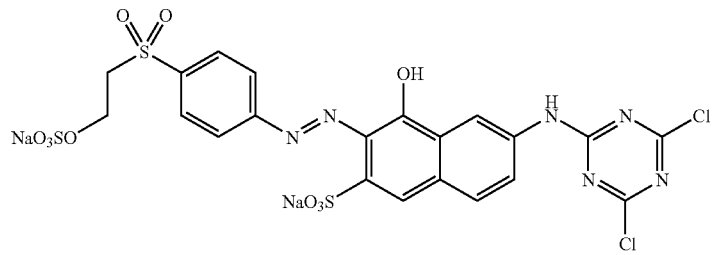
(III-7)

EXAMPLES 11 TO 448

The tabular examples hereinbelow describe further inventive mixtures of the dyes of the general formulae (I)-(III), each recited in the form of the sodium salts. The mixing proportions are indicated in percent by weight. The dye mixtures provide gray to jet black dyeings, on cotton for example, by the dyeing methods customary for reactive dyes.

| Example | Dye of gen. formula (I) |
|---------|-------------------------|
| 11 | (I-1) |
| 12 | (I-1) |
| 13 | (I-1) |
| 14 | (I-1) |
| 15 | (I-1) |
| 16 | (I-1) |
| 17 | (I-1) |
| 18 | (I-1) |
| 19 | (I-1) |
| 20 | (I-1) |
| 21 | (I-1) |
| 22 | (I-1) |
| 23 | (I-1) |
| 24 | (I-1) |
| 25 | (I-2) |
| 26 | (I-2) |
| 27 | (I-2) |
| 28 | (I-2) |
| 29 | (I-1) |
| 30 | (I-1) |
| 31 | (I-1) |
| 32 | (I-2) |
| 33 | (I-1) |
| 34 | (I-1) |
| 35 | (I-2) |
| 36 | (I-1) |
| 37 | (I-2) |
| 38 | (I-1) |
| 39 | (I-1) |
| 40 | (I-1) |
| 41 | (I-1) |
| 42 | (I-1) |
| 43 | (I-1) |
| 44 | (I-2) |
| 45 | (I-2) |
| 46 | (I-1) |
| 47 | (I-1) |
| 48 | (I-1) |
| 49 | (I-1) |
| 50 | (I-1) |
| 51 | (I-1) |
| 52 | (I-2) |
| 53 | (I-1) |
| 54 | (I-1) |
| 55 | (I-2) |
| 56 | (I-2) |
| 57 | (I-1) |
| 58 | (I-1) |
| 59 | (I-2) |
| 60 | (I-1) |
| 61 | (I-1) |
| 62 | (I-1) |
| 63 | (I-1) |
| 64 | (I-1) |
| 65 | (I-1) |
| 66 | (I-2) |
| 67 | (I-2) |
| 68 | (I-2) |
| 69 | (I-2) |
| 70 | (I-2) |
| 71 | (I-2) |
| 72 | (I-2) |
| 73 | (I-2) |
| 74 | (I-2) |
| 75 | (I-2) |
| 76 | (I-2) |
| 77 | (I-3) |
| 78 | (I-3) |
| 79 | (I-3) |
| 80 | (I-3) |
| 81 | (I-3) |

-continued

| | |
|---|---|
| 82 | (I-3) |
| 83 | (I-3) |
| 84 | (I-3) |
| 85 | (I-3) |
| 86 | (I-3) |
| 87 | (I-3) |
| 88 | (I-3) |
| 89 | (I-3) |
| 90 | (I-3) |
| 91 | (I-3) |
| 92 | (I-3) |
| 93 | (I-3) |
| 94 | (I-4) |
| 95 | (I-4) |
| 96 | (I-4) |
| 97 | (I-4) |
| 98 | (I-4) |
| 99 | (I-4) |
| 100 | (I-4) |
| 101 | (I-4) |
| 102 | (I-4) |
| 103 | (I-4) |
| 104 | (I-4) |
| 105 | (I-4) |
| 106 | (I-4) |
| 107 | (I-4) |
| 108 | (I-4) |
| 109 | (I-4) |
| 110 | (I-4) |
| 111 | (I-5) |
| 112 | (I-5) |
| 113 | (I-5) |
| 114 | (I-5) |
| 115 | (I-5) |
| 116 | (I-5) |
| 117 | (I-5) |
| 118 | (I-5) |
| 119 | (I-5) |
| 120 | (I-5) |
| 121 | (I-5) |
| 122 | (I-5) |
| 123 | (I-5) |
| 124 | (I-5) |
| 125 | (I-5) |
| 126 | (I-5) |
| 127 | (I-5) |
| 128 | (I-6) |
| 129 | (I-6) |
| 130 | (I-6) |
| 131 | (I-6) |
| 132 | (I-6) |
| 133 | (I-6) |
| 134 | (I-6) |
| 135 | (I-6) |
| 136 | (I-6) |
| 137 | (I-6) |
| 138 | (I-6) |
| 139 | (I-6) |
| 140 | (I-6) |
| 141 | (I-6) |
| 142 | (I-6) |
| 143 | (I-6) |
| 144 | (I-6) |
| 145 | (I-6) |
| 146 | (I-6) |
| 147 | (I-6) |
| 148 | (I-7) |
| 149 | (I-7) |
| 150 | (I-7) |
| 151 | (I-7) |
| 152 | (I-7) |
| 153 | (I-7) |
| 154 | (I-7) |
| 155 | (I-7) |
| 156 | (I-7) |
| 157 | (I-7) |
| 158 | (I-7) |
| 159 | (I-7) |
| 160 | (I-7) |

-continued
| | |
|---|---|
| 161 | (I-7) |
| 162 | (I-7) |
| 163 | (I-7) |
| 164 | (I-7) |
| 165 | (I-7) |
| 166 | 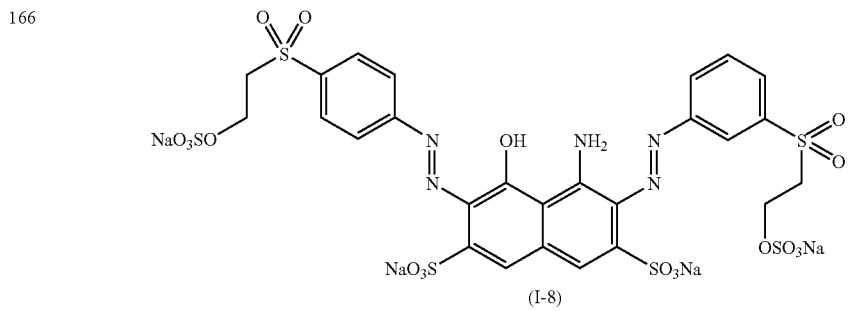 (I-8) |
| 167 | (I-8) |
| 168 | (I-8) |
| 169 | (I-8) |
| 170 | (I-8) |
| 171 | (I-8) |
| 172 | (I-8) |
| 173 | (I-8) |
| 174 | (I-8) |
| 175 | (I-8) |
| 176 | (I-8) |
| 177 | (I-8) |
| 178 | 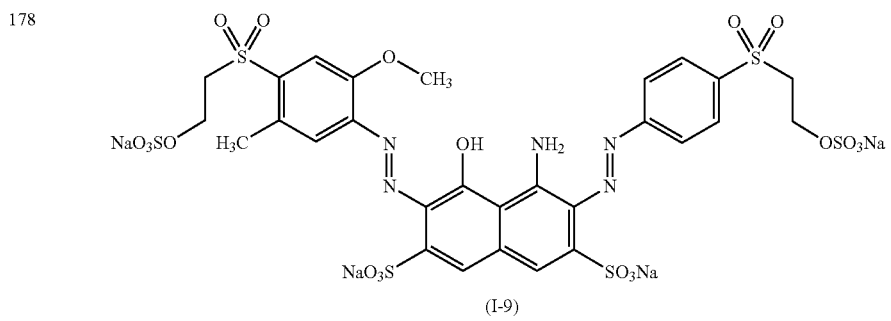 (I-9) |
| 179 | (I-9) |
| 180 | (I-9) |
| 181 | (I-9) |
| 182 | (I-9) |
| 183 | (I-9) |
| 184 | (I-9) |
| 185 | (I-9) |
| 186 | (I-9) |
| 187 | (I-9) |
| 188 | (I-9) |
| 189 | (I-9) |
| 190 | (I-9) |
| 191 | (I-9) |
| 192 | (I-9) |
| 193 | (I-9) |
| 194 | (I-9) |

-continued
| | | |
|---|---|---|
| 195 | 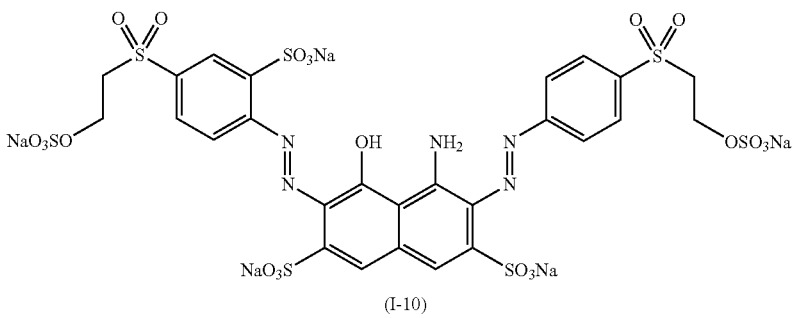 (I-10) | |
| 196 | (I-10) | |
| 197 | (I-10) | |
| 198 | (I-10) | |
| 199 | (I-10) | |
| 200 | (I-10) | |
| 201 | (I-10) | |
| 202 | (I-10) | |
| 203 | (I-10) | |
| 204 | (I-10) | |
| 205 | (I-10) | |
| 206 | (I-10) | |
| 207 | 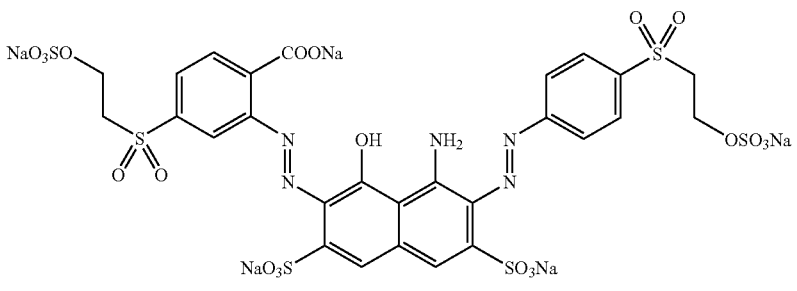 (I-11) | |
| 208 | (I-11) | |
| 209 | (I-11) | |
| 210 | (I-11) | |
| 211 | (I-11) | |
| 212 | (I-11) | |
| 213 | (I-11) | |
| 214 | (I-11) | |
| 215 | (I-11) | |
| 216 | (I-11) | |
| 217 | (I-11) | |
| 218 | (I-11) | |
| 219 | (I-11) | |
| 220 | (I-11) | |
| 221 | (I-11) | |
| 222 | (I-11) | |
| 223 | (I-11) | |
| 224 | 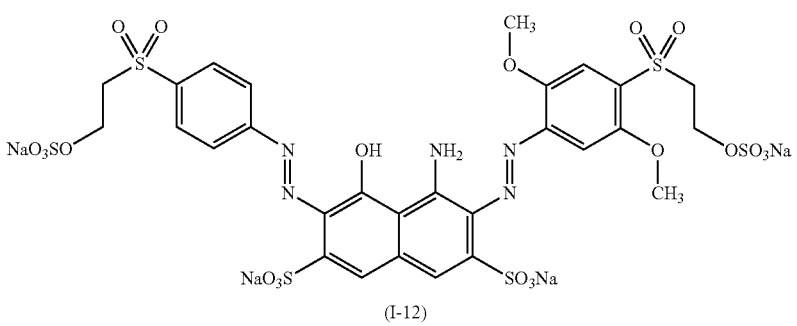 (I-12) | |
| 225 | (I-12) | |
| 226 | (I-12) | |
| 227 | (I-12) | |

-continued
| | |
|---|---|
| 228 | (I-12) |
| 229 | (I-12) |
| 230 | (I-12) |
| 231 | (I-12) |
| 232 | (I-12) |
| 233 | (I-12) |
| 234 | (I-12) |
| 235 | (I-12) |
| 236 | (I-12) |
| 237 | (I-12) |
| 238 | (I-12) |
| 239 | (I-12) |
| 240 | (I-12) |
| 241 | 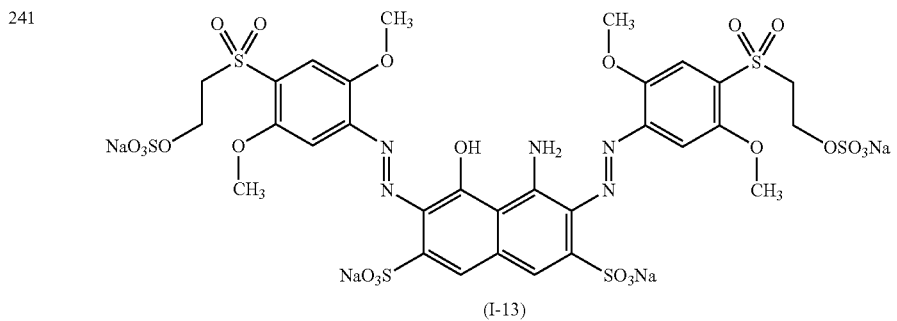 (I-13) |
| 242 | (I-13) |
| 243 | (I-13) |
| 244 | (I-13) |
| 245 | (I-13) |
| 246 | (I-13) |
| 247 | (I-13) |
| 248 | (I-13) |
| 249 | (I-13) |
| 250 | (I-13) |
| 251 | (I-13) |
| 252 | (I-13) |
| 253 | (I-13) |
| 254 | (I-13) |
| 255 | (I-13) |
| 256 | (I-13) |
| 257 | (I-13) |
| 258 | 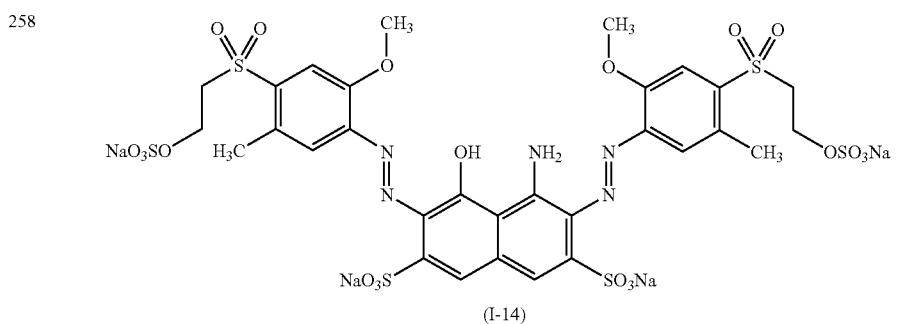 (I-14) |
| 259 | (I-14) |
| 260 | (I-14) |
| 261 | (I-14) |
| 262 | (I-14) |
| 263 | (I-14) |
| 264 | (I-14) |
| 265 | (I-14) |
| 266 | (I-14) |
| 267 | (I-14) |
| 268 | (I-14) |
| 269 | (I-14) |
| 270 | (I-14) |
| 271 | (I-14) |
| 272 | (I-14) |
| 273 | (I-14) |
| 274 | (I-14) |

-continued
275 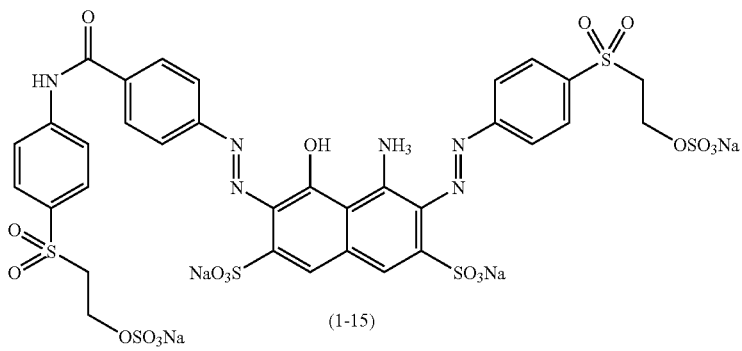
(1-15)
| | |
|---|---|
| 276 | (I-15) |
| 277 | (I-15) |
| 278 | (I-15) |
| 279 | (I-15) |
| 280 | (I-15) |
| 281 | (I-15) |
| 282 | (I-15) |
| 283 | (I-15) |
| 284 | (I-15) |
| 285 | (I-15) |
| 286 | (I-15) |
| 287 | (I-15) |
| 288 | (I-15) |
| 289 | (I-15) |
| 290 | (I-15) |
| 291 | (I-15) |
| 292 | (I-15) |
| 293 | (I-15) |
| 294 | (I-15) |
295 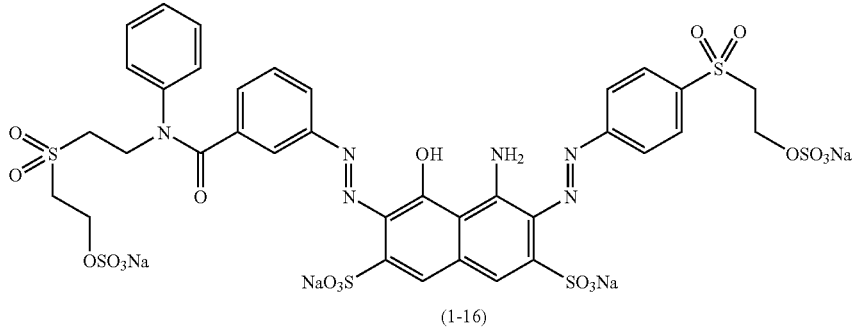
(1-16)
| | |
|---|---|
| 296 | (I-16) |
| 297 | (I-16) |
| 298 | (I-16) |
| 299 | (I-16) |
| 300 | (I-16) |
| 301 | (I-16) |
| 302 | (I-16) |
| 303 | (I-16) |
| 304 | (I-16) |
| 305 | (I-16) |
| 306 | (I-16) |
| 307 | (I-16) |
| 308 | (I-16) |
| 309 | (I-16) |
| 310 | (I-16) |
| 311 | (I-16) |
| 312 | (I-16) |

-continued
313 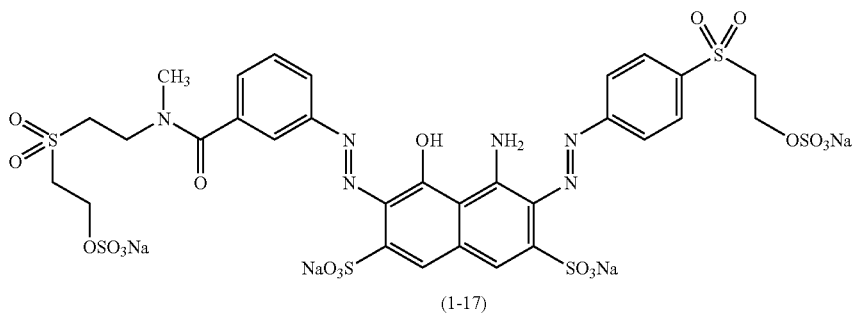
(1-17)
| | |
|---|---|
| 314 | (I-17) |
| 315 | (I-17) |
| 316 | (I-17) |
| 317 | (I-17) |
| 318 | (I-17) |
| 319 | (I-17) |
| 320 | (I-17) |
| 321 | (I-17) |
| 322 | (I-17) |
| 323 | (I-17) |
| 324 | (I-17) |
| 325 | (I-17) |
| 326 | (I-17) |
| 327 | (I-17) |
| 328 | (I-17) |
| 329 | (I-17) |
| 330 | (I-17) |
331 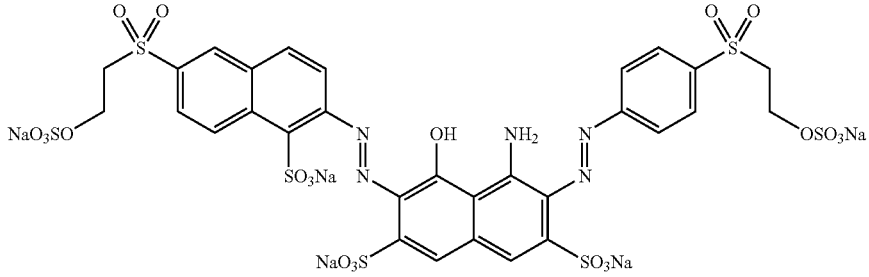
(1-18)
| | |
|---|---|
| 332 | (I-18) |
| 333 | (I-18) |
| 334 | (I-18) |
| 335 | (I-18) |
| 336 | (I-18) |
| 337 | (I-18) |
| 338 | (I-18) |
| 339 | (I-18) |
| 340 | (I-18) |
| 341 | (I-18) |
| 342 | (I-18) |
| 343 | (I-18) |
| 344 | (I-18) |
| 345 | (I-18) |
| 346 | (I-18) |
| 347 | (I-18) |

| | | |
|---|---|---|
| 348 | 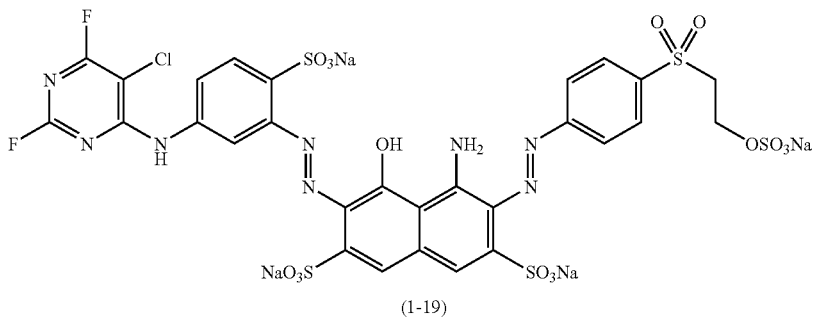 (1-19) | |
| 349 | (I-19) | |
| 350 | (I-19) | |
| 351 | (I-19) | |
| 352 | (I-19) | |
| 353 | (I-19) | |
| 354 | (I-19) | |
| 355 | (I-19) | |
| 356 | (I-19) | |
| 357 | (I-19) | |
| 358 | (I-19) | |
| 359 | (I-19) | |
| 360 | (I-19) | |
| 361 | (I-19) | |
| 362 | (I-19) | |
| 363 | (I-19) | |
| 364 | (I-19) | |
| 365 | 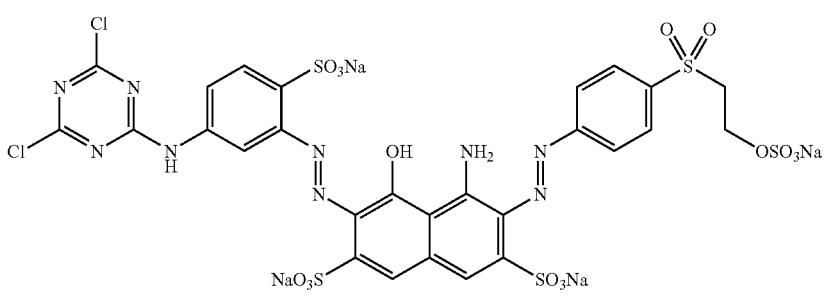 (1-20) | |
| 366 | (I-20) | |
| 367 | (I-20) | |
| 368 | (I-20) | |
| 369 | (I-20) | |
| 370 | (I-20) | |
| 371 | (I-20) | |
| 372 | (I-20) | |
| 373 | (I-20) | |
| 374 | (I-20) | |
| 375 | (I-20) | |
| 376 | (I-20) | |
| 377 | (I-20) | |
| 378 | (I-20) | |
| 379 | (I-20) | |
| 380 | (I-20) | |
| 381 | (I-20) | |

-continued

| | |
|---|---|
| 382 | (structure 1-21): triazine with F substituent, linked via NH groups to phenyl-sulfonylethyl-OSO₃Na groups and to an aminonaphthol bis-azo dye with SO₃Na groups, coupled to phenyl-sulfonylethyl-OSO₃Na (1-21) |
| 383 | (I-21) |
| 384 | (I-21) |
| 385 | (I-21) |
| 386 | (I-21) |
| 387 | (I-21) |
| 388 | (I-21) |
| 389 | (I-21) |
| 390 | (I-21) |
| 391 | (I-21) |
| 392 | (I-21) |
| 393 | (I-21) |
| 394 | (I-21) |
| 395 | (I-21) |
| 396 | (I-21) |
| 397 | (I-21) |
| 398 | (I-21) |
| 399 | (I-21) |
| 400 | (structure 1-22): triazine with Cl substituent, analogous structure (1-22) |
| 401 | (I-22) |
| 402 | (I-22) |
| 403 | (I-22) |
| 404 | (I-22) |
| 405 | (I-22) |
| 406 | (I-22) |
| 407 | (I-22) |
| 408 | (I-22) |
| 409 | (I-22) |
| 410 | (I-22) |
| 411 | (I-22) |
| 412 | (I-22) |
| 413 | (I-22) |
| 414 | (I-22) |
| 415 | (I-22) |
| 416 | (I-22) |
| 417 | (I-22) |

| Example | Dye of gen. formula (II) |
|---|---|
| 11 | (II-1) |
| 12 | (II-1) |
| 13 | (II-2) |
| 14 | (II-2) |

-continued
| | |
|---|---|
| 15 | (II-2) |
| 16 | (II-2) |
| 17 | (II-6) |
| 18 | (II-6) |
| 19 | (II-6) |
| 20 | (II-6) |
| 21 | (II-6) |
| 22 | (II-6) |
23
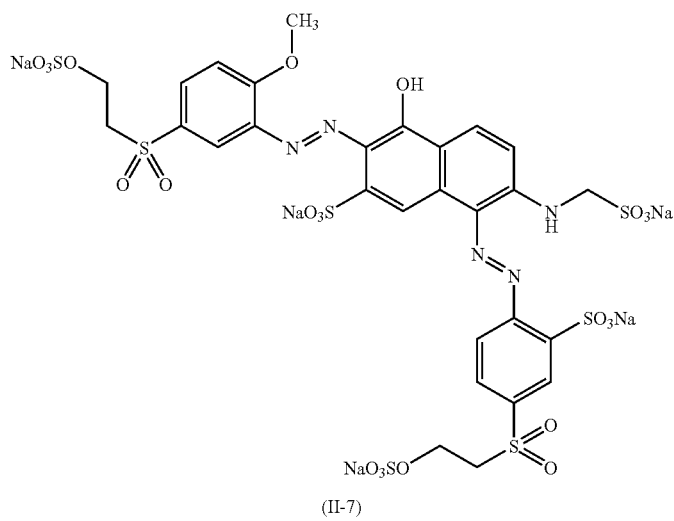
(II-7)
24
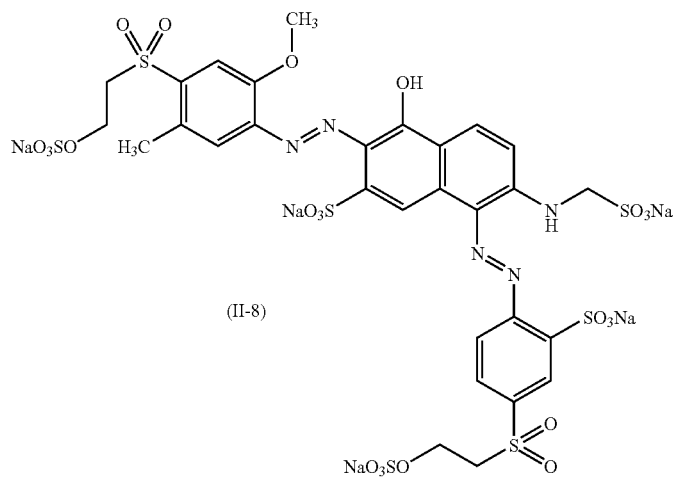
(II-8)

-continued
25
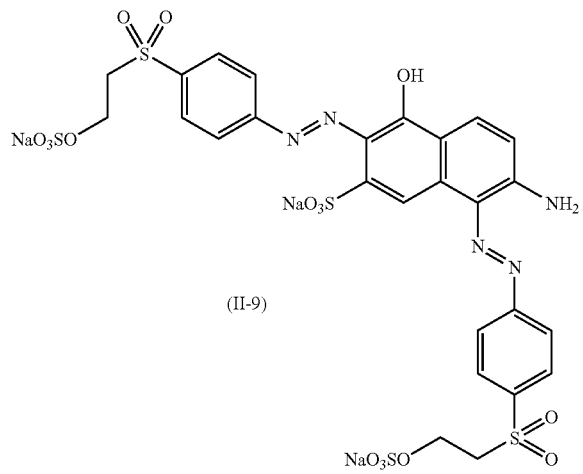
(II-9)
26
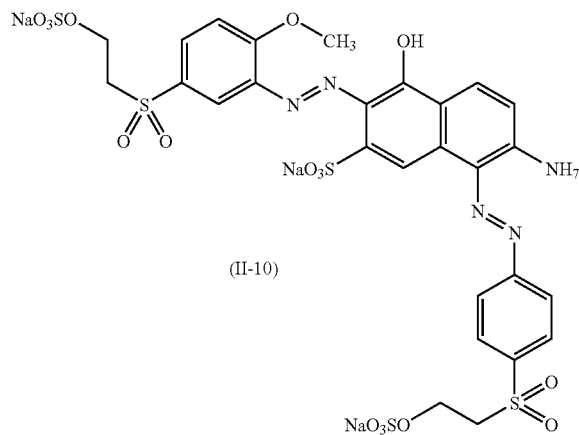
(II-10)
27
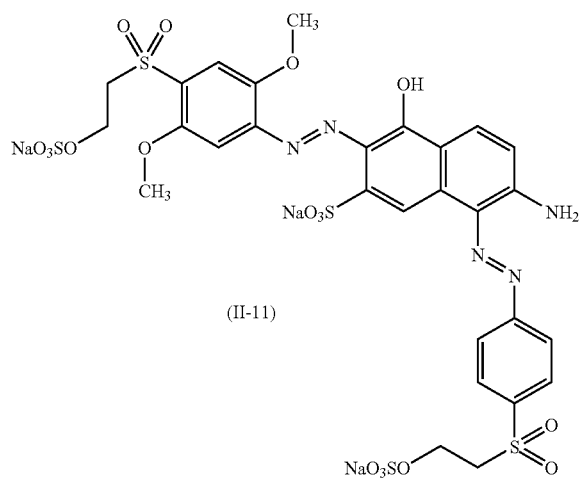
(II-11)

-continued
28
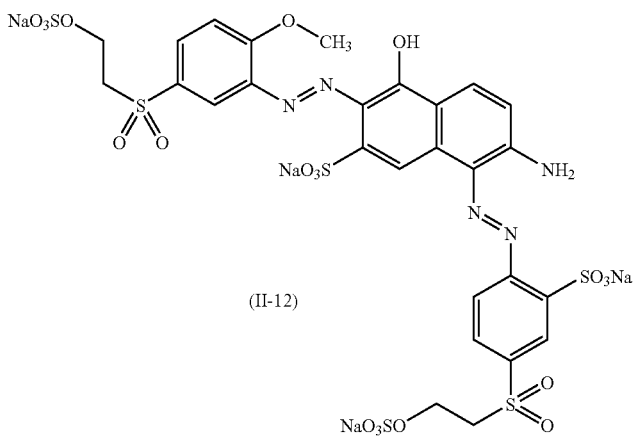
(II-12)
29
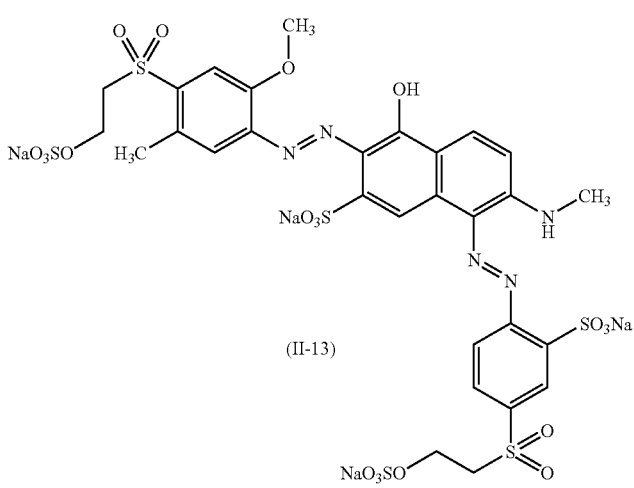
(II-13)
30
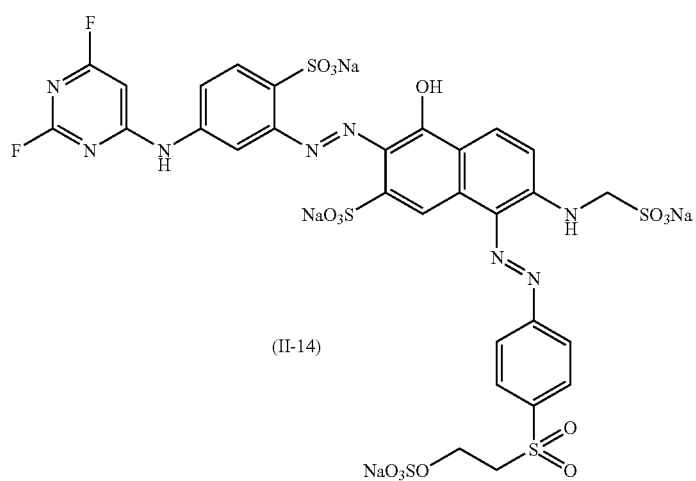
(II-14)

-continued
31
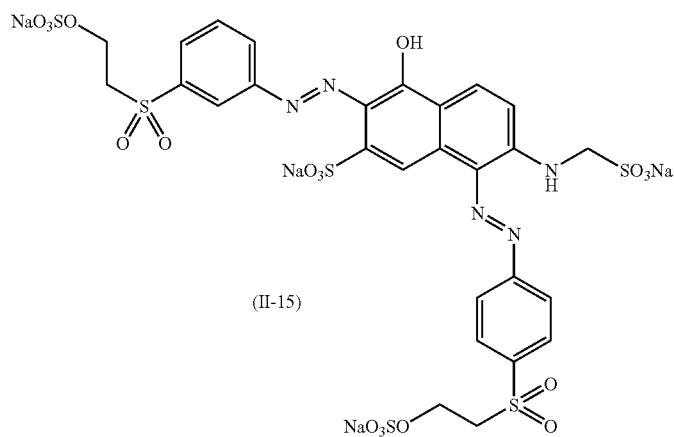
(II-15)
32
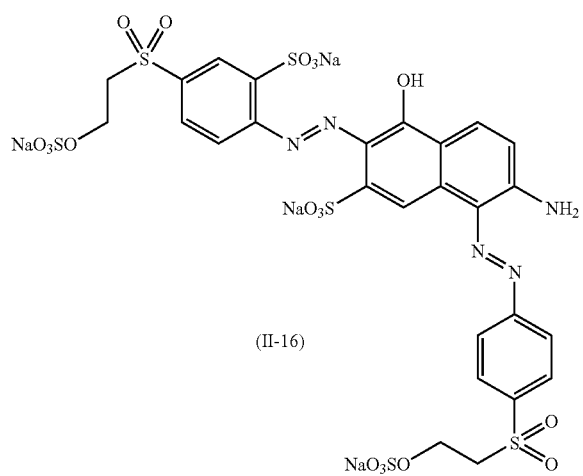
(II-16)
33
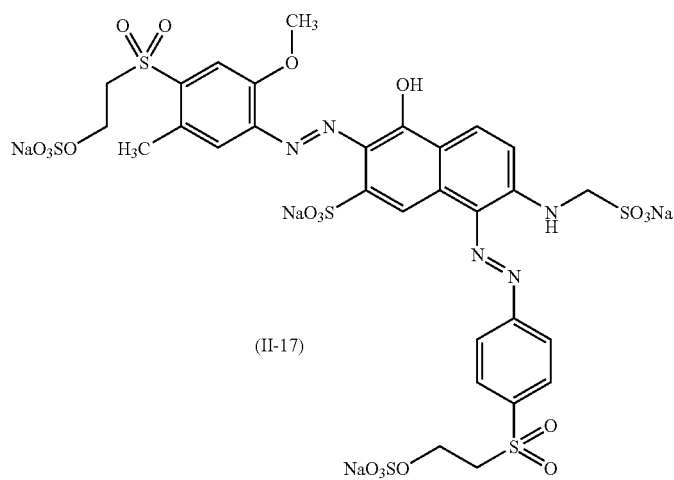
(II-17)

34 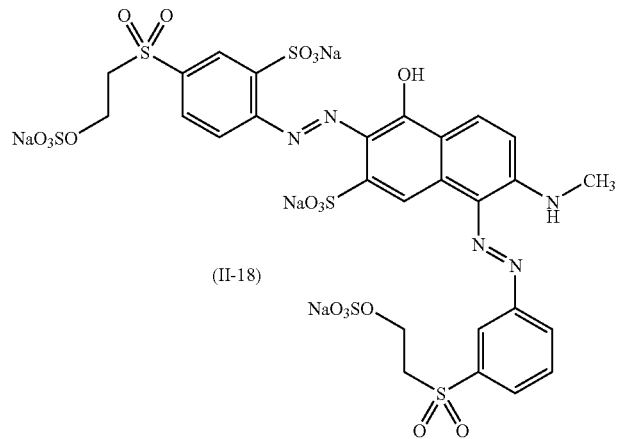
(II-18)
35 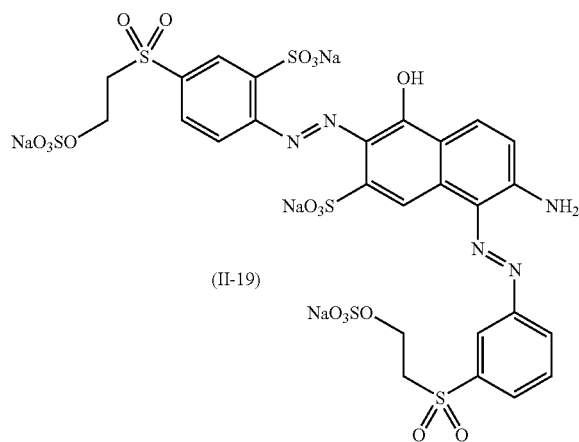
(II-19)
36 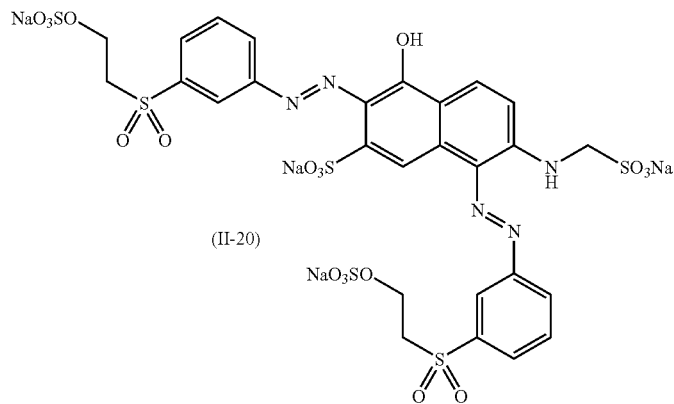
(II-20)

-continued
| 37 | 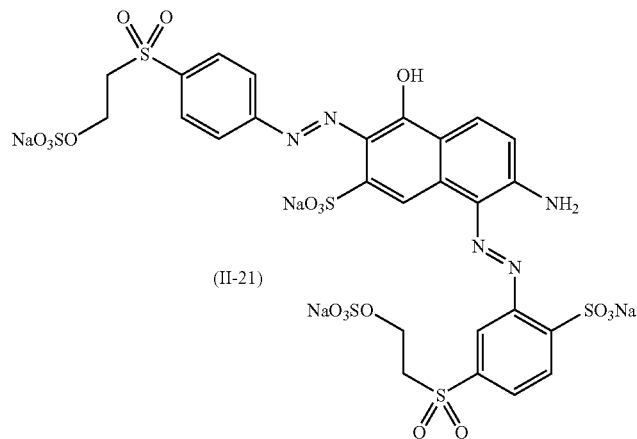 |
| --- | --- |
|  | (II-21) |
| 38 | 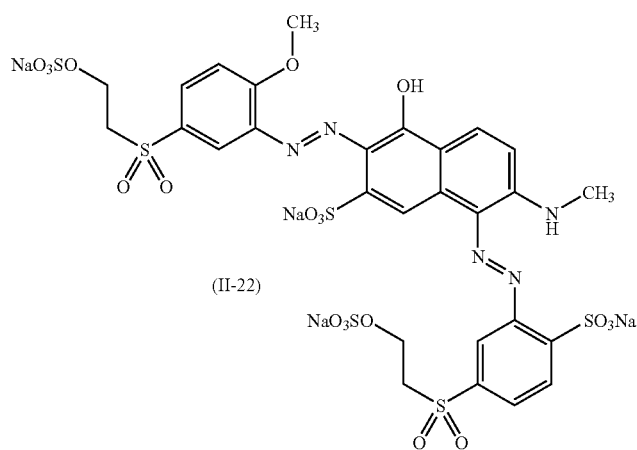 |
| --- | --- |
|  | (II-22) |
| 39 | 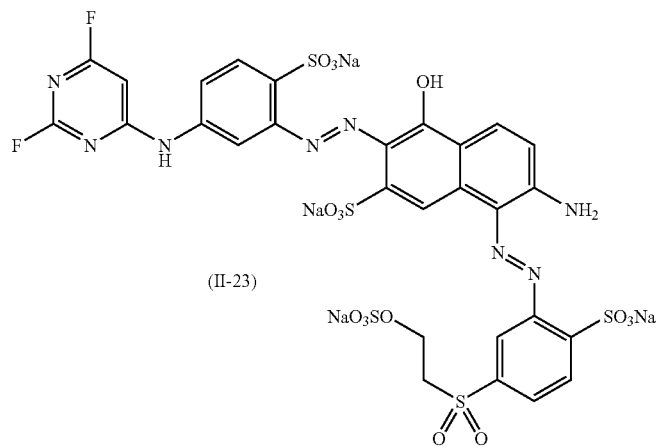 |
| --- | --- |
|  | (II-23) |

40
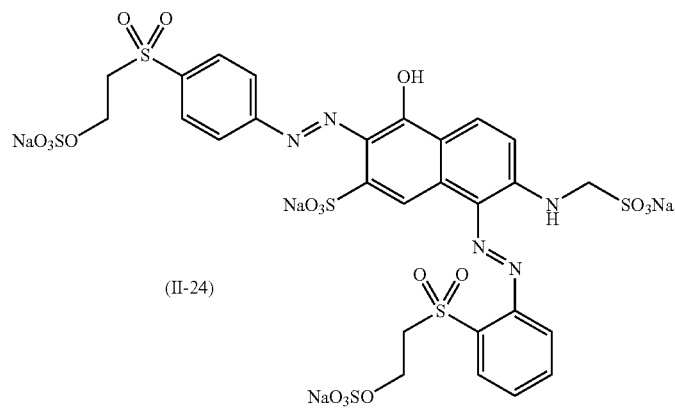
(II-24)
41
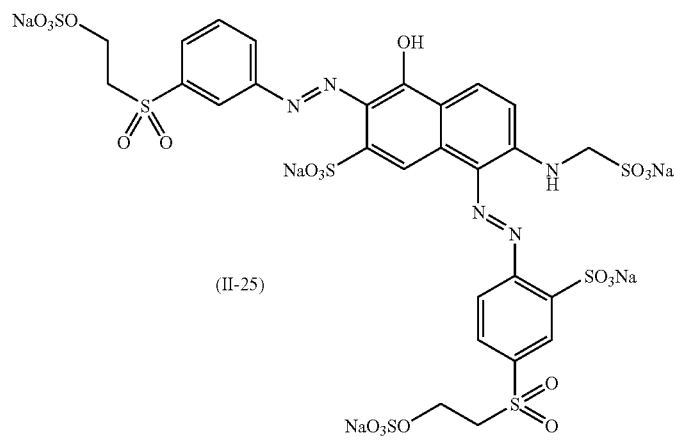
(II-25)
42
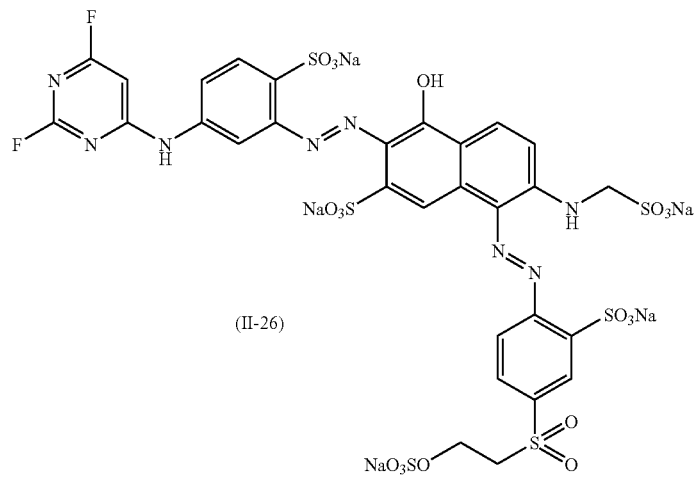
(II-26)

-continued
43
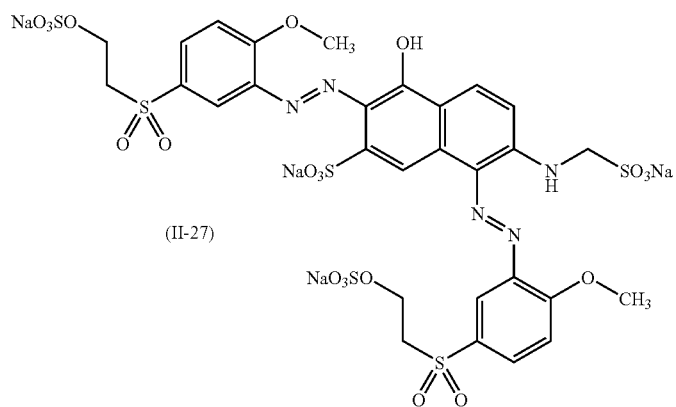
(II-27)
44
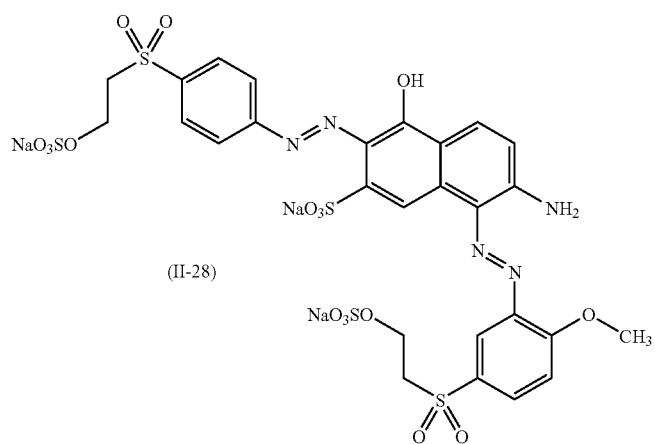
(II-28)
45
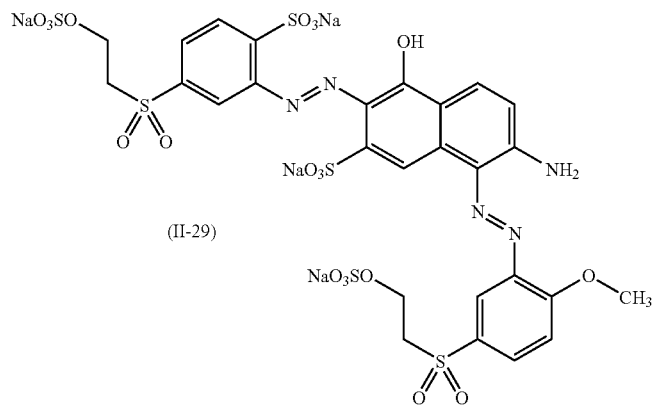
(II-29)

-continued
46 (II-30)
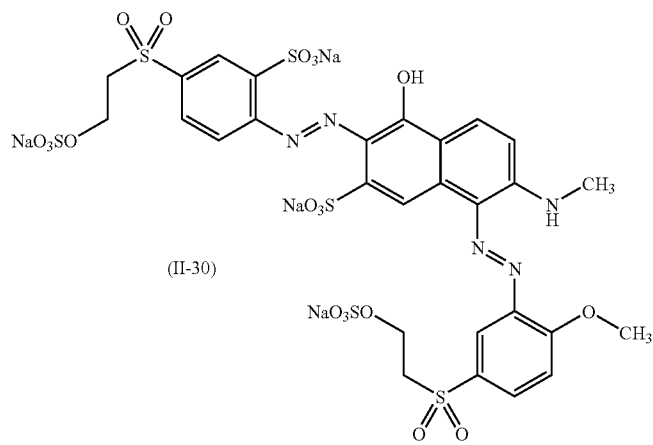
47 (II-31)
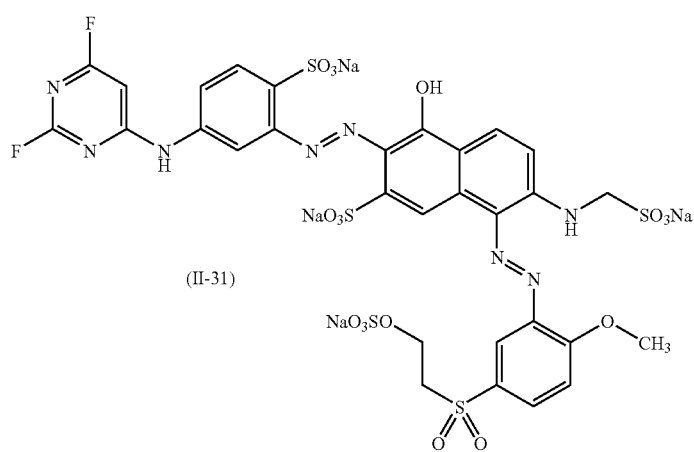
48 (II-32)
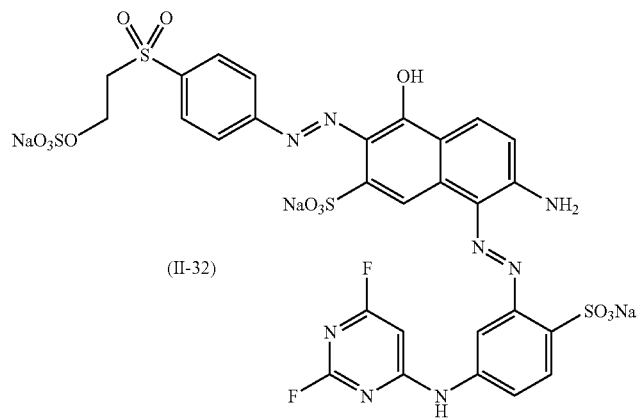

-continued
49 (II-33)
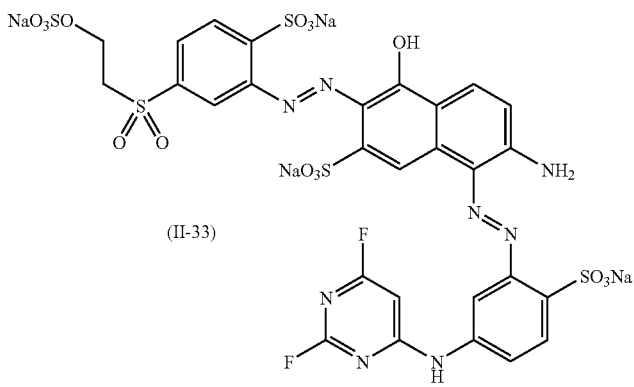
50 (II-34)
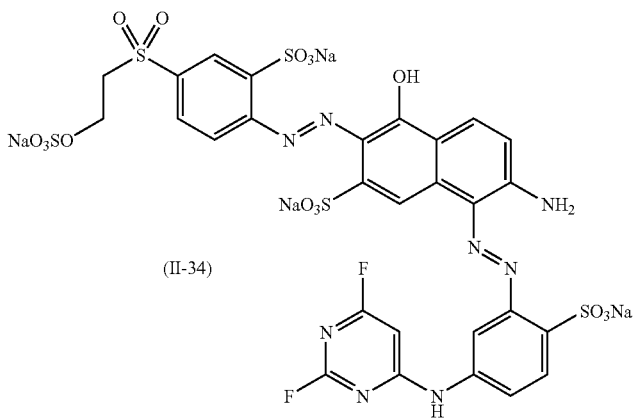
51 (II-35)
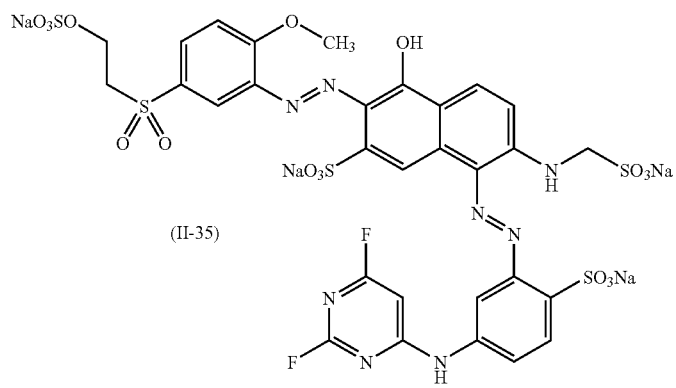

52 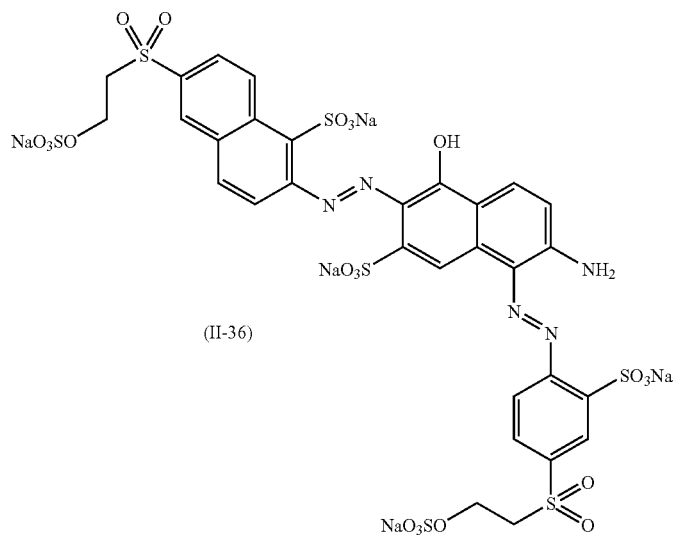
(II-36)
53 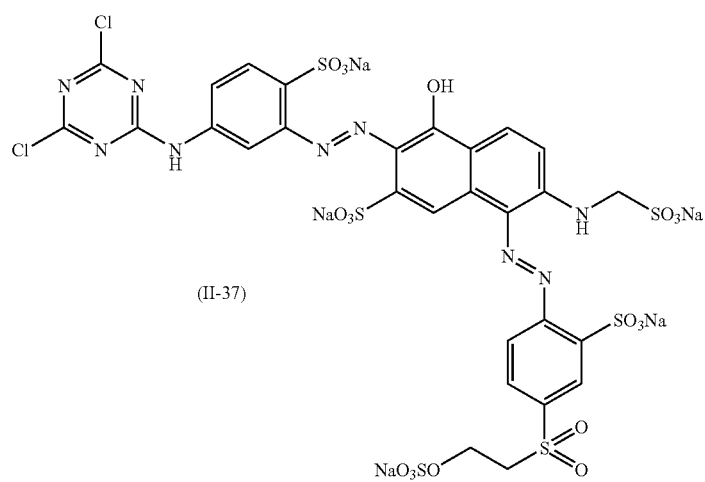
(II-37)
54 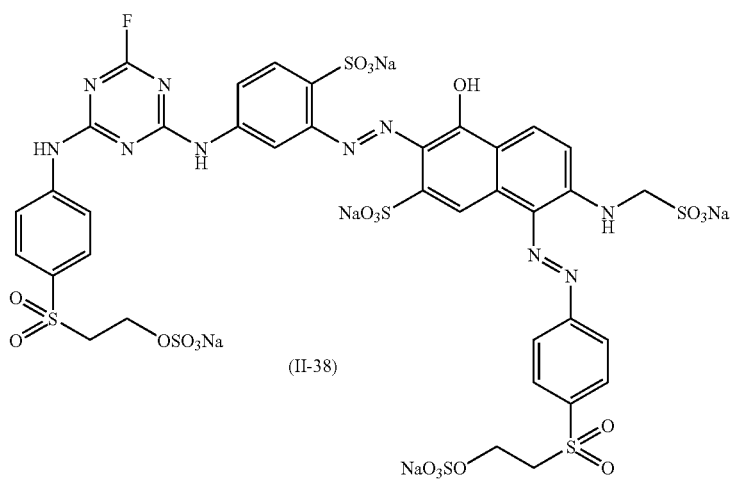
(II-38)

55 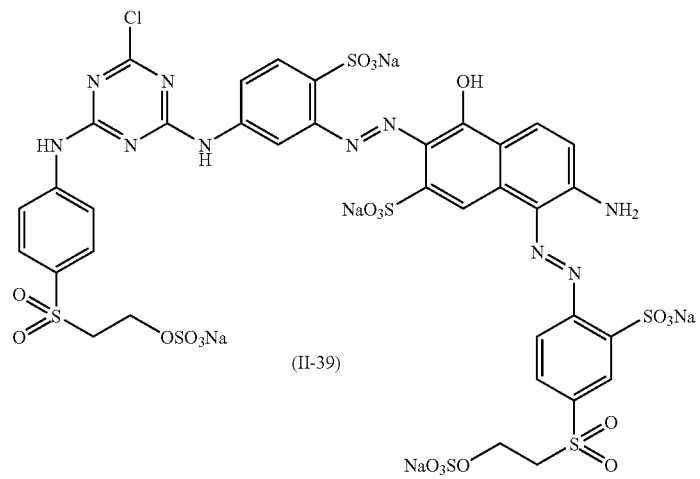
(II-39)
56 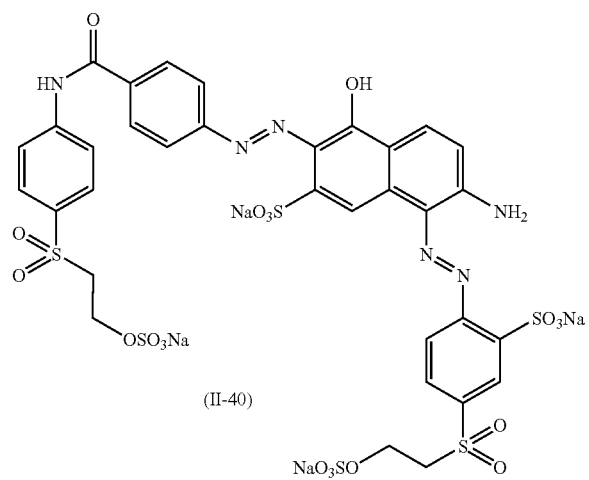
(II-40)
57 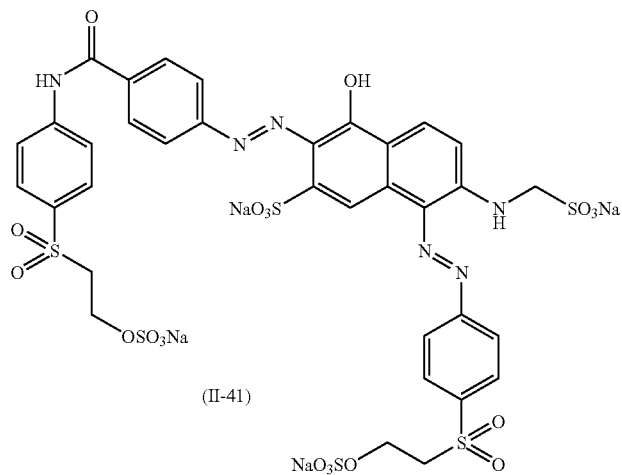
(II-41)

58
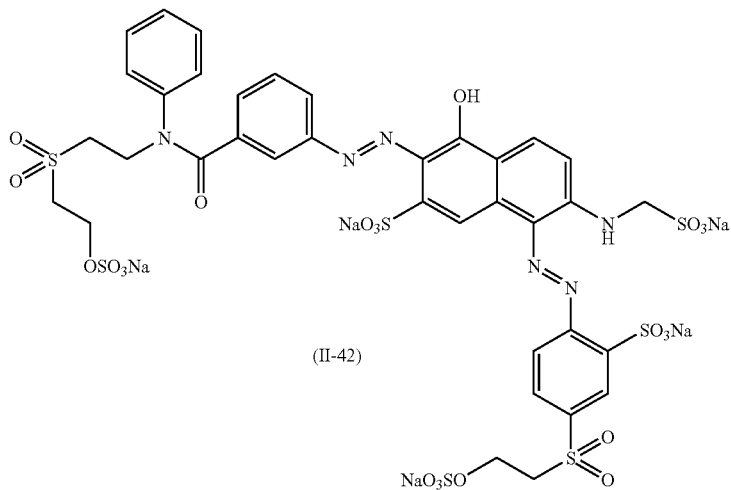
(II-42)
59
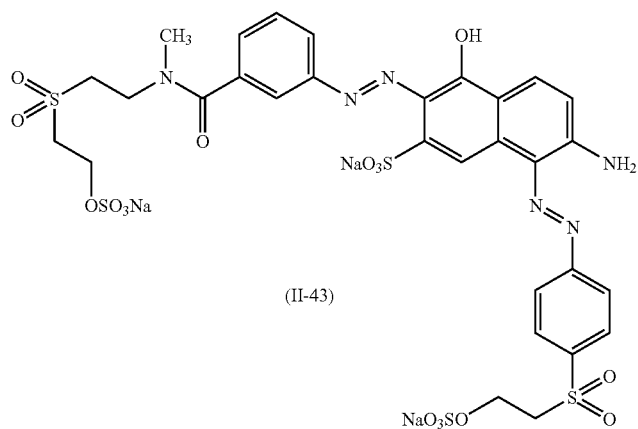
(II-43)
60
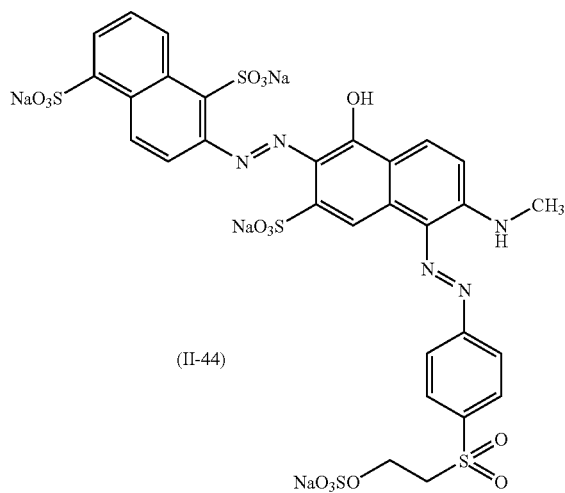
(II-44)

61
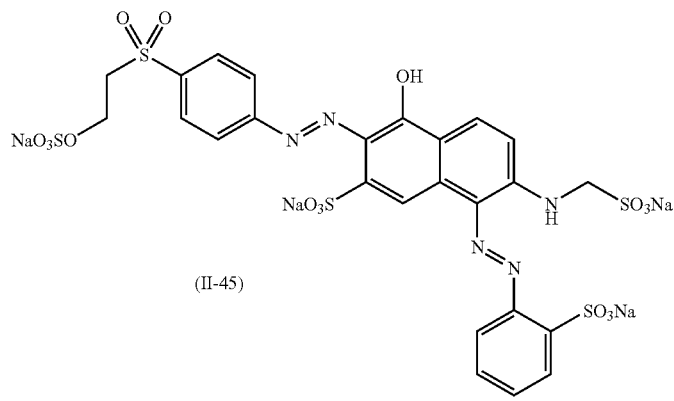
(II-45)
62
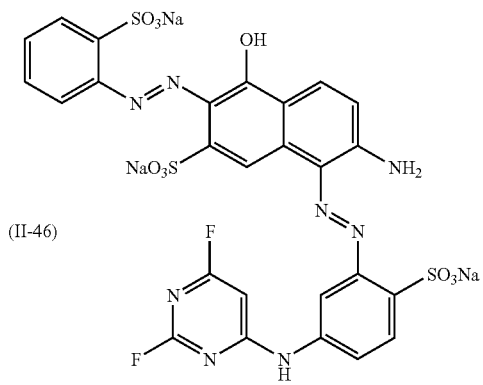
(II-46)
63
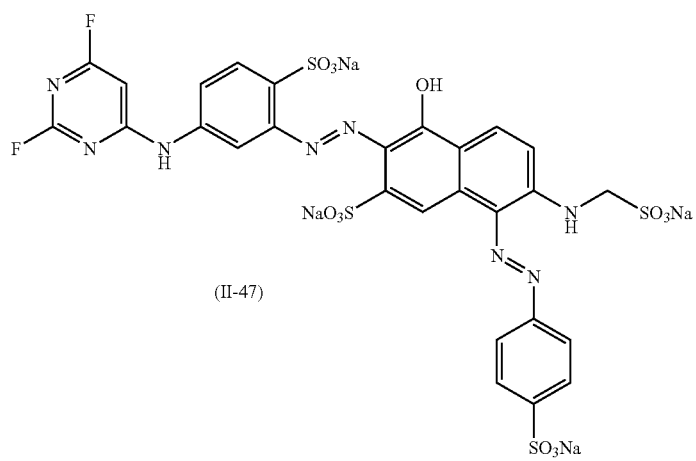
(II-47)

-continued
64 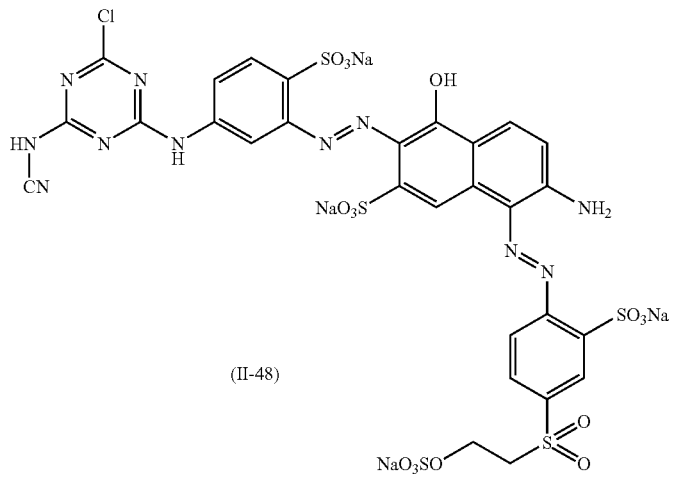
(II-48)
65 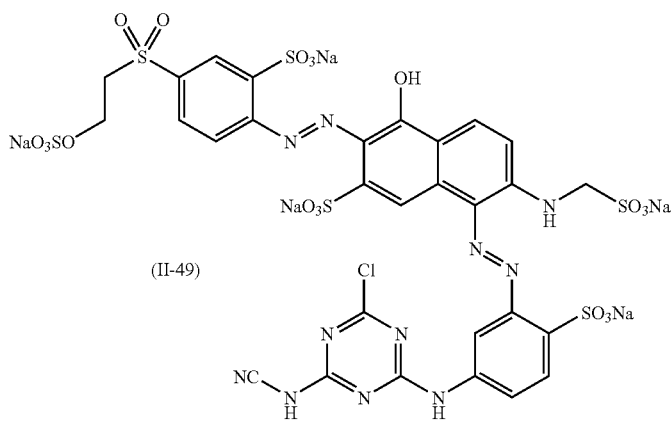
(II-49)
| 66 | (II-1) |
| 67 | (II-2) |
| 68 | (II-7) |
| 69 | (II-22) |
| 70 | (II-24) |
| 71 | (II-26) |
| 72 | (II-34) |
| 73 | (II-44) |
| 74 | (II-45) |
| 75 | (II-46) |
| 76 | (II-48) |
| 77 | (II-1) |
| 78 | (II-2) |
| 79 | (II-5) |
| 80 | (II-6) |
| 81 | (II-7) |
| 82 | (II-9) |
| 83 | (II-16) |
| 84 | (II-22) |
| 85 | (II-24) |
| 86 | (II-26) |
| 87 | (II-34) |
| 88 | (II-36) |
| 89 | (II-37) |
| 90 | (II-44) |
| 91 | (II-45) |
| 92 | (II-46) |
| 93 | (II-48) |
| 94 | (II-1) |
| 95 | (II-2) |
| 96 | (II-5) |
| 97 | (II-6) |
| 98 | (II-7) |
| 99 | (II-9) |
| 100 | (II-16) |

-continued

| | |
|---|---|
| 101 | (II-22) |
| 102 | (II-24) |
| 103 | (II-26) |
| 104 | (II-34) |
| 105 | (II-36) |
| 106 | (II-37) |
| 107 | (II-44) |
| 108 | (II-45) |
| 109 | (II-46) |
| 110 | (II-48) |
| 111 | (II-1) |
| 112 | (II-2) |
| 113 | (II-5) |
| 114 | (II-6) |
| 115 | (II-7) |
| 116 | (II-9) |
| 117 | (II-16) |
| 118 | (II-22) |
| 119 | (II-24) |
| 120 | (II-26) |
| 121 | (II-34) |
| 122 | (II-36) |
| 123 | (II-37) |
| 124 | (II-44) |
| 125 | (II-45) |
| 126 | (II-46) |
| 127 | (II-48) |
| 128 | (II-1) |
| 129 | (II-2) |
| 130 | (II-5) |
| 131 | (II-6) |
| 132 | (II-7) |
| 133 | (II-9) |
| 134 | (II-12) |
| 135 | (II-16) |
| 136 | (II-22) |
| 137 | (II-24) |
| 138 | (II-26) |
| 139 | (II-34) |
| 140 | (II-36) |
| 141 | (II-37) |
| 142 | (II-40) |
| 143 | (II-41) |
| 144 | (II-44) |
| 145 | (II-45) |
| 146 | (II-46) |
| 147 | (II-48) |
| 148 | (II-1) |
| 149 | (II-2) |
| 150 | (II-5) |
| 151 | (II-6) |
| 152 | (II-7) |
| 153 | (II-9) |
| 154 | (II-16) |
| 155 | (II-22) |
| 156 | (II-24) |
| 157 | (II-26) |
| 158 | (II-34) |
| 159 | (II-36) |
| 160 | (II-37) |
| 161 | (II-42) |
| 162 | (II-44) |
| 163 | (II-45) |
| 164 | (II-46) |
| 165 | (II-48) |
| 166 | (II-1) |
| 167 | (II-2) |
| 168 | (II-6) |
| 169 | (II-7) |
| 170 | (II-22) |
| 171 | (II-24) |
| 172 | (II-26) |
| 173 | (II-34) |
| 174 | (II-44) |
| 175 | (II-45) |
| 176 | (II-46) |
| 177 | (II-48) |
| 178 | (II-1) |
| 179 | (II-2) |

-continued

| | |
|---|---|
| 180 | (II-5) |
| 181 | (II-6) |
| 182 | (II-7) |
| 183 | (II-9) |
| 184 | (II-16) |
| 185 | (II-22) |
| 186 | (II-24) |
| 187 | (II-26) |
| 188 | (II-34) |
| 189 | (II-36) |
| 190 | (II-37) |
| 191 | (II-44) |
| 192 | (II-45) |
| 193 | (II-46) |
| 194 | (II-48) |
| 195 | (II-1) |
| 196 | (II-2) |
| 197 | (II-6) |
| 198 | (II-7) |
| 199 | (II-22) |
| 200 | (II-24) |
| 201 | (II-26) |
| 202 | (II-34) |
| 203 | (II-44) |
| 204 | (II-45) |
| 205 | (II-46) |
| 206 | (II-48) |
| 207 | (II-1) |
| 208 | (II-2) |
| 209 | (II-5) |
| 210 | (II-6) |
| 211 | (II-7) |
| 212 | (II-9) |
| 213 | (II-16) |
| 214 | (II-22) |
| 215 | (II-24) |
| 216 | (II-26) |
| 217 | (II-34) |
| 218 | (II-36) |
| 219 | (II-37) |
| 220 | (II-44) |
| 221 | (II-45) |
| 222 | (II-46) |
| 223 | (II-48) |
| 224 | (II-1) |
| 225 | (II-2) |
| 226 | (II-5) |
| 227 | (II-6) |
| 228 | (II-7) |
| 229 | (II-9) |
| 230 | (II-16) |
| 231 | (II-22) |
| 232 | (II-24) |
| 233 | (II-26) |
| 234 | (II-34) |
| 235 | (II-36) |
| 236 | (II-37) |
| 237 | (II-44) |
| 238 | (II-45) |
| 239 | (II-46) |
| 240 | (II-48) |
| 241 | (II-1) |
| 242 | (II-2) |
| 243 | (II-5) |
| 244 | (II-6) |
| 245 | (II-7) |
| 246 | (II-9) |
| 247 | (II-16) |
| 248 | (II-22) |
| 249 | (II-24) |
| 250 | (II-26) |
| 251 | (II-34) |
| 252 | (II-36) |
| 253 | (II-37) |
| 254 | (II-44) |
| 255 | (II-45) |
| 256 | (II-46) |
| 257 | (II-48) |
| 258 | (II-1) |

-continued

| | |
|---|---|
| 259 | (II-2) |
| 260 | (II-5) |
| 261 | (II-6) |
| 262 | (II-7) |
| 263 | (II-9) |
| 264 | (II-16) |
| 265 | (II-22) |
| 266 | (II-24) |
| 267 | (II-26) |
| 268 | (II-34) |
| 269 | (II-36) |
| 270 | (II-37) |
| 271 | (II-44) |
| 272 | (II-45) |
| 273 | (II-46) |
| 274 | (II-48) |
| 275 | (II-1) |
| 276 | (II-2) |
| 277 | (II-5) |
| 278 | (II-6) |
| 279 | (II-7) |
| 280 | (II-9) |
| 281 | (II-12) |
| 282 | (II-16) |
| 283 | (II-22) |
| 284 | (II-24) |
| 285 | (II-26) |
| 286 | (II-34) |
| 287 | (II-36) |
| 288 | (II-37) |
| 289 | (II-40) |
| 290 | (II-41) |
| 291 | (II-44) |
| 292 | (II-45) |
| 293 | (II-46) |
| 294 | (II-48) |
| 295 | (II-1) |
| 296 | (II-2) |
| 297 | (II-5) |
| 298 | (II-6) |
| 299 | (II-7) |
| 300 | (II-9) |
| 301 | (II-16) |
| 302 | (II-22) |
| 303 | (II-24) |
| 304 | (II-26) |
| 305 | (II-34) |
| 306 | (II-36) |
| 307 | (II-37) |
| 308 | (II-42) |
| 309 | (II-44) |
| 310 | (II-45) |
| 311 | (II-46) |
| 312 | (II-48) |
| 313 | (II-1) |
| 314 | (II-2) |
| 315 | (II-5) |
| 316 | (II-6) |
| 317 | (II-7) |
| 318 | (II-9) |
| 319 | (II-16) |
| 320 | (II-22) |
| 321 | (II-24) |
| 322 | (II-26) |
| 323 | (II-34) |
| 324 | (II-36) |
| 325 | (II-37) |
| 326 | (II-43) |
| 327 | (II-44) |
| 328 | (II-45) |
| 329 | (II-46) |
| 330 | (II-48) |
| 331 | (II-1) |
| 332 | (II-2) |
| 333 | (II-5) |
| 334 | (II-6) |
| 335 | (II-7) |
| 336 | (II-9) |
| 337 | (II-16) |

-continued

| | |
|---|---|
| 338 | (II-22) |
| 339 | (II-24) |
| 340 | (II-26) |
| 341 | (II-34) |
| 342 | (II-36) |
| 343 | (II-37) |
| 344 | (II-44) |
| 345 | (II-45) |
| 346 | (II-46) |
| 347 | (II-48) |
| 348 | (II-1) |
| 349 | (II-2) |
| 350 | (II-5) |
| 351 | (II-6) |
| 352 | (II-7) |
| 353 | (II-9) |
| 354 | (II-16) |
| 355 | (II-22) |
| 356 | (II-24) |
| 357 | (II-26) |
| 358 | (II-34) |
| 359 | (II-36) |
| 360 | (II-37) |
| 361 | (II-44) |
| 362 | (II-45) |
| 363 | (II-46) |
| 364 | (II-48) |
| 365 | (II-1) |
| 366 | (II-2) |
| 367 | (II-5) |
| 368 | (II-6) |
| 369 | (II-7) |
| 370 | (II-9) |
| 371 | (II-16) |
| 372 | (II-22) |
| 373 | (II-24) |
| 374 | (II-26) |
| 375 | (II-34) |
| 376 | (II-36) |
| 377 | (II-37) |
| 378 | (II-44) |
| 379 | (II-45) |
| 380 | (II-46) |
| 381 | (II-48) |
| 382 | (II-1) |
| 383 | (II-2) |
| 384 | (II-5) |
| 385 | (II-6) |
| 386 | (II-7) |
| 387 | (II-9) |
| 388 | (II-16) |
| 389 | (II-22) |
| 390 | (II-24) |
| 391 | (II-26) |
| 392 | (II-34) |
| 393 | (II-36) |
| 394 | (II-37) |
| 395 | (II-38) |
| 396 | (II-44) |
| 397 | (II-45) |
| 398 | (II-46) |
| 399 | (II-48) |
| 400 | (II-1) |
| 401 | (II-2) |
| 402 | (II-5) |
| 403 | (II-6) |
| 404 | (II-7) |
| 405 | (II-9) |
| 406 | (II-16) |
| 407 | (II-22) |
| 408 | (II-24) |
| 409 | (II-26) |
| 410 | (II-34) |
| 411 | (II-36) |
| 412 | (II-37) |
| 413 | (II-39) |
| 414 | (II-44) |
| 415 | (II-45) |
| 416 | (II-46) |

-continued

| 417 | (II-48) | |
|---|---|---|
| Example | Dye of gen. formula (II) | Ratio (I):(II):(III) |
| 11 | (III-4) | 65:20:15 |
| 12 | (III-6) | 68:20:12 |
| 13 | (III-2) | 67:20:13 |
| 14 | (III-4) | 65:21:14 |
| 15 | (III-6) | 65:22:13 |
| 16 | (III-7) | 64:18:18 |
| 17 | (III-1) | 65:15:20 |
| 18 | (III-2) | 65:17:18 |
| 19 | (III-3) | 67:20:13 |
| 20 | (III-4) | 65:20:15 |
| 21 | (III-6) | 65:17:18 |
| 22 | (III-7) | 66:20:14 |
| 23 | (III-1) | 65:20:15 |
| 24 | (III-8) | 70:20:10 |
| 25 | (III-2) | 70:18:12 |
| 26 | (III-9) | 68:22:10 |
| 27 | (III-2) | 65:20:15 |
| 28 | (III-1) | 68:20:12 |
| 29 | (III-10) | 68:18:14 |

-continued
| | | |
|---|---|---|
| 30 | 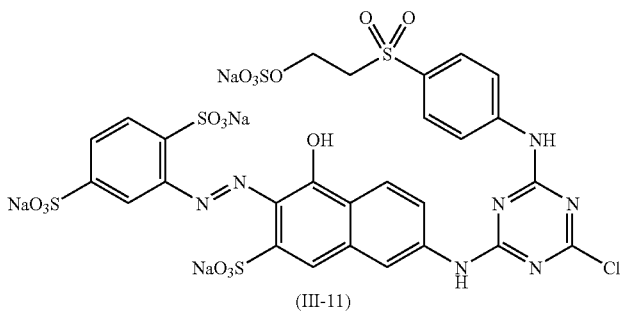 (III-11) | 60:22:18 |
| 31 | (III-1) | 72:18:10 |
| 32 | (III-4) | 70:15:15 |
| 33 | (III-7) | 70:20:10 |
| 34 | (III-5) | 67:22:11 |
| 35 | (III-3) | 68:18:14 |
| 36 | (III-1) | 66:22:12 |
| 37 | (III-1) | 67:22:11 |
| 38 | (III-4) | 65:20:15 |
| 39 | 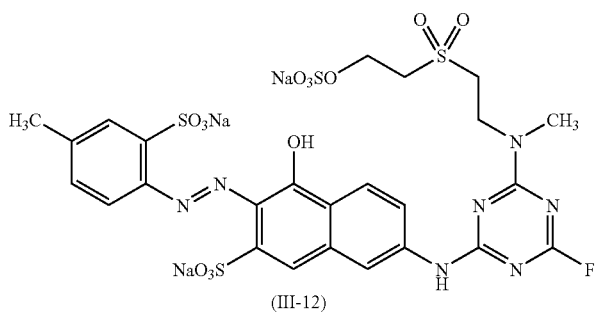 (III-12) | 66:18:16 |
| 40 | (III-1) | 67:22:11 |
| 41 | 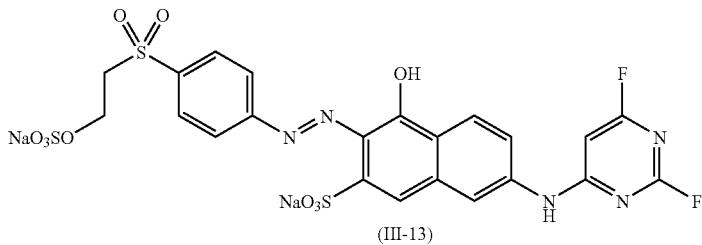 (III-13) | 65:22:13 |
| 42 | (III-1) | 68:20:12 |
| 43 | (III-2) | 65:20:15 |
| 44 | (III-5) | 70:20:10 |
| 45 | (III-4) | 67:20:13 |
| 46 | (III-1) | 69:20:11 |
| 47 | (III-10) | 64:20:16 |
| 48 | (III-11) | 65:18:17 |
| 49 | (III-8) | 67:22:11 |
| 50 | (III-1) | 68:21:11 |
| 51 | (III-2) | 68:20:12 |
| 52 | (III-1) | 70:18:12 |
| 53 | (III-1) | 70:15:15 |
| 54 | (III-12) | 65:20:15 |
| 55 | (III-11) | 64:18:18 |
| 56 | (III-1) | 75:10:15 |
| 57 | (III-2) | 70:15:15 |
| 58 | (III-10) | 65:23:12 |
| 59 | (III-8) | 64:24:12 |
| 60 | (III-1) | 65:20:15 |
| 61 | (III-1) | 64:22:14 |
| 62 | (III-6) | 60:20:20 |
| 63 | (III-7) | 65:22:13 |

| | | | |
|---|---|---|---|
| | | -continued | |
| 64 | NaO₃SO−S(=O)₂−C₆H₄−N=N−[naphthalene(OH)(SO₃Na)]−NH−[pyrimidine(F)(F)] (III-14) | | 65:20:15 |
| 65 | | (III-1) | 69:20:11 |
| 66 | | (III-2) | 65:18:17 |
| 67 | | (III-1) | 65:20:15 |
| 68 | | (III-1) | 67:20:13 |
| 69 | | (III-7) | 68:20:12 |
| 70 | | (III-13) | 65:22:13 |
| 71 | | (III-1) | 66:20:14 |
| 72 | | (III-4) | 64:20:16 |
| 73 | | (III-10) | 69:20:11 |
| 74 | | (III-1) | 60:25:15 |
| 75 | | (III-6) | 60:25:15 |
| 76 | | (III-1) | 64:20:16 |
| 77 | | (III-2) | 65:18:17 |
| 78 | | (III-1) | 65:20:15 |
| 79 | | (III-1) | 70:20:10 |
| 80 | | (III-7) | 66:20:14 |
| 81 | | (III-14) | 67:20:13 |
| 82 | | (III-5) | 72:18:10 |
| 83 | | (III-8) | 64:22:14 |
| 84 | | (III-7) | 68:20:12 |
| 85 | | (III-8) | 65:22:13 |
| 86 | | (III-1) | 66:20:14 |
| 87 | | (III-4) | 64:20:16 |
| 88 | | (III-9) | 72:18:10 |
| 89 | | (III-1) | 70:20:10 |
| 90 | | (III-10) | 69:20:11 |
| 91 | | (III-13) | 60:25:15 |
| 92 | | (III-6) | 60:25:15 |
| 93 | | (III-1) | 64:20:16 |
| 94 | | (III-2) | 65:18:17 |
| 95 | | (III-7) | 63:21:16 |
| 96 | | (III-1) | 70:20:10 |
| 97 | | (III-7) | 66:20:14 |
| 98 | | (III-14) | 67:20:13 |
| 99 | | (III-5) | 72:18:10 |
| 100 | | (III-8) | 64:22:14 |
| 101 | | (III-7) | 68:20:12 |
| 102 | | (III-8) | 65:22:13 |
| 103 | | (III-1) | 66:20:14 |
| 104 | | (III-4) | 64:20:16 |
| 105 | | (III-9) | 72:18:10 |
| 106 | | (III-1) | 70:20:10 |
| 107 | | (III-10) | 69:20:11 |
| 108 | | (III-13) | 60:25:15 |
| 109 | | (III-6) | 60:25:15 |
| 110 | | (III-1) | 64:20:16 |
| 111 | | (III-2) | 65:18:17 |
| 112 | | (III-1) | 65:20:15 |
| 113 | | (III-1) | 70:20:10 |
| 114 | | (III-7) | 66:20:14 |
| 115 | | (III-14) | 67:20:13 |
| 116 | | (III-5) | 72:18:10 |
| 117 | | (III-8) | 64:22:14 |
| 118 | | (III-7) | 68:20:12 |
| 119 | | (III-8) | 65:22:13 |
| 120 | | (III-1) | 66:20:14 |
| 121 | | (III-4) | 64:20:16 |
| 122 | | (III-9) | 72:18:10 |
| 123 | | (III-1) | 70:20:10 |
| 124 | | (III-10) | 69:20:11 |
| 125 | | (III-13) | 60:25:15 |
| 126 | | (III-6) | 60:25:15 |
| 127 | | (III-1) | 64:20:16 |
| 128 | | (III-2) | 65:18:17 |
| 129 | | (III-1) | 65:20:15 |
| 130 | | (III-1) | 70:20:10 |

-continued

| | | |
|---|---|---|
| 131 | (III-7) | 66:20:14 |
| 132 | (III-14) | 67:20:13 |
| 133 | (III-5) | 72:18:10 |
| 134 | (III-1) | 65:22:13 |
| 135 | (III-8) | 64:22:14 |
| 136 | (III-7) | 68:20:12 |
| 137 | (III-8) | 65:22:13 |
| 138 | (III-1) | 66:20:14 |
| 139 | (III-4) | 64:20:16 |
| 140 | (III-9) | 72:18:10 |
| 141 | (III-1) | 70:20:10 |
| 142 | (III-5) | 66:21:13 |
| 143 | (III-1) | 65:18:17 |
| 144 | (III-10) | 69:20:11 |
| 145 | (III-13) | 60:25:15 |
| 146 | (III-6) | 60:25:15 |
| 147 | (III-1) | 64:20:16 |
| 148 | (III-2) | 65:18:17 |
| 149 | (III-1) | 65:20:15 |
| 150 | (III-1) | 70:20:10 |
| 151 | (III-8) | 65:20:15 |
| 152 | (III-14) | 67:20:13 |
| 153 | (III-5) | 72:18:10 |
| 154 | (III-8) | 64:22:14 |
| 155 | (III-7) | 68:20:12 |
| 156 | (III-8) | 65:22:13 |
| 157 | (III-1) | 66:20:14 |
| 158 | (III-4) | 64:20:16 |
| 159 | (III-9) | 72:18:10 |
| 160 | (III-1) | 70:20:10 |
| 161 | (III-12) | 62:22:16 |
| 162 | (III-10) | 69:20:11 |
| 163 | (III-13) | 60:25:15 |
| 164 | (III-6) | 60:25:15 |
| 165 | (III-1) | 64:20:16 |
| 166 | (III-2) | 65:18:17 |
| 167 | (III-1) | 65:20:15 |
| 168 | (III-7) | 66:20:14 |
| 169 | (III-14) | 67:20:13 |
| 170 | (III-7) | 68:20:12 |
| 171 | (III-8) | 66:22:13 |
| 172 | (III-1) | 66:20:14 |
| 173 | (III-4) | 64:20:16 |
| 174 | (III-10) | 69:20:11 |
| 175 | (III-13) | 60:25:15 |
| 176 | (III-6) | 60:25:15 |
| 177 | (III-1) | 64:20:16 |
| 178 | (III-2) | 65:18:17 |
| 179 | (III-1) | 65:20:15 |
| 180 | (III-1) | 70:20:10 |
| 181 | (III-7) | 66:20:14 |
| 182 | (III-14) | 67:20:13 |
| 183 | (III-5) | 72:18:10 |
| 184 | (III-8) | 62:22:14 |
| 185 | (III-7) | 68:20:12 |
| 186 | (III-8) | 65:22:13 |
| 187 | (III-1) | 66:20:14 |
| 188 | (III-4) | 64:20:16 |
| 189 | (III-9) | 72:18:10 |
| 190 | (III-1) | 70:20:10 |
| 191 | (III-10) | 69:20:11 |
| 192 | (III-13) | 60:25:15 |
| 193 | (III-6) | 60:25:15 |
| 194 | (III-1) | 64:20:16 |
| 195 | (III-2) | 65:18:17 |
| 196 | (III-1) | 65:20:15 |
| 197 | (III-7) | 66:20:14 |
| 198 | (III-14) | 67:20:13 |
| 199 | (III-7) | 68:20:12 |
| 200 | (III-8) | 65:22:13 |
| 201 | (III-1) | 66:20:14 |
| 202 | (III-4) | 64:20:16 |
| 203 | (III-10) | 69:20:11 |
| 204 | (III-13) | 60:25:15 |
| 205 | (III-6) | 60:25:15 |
| 206 | (III-1) | 64:20:16 |
| 207 | (III-2) | 65:18:17 |
| 208 | (III-1) | 65:20:15 |
| 209 | (III-1) | 70:20:10 |

-continued

| | | |
|---|---|---|
| 210 | (III-7) | 66:20:14 |
| 211 | (III-14) | 67:20:13 |
| 212 | (III-5) | 72:18:10 |
| 213 | (III-8) | 64:22:14 |
| 214 | (III-7) | 68:20:12 |
| 215 | (III-8) | 65:22:13 |
| 216 | (III-1) | 66:20:14 |
| 217 | (III-4) | 64:20:16 |
| 218 | (III-9) | 72:18:10 |
| 219 | (III-1) | 70:20:10 |
| 220 | (III-10) | 69:20:11 |
| 221 | (III-13) | 60:25:15 |
| 222 | (III-6) | 60:25:15 |
| 223 | (III-1) | 64:20:16 |
| 224 | (III-2) | 65:18:17 |
| 225 | (III-1) | 65:20:15 |
| 226 | (III-1) | 70:20:10 |
| 227 | (III-7) | 66:20:14 |
| 228 | (III-14) | 67:20:13 |
| 229 | (III-5) | 72:18:10 |
| 230 | (III-8) | 64:22:14 |
| 231 | (III-7) | 68:20:12 |
| 232 | (III-8) | 65:22:13 |
| 233 | (III-1) | 66:20:14 |
| 234 | (III-4) | 64:20:16 |
| 235 | (III-9) | 72:18:10 |
| 236 | (III-1) | 70:20:10 |
| 237 | (III-10) | 69:20:11 |
| 238 | (III-13) | 60:25:15 |
| 239 | (III-6) | 60:25:15 |
| 240 | (III-1) | 64:20:16 |
| 241 | (III-2) | 65:18:17 |
| 242 | (III-1) | 65:20:15 |
| 243 | (III-1) | 70:20:10 |
| 244 | (III-7) | 66:20:14 |
| 245 | (III-14) | 67:20:13 |
| 246 | (III-5) | 72:18:10 |
| 247 | (III-8) | 64:22:14 |
| 248 | (III-7) | 68:20:12 |
| 249 | (III-8) | 65:22:13 |
| 250 | (III-1) | 66:20:14 |
| 251 | (III-4) | 64:20:16 |
| 252 | (III-9) | 72:18:10 |
| 253 | (III-1) | 70:20:10 |
| 254 | (III-10) | 69:20:11 |
| 255 | (III-13) | 60:25:15 |
| 256 | (III-6) | 60:25:15 |
| 257 | (III-1) | 64:20:16 |
| 258 | (III-2) | 68:16:16 |
| 259 | (III-1) | 65:20:15 |
| 260 | (III-1) | 70:20:10 |
| 261 | (III-7) | 66:20:14 |
| 262 | (III-14) | 67:20:13 |
| 263 | (III-5) | 72:18:10 |
| 264 | (III-8) | 64:22:14 |
| 265 | (III-7) | 68:20:12 |
| 266 | (III-8) | 65:22:13 |
| 267 | (III-1) | 66:20:14 |
| 268 | (III-4) | 64:20:16 |
| 269 | (III-9) | 72:18:10 |
| 270 | (III-1) | 70:20:10 |
| 271 | (III-10) | 69:20:11 |
| 272 | (III-13) | 60:25:15 |
| 273 | (III-6) | 60:25:15 |
| 274 | (III-1) | 64:20:16 |
| 275 | (III-2) | 65:18:17 |
| 276 | (III-1) | 65:20:15 |
| 277 | (III-1) | 70:20:10 |
| 278 | (III-7) | 66:20:14 |
| 279 | (III-14) | 67:20:13 |
| 280 | (III-5) | 72:18:10 |
| 281 | (III-1) | 65:22:13 |
| 282 | (III-8) | 64:22:14 |
| 283 | (III-7) | 68:20:12 |
| 284 | (III-8) | 65:22:13 |
| 285 | (III-1) | 66:20:14 |
| 286 | (III-4) | 64:20:16 |
| 287 | (III-9) | 72:18:10 |
| 288 | (III-1) | 70:20:10 |

-continued

| | | |
|---|---|---|
| 289 | (III-1) | 66:21:13 |
| 290 | (III-5) | 65:18:17 |
| 291 | (III-10) | 69:20:11 |
| 292 | (III-13) | 60:25:15 |
| 293 | (III-6) | 60:25:15 |
| 294 | (III-1) | 64:20:16 |
| 295 | (III-2) | 65:18:17 |
| 296 | (III-1) | 65:20:15 |
| 297 | (III-1) | 70:20:10 |
| 298 | (III-7) | 66:20:14 |
| 299 | (III-14) | 67:20:13 |
| 300 | (III-5) | 72:18:10 |
| 301 | (III-8) | 64:22:14 |
| 302 | (III-7) | 68:20:12 |
| 303 | (III-8) | 65:22:13 |
| 304 | (III-1) | 66:20:14 |
| 305 | (III-4) | 64:20:16 |
| 306 | (III-9) | 72:18:10 |
| 307 | (III-1) | 70:20:10 |
| 308 | (III-1) | 67:22:11 |
| 309 | (III-10) | 69:20:11 |
| 310 | (III-13) | 60:25:15 |
| 311 | (III-6) | 60:25:15 |
| 312 | (III-1) | 64:20:16 |
| 313 | (III-2) | 65:18:17 |
| 314 | (III-1) | 65:20:15 |
| 315 | (III-1) | 70:20:10 |
| 316 | (III-7) | 66:20:14 |
| 317 | (III-14) | 67:20:13 |
| 318 | (III-5) | 72:18:10 |
| 319 | (III-8) | 64:22:14 |
| 320 | (III-7) | 68:20:12 |
| 321 | (III-8) | 65:22:13 |
| 322 | (III-1) | 66:20:14 |
| 323 | (III-4) | 64:20:16 |
| 324 | (III-9) | 72:18:10 |
| 325 | (III-1) | 70:20:10 |
| 326 | (III-1) | 67:22:11 |
| 327 | (III-10) | 69:20:11 |
| 328 | (III-13) | 60:25:15 |
| 329 | (III-6) | 60:25:15 |
| 330 | (III-1) | 64:20:16 |
| 331 | (III-2) | 65:18:17 |
| 332 | (III-1) | 65:20:15 |
| 333 | (III-1) | 70:20:10 |
| 334 | (III-7) | 66:20:14 |
| 335 | (III-14) | 67:20:13 |
| 336 | (III-5) | 72:18:10 |
| 337 | (III-8) | 64:22:14 |
| 338 | (III-7) | 68:20:12 |
| 339 | (III-8) | 65:22:13 |
| 340 | (III-1) | 66:20:14 |
| 341 | (III-4) | 64:20:16 |
| 342 | (III-9) | 72:18:10 |
| 343 | (III-1) | 70:20:10 |
| 344 | (III-10) | 69:20:11 |
| 345 | (III-13) | 60:25:15 |
| 346 | (III-6) | 60:25:15 |
| 347 | (III-1) | 64:20:15 |
| 348 | (III-2) | 65:18:17 |
| 349 | (III-1) | 65:20:15 |
| 350 | (III-1) | 70:20:10 |
| 351 | (III-7) | 66:20:14 |
| 352 | (III-14) | 67:20:13 |
| 353 | (III-5) | 72:18:10 |
| 354 | (III-8) | 64:22:14 |
| 355 | (III-7) | 68:20:12 |
| 356 | (III-8) | 65:22:13 |
| 357 | (III-1) | 66:20:14 |
| 358 | (III-4) | 64:20:16 |
| 359 | (III-9) | 72:18:10 |
| 360 | (III-1) | 70:20:10 |
| 361 | (III-10) | 69:20:11 |
| 362 | (III-13) | 60:25:15 |
| 363 | (III-6) | 60:25:15 |
| 364 | (III-1) | 64:20:16 |
| 365 | (III-2) | 65:18:17 |
| 366 | (III-1) | 65:20:15 |
| 367 | (III-1) | 70:20:10 |

| | | |
|---|---|---|
| -continued | | |
| 368 | (III-7) | 66:20:14 |
| 369 | (III-14) | 67:20:13 |
| 370 | (III-5) | 72:18:10 |
| 371 | (III-8) | 64:22:14 |
| 372 | (III-7) | 68:20:12 |
| 373 | (III-8) | 65:22:13 |
| 374 | (III-1) | 66:20:14 |
| 375 | (III-4) | 64:20:16 |
| 376 | (III-9) | 72:18:10 |
| 377 | (III-1) | 70:20:10 |
| 378 | (III-10) | 69:20:11 |
| 379 | (III-13) | 60:25:15 |
| 380 | (III-6) | 60:25:15 |
| 381 | (III-1) | 64:20:16 |
| 382 | (III-2) | 65:18:17 |
| 383 | (III-1) | 65:20:15 |
| 384 | (III-1) | 70:20:10 |
| 385 | (III-7) | 66:20:14 |
| 386 | (III-14) | 67:20:13 |
| 387 | (III-5) | 72:18:10 |
| 388 | (III-8) | 64:22:14 |
| 389 | (III-7) | 68:20:12 |
| 390 | (III-8) | 65:22:13 |
| 391 | (III-1) | 66:20:14 |
| 392 | (III-4) | 64:20:16 |
| 393 | (III-9) | 72:18:10 |
| 394 | (III-1) | 70:20:10 |
| 395 | (III-1) | 65:22:13 |
| 396 | (III-10) | 69:20:11 |
| 397 | (III-13) | 60:25:15 |
| 398 | (III-6) | 60:25:15 |
| 399 | (III-1) | 64:20:16 |
| 400 | (III-2) | 65:18:17 |
| 401 | (III-1) | 65:20:15 |
| 402 | (III-1) | 70:20:10 |
| 403 | (III-7) | 66:20:14 |
| 404 | (III-14) | 67:20:13 |
| 405 | (III-5) | 72:18:10 |
| 406 | (III-8) | 64:22:14 |
| 407 | (III-7) | 68:20:12 |
| 408 | (III-8) | 65:22:13 |
| 409 | (III-1) | 66:20:14 |
| 410 | (III-4) | 64:20:16 |
| 411 | (III-9) | 72:18:10 |
| 412 | (III-1) | 70:20:10 |
| 413 | (III-1) | 65:22:13 |
| 414 | (III-10) | 69:20:11 |
| 415 | (III-13) | 60:25:15 |
| 416 | (III-6) | 60:25:15 |
| 417 | (III-1) | 64:20:16 |

Dye Mixtures in Accordance with Example 3

| Example | Dye of gen. formula (I) | Dye of gen. formula (II) | Dye of formula (III) | Ratio (I):(II):(III) |
|---|---|---|---|---|
| 418 | (I-1) | (II-1) | (III-1) | 65:20:15 |
| 419 | (I-1) | (II-1) | (III-3) | 63:20:17 |
| 420 | (I-1) | (II-1) | (III-5) | 68:20:12 |
| 421 | (I-1) | (II-1) | (III-7) | 64:18:18 |
| 422 | (I-1) | (II-1) | (III-13) | 70:18:12 |
| 423 | (I-1) | (II-1) | (III-14) | 62:19:19 |

Dye Mixtures in Accordance with Example 4

| Example | Dye of gen. formula (I) | Dye of gen. formula (II) | Dye of formula (III) | Ratio (I):(II):(III) |
|---|---|---|---|---|
| 424 | (I-1) | (II-2) | (III-1) | 65:20:15 |
| 425 | (I-1) | (II-24) | (III-13) | 63:20:17 |
| 426 | (I-1) | (II-32) | (III-14) | 66:20:14 |
| 427 | (I-1) | (II-45) | (III-7) | 64:18:18 |

-continued

| Example | Dye of gen. formula (I) | Dye of gen. formula (II) | Dye of formula (III) | Ratio (I):(II):(III): |
|---|---|---|---|---|
| 428 | (I-4) | (II-4) | (III-15) | 65:20:15 |
| 429 | (I-4) | (II-11) | (III-15) | 66:17:17 |
| 430 | (I-14) | (II-8) | (III-16) | 68:17:15 |
| 431 | (I-14) | (II-13) | (III-16) | 65:15:20 |
| 432 | (I-14) | (II-17) | (III-16) | 66:14:20 |

Dye Mixtures in Accordance with Example 5

| Example | Dye of gen. formula (I) | Dye of gen. formula (II) | Dye of formula (III) | Ratio (I):(II):(III) |
|---|---|---|---|---|
| 433 | (I-2) | (II-3) | (III-8) | 65:20:15 |
| 434 | (I-2) | (II-10) | (III-4) | 65:18:17 |
| 435 | (I-3) | (II-4) | (III-15) | 68:20:12 |
| 436 | (I-6) | (II-41) | (III-17) | 64:20:16 |

-continued

| Example | Dye of gen. formula (I) | Dye of gen. formula (II) | Dye of formula (III) | Ratio (I):(II):(III) |
|---|---|---|---|---|
| 437 | (I-7) | (II-14) | 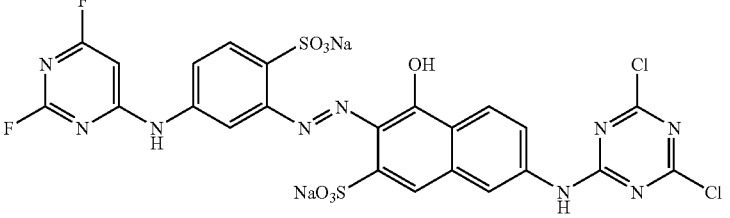 (III-18) | 70:18:12 |
| 438 | (I-9) | (II-17) | (III-16) | 66:19:15 |
| 439 | (I-17) | (II-43) | 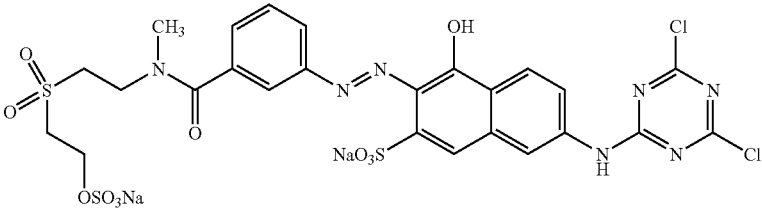 (III-19) | 62:23:15 |
| 440 | (I-21) | (II-38) | 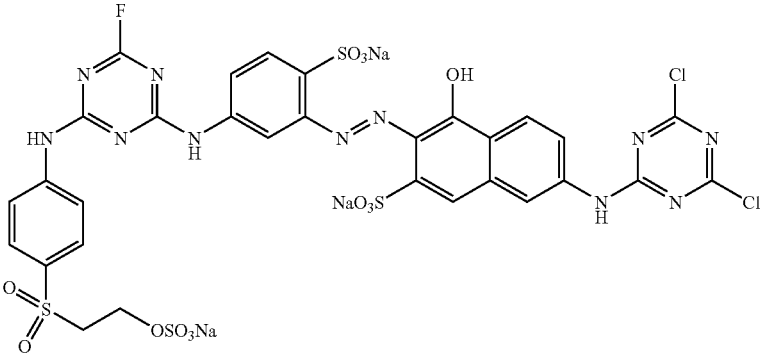 (III-20) | 64:21:15 |

Dye Mixtures in Accordance with Example 6

| Example | Dye of gen. formula (I) | Dye of gen. formula (II) | Dye of formula (III) | Ratio (I):(II):(III) |
|---|---|---|---|---|
| 441 | (I-2) | (II-3) | (III-14) | 65:18:17 |
| 442 | (I-2) | (II-10) | (III-1) | 65:20:15 |
| 443 | (I-3) | (II-4) | (III-8) | 67:20:13 |
| 444 | (I-6) | (II-41) | (III-13) | 65:20:15 |
| 445 | (I-7) | (II-14) | (III-12) | 64:22:14 |
| 446 | (I-9) | (II-17) | (III-7) | 66:19:15 |
| 447 | (I-17) | (II-43) | (III-10) | 62:23:15 |
| 448 | (I-21) | (II-38) | (III-13) | 64:22:14 |

EXAMPLE 449

73 parts of an electrolyte-containing dye powder containing the navy disazo dye of the formula (I-1) in a 70% fraction, 15 parts of an electrolyte-containing dye powder containing the scarlet disazo dye of the formula (II-2) in a 75% fraction, and 13 parts of an electrolyte-containing dye powder containing the orange-colored azo dye of the formula (III-21)

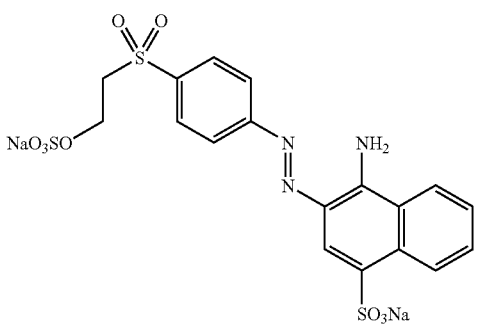

(III-21)

in an 80% fraction are dissolved in 700 parts of water and the dye solution obtained is adjusted to a pH of 5.5-6.5. Concentration of this dye solution gives a dye mixture which provides jet black dyeings and prints on cotton under the dyeing conditions customary for reactive dyes.

Further Dye Mixtures in Accordance with Example 449

| Example | Dye of gen. formula (I) | Dye of gen. formula (II) | Dye of gen. of formula (III) | Ratio |
|---|---|---|---|---|
| 450 | (I-1) | (II-1) | (III-22) | 70:15:15 |
| 451 | (I-1) | (II-2) | (III-23) | 72:16:12 |
| 452 | (I-1) | (II-6) | (III-24) | 70:20:10 |
| 453 | (I-1) | (II-7) | (III-25) | 68:20:12 |

-continued
| Example | Dye of gen. formula (I) | Dye of gen. formula (II) | Dye of gen. of formula (III) | Ratio |
|---|---|---|---|---|
| 454 | (I-1) | (II-24) | 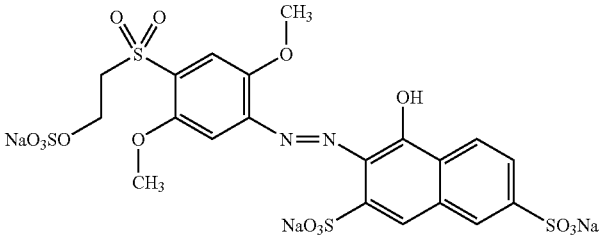<br>(III-26) | 72:19:9 |
| 455 | (I-1) | (II-26) | 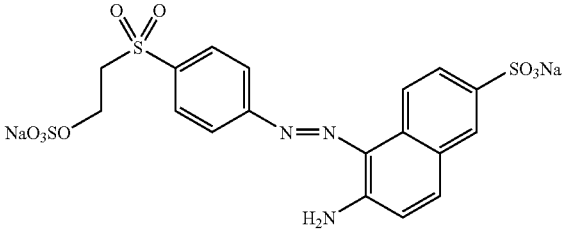<br>(III-27) | 71:16:13 |
| 456 | (I-1) | (II-34) | 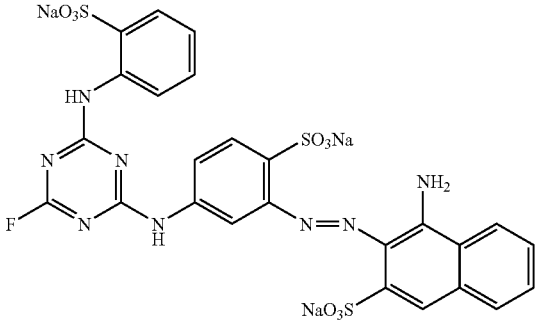<br>(III-28) | 67:18:15 |
| 457 | (I-1) | (II-37) | 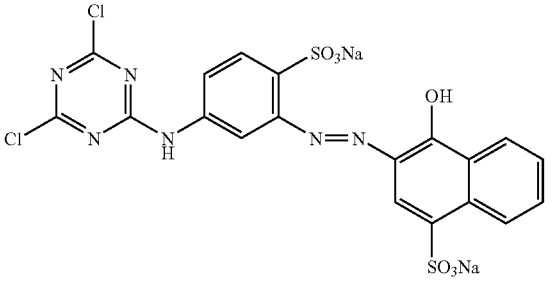<br>(III-29) | 70:15:15 |

-continued

| Example | Dye of gen. formula (I) | Dye of gen. formula (II) | Dye of gen. of formula (III) | Ratio |
|---|---|---|---|---|
| 458 | (I-1) | (II-44) | (III-30) | 68:18:14 |
| 459 | (I-1) | (II-45) | (III-31) | 70:20:10 |
| 460 | (I-1) | (II-46) | (III-32) | 66:22:12 |
| 461 | (I-1) | (II-48) | (III-33) | 67:20:13 |
| 462 | (I-2) | (II-5) | (III-34) | 67:18:15 |

-continued

| Example | Dye of gen. formula (I) | Dye of gen. formula (II) | Dye of gen. of formula (III) | Ratio |
|---------|------------------------|--------------------------|------------------------------|-------|
| 463 | (I-2) | (II-2) | (III-35) | 70:18:12 |
| 464 | (I-2) | (II-7) | (III-36) | 71:15:14 |
| 465 | (I-7) | (II-2) | (III-37) | 70:17:13 |
| 466 | (I-19) | (II-7) | (III-38) | 68:18:14 |

-continued

| Example | Dye of gen. formula (I) | Dye of gen. formula (II) | Dye of gen. of formula (III) | Ratio |
|---|---|---|---|---|
| 467 | (I-21) | (II-2) | (III-39) | 68:20:12 |

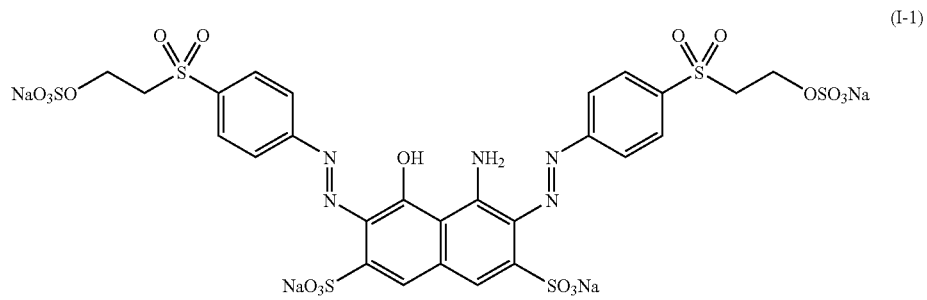

(III-39)

EXAMPLE 468

70 parts of an electrolyte-containing dye powder containing the navy disazo dye of the formula (I-1)

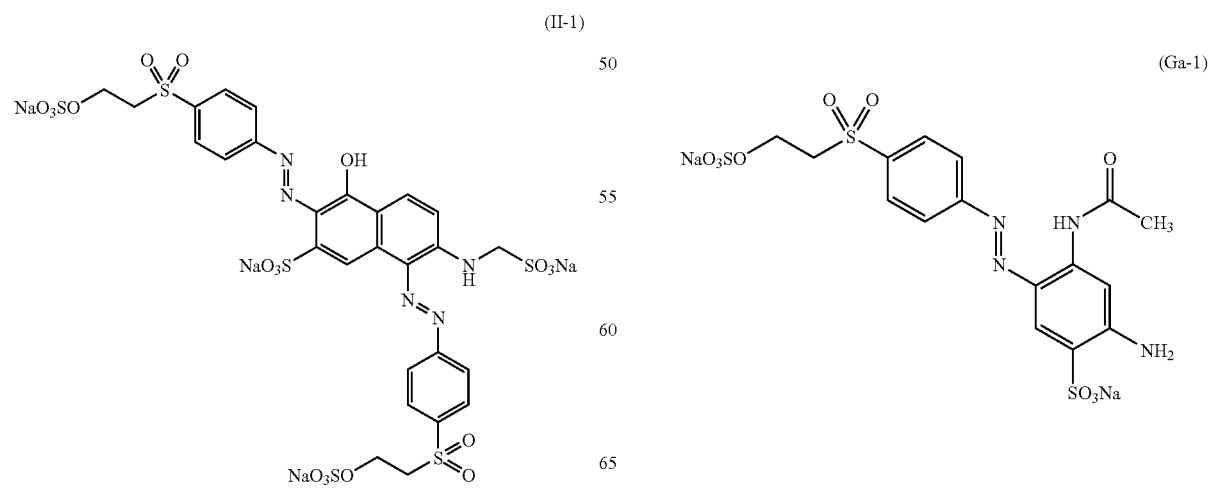

in a 70% fraction, 20 parts of an electrolyte-containing dye powder containing the scarlet disazo dye of the formula (II-1) in a 75% fraction, and 10 parts of an electrolyte-containing dye powder containing the yellow disazo dye of the formula (Ga-1)

in a 70% fraction are mixed mechanically with one another.

The resultant dye mixture of the invention provides jet black dyeings from prints, on cotton for example, under the dyeing conditions customary for reactive dyes.

EXAMPLE 469

65 parts of an electrolyte-containing dye powder containing the navy disazo dye of the formula (I-1) in a 70% fraction, 15 parts of an electrolyte-containing dye powder containing the scarlet disazo dye of the formula (II-2)

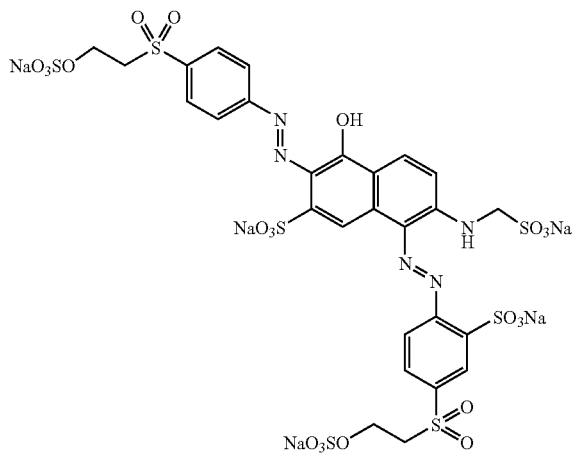
(II-2)

in a 75% fraction, and 20 parts of an electrolyte-containing dye powder containing the yellow disazo dye of the formula (Gf-1)

in a 60% fraction are dissolved in 750 parts of water and the dye solution obtained is adjusted to a pH of 5.5-6.5. Concentrating this dye solution gives a dye mixture which provides jet black dyeings from prints on cotton under the dyeing conditions customary for reactive dyes.

EXAMPLE 470

812 parts of 4-(β-sulfatoethylsulfonyl)aniline are suspended in 1900 parts of ice-water and 520 parts of 30% hydrochloric acid and diazotized by dropwise addition of 500 parts of 40% sodium nitrite solution. 319 parts of 1-amino-8-hydroxynaphthalene-3,6-disulfonic acid, 93 parts of 4-hydroxy-7-(sulfomethyl-amino)naphthalene-2-sulfonic acid, prepared by reacting 67 parts of 7-amino-4-hydroxynaphthalene-2-sulfonic acid with 42 parts of formaldehyde-sodium bisulfite in an aqueous medium at a pH of 5.5-6 and at 50° C., and 31 parts of 2,4-diaminobenzenesulfonic acid are added and coupling is carried out first in a first stage at a pH of from 1 to 1.3 and at below 20° C. to give a mixture of 3 monoazo dyes conforming to the formulae (15-1), (17-1), and (Ga-3). The stated pH range is set and maintained during the coupling reaction by adding solid sodium hydrogen carbonate.

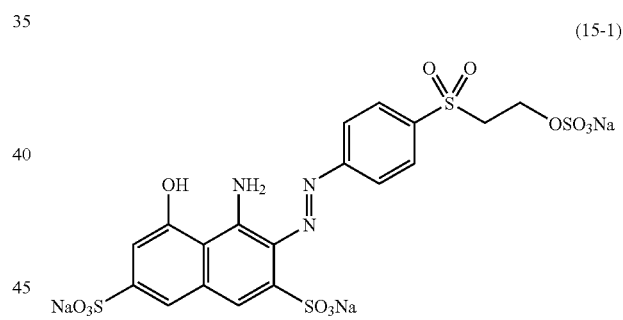
(15-1)

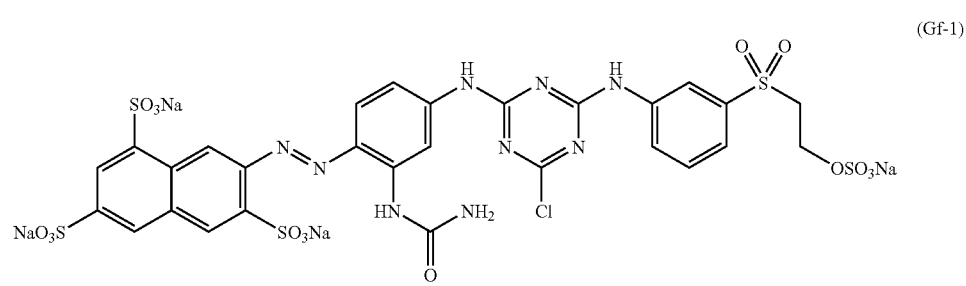
(Gf-1)

-continued

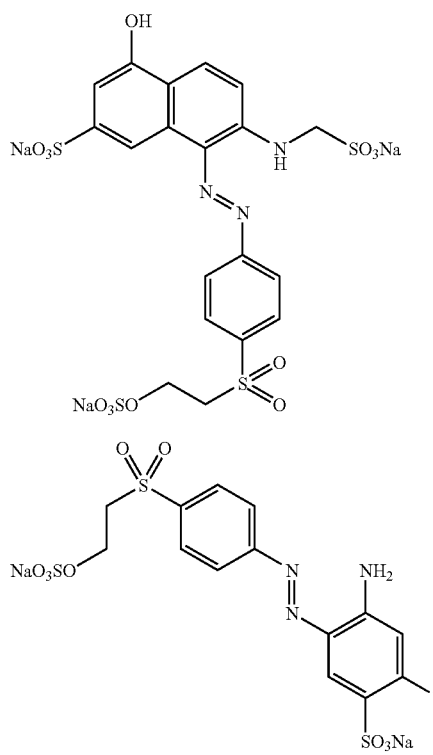

(17-1)

(Ga-3)

After the end of the first coupling, the pH is adjusted to 5-6 at below 25° C. using sodium carbonate, and the 70:20:10 mixture of the three disazo dyes (I-1), (II-1), and (Gb-3) obtained after the end of the second coupling reaction is isolated by spray driving.

Alternatively, the dye solution obtained can be buffered at a pH of 5.5-6 by adding a phosphate buffer and adjusted by further dilution or concentration to form a liquid brand of defined strength.

The resulting dye mixture of the invention dyes cotton in black shades.

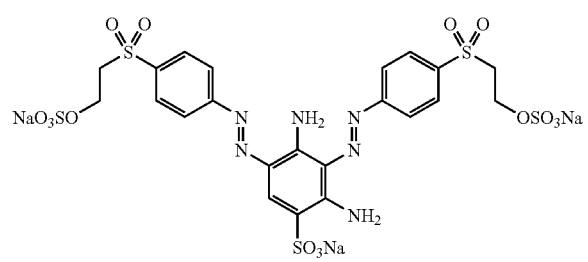

(Gb-3)

EXAMPLE 471

677 parts of 4-(β-sulfatoethylsulfonyl)aniline are suspended in 1570 parts of ice-water and 434 parts of 30% hydrochloric acid and diazotized by dropwise addition of 417 parts of 40% sodium nitrite solution. 319 parts of 1-amino-8-hydroxynaphthaline-3,6-disulphonic acid are added and coupling takes place in a first stage at a pH of from 1 to 1.3 and at below 20° C. to give a red monoazo dye of the formula (15-1). The stated pH range is set and maintained during the coupling reaction by adding solid sodium hydrogen carbonate.

After the end of the first coupling, an aqueous solution of 206 parts of the scarlet monoazo dye of the formula (17-2) and 94 parts of the yellow monoazo dye of the formula (Ga-4),

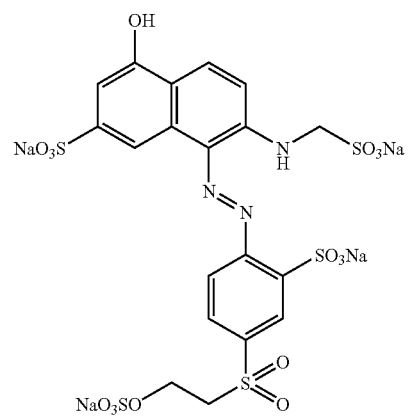

(17-2)

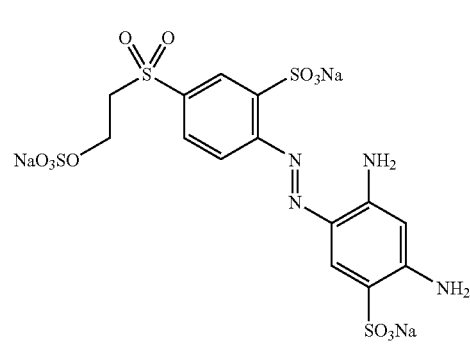

(Ga-4)

obtained by diazotizing 148 parts of 2-amino-(β-sulfatoethylsulfonyl)benzenesulfonic acid with 71 parts of 40% sodium nitrite solution in an acidic medium and then coupling the product to a mixture of 86.5 parts of 4-hydroxy-7-(sulfomethylamino)naphthalene-2-sulfonic acid and 28 parts of 2,4-diaminobenzenesulfonic acid at a pH of 1-2, is added to the reaction mixture. Subsequently, the pH is adjusted to 5-6 at below 25° C. using sodium carbonate, and the 70:20:10 mixture of the three disazo dyes (I-1), (II-2), and (Gb-2) formed after the end of the coupling reaction is isolated by concentration under reduced pressure or by spray drying.

The resulting dye mixture of the invention dyes cotton in black shades.

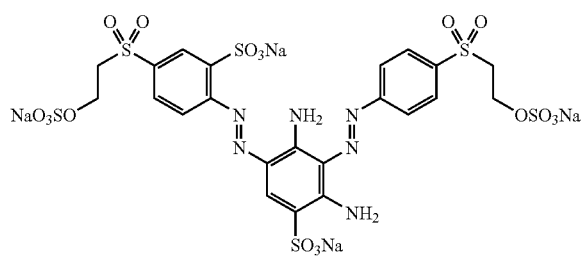

(Gb-2)

EXAMPLE 472 a) 406 parts of 4-(β-sulfatoethylsulfonyl)aniline are suspended in 950 parts of ice-water and 260 parts of 30% hydrochloric acid and diazotized by dropwise addition of 250 parts of 40% sodium nitrite solution. 319 parts of 1-amino-8-hydroxynaphthalene-3,6-disulfonic acid, 93 parts of 4-hydroxy-7-(sulfomethylamino)-5-naphthalene-2-sulfonic acid, and 31 parts of 2,4-diaminobenzenesulfonic acid are added and coupling takes place in a first stage at a pH of from 1 to 1.3 and at below 20° C. to give a mixture of three monoazo dyes conforming to the formulae (15-1), (17-1), and (Ga-3). The stated pH range is set and maintained during the coupling reaction by addition of solid sodium hydrogen carbonate.

b) In a second, separate reaction vessel 451 parts of 2-methoxy-5-(β-sulfatoethylsulfonyl)aniline are suspended in 1300 parts of ice-water and 261 parts of 30% hydrochloric acid and diazotized by dropwise addition of 251 parts of 40% sodium nitrite solution. The excess nitrite is then removed with amidosulfonic acid solution and the resulting diazo suspension, after the end of the first coupling, is pumped into the solution of the minoazo dyes from a).

The pH is then adjusted to 5-6 at below 25° C. using sodium carbonate, and the 70:20:10 mixture of the three disazo dyes (I-2), (II-3), and (Gb-1) formed after the end of the second coupling reaction is isolated by concentration under reduced pressure or by spray drying

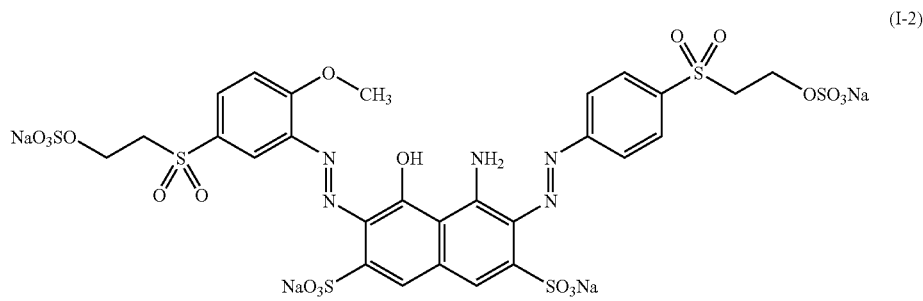

(I-2)

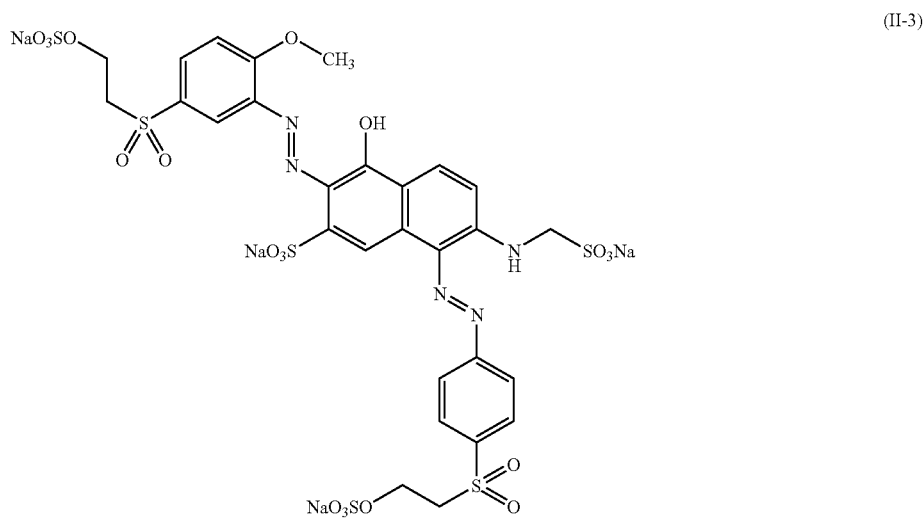

(II-3)

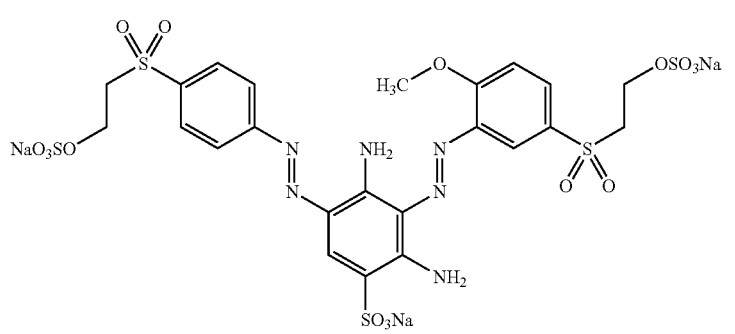

(Gb-1)

The resulting dye mixture of the invention dyes cotton in black shades.

EXAMPLE 473 a) 351 parts of 4-(β-sulfatoethylsulfonyl)aniline are suspended in 825 parts of ice-water and 225 parts of 30% hydrochloric acid and diazotized by dropwise addition of 216 parts of 40% sodium nitrite solution. 319 parts of 1-amino-8-hydroxynaphthalene-3,6-disulfonic acid and 83 parts of 4-hydroxy-7-(sulfomethyl-amino)naphthalene-2-sulfonic acid are added and coupling takes place in a first stage at a pH of from 1 to 1.3 and at below 20° C. to give a mixture of the two monoazo dyes conforming to the formulae (15-1) and (17-1). The stated pH range is set and maintained during the coupling reaction by addition of solid sodium hydrogen carbonate.

b) In a second, separate reaction vessel 427 parts of 2,5-dimethoxy-4-(β-sulfatoethylsulfonyl)aniline are suspended in 1150 parts of ice-water and 226 parts of 30% hydrochloric acid and diazotized by dropwise addition of 217 parts of 40% sodium nitrite solution. The excess nitrite is then removed using aminosulfonic acid solution, and the resulting diazo suspension, after the end of the first coupling, is pumped into the solution of the two monoazo dyes from a).

The pH is then adjusted to 5-6 at below 25° C. using sodium carbonate, and the dye solution obtained after the end of the second coupling reaction is admixed with 250 parts of a yellow dye of the formula (Gf-2). The resultant 67:17:16 mixture of the three disazo dyes (I-3), (II-4), and (Gf-2) can be isolated by concentration under reduced pressure or by spray drying.

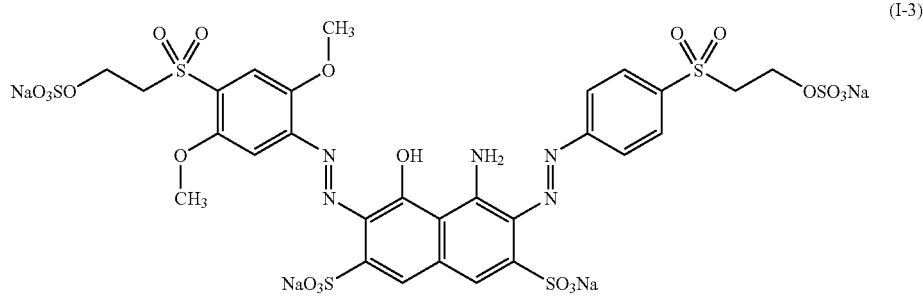

(I-3)

(II-4)
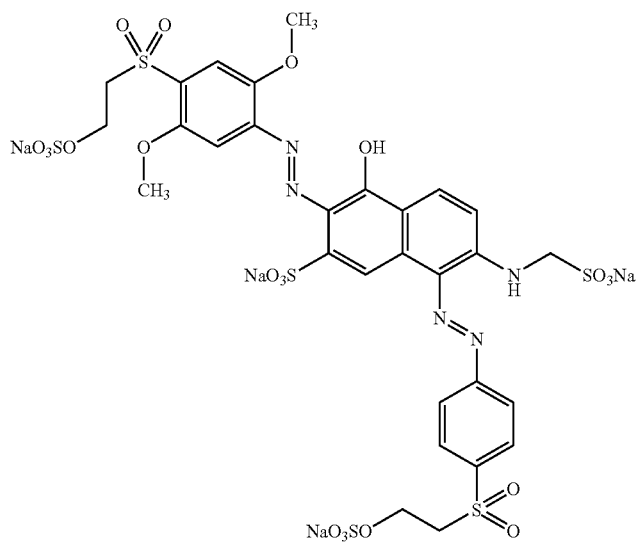
(Gf-2)
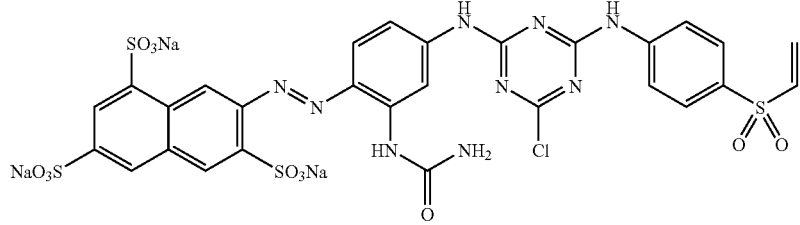
The resultant dye mixture of the invention dyes cotton in black shades.
EXAMPLE 474
70 parts of an electrolyte-containing dye powder containing the greenish navy disazo dye of the formula (I-4)
(I-4)
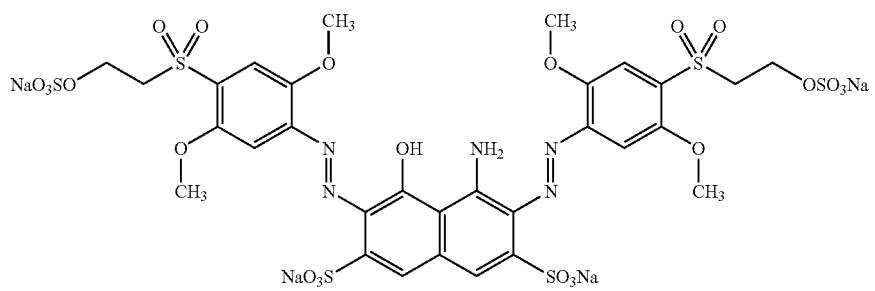
in a 70% fraction and 30 parts of an electrolyte-containing dye powder containing the scarlet disazo dye of the formula (II-7)

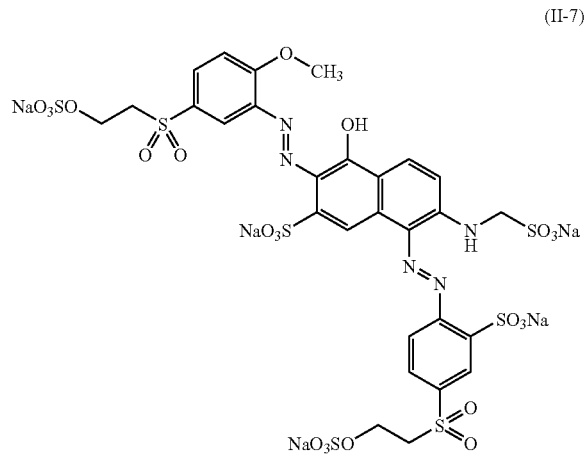

(II-7)

in, again, a 70% fraction are dissolved in 600 parts of water and the resulting dye solution is adjusted to a pH of 5.5-6.5. Concentration of this dye solution produces a binary dye mixture which provides jet black dyeings and prints on cotton under the dyeing conditions customary for reactive dyes.

EXAMPLE 475 a) 341 parts of 2,5-dimethoxy-4-(7-sulfatoethylsulfonyl) aniline are suspended in 950 parts of ice-water and 180 parts of 30% hydrochloric acid and diazotized by dropwise addition of 173 parts of 40% sodium nitrite solution. 319 parts of 1-amino-8-hydroxy-naphthalene-3,6-+disulfonic acid are added and coupling takes place in a first stage at a pH of 1 to 1.5 and at below 20° C. to give a red monoazo dye of the formula (15-2). The stated pH range is set and maintained during the coupling reaction by addition of solid sodium hydrogen carbonate.

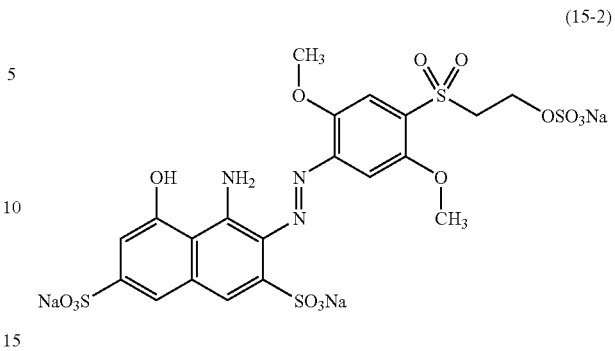

(15-2)

After the end of the first coupling the reaction mixture is admixed with an aqueous solution of 254 parts of the scarlet monoazo dye of the formula (17-2), obtained by diazotizing 116 parts of 2-amino-5-(β-sulfatoethylsulfonyl)benzenesulfonic acid with 55.5 parts of 40% sodium nitrite solution in an acidic medium and then coupling the product to 107 parts of 4-hydroxy-7-(sulfomethylamino)naphthalene-2-sulfonic acid at a pH of 1-2.

b) In a second, separate reaction vessel 430 parts of 2-methoxy-5-methyl-4-(β-sulfatoethylsulfonyl)aniline are suspended in 1250 parts of ice-water and 238 parts of 30% hydrochloric acid and diazotized by dropwise addition of 229 parts of 40% sodium nitrite solution. The excess nitride is then removed using amidosulfonic acid solution, and the diazo suspension obtained is pumped into the solution of the monoazo dye mixture from a).

Then a pH of 5-6 is set at below 25° C. using sodium carbonate, and the 75:25 mixture of the two disazo dyes (I-5) and (II-8) formed after the end of the second coupling reaction is isolated by concentration under reduced pressure or by spray drying.

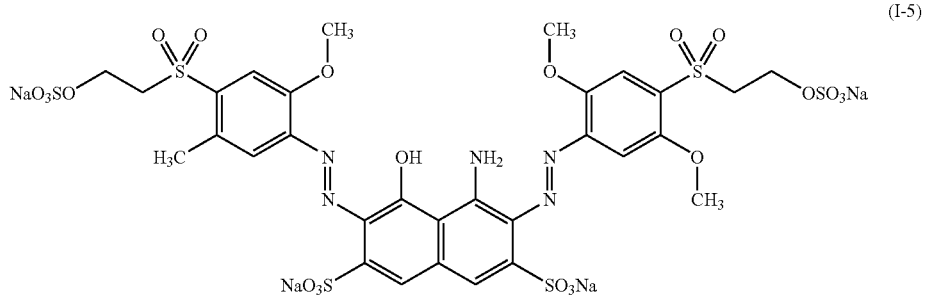

(I-5)

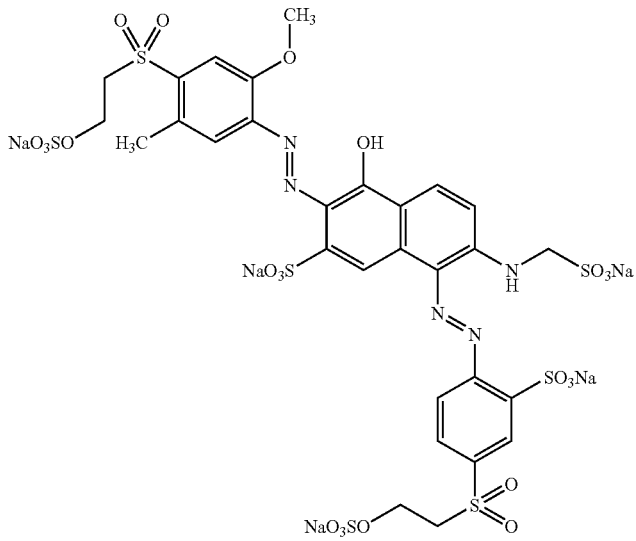

(II-8)

The resultant binary dye mixture of the invention dyes cotton in black shades.

EXAMPLE 476

A binary mixture, prepared in analogy to the procedure described in Example 475, of 1021 parts of the navy dye of the formula (I-2) and 335 parts of the scarlet disazo dye of the formula (II-7) is admixed with 168 parts of the yellow disazo dye of the formula (Ge-1)

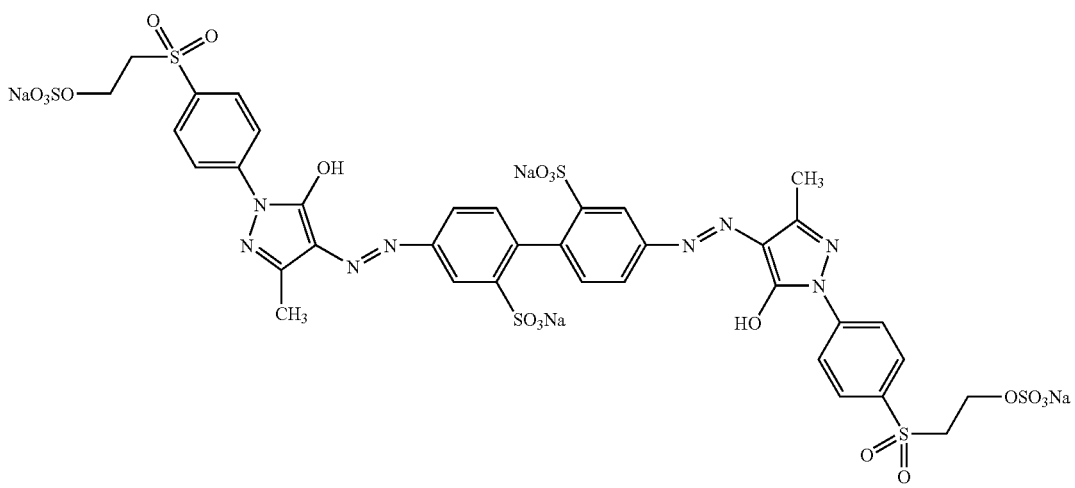

(Ge-1)

the mixture is adjusted to a pH of 5.5-6.5, and the product is isolated by concentration of the aqueous solution. The resultant dye mixture of the invention dyes cotton in black shades.

EXAMPLE 477

70 parts of an electrolyte-containing dye powder containing the navy disazo dye of the formula (I-6)

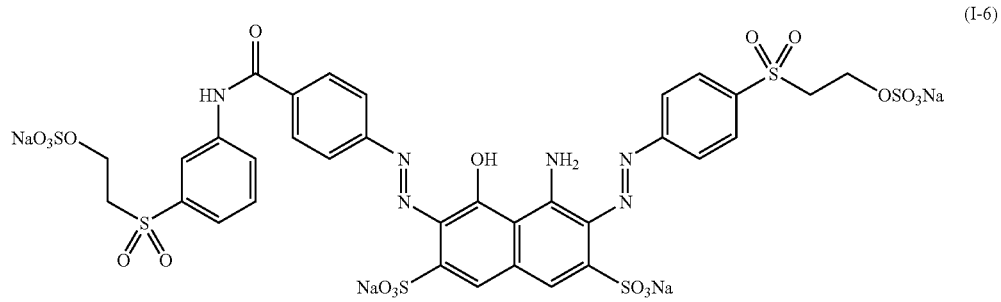

(I-6)

in a 70% fraction, 18 parts of an electrolyte-containing dye powder containing the scarlet disazo dye of the formula (II-1) in a 75% fraction, and 12 parts of an electrolyte-containing dye powder containing the yellow disazo dye of the formula (Gf-3)

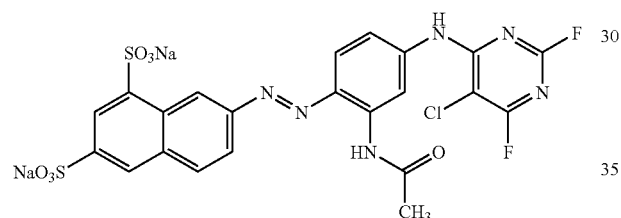

(Gf-3)

in a 70% fraction are mixed with one another as described in Example 468.

The resultant dye mixture of the invention provides jet black dyeings, on cotton for example, under the dyeing conditions customary for reactive dyes and also with an amount of salt reduced as compared with the standard method.

EXAMPLE 478

A binary mixture, prepared in analogy to the procedure described in Example 473, of 1012 parts of the navy disazo dye of the formula (I-7) and 290 parts of the scarlet dye of the formula (II-14) is admixed with 145 parts of the yellow disazo dye of the formula (Ga-2), the mixture is adjusted to a pH of 5.5-6.5, and the product is isolated by concentration of the aqueous solution. The resultant dye mixture of the invention dyes cotton in black shades.

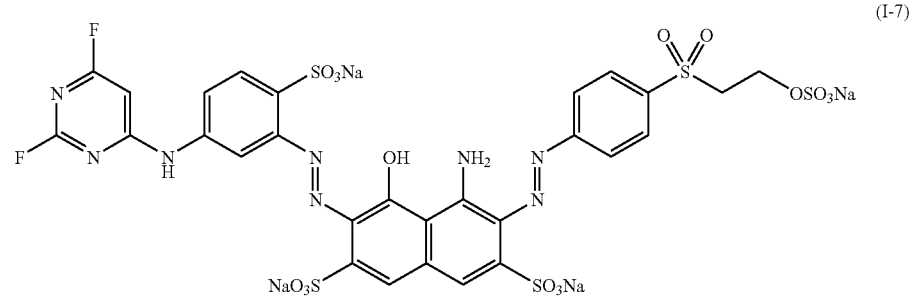

(I-7)

-continued (II-14)

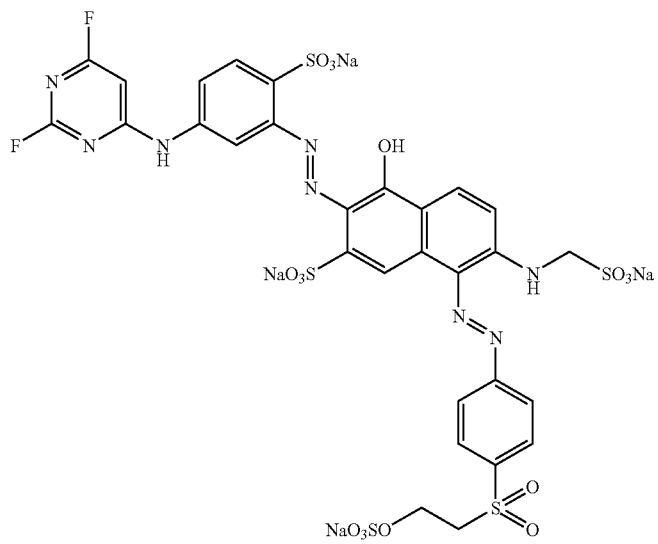

(Ga-2)

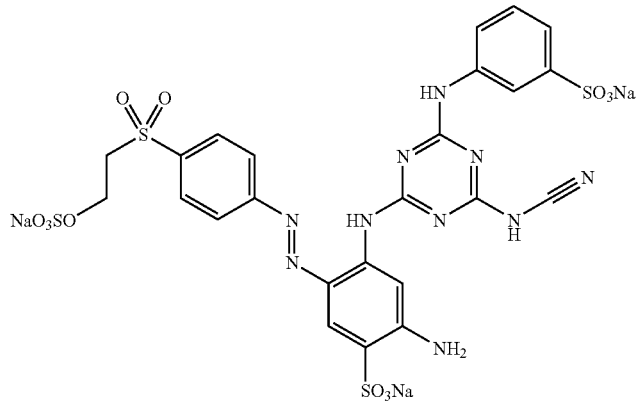

EXAMPLE 479 a) A mixture of 70.5 parts of 7-amino-4-hydroxynaphthalene-2-sulfonic acid and 37.5 parts of 2,4-diaminobenzenesulfonic acid are suspended in 800 parts of water and dissolved by adding sodium hydroxide solution. At a pH of 5.5-6, 79 parts of formaldehyde-sodium bisulfite are added and the mixture is stirred at 50-55° C. for 4 h, the stated pH range being maintained by means of dilute sodium hydroxide solution.

b) In a separate reaction vessel, 843 parts of 4-(β-sulfatoethylsulfonyl)aniline are suspended in 2000 parts of ice-water and 540 parts of 30% hydrochloric acid and diazotized by dropwise addition of 520 parts of 40% sodium nitrite solution. After removal of the excess nitrite with amidosulfonic acid solution, 319 parts of 1-amino-8-hydroxynaphthalene-3,6-disulfonic acid are added, along with the mixture of the further coupling components from a), and coupling takes place in a first stage at a pH of from 0.8 to 1.3 and at below 20° C. to give a mixture of three monoazo dyes conforming to the formulae (15-1), (17-1), and (Ga-6). The stated pH range is set and maintained during the coupling reaction by addition of solid sodium hydrogen carbonate.

(Ga-6)

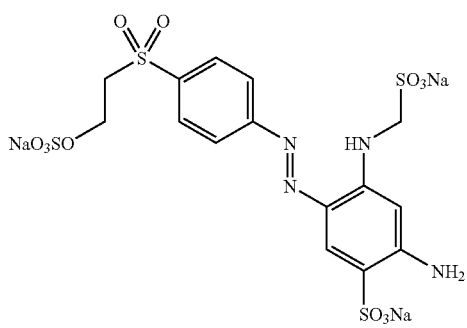

When the first coupling is complete, the pH is adjusted to 5-6 at below 25° C. with sodium carbonate, and the 67:20:13 mixture of the three disazo dyes (I-1), (II-1), and (Gb-5), obtained after the end of the second coupling reaction, is isolated by spray drying or concentration under reduced pressure.

Alternatively, the dye solution obtained can be buffered at a pH of 5.5-6 by addition of a phosphate buffer and adjusted by further dilution or concentration to give a liquid brand of defined strength.

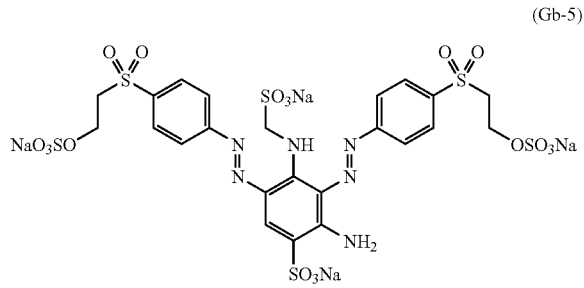

(Gb-5)

The resulting dye mixture of the invention dyes cotton in black shades.

EXAMPLE 480

843 parts of 4-(β-sulfatoethylsulfonyl)aniline are suspended in 2000 parts of ice-water and 540 parts of 30% hydrochloric acid and diazotized by dropwise addition of 520 parts of 40% sodium nitrite solution. After removal of the excess nitrite using aminosulfonic acid solution, 319 parts of 1-amino-8-hydroxynaphthalene-3,6-disulfonic acid is added along with a mixture of further coupling components obtained in analogy to Example 479 a) by reacting 72 parts of 7-amino-4-hydroxynaphthalene-2-sulfonic acid and 75 parts of 2,4-diaminobenzenesulfonic acid with 112 parts of formaldehyde-sodium bisulfite at a pH of 5.7 and at 50° C., and coupling takes place initially in a first stage at a pH of from 0.8 to 1.3 and at below 20° C. to give a mixture of three monoazo dyes conforming to the formulae (15-1), (17-1), and (Ga-6). The stated pH range is set and maintained during the coupling reaction by addition of solid sodium hydrogen carbonate.

When the first coupling is complete, the pH is adjusted to 5-6 at below 25° C. using sodium carbonate, and the 64:20:16 mixture of the three azo dyes (I-1), (II-1), and (Ga-6), obtained after the end of the second coupling reaction, is isolated by spray drying or concentration under reduced pressure.

The resulting dye mixture of the invention dyes cotton in black shades.

EXAMPLE 481

574 parts of 4-(β-sulfatoethylsulfonyl)aniline are suspended in 1350 parts of ice-water and 368 parts of 30% hydrochloric acid and diazotized by dropwise addition of 354 parts of 40% sodium nitrite solution. Following removal of the excess nitrite using amidosulfonic acid solution, an aqueous solution of two coupling components is added, obtained in analogy to Example 479a) by reacting 74 parts of 7-amino-4-hydroxynaphthalene-2-sulfonic acid and 39.5 parts of 2,4-diaminobenzenesulfonic acid with 83 parts of formaldehyde-sodium bisulfite at a pH of 5.5-6 and at 50° C., and coupling takes place first of all in a first stage at a pH of from 1.0 to 1.3 and at below 20° C. to give a mixture of two monoazo dyes conforming to the formulae (17-1) and (Ga-6). The stated pH range is set and maintained during the coupling reaction by addition of solid sodium hydrogen carbonate.

After the first coupling is complete, the reaction mixture is admixed with 737 parts of the red monoazo dye of the formula (15-2) in the form of an aqueous solution, obtainable as described in Example 475a). Thereafter, the pH is adjusted to 5-6 at below 25° C. using sodium carbonate, and the 67:20:13 mixture of the three disazo dyes (I-12), (II-11), and (Gb-5) obtained after the end of the second coupling reaction is isolated by spray drying or concentration under reduced pressure.

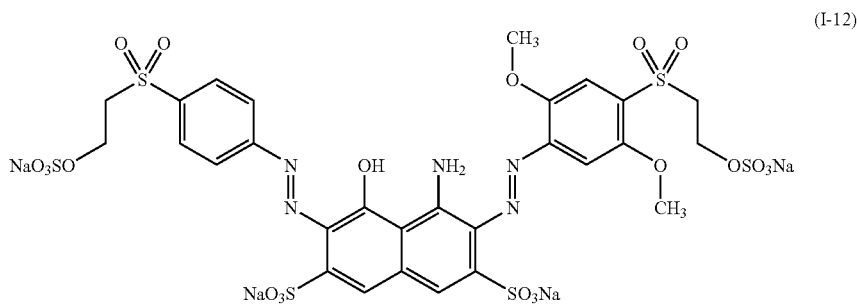

(I-12)

The resulting dye mixture of the invention dyes cotton in black shades.

EXAMPLES 482 TO 819

The tabular examples below describe further inventive mixtures of the dyes of the general formulae (I) and (II) or (I) and (II) and (G), each recited in the form of the sodium salts. The mixing proportions are indicated in percent by weight. The dye mixtures provide grade jet black dyeings, on cotton for example, by the dyeing methods customary for reactive dyes.

Dye Mixtures in Accordance with Examples 468 or 469

| Example | Dye of gen. formula (I) |
|---|---|
| 482 | (I-1) |
| 483 | (I-1) |
| 484 | (I-1) |
| 485 | (I-1) |
| 486 | (I-1) |
| 487 | (I-1) |
| 488 | (I-1) |
| 489 | (I-1) |
| 490 | (I-1) |
| 491 | (I-1) |
| 492 | (I-1) |
| 493 | (I-1) |
| 494 | (I-1) |
| 495 | (I-1) |
| 496 | (I-1) |
| 497 | (I-1) |
| 498 | (I-1) |
| 499 | (I-1) |
| 500 | (I-1) |
| 501 | (I-1) |
| 502 | (I-1) |
| 503 | (I-1) |
| 504 | (I-1) |
| 505 | (I-1) |
| 506 | (I-1) |
| 507 | (I-1) |
| 508 | (I-1) |
| 509 | (I-1) |
| 510 | (I-1) |
| 511 | (I-1) |
| 512 | (I-1) |
| 513 | (I-1) |
| 514 | (I-1) |
| 515 | (I-1) |
| 516 | (I-1) |
| 517 | (I-1) |
| 518 | (I-1) |
| 519 | (I-1) |
| 520 | (I-1) |
| 521 | (I-1) |
| 522 | (I-1) |
| 523 | (I-1) |
| 524 | (I-1) |
| 525 | (I-1) |
| 526 | (I-1) |
| 527 | (I-1) |
| 528 | (I-1) |
| 529 | (I-1) |
| 530 | (I-1) |
| 531 | (I-1) |
| 532 | (I-1) |
| 533 | (I-1) |
| 534 | (I-1) |
| 535 | (I-1) |
| 536 | (I-1) |
| 537 | (I-1) |
| 538 | (I-1) |
| 539 | (I-1) |
| 540 | (I-1) |
| 541 | (I-1) |
| 542 | (I-1) |
| 543 | (I-1) |
| 544 | (I-1) |
| 545 | (I-1) |
| 546 | (I-1) |
| 547 | (I-1) |
| 548 | (I-1) |
| 549 | (I-1) |
| 550 | (I-1) |
| 551 | (I-1) |
| 552 | (I-1) |
| 553 | (I-1) |
| 554 | (I-1) |
| 555 | (I-1) |
| 556 | (I-1) |

-continued
| | |
|---|---|
| 557 | (I-1) |
| 558 | (I-1) |
| 559 | (I-1) |
| 560 | (I-1) |
| 561 | (I-1) |
| 562 | (I-1) |
| 563 | (I-1) |
| 564 | (I-1) |
| 565 | (I-1) |
| 566 | (I-1) |
| 567 | (I-1) |
| 568 | (I-1) |
| 569 | (I-1) |
| 570 | (I-1) |
| 571 | (I-1) |
| 572 | (I-1) |
| 573 | (I-1) |
| 574 | (I-1) |
| 575 | (I-1) |
| 576 | (I-1) |
| 577 | (I-1) |
| 578 | (I-1) |
| 579 | (I-1) |
| 580 | (I-1) |
| 581 | (I-1) |
| 582 | (I-2) |
| 583 | (I-2) |
| 584 | (I-2) |
| 585 | (I-2) |
| 586 | (I-2) |
| 587 | (I-2) |
| 588 | (I-2) |
| 589 | (I-2) |
| 590 | (I-2) |
| 591 | (I-2) |
| 592 | (I-3) |
| 593 | (I-3) |
| 594 | (I-3) |
| 595 | (I-3) |
| 596 | (I-4) |
| 597 | (I-4) |
| 598 | (I-4) |
| 599 | (I-5) |
| 600 | (I-5) |
| 601 | (I-6) |
| 602 | (I-6) |
| 603 | (I-6) |
| 604 | (I-6) |
| 605 | (I-6) |
| 606 | (I-6) |
| 607 | (I-6) |
| 608 | (I-7) |
| 609 | (I-7) |
| 610 | (I-7) |
| 611 | (I-7) |
| 612 | (I-7) |
| 613 | (I-7) |
| 614 | (I-7) |
| 615 | 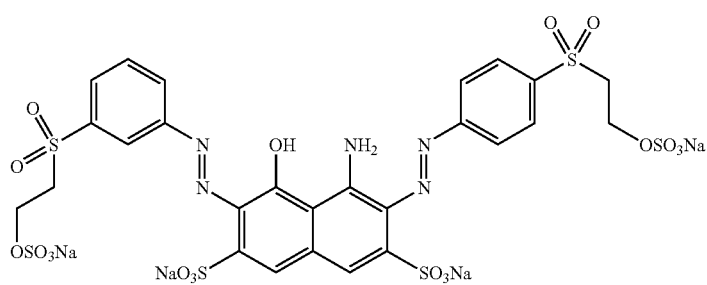<br>(I-24) |
| 616 | (I-24) |
| 617 | (I-24) |
| 618 | (I-24) |
| 619 | (I-24) |

-continued
620 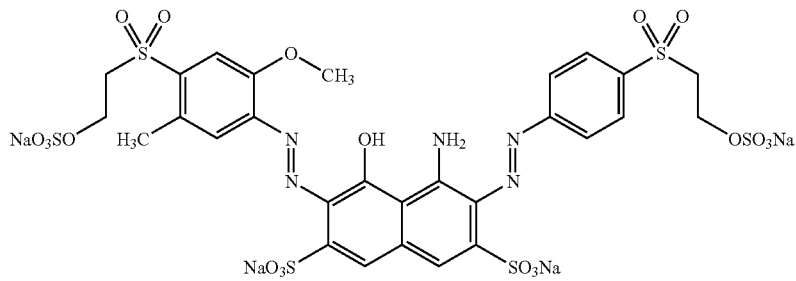
(I-9)
621 (I-9)
622 (I-9)
623 (I-9)
624 (I-9)
625 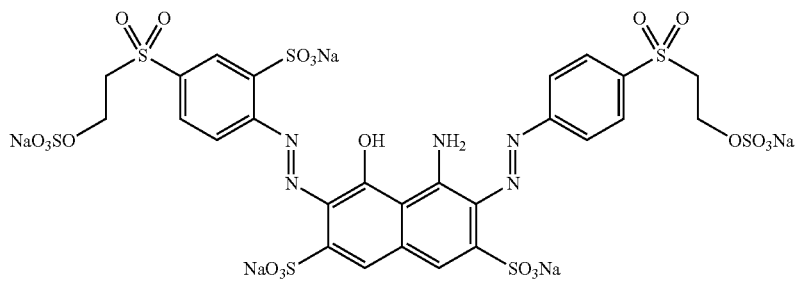
(I-10)
626 (I-10)
627 (I-10)
628 (I-10)
629 (I-10)
630 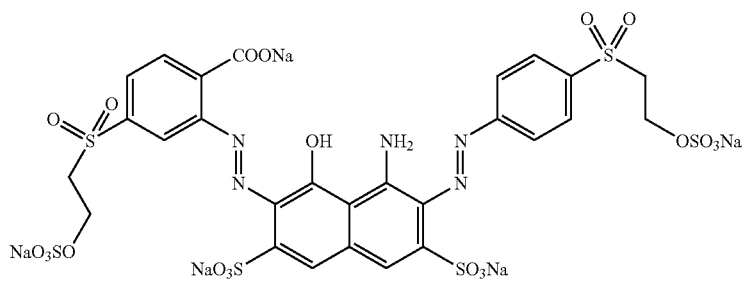
(I-11)
631 (I-11)
632 (I-11)
633 (I-11)
634 (I-11)
635 (I-12)
636 (I-12)
637 (I-12)
638 (I-12)

| | | |
|---|---|---|
| 639 | 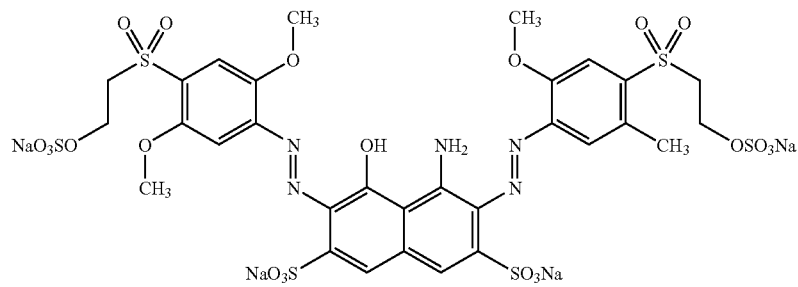 (I-13) | |
| 640 | (I-13) | |
| 641 | (I-13) | |
| 642 | 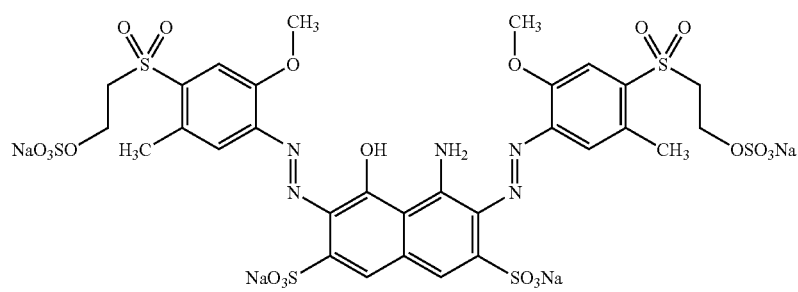 (I-14) | |
| 643 | (I-14) | |
| 644 | (I-14) | |
| 645 | 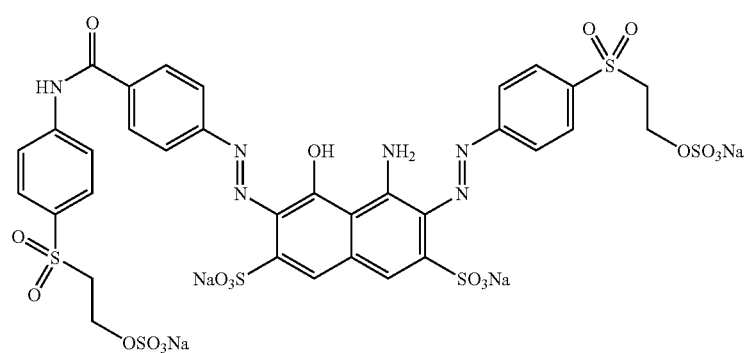 (I-15) | |
| 646 | (I-15) | |
| 647 | (I-15) | |
| 648 | (I-15) | |
| 649 | (I-15) | |
| 650 | (I-15) | |
| 651 | (I-15) | |
| 652 | (I-15) | |

-continued
| | |
|---|---|
| 653 | 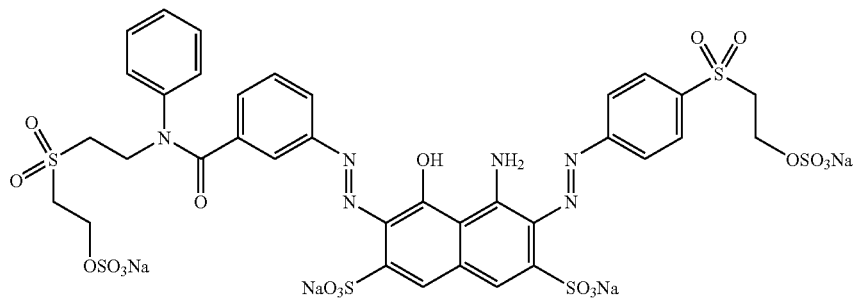<br>(I-16) |
| 654 | (I-16) |
| 655 | (I-16) |
| 656 | (I-16) |
| 657 | (I-16) |
| 658 | 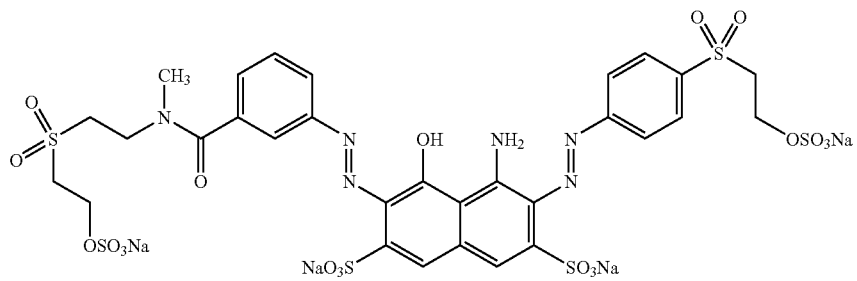<br>(I-17) |
| 659 | (I-17) |
| 660 | (I-17) |
| 661 | (I-17) |
| 662 | (I-17) |
| 663 | 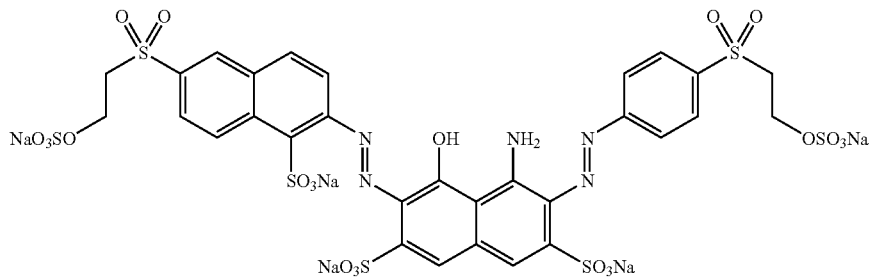<br>(I-18) |
| 664 | (I-18) |
| 665 | (I-18) |
| 666 | (I-18) |
| 667 | (I-18) |
| 668 | 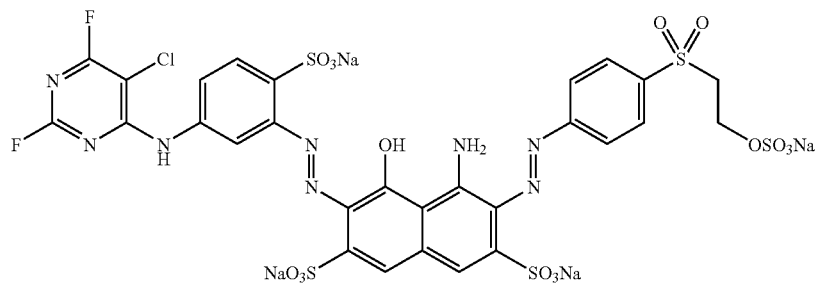<br>(I-19) |

| | |
|---|---|
| 669 | (I-19) |
| 670 | (I-19) |
| 671 | (I-19) |
| 672 | (I-19) |
| 673 | (I-19) |
| 674 | (I-19) |
| 675 | (I-19) |
| 676 | 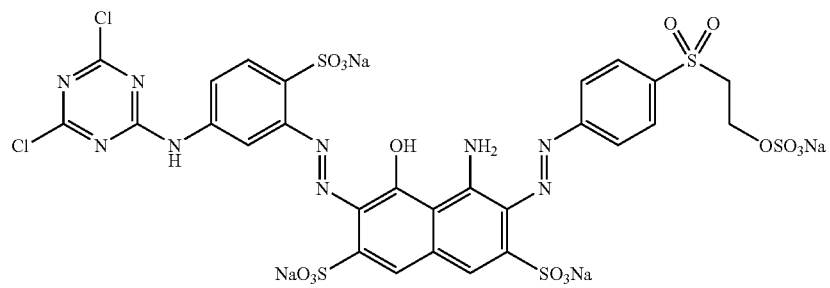 (I-20) |
| 677 | (I-20) |
| 678 | (I-20) |
| 679 | (I-20) |
| 680 | (I-20) |
| 681 | (I-20) |
| 682 | 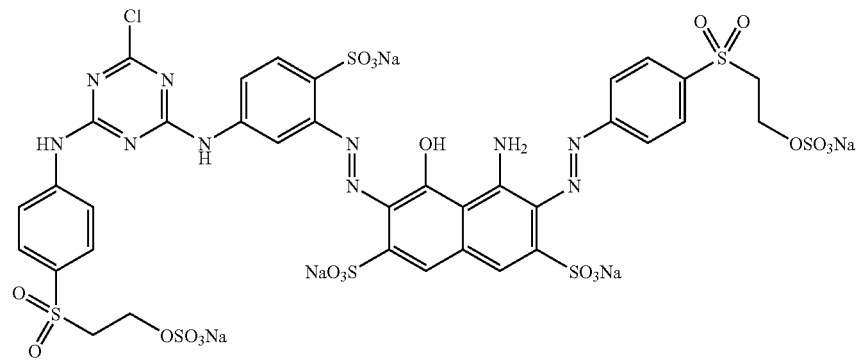 (I-21) |
| 683 | (I-21) |
| 684 | (I-21) |
| 685 | (I-21) |
| 686 | (I-21) |
| 687 | 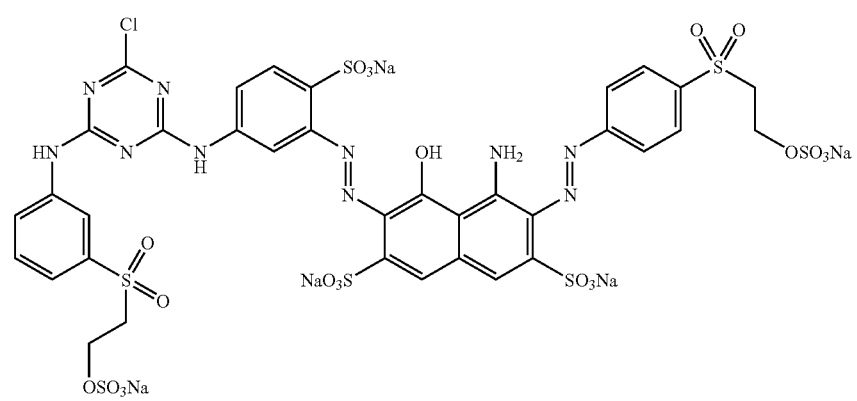 (I-22) |
| 688 | (I-22) |
| 689 | (I-22) |

-continued
| | |
|---|---|
| 690 | (I-22) |
| 691 | (I-22) |
| 682 | (I-22) |
| Example | Dye of gen. formula (II) |
|---|---|
| 482 | (II-1) |
| 483 | (II-1) |
| 484 | (II-1) |
| 485 | (II-1) |
| 486 | (II-1) |
| 487 | (II-1) |
| 488 | (II-1) |
| 489 | (II-1) |
| 490 | (II-2) |
| 491 | (II-2) |
| 492 | (II-2) |
| 493 | (II-2) |
| 494 | (II-2) |
| 495 | (II-2) |
| 496 | (II-2) |
| 497 | (II-3) |
| 498 | (II-3) |
| 499 | (II-3) |
| 500 | (II-3) |
| 501 | (II-3) |
| 502 | (II-3) |
| 503 | (II-4) |
| 504 | (II-7) |
| 505 | (II-7) |
| 506 | (II-7) |
| 507 | (II-7) |
| 508 | (II-7) |
| 509 | (II-7) |
| 510 | (II-8) |
| 511 | (II-14) |
| 512 | (II-14) |
| 513 | (II-14) |
| 514 | (II-14) |
| 515 | 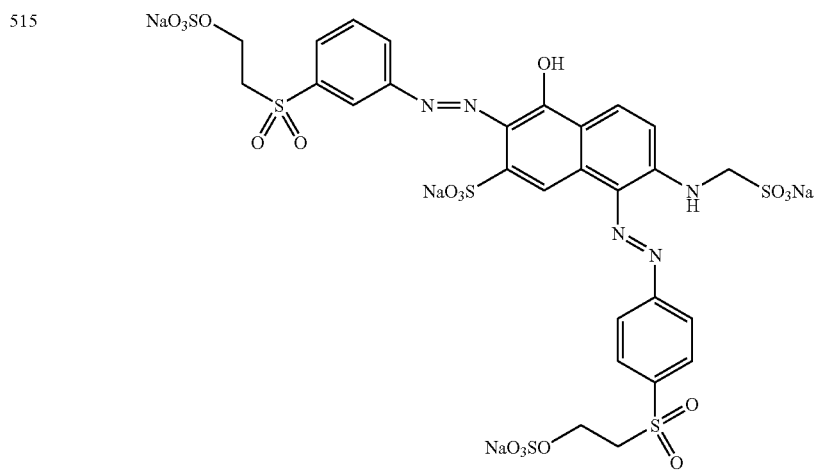<br>(II-15) |
| 516 | (II-15) |
| 517 | (II-15) |
| 518 | (II-15) |
| 519 | (II-15) |

-continued
520 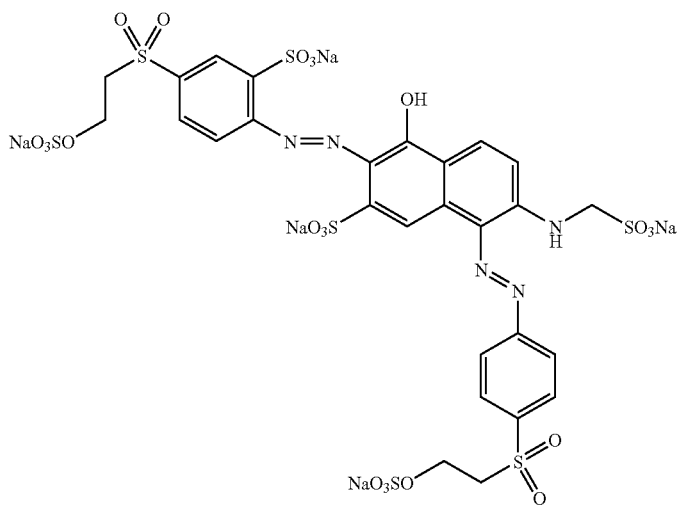
(II-54)
521 (II-54)
522 (II-54)
523 (II-54)
524 (II-54)
525 (II-54)
526 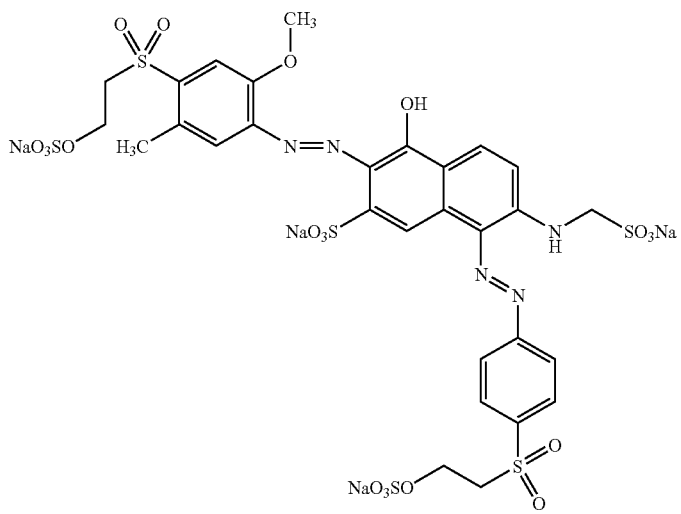
(II-17)

-continued
527 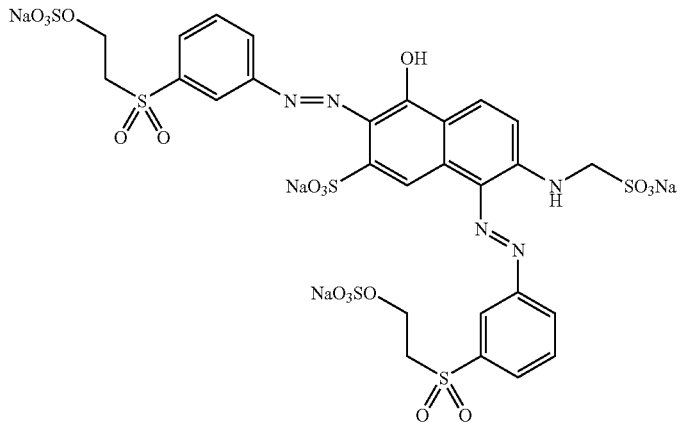
(II-20)
528 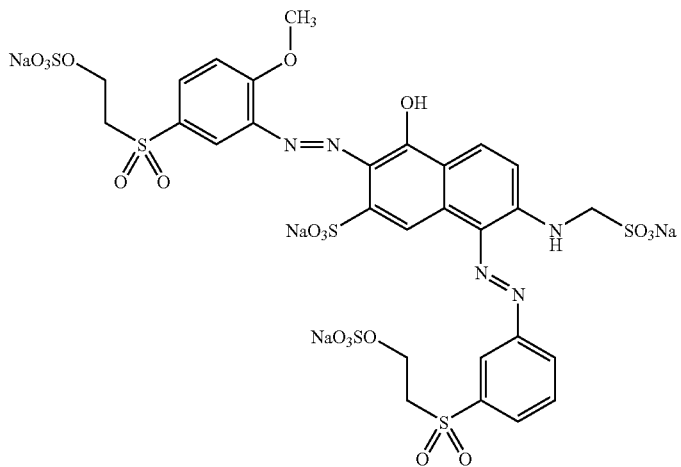
(II-57)
529 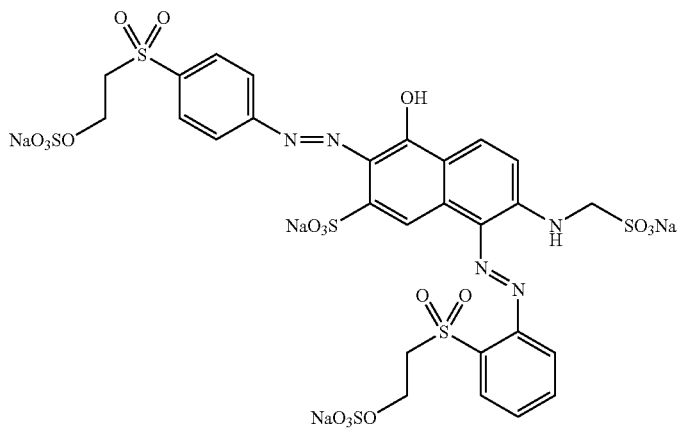
(II-24)
| | |
|---|---|
| 530 | (II-24) |
| 531 | (II-24) |
| 532 | (II-24) |
| 533 | (II-24) |
| 534 | (II-24) |

535 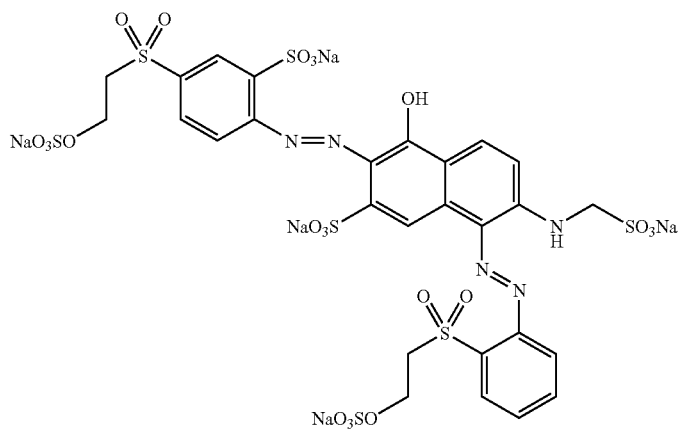
(II-59)
536 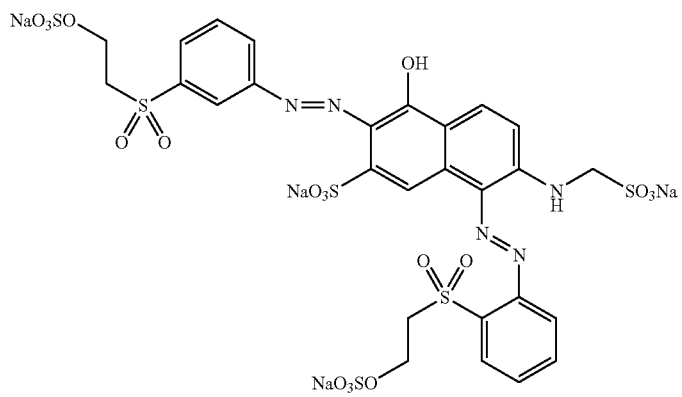
(II-60)
537 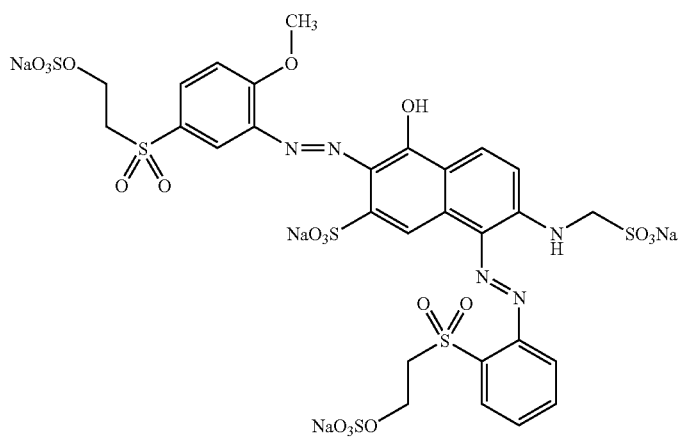
(II-62)

| 538 | 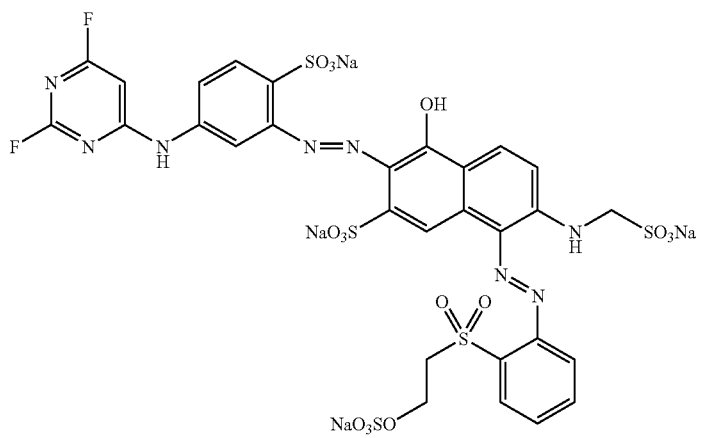 |
| --- | --- |
| | (II-63) |
| 539 | 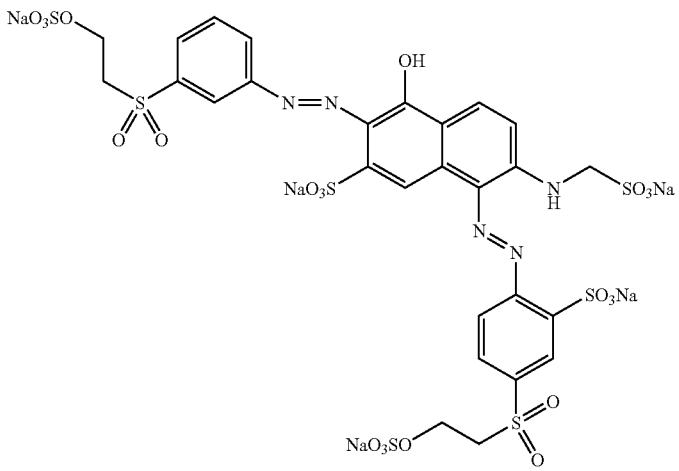 |
| | (II-25) |
| 540 | 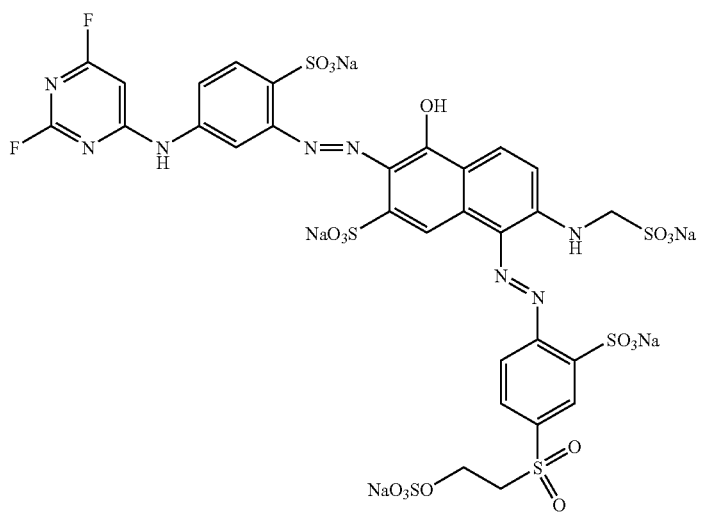 |
| | (II-26) |
| 541 | (II-26) |
| 542 | (II-26) |
| 543 | (II-26) |

-continued
544
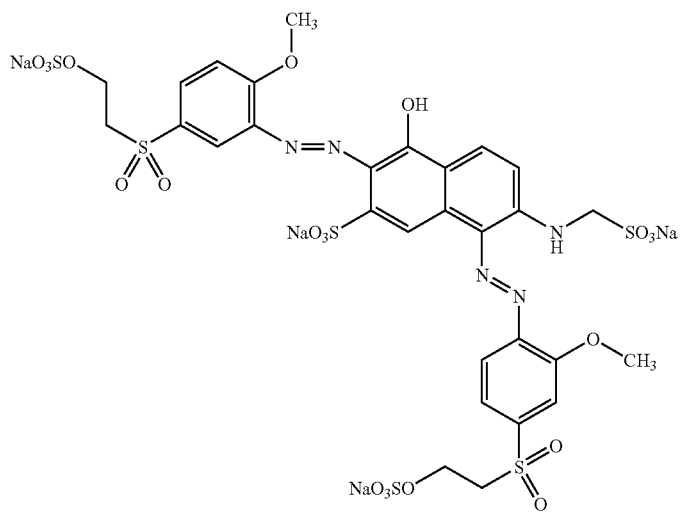
(II-27)
| 545 | (II-27) |
| 546 | (II-27) |
| 547 | (II-27) |
| 548 | (II-27) |
| 549 | (II-27) |
550
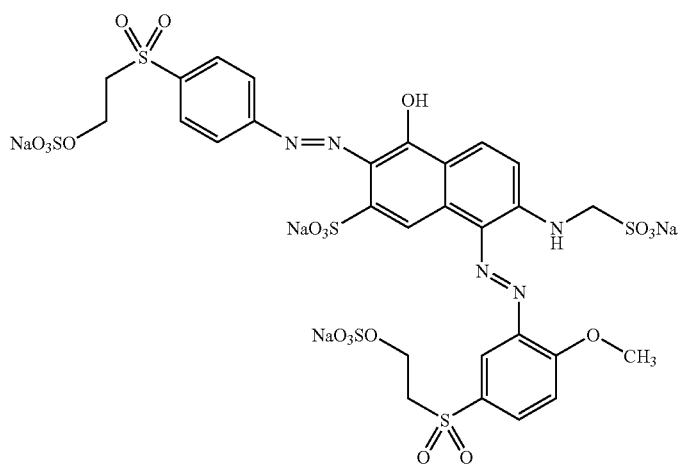
(II-67)
| 551 | (II-67) |
| 552 | (II-67) |
| 553 | (II-67) |
| 554 | (II-67) |
| 555 | (II-67) |
| 556 | (II-67) |

557 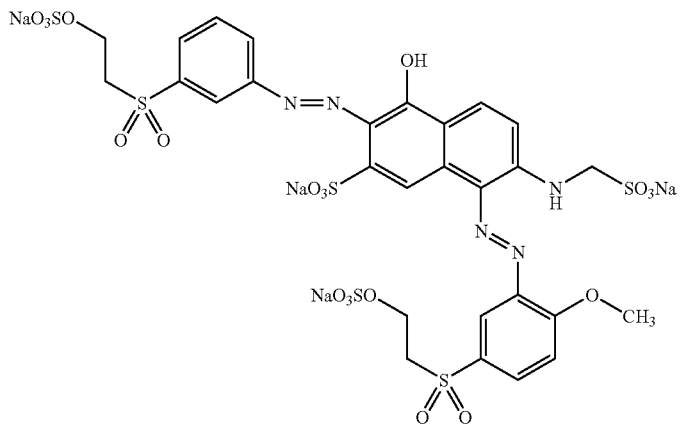
(II-65)
558 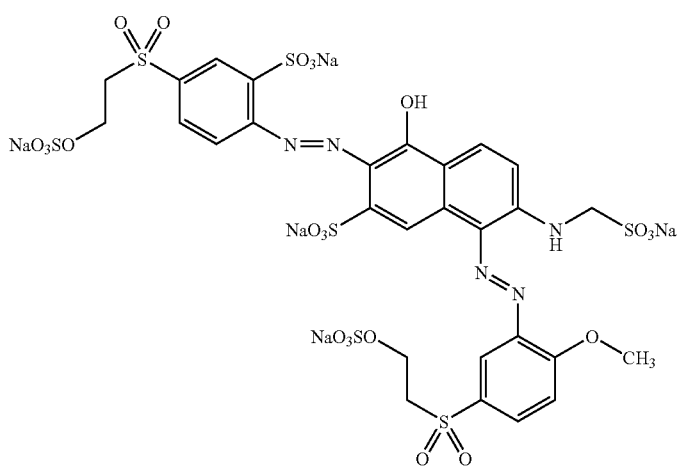
(II-69)
559 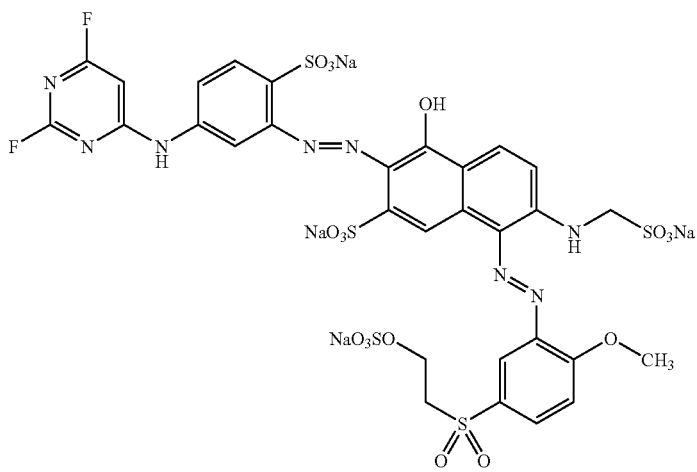
(II-31)

-continued
| | |
|---|---|
| 560 | 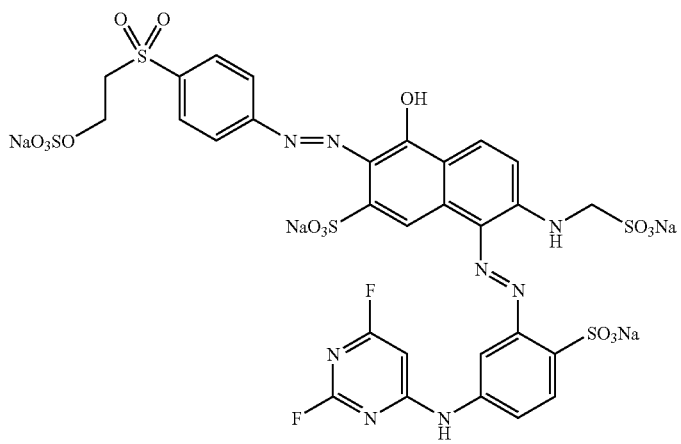 |
| | (II-72) |
| 561 | (II-72) |
| 562 | (II-72) |
| 563 | (II-72) |
| 564 | 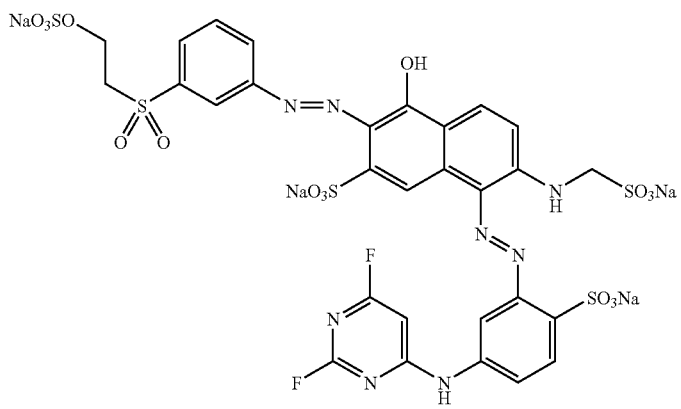 |
| | (II-73) |
| 565 | 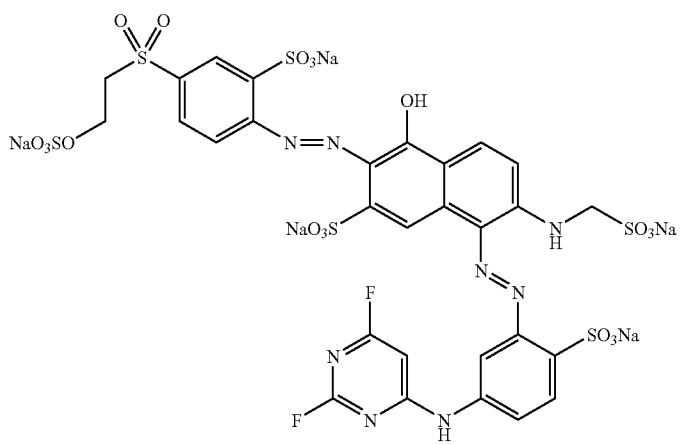 |
| | (II-74) |

566 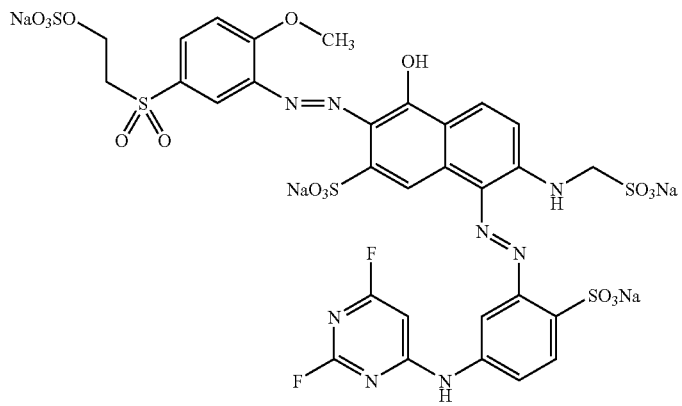
(II-35)
567 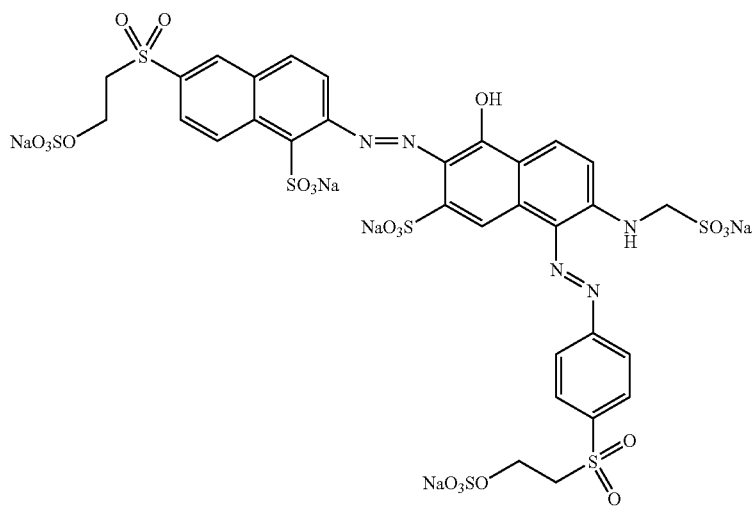
(II-76)
568 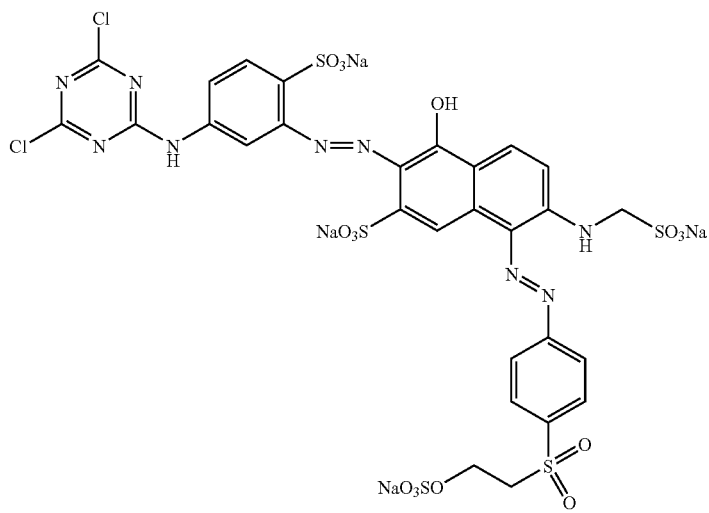
(II-77)

569 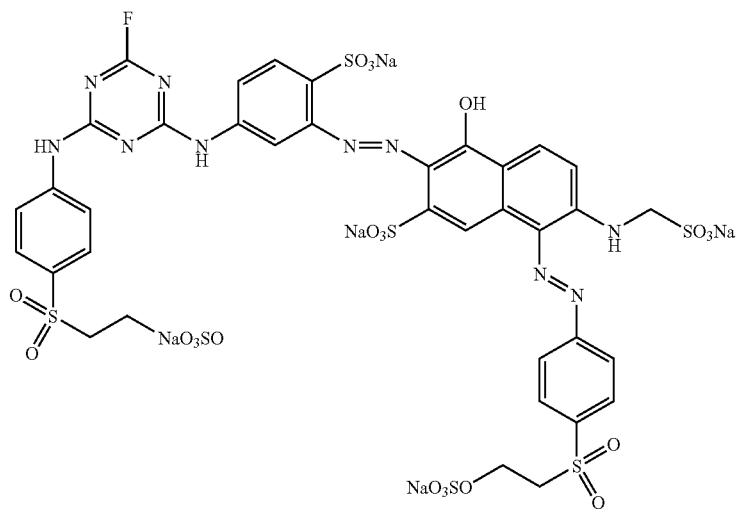
(II-36)
570 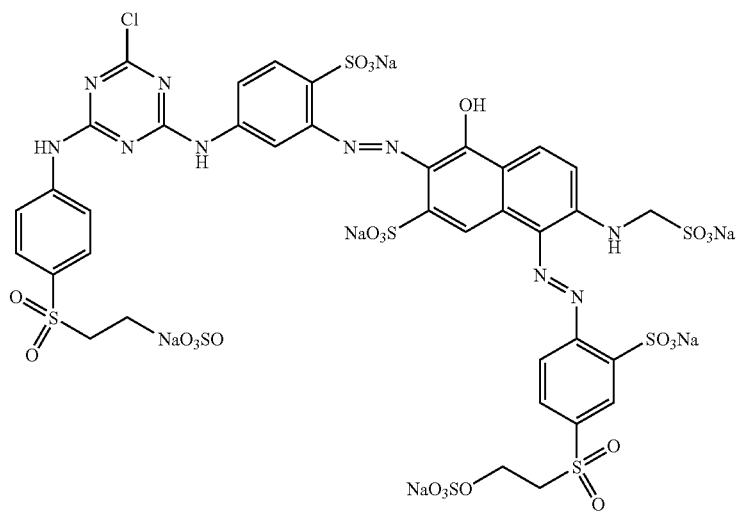
(II-80)
571 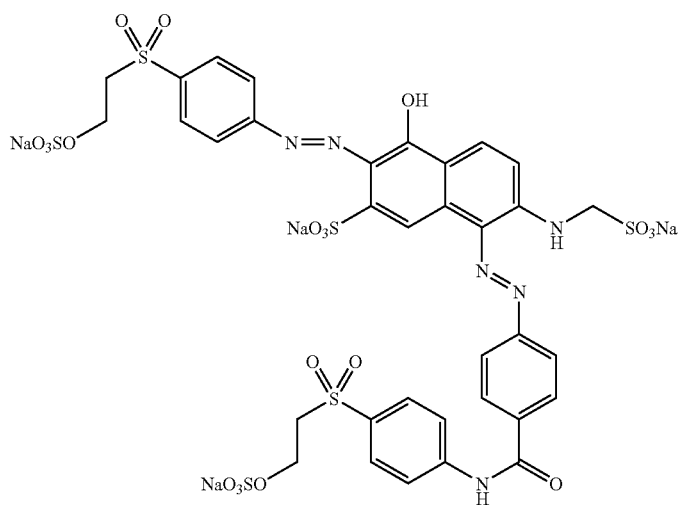
(II-61)

572
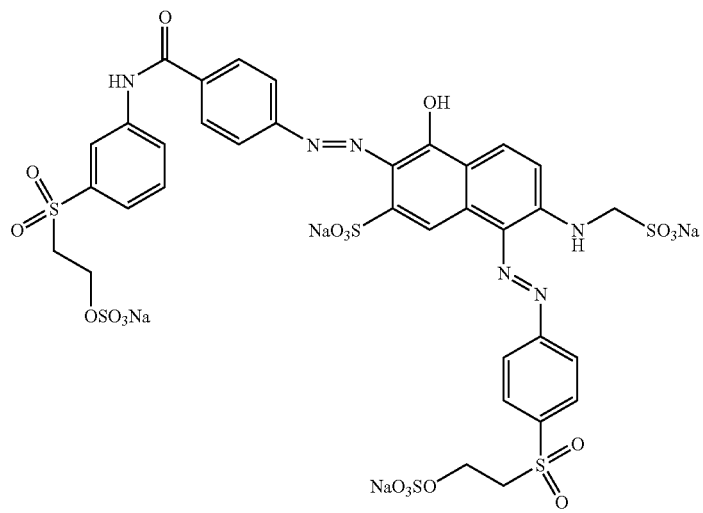
(II-41)
573
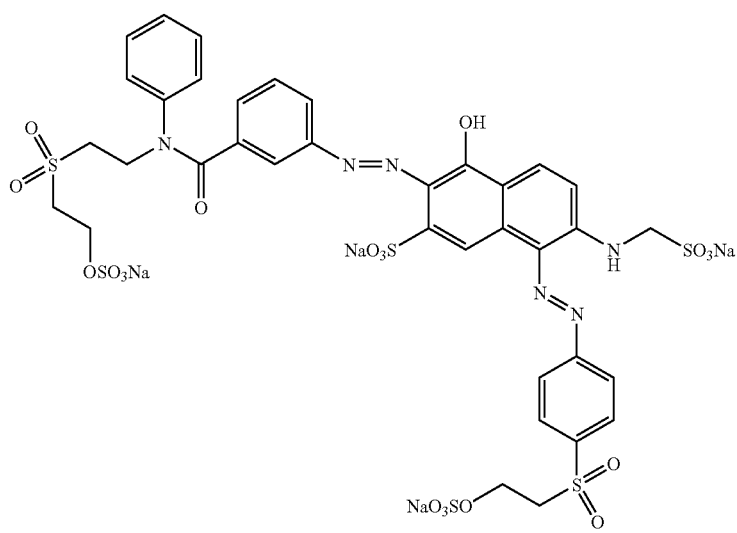
(II-83)
574
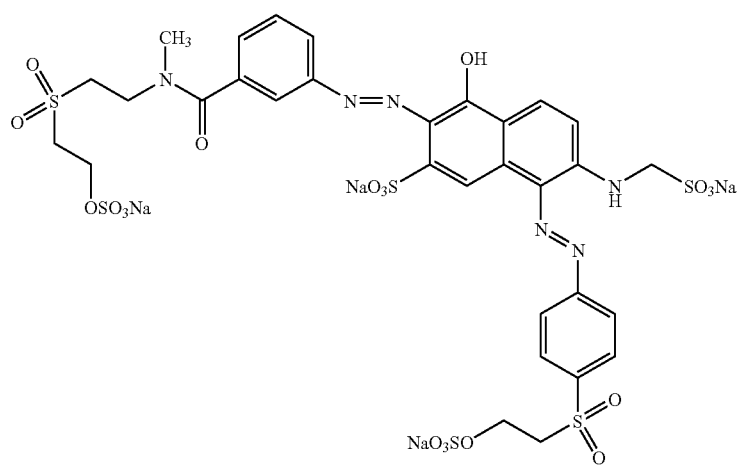
(II-85)

575 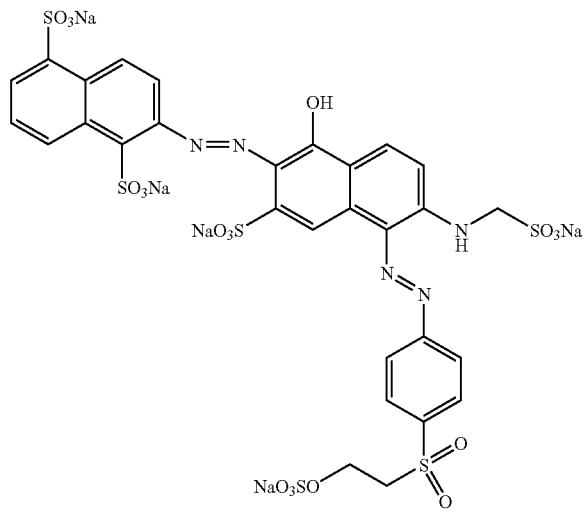
(II-86)
576 (II-86)
577 (II-86)
578 (II-86)
579 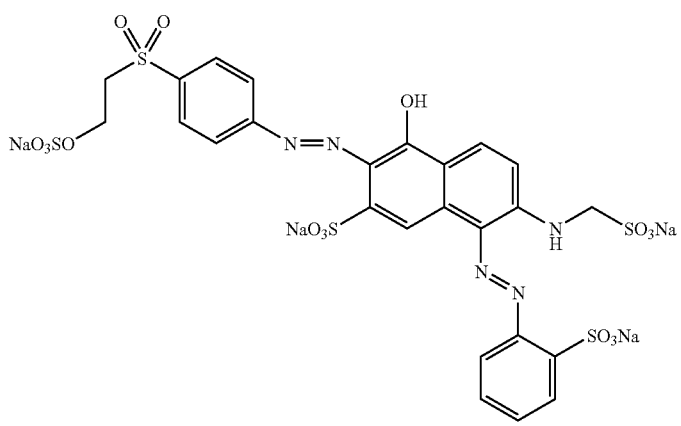
(II-46)
580 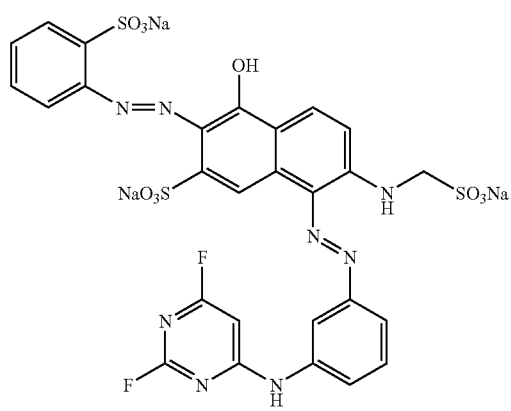
(II-89)

581 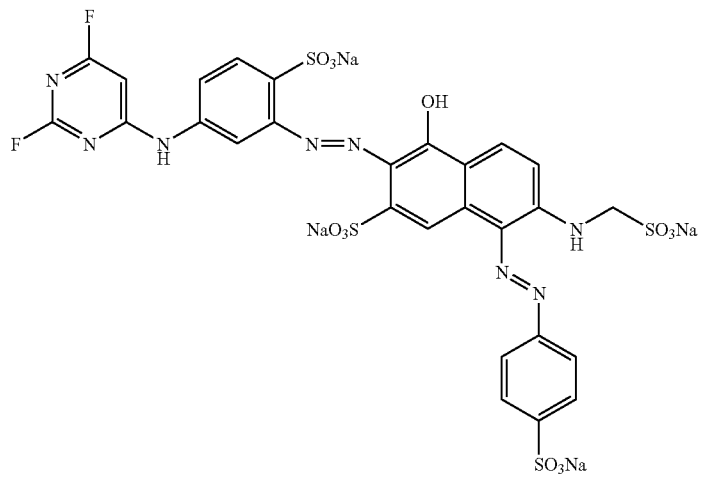
(II-47)
| | |
|---|---|
| 582 | (II-1) |
| 583 | (II-2) |
| 584 | (II-14) |
| 585 | (II-54) |
| 586 | (II-24) |
| 587 | (II-27) |
| 588 | (II-67) |
| 589 | (II-69) |
| 590 | (II-72) |
| 591 | (II-86) |
| 592 | (II-3) |
| 593 | (II-7) |
| 594 | (II-27) |
| 595 | (II-86) |
| 596 | (II-4) |
| 597 | (II-8) |
| 598 | (II-17) |
| 599 | (II-4) |
| 600 | (II-17) |
| 601 | (II-1) |
| 602 | (II-3) |
| 603 | (II-24) |
| 604 | (II-27) |
| 605 | (II-67) |
| 606 | (II-72) |
| 607 | (II-41) |
| 608 | (II-1) |
| 609 | (II-2) |
| 610 | (II-3) |
| 611 | (II-7) |
| 612 | (II-26) |
| 613 | (II-67) |
| 614 | (II-72) |
| 615 | (II-1) |
| 616 | (II-2) |
| 617 | (II-3) |
| 618 | (II-7) |
| 619 | (II-67) |
| 620 | (II-1) |
| 621 | (II-2) |
| 622 | (II-3) |
| 623 | (II-7) |
| 624 | (II-67) |
| 625 | (II-1) |
| 626 | (II-2) |
| 627 | (II-3) |
| 628 | (II-7) |
| 629 | (II-67) |
| 630 | (II-1) |
| 631 | (II-2) |
| 632 | (II-3) |
| 633 | (II-7) |
| 634 | (II-67) |
| 635 | (II-3) |

-continued

| | |
|---|---|
| 636 | (II-7) |
| 637 | (II-27) |
| 638 | (II-86) |
| 639 | (II-8) |
| 640 | (II-17) |
| 641 | (II-67) |
| 642 | (II-4) |
| 643 | (II-8) |
| 644 | (II-17) |
| 645 | (II-1) |
| 646 | (II-3) |
| 647 | (II-20) |
| 648 | (II-27) |
| 649 | (II-28) |
| 650 | (II-72) |
| 651 | (II-81) |
| 652 | (II-41) |
| 653 | (II-1) |
| 654 | (II-2) |
| 655 | (II-3) |
| 656 | (II-7) |
| 657 | (II-67) |
| 658 | (II-1) |
| 659 | (II-2) |
| 660 | (II-3) |
| 661 | (II-7) |
| 662 | (II-67) |
| 663 | (II-1) |
| 664 | (II-2) |
| 665 | (II-3) |
| 666 | (II-7) |
| 667 | (II-67) |
| 668 | (II-1) |
| 669 | (II-2) |
| 670 | (II-3) |
| 671 | (II-7) |
| 672 | (II-14) |
| 673 | (II-26) |
| 674 | (II-67) |
| 675 | (II-72) |
| 676 | (II-1) |
| 677 | (II-2) |
| 678 | (II-3) |
| 679 | (II-7) |
| 680 | (II-67) |
| 681 | (II-80) |
| 682 | (II-1) |
| 683 | (II-2) |
| 684 | (II-3) |
| 685 | (II-7) |
| 686 | (II-67) |
| 687 | (II-1) |
| 688 | (II-2) |
| 689 | (II-3) |
| 690 | (II-7) |
| 691 | (II-67) |
| 692 | (II-80) |

| Example | Dye of formula (G) | Ratio (I):(II):(III) |
|---|---|---|
| 482 | (Ga-2) | 63:19:18 |
| 483 | (Ga-3) | 68:20:12 |
| 484 | (Gb-2) | 67:20:13 |

-continued

| 485 | (Gc-1) [structure shown] | 65:18:17 |
|---|---|---|
| 486 | (Gd-1) [structure shown] | 65:20:15 |
| 487 | (Ge-1) | 70:20:10 |
| 488 | (Gf-1) | 63:18:19 |
| 489 | (Gf-4) [structure shown] | 70:18:12 |
| 490 | (Ga-1) | 67:20:13 |
| 491 | (Ga-2) | 65:20:15 |
| 492 | (Ga-6) | 64:20:16 |
| 493 | (Gb-3) | 67:20:13 |
| 494 | (Gb-5) | 68:20:12 |
| 495 | (Ge-1) | 68:22:10 |
| 496 | (Gf-2) | 64:18:18 |
| 497 | (Ga-1) | 70:18:12 |
| 498 | (Ga-2) | 65:15:20 |
| 499 | (Gb-2) | 67:20:13 |
| 500 | (Gb-5) | 68:18:14 |
| 501 | (Ge-1) | 72:18:10 |
| 502 | (Gf-1) | 65:15:20 |

| | | |
|---|---|---|
| 503 | 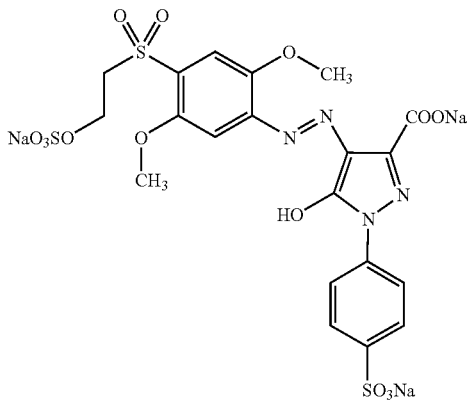 (Gc-2) | 67:18:15 |
| 504 | (Ga-1) | 68:20:12 |
| 505 | (Ga-2) | 66:16:18 |
| 506 | (Gb-2) | 70:18:12 |
| 507 | (Gb-5) | 67:20:13 |
| 508 | (Ge-1) | 73:17:10 |
| 509 | (Gf-1) | 65:17:18 |
| 510 | 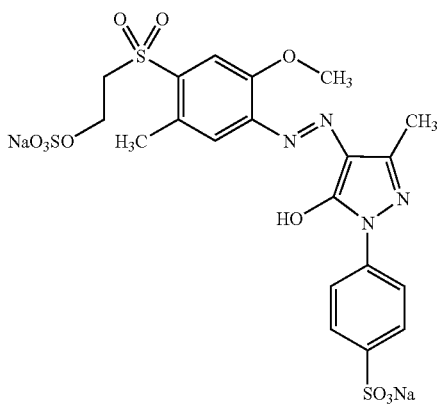 (Gc-3) | 65:20:15 |
| 511 | (Ga-1) | 60:25:15 |
| 512 | (Gb-5) | 66:22:12 |
| 513 | (Ge-1) | 65:23:12 |
| 514 | (Gf-2) | 63:20:17 |
| 515 | (Ga-1) | 66:20:14 |
| 516 | (Gb-2) | 70:20:10 |
| 517 | (Gb-5) | 68:20:12 |
| 518 | 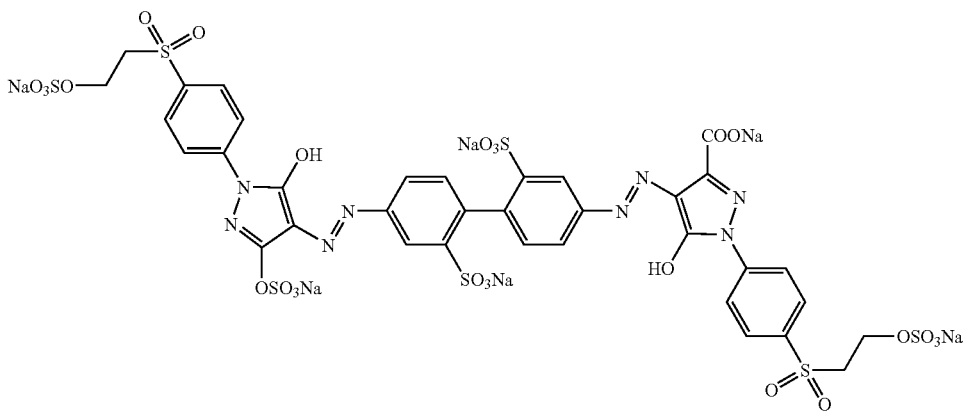 (Ge-2) | 70:20:10 |

-continued

| | | |
|---|---|---|
| 519 | (Gf-1) | 68:17:15 |
| 520 | (Ga-1) | 68:20:12 |
| 521 | (Ga-2) | 65:20:15 |
| 522 | (Gb-2) | 70:18:12 |
| 523 | (Gb-5) | 67:20:13 |
| 524 | (Ge-1) | 70:20:10 |
| 525 | (Gf-1) | 65:18:17 |
| 526 | (Gb-2) | 70:18:12 |
| 527 | (Ge-1) | 67:22:11 |
| 528 | (Gf-2) | 63:20:17 |
| 529 | (Ga-1) | 67:20:13 |
| 530 | (Ga-2) | 65:20:15 |
| 531 | (Gb-2) | 70:18:12 |
| 532 | (Gb-5) | 67:20:13 |
| 533 | (Ge-1) | 70:20:10 |
| 534 | (Gf-1) | 66:17:17 |
| 535 | (Ge-1) | 70:20:10 |
| 536 | (Gb-2) | 68:20:12 |
| 537 | (Gf-2) | 65:20:15 |
| 538 | (Ga-1) | 67:20:13 |
| 539 | (Gf-1) | 62:22:16 |
| 540 | (Ga-1) | 70:18:12 |
| 541 | (Gb-5) | 68:20:12 |
| 542 | (Ge-1) | 70:20:10 |
| 543 | (Gf-1) | 65:20:15 |
| 544 | (Ga-1) | 67:18:15 |
| 545 | (Ga-2) | 66:17:17 |
| 546 | (Gb-2) | 73:15:12 |
| 547 | (Gb-5) | 67:20:13 |
| 548 | (Ge-1) | 70:18:12 |
| 549 | (Gf-1) | 67:15:18 |
| 550 | (Ga-1) | 65:20:15 |
| 551 | (Ga-2) | 63:20:17 |
| 552 | (Ga-6) | 64:20:16 |
| 553 | (Gb-2) | 63:25:12 |
| 554 | (Gb-5) | 68:20:12 |
| 555 | (Ge-1) | 66:23:11 |
| 556 | (Gf-1) | 60:20:20 |
| 557 | (Ge-1) | 65:25:10 |
| 558 | (Gb-2) | 68:20:12 |
| 559 | (Ga-2) | 67:20:13 |
| 560 | (Ga-1) | 65:20:15 |
| 561 | (Gb-5) | 68:20:12 |
| 562 | (Ge-1) | 70:20:10 |
| 563 | (Gf-2) | 63:20:17 |
| 564 | (Gd-2) | 65:20:15 |
| 565 | (Ge-1) | 72:18:10 |
| 566 | (Ga-1) | 67:18:15 |
| 567 | (Gb-2) | 70:15:15 |
| 568 | (Ge-2) | 75:15:10 |
| 569 | (Gf-1) | 66:20:14 |
| 570 | (Gf-2) | 65:20:15 |
| 571 | (Gf-3) | 68:20:12 |

-continued
| | | | |
|---|---|---|---|
| 572 | 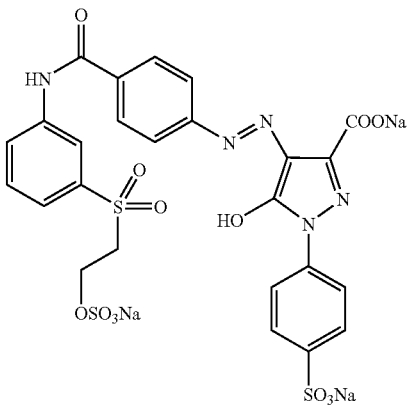 | | 67:18:15 |
| | (Gc-4) | | |
| 573 | (Ga-3) | | 62:20:18 |
| 574 | (Gb-2) | | 66:22:12 |
| 575 | (Ga-1) | | 62:23:15 |
| 576 | (Gb-5) | | 70:20:10 |
| 577 | (Ge-1) | | 67:22:11 |
| 578 | (Gf-1) | | 63:20:17 |
| 579 | (Ga-1) | | 60:25:15 |
| 580 | (Gf-2) | | 65:20:15 |
| 581 | (Gb-2) | | 67:20:13 |
| 582 | (Gb-5) | | 68:20:12 |
| 583 | (Gb-2) | | 72:18:10 |
| 584 | (Gf-3) | | 65:23:12 |
| 585 | (Ge-2) | | 70:20:10 |
| 586 | (Gf-2) | | 67:18:15 |
| 587 | (Ga-1) | | 69:18:13 |
| 588 | (Ge-1) | | 70:20:10 |
| 589 | (Gf-1) | | 65:20:15 |
| 590 | (Gf-4) | | 66:22:12 |
| 591 | (Ga-3) | | 60:20:20 |
| 592 | (Ge-1) | | 73:20:7 |
| 593 | (Gb-5) | | 69:20:11 |
| 594 | (Gf-2) | | 70:20:10 |
| 595 | (Ga-1) | | 67:22:11 |
| 596 | (Gb-2) | | 72:20:8 |
| 597 | (Gf-2) | | 70:20:10 |
| 598 | (Ge-1) | | 73:22:5 |
| 599 | (Ge-1) | | 72:20:8 |
| 600 | (Gb-2) | | 73:20:7 |
| 601 | (Gb-3) | | 70:20:10 |
| 602 | (Gf-3) | | 67:22:11 |
| 603 | (Ge-1) | | 72:20:8 |
| 604 | (Gb-5) | | 66:20:14 |
| 605 | (Ga-3) | | 66:17:17 |
| 606 | (Gf-4) | | 63:22:15 |
| 607 | (Gc-4) | | 67:22:11 |
| 608 | (Ge-1) | | 70:20:10 |
| 609 | (Gb-2) | | 73:18:9 |
| 610 | (Gf-1) | | 67:20:13 |
| 611 | (Gb-5) | | 66:21:13 |
| 612 | (Gf-4) | | 65:20:15 |
| 613 | (Ga-1) | | 67:22:11 |
| 614 | (Gf-3) | | 66:20:14 |
| 615 | (Gb-5) | | 68:20:12 |
| 616 | (Gb-2) | | 67:22:11 |
| 617 | (Ga-1) | | 67:20:13 |
| 618 | (Gf-2) | | 66:17:17 |
| 619 | (Ge-1) | | 70:22:8 |
| 620 | (Ge-1) | | 70:20:10 |
| 621 | (Gf-2) | | 65:20:15 |
| 622 | (Ga-1) | | 67:22:11 |
| 623 | (Gb-5) | | 67:20:13 |
| 624 | (Gb-2) | | 68:22:10 |
| 625 | (Gb-5) | | 68:20:12 |
| 626 | (Gb-2) | | 69:20:11 |
| 627 | (Ga-1) | | 67:22:11 |
| 628 | (Gf-2) | | 66:18:16 |
| 629 | (Ge-1) | | 70:20:10 |

-continued

| | | |
|---|---|---|
| 630 | (Ge-1) | 72:20:8 |
| 631 | (Gf-1) | 66:20:14 |
| 632 | (Ga-1) | 68:20:12 |
| 633 | (Gb-2) | 72:18:10 |
| 634 | (Gb-5) | 67:20:13 |
| 635 | (Ge-1) | 70:23:7 |
| 636 | (Gb-2) | 70:20:10 |
| 637 | (Gf-1) | 67:20:13 |
| 638 | (Ga-1) | 68:22:10 |
| 639 | (Ge-1) | 72:20:8 |
| 640 | (Gb-2) | 70:20:10 |
| 641 | (Gf-2) | 66:20:14 |
| 642 | (Gb-2) | 70:20:10 |
| 643 | (Gf-1) | 68:20:12 |
| 644 | (Ge-1) | 72:20:8 |
| 645 | (Gb-1) | 70:20:10 |
| 646 | (Gf-3) | 66:22:12 |
| 647 | (Ge-1) | 72:20:8 |
| 648 | (Gb-1) | 67:20:13 |
| 649 | (Ga-3) | 66:18:16 |
| 650 | (Gf-4) | 66:20:14 |
| 651 | (Gf-3) | 68:20:12 |
| 652 | (Gc-4) | 70:18:12 |
| 653 | (Ge-1) | 72:20:8 |
| 654 | (Gb-2) | 70:20:10 |
| 655 | (Ga-1) | 68:20:12 |
| 656 | (Gb-5) | 66:20:14 |
| 657 | (Gf-1) | 66:17:17 |
| 658 | (Gb-5) | 71:18:11 |
| 659 | (Gb-2) | 70:20:10 |
| 660 | (Ga-1) | 70:18:12 |
| 661 | (Gf-2) | 67:20:13 |
| 662 | (Ge-1) | 72:18:10 |
| 663 | (Gb-5) | 67:20:13 |
| 664 | (Gb-2) | 68:20:12 |
| 665 | (Ga-1) | 68:18:14 |
| 666 | (Gf-1) | 65:20:15 |
| 667 | (Ge-1) | 70:20:10 |
| 668 | (Ge-1) | 68:22:10 |
| 669 | (Gb-2) | 70:20:10 |
| 670 | (Gf-1) | 67:20:13 |
| 671 | (Ga-2) | 66:22:12 |
| 672 | (Gf-4) | 65:22:13 |
| 673 | (Gf-3) | 67:20:13 |
| 674 | (Ga-1) | 68:20:12 |
| 675 | (Gd-2) | 67:22:11 |
| 676 | (Ge-1) | 67:22:11 |
| 677 | (Gf-1) | 65:20:15 |
| 678 | (Ga-1) | 68:20:12 |
| 679 | (Gb-2) | 70:20:10 |
| 680 | (Gb-5) | 66:22:12 |
| 681 | (Ga-2) | 65:20:15 |
| 682 | (Gb-5) | 68:20:12 |
| 683 | (Gf-2) | 66:20:14 |
| 684 | (Ga-1) | 67:20:13 |
| 685 | (Gb-2) | 67:22:11 |
| 686 | (Ge-1) | 68:22:10 |
| 687 | (Ge-1) | 72:20:8 |
| 688 | (Gf-1) | 67:20:13 |
| 689 | (Ga-1) | 68:20:12 |
| 690 | (Gb-2) | 70:20:10 |
| 691 | (Ge-2) | 67:22:11 |
| 692 | (Gd-1) | 65:20:15 |

Further Dye Mixtures in Accordance with Example 468 or 469

| Example | Dye of gen. formula (I) | Dye of gen. formula (II) | Dye of Formula (G) | Ratio (I):(II):(G) |
|---|---|---|---|---|
| 693 | (I-1) | (II-1) | (Ga-7) | 72:18:10 |
| 694 | (I-1) | (II-2) | (Ga-8) | 68:21:11 |
| 695 | (I-1) | (II-7) | (Ga-9) | 70:20:10 |
| 696 | (I-1) | (II-54) | (Ga-10) | 70:18:12 |
| 697 | (I-1) | (II-26) | (Ga-9) | 72:17:11 |

-continued

| Example | Dye of gen. formula (I) | Dye of gen. formula (II) | Dye of Formula (G) | Ratio (I):(II):(G) |
|---|---|---|---|---|
| 698 | (I-1) | (II-77) | (Ga-7) | 73:18:9 |
| 699 | (I-2) | (II-1) | (Ga-7) | 72:18:10 |
| 760 | (I-2) | (II-2) | (Ga-7) | 68:21:11 |
| 701 | (I-2) | (II-7) | (Ga-9) | 70:20:10 |
| 702 | (I-2) | (II-54) | (Ga-10) | 70:18:12 |
| 703 | (I-2) | (II-26) | (Ga-9) | 72:17:11 |
| 704 | (I-2) | (II-77) | (Ga-7) | 73:18:9 |
| 705 | (I-4) | (II-1) | (Ga-7) | 72:18:10 |
| 706 | (I-4) | (II-2) | (Ga-8) | 68:21:11 |
| 707 | (I-4) | (II-7) | (Ga-9) | 70:20:10 |
| 708 | (I-4) | (II-54) | (Ga-10) | 70:18:12 |
| 709 | (I-4) | (II-26) | (Ga-9) | 72:17:11 |
| 710 | (I-4) | (II-77) | (Ga-7) | 73:18:9 |
| 711 | (I-7) | (II-1) | (Ga-7) | 72:18:10 |
| 712 | (I-7) | (II-2) | (Ga-8) | 68:21:11 |
| 713 | (I-7) | (II-7) | (Ga-9) | 70:20:10 |
| 714 | (I-7) | (II-54) | (Ga-10) | 70:18:12 |
| 715 | (I-7) | (II-26) | (Ga-9) | 72:17:11 |
| 716 | (I-7) | (II-77) | (Ga-7) | 73:18:9 |

Dye Mixtures in Accordance with Example 473

| Example | Dye of gen. formula (I) | Dye of gen. formula (II) | Dye of gen. formula (G) | Ratio (I):(II):(G) |
|---|---|---|---|---|
| 717 | (I-1) | (II-1) | (Gf-2) | 65:20:15 |
| 718 | (I-2) | (II-3) | (Ge-1) | 70:20:10 |
| 719 | (I-6) | (II-41) | (Gf-3) | 67:22:11 |
| 720 | (I-7) | (II-14) | (Gd-2) | 65:22:13 |
| 721 | (I-24) | (II-15) | (Gf-1) | 67:20:13 |
| 722 | (I-9) | (II-17) | (Ga-3) | 67:18:15 |
| 723 | (I-10) | (II-54) | (Ga-4) | 66:22:12 |
| 724 | (I-16) | (II-83) | (Ga-2) | 65:20:15 |
| 725 | (I-17) | (II-85) | (Gb-5) | 67:20:13 |
| 726 | (I-18) | (II-76) | (Gb-3) | 70:17:13 |
| 727 | (I-20) | (II-77) | (Gf-3) | 70:15:15 |
| 728 | (I-21) | (II-38) | (Gd-1) | 65:20:15 |

Dye Mixtures in Accordance with Example 474

| Example | Dye of gen. formula (I) | Dye of gen. formula (II) | Ratio (I):(II) |
|---|---|---|---|
| 729 | (I-3) | (II-1) | 70:30 |
| 730 | (I-3) | (II-2) | 67:33 |
| 731 | (I-3) | (II-54) | 70:30 |
| 732 | (I-3) | (II-24) | 75:25 |
| 733 | (I-3) | (II-26) | 70:30 |
| 734 | (I-3) | (II-67) | 72:28 |
| 735 | (I-3) | (II-69) | 75:25 |
| 736 | (I-3) | (II-72) | 68:32 |
| 737 | (I-4) | (II-1) | 67:33 |
| 738 | (I-4) | (II-2) | 65:35 |
| 739 | (I-4) | (II-3) | 75:25 |
| 740 | (I-4) | (II-14) | 68:32 |
| 741 | (I-4) | (II-54) | 70:30 |
| 742 | (I-4) | (II-24) | 76:24 |
| 743 | (I-4) | (II-26) | 72:28 |
| 744 | (I-4) | (II-27) | 77:23 |
| 745 | (I-4) | (II-67) | 73:27 |
| 746 | (I-4) | (II-69) | 70:30 |
| 747 | (I-4) | (II-72) | 70:30 |
| 748 | (I-4) | (II-86) | 80:20 |
| 749 | (I-5) | (II-1) | 70:30 |
| 750 | (I-5) | (II-2) | 67:33 |
| 751 | (I-5) | (II-3) | 72:28 |
| 752 | (I-5) | (II-7) | 70:30 |
| 753 | (I-5) | (II-14) | 66:34 |
| 754 | (I-5) | (II-54) | 68:32 |
| 755 | (I-5) | (II-24) | 75:25 |
| 756 | (I-5) | (II-26) | 73:27 |
| 757 | (I-5) | (II-27) | 75:25 |
| 758 | (I-5) | (II-67) | 72:28 |
| 759 | (I-5) | (II-69) | 70:30 |
| 760 | (I-5) | (II-72) | 70:30 |
| 761 | (I-12) | (II-54) | 70:30 |
| 762 | (I-12) | (II-26) | 75:25 |
| 763 | (I-12) | (II-69) | 68:32 |
| 764 | (I-13) | (II-1) | 75:25 |
| 765 | (I-13) | (II-2) | 67:33 |
| 766 | (I-13) | (II-3) | 70:30 |
| 767 | (I-13) | (II-7) | 72:28 |
| 768 | (I-13) | (II-14) | 65:35 |
| 769 | (I-13) | (II-54) | 68:32 |
| 770 | (I-13) | (II-24) | 73:27 |
| 771 | (I-13) | (II-26) | 72:28 |
| 772 | (I-13) | (II-27) | 75:25 |
| 773 | (I-13) | (II-67) | 70:30 |
| 774 | (I-13) | (II-69) | 68:32 |
| 775 | (I-13) | (II-72) | 70:30 |
| 776 | (I-14) | (II-1) | 72:28 |
| 777 | (I-14) | (II-2) | 68:32 |
| 778 | (I-14) | (II-3) | 72:28 |
| 779 | (I-14) | (II-7) | 70:30 |
| 780 | (I-14) | (II-14) | 66:34 |
| 781 | (I-14) | (II-54) | 70:30 |
| 782 | (I-14) | (II-24) | 75:25 |
| 783 | (I-14) | (II-26) | 72:28 |
| 784 | (I-14) | (II-27) | 74:26 |
| 785 | (I-14) | (II-67) | 72:28 |
| 786 | (I-14) | (II-69) | 68:32 |
| 787 | (I-14) | (II-72) | 72:28 |
| 788 | (I-14) | (II-86) | 75:25 |

Dye Mixtures in Accordance with Example 475

| Example | Dye of gen. formula (I) | Dye of gen. formula (II) | Ratio (I):(II) |
|---|---|---|---|
| 789 | (I-4) | (II-4) | 70:30 |
| 790 | (I-5) | (II-17) | 75:25 |
| 791 | (I-12) | (II-1) | 73:27 |
| 792 | (I-12) | (II-2) | 70:30 |
| 793 | (I-12) | (II-24) | 72:28 |
| 794 | (I-12) | (II-67) | 73:27 |
| 795 | (I-12) | (II-72) | 72:28 |
| 796 | (I-12) | (II-45) | 65:35 |
| 797 | (I-13) | (II-4) | 75:25 |
| 798 | (I-14) | (II-17) | 77:23 |

Dye Mixtures in Accordance with Example 476

| Example | Dye of gen. formula (I) | Dye of gen. formula (II) | Dye of gen. formula (G) | Ratio (I):(II):(G) |
|---|---|---|---|---|
| 799 | (I-1) | (II-24) | (Gf-2) | 66:20:14 |
| 800 | (I-1) | (II-67) | (Gb-5) | 67:20:13 |
| 801 | (I-1) | (II-72) | (Gf-1) | 65:20:15 |
| 802 | (I-1) | (II-45) | (Ga-3) | 60:25:15 |
| 803 | (I-2) | (II-57) | (Ge-1) | 70:20:10 |
| 804 | (I-2) | (II-62) | (Ga-1) | 65:22:13 |
| 805 | (I-2) | (II-27) | (Gb-2) | 70:20:10 |
| 806 | (I-2) | (II-35) | (Gf-1) | 66:20:14 |
| 807 | (I-7) | (II-63) | (Ge-1) | 70:22:8 |
| 808 | (I-7) | (II-26) | (Gb-2) | 70:20:10 |
| 809 | (I-7) | (II-31) | (Gd-2) | 67:20:13 |
| 810 | (I-7) | (II-47) | (Gb-1) | 65:25:10 |
| 811 | (I-24) | (II-20) | (Ga-2) | 65:20:15 |
| 812 | (I-24) | (II-60) | (Gf-1) | 67:18:15 |
| 813 | (I-24) | (II-25) | (Gf-3) | 66:20:14 |
| 814 | (I-24) | (II-68) | (Gb-2) | 67:22:11 |
| 815 | (I-24) | (II-73) | (Gd-2) | 65:18:17 |
| 816 | (I-9) | (II-8) | (Gf-1) | 65:20:15 |
| 817 | (I-10) | (II-59) | (Gb-2) | 67:22:11 |
| 818 | (I-10) | (II-69) | (Ga-1) | 65:23:12 |
| 819 | (I-10) | (II-74) | (Ga-2) | 67:20:13 |

EXAMPLE 820

70 parts of an electrolyte-containing dye powder containing the navy disazo dye of the formula (I-2)

in a 70% fraction, 20 parts of an electrolyte-containing dye powder containing the scarlet disazo dye of the formula (II-9)

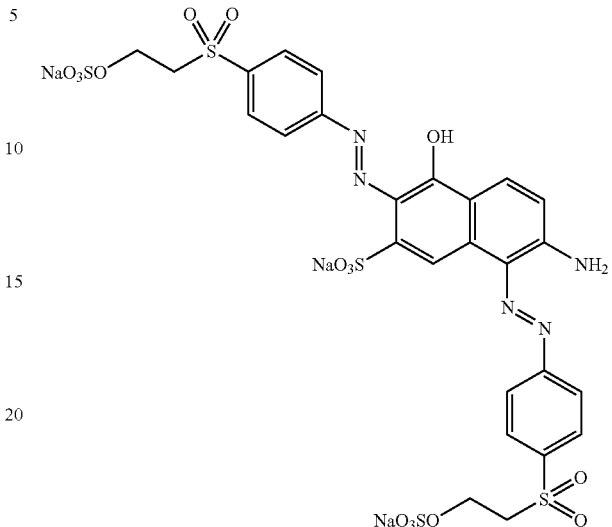

(II-9)

in a 75% fraction, and 10 parts of an electrolyte-containing dye powder containing the yellow disazo dye of the formula (Ga-1)

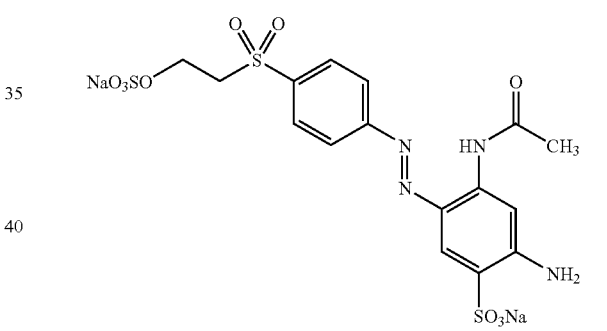

(Ga-1)

in a 70% fraction are mixed mechanically with one another.

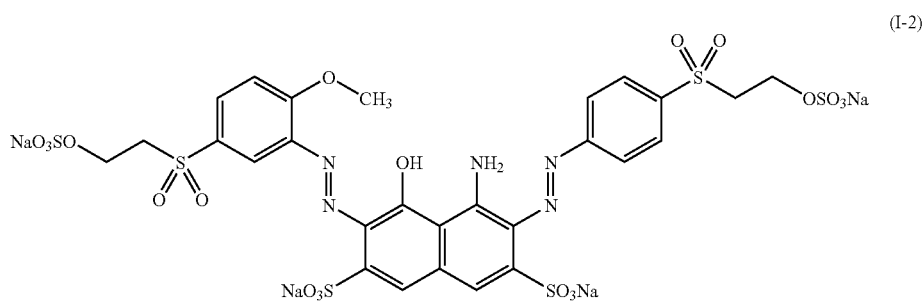

(I-2)

The resultant dye mixture of the invention provides jet black dyeings and prints, on cotton for example, under the dyeing conditions customary for reactive dyes.

EXAMPLE 821

65 parts of an electrolyte-containing dye powder containing the navy disazo dye of the formula (I-2) in a 70% fraction, 15 parts of an electrolyte-containing dye powder containing the scarlet disazo dye of the formula (II-5)

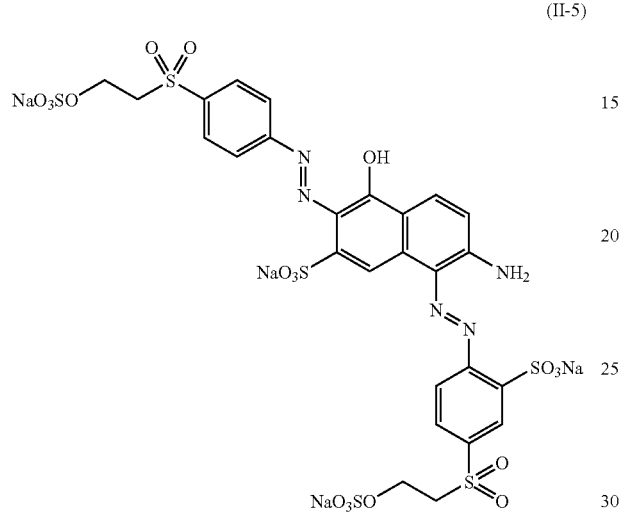
(II-5)

in a 75% fraction, and 20 parts of an electrolyte-containing dye powder containing the yellow disazo dye of the formula (Gf-1)

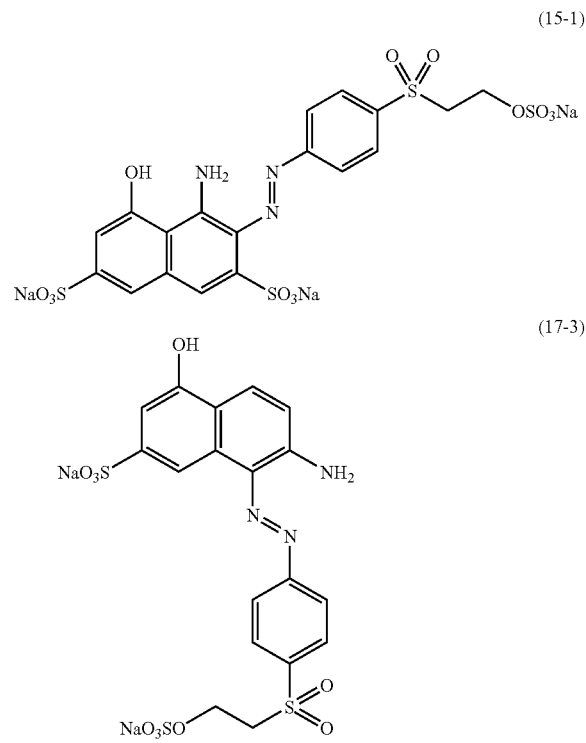
(Gf-1)

in a 60% dye fraction are dissolved in 750 parts of water and the dye solution obtained is adjusted to a pH of 5.5-6.5. Evaporative concentration of this dye solution gives a dye mixture which provides jet black dyeings and prints on cotton under the dyeing conditions customary for reactive dyes.

EXAMPLE 822 a) 419 parts of 4-(β-sulfatoethylsulfonyl)aniline are suspended in 1000 parts of ice-water and 268 parts of 30% hydrochloric acid and diazotized by dropwise addition of 258 parts of 40% sodium nitrite solution. 319 parts of 1-amino-8-hydroxynaphthalene-3,6-sulfonic acid, 76.5 parts of 7-amino-4-hydroxynaphthalene-2-sulfonic acid, and 32 parts of 2,4-diaminobenzenesulfonic acid are added and coupling takes place in a first stage at a pH of from 1 to 1.3 and below 20° C. to give a mixture or the three monoazo dyes conforming to the formulae (15-1), (17-3), and (Ga-3). The stated pH range is set and maintained during the coupling reaction by the addition of solid sodium hydrogen carbonate.

(15-1)

(17-3)

-continued

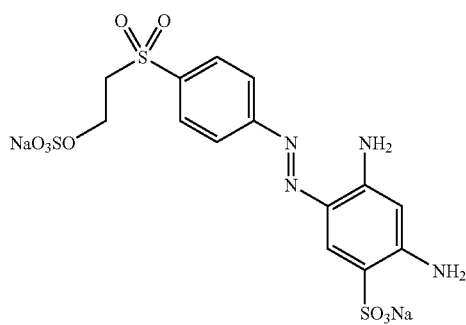
(Ga-3)

b) In a second, separate reaction vessel 464 parts of 2-methoxy-5-(β-sulfatoethylsulfonyl)aniline are suspended in 1350 parts of ice-water and 269 parts of 30% hydrochloric acid and diazotized by dropwise addition of 259 parts of 40% sodium nitrite solution. The excess nitrite is subsequently removed with aminosulfonic acid solution, and the diazo suspension obtained is pumped, after the end of the first coupling, into the solution of the monoazo dyes from a).

Then the pH is adjusted to 5-6 at below 25° C. using sodium carbonate, and the 70:20:10 mixture of the three disazo dyes (I-2), (II-10), and (Gb-1) obtained after the end of the second coupling reaction is isolated by concentration under reduced pressure or by spray drying.

Alternatively, the resulting dye solution can also be buffered at a pH of 5.5-6 by adding a phosphate buffer and adjusted to further dilution or concentration to give a liquid brand of defined strength.

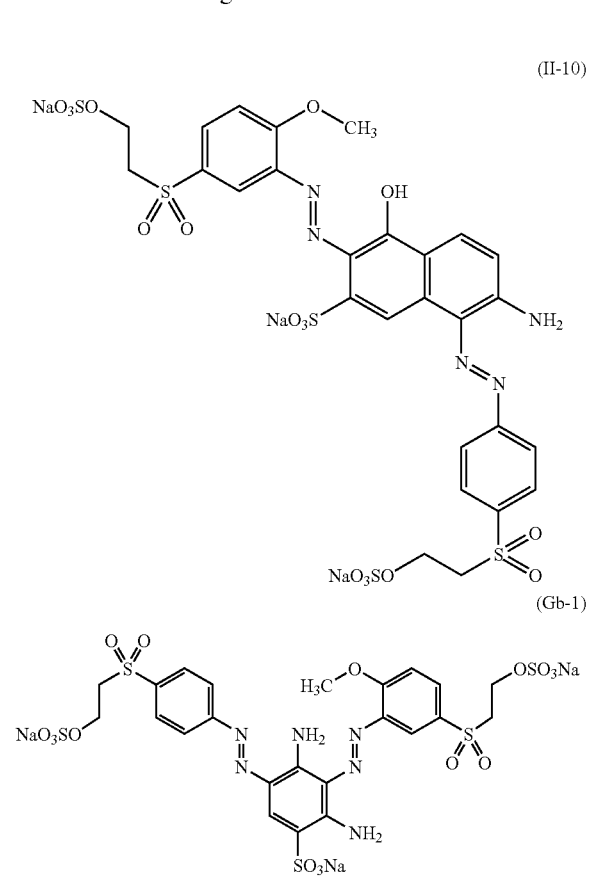

The resulting dye mixture of the invention dyes cotton in black shades.

EXAMPLE 823 a) 311 parts of 2-methoxy-5-(β-sulfatoethylsulfonyl)aniline are suspended in 900 parts of ice-water and 181 parts of 30% hydrochloric acid and diazotized by dropwise addition of 174 parts of 40% sodium nitrite solution. 319 parts of 1-amino-8-hydroxynaphthalene-3,6-disulfonic acid are added and coupling takes place in a first stage at a pH of from 1 to 1.3 and at below 20° C. to give a red monoazo dye of the formula (15-3). The stated pH range is set and maintained during the coupling reaction by addition of solid sodium hydrogen carbonate.

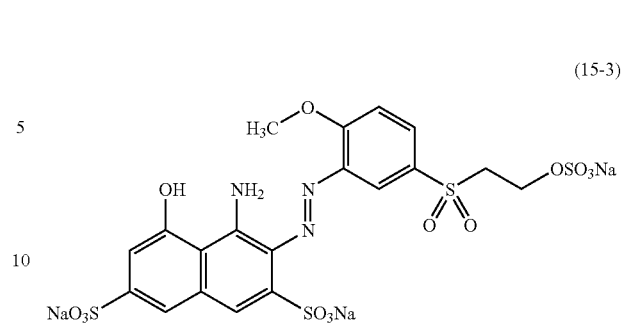

After the end of this first coupling, the reaction mixture is admixed with an aqueous solution of 200 parts of the scarlet monoazo dye of the formula (17-4) and 94 parts of the yellow monoazo dye of the formula (Ga-4), obtained by diazotizing 161 parts of 2-amino-5-(β-sulfatoethylsulfonyl)benzenesulfonic acid with 77 parts of 40% sodium nitrite solution in an acidic medium and then coupling the products to a mixture of 70.5 parts of 7-amino-4-hydroxynaphthalene-2-sulfonic acid and 28 parts of 2,4-diaminobenzenesulfonic acid at a pH of 1-2.

b) 406 parts of 4-(β-sulfatoethylsulfonyl)aniline are suspended in 950 parts of ice-water and 260 parts of 30% hydrochloric acid and diazotized by dropwise addition of 250 parts of 40% sodium nitrite solution. After removal of the excess of nitrite with amidosulfonic acid solution, the diazo suspension is pumped into the mixture of the three monoazo dyes (15-3), (17-4), and (Ga-4) from a) and the pH is adjusted to 5-6 at below 25° C. using sodium carbonate. The 70:20:10 mixture of the three disazo dyes (I-23), (II-5), and (Gb-2) obtained after the end of the coupling reaction is subsequently isolated by concentration under reduced pressure or by spray drying.

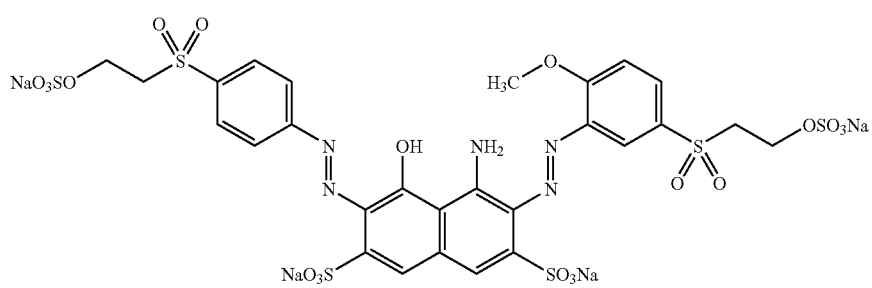

(I-23)

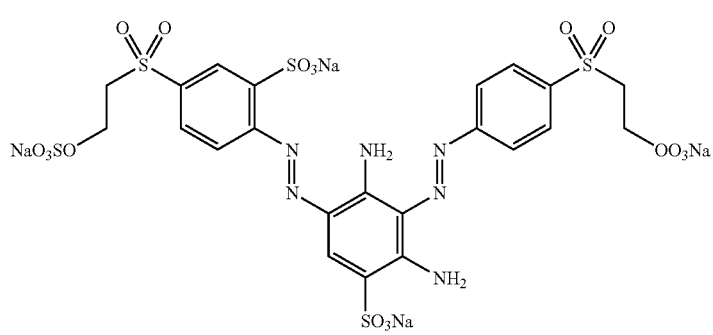

(Gb-2)

The resulting dye mixture of the invention dyes cotton in black shades.

EXAMPLE 824

562 parts of 4-(β-sulfatoethylsulfonyl)aniline are suspended in 1300 parts of ice-water and 360 parts of 30% hydrochloric acid and diazotized by dropwise addition of 346 parts of 40% sodium nitrite solution. After removal of the excess nitrite with amidosulfonic acid solution, 79 parts of 7-amino-4-hydroxynaphthalene-2-sulfonic acid and 32 parts of 2,4-diaminobenzenesulfonic acid are added and coupling takes place initially in a first stage at a pH of from 1 to 1.3 and at below 20° C. to give a mixture of two monoazo dyes conforming to the formulae (17-3) and (Ga-3). The stated pH range is set and maintained during the coupling reaction by addition of solid sodium hydrogen carbonate.

After the end of the first coupling the reaction mixture was admixed with 707 parts of the monoazo dye of formula (15-3) in the form of an aqueous solution and the mixture is adjusted to a pH of 5-6 at below 25° C. using sodium carbonate. The 70:20:10 mixture of the three disazo dyes (I-23), (II-9), and (Gb-3) obtained after the end of the second coupling reaction is isolated by spray drying or concentration under reduced pressure.

The resulting dye mixture of the invention dyes cotton in black shades.

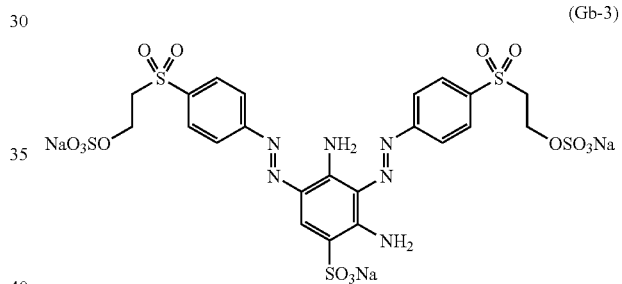

(Gb-3)

EXAMPLE 825 a) 351 parts of 4-(β-sulfatoethylsulfonyl)aniline are suspended in 825 parts of ice-water and 225 parts of 30% hydrochloric acid and diazotized by dropwise addition of 216 parts of 40% sodium nitrite solution. 319 parts of 1-amino-8-hydroxynaphthalene-3,6-disulfonic and 60 parts of 7-amino-4-hydroxynaphthalene-2-sulfonic acid are added and coupling takes place in a first stage at a pH of from 1 to 1.3 and at below 20° C. to give a mixture of the two monoazo dyes conforming to the formulae (15-1) and (17-3). The stated pH range is set and maintained during the coupling reaction by addition of solid sodium hydrogen carbonate.

b) In a second, separate reaction vessel 427 parts of 2,5-dimethoxy-4-(β-sulfatoethylsulfonyl)aniline are suspended in 1150 pads of ice-water and 226 parts of 30% hydrochloric acid and diazotized by dropwise addition of 217 parts of 40% sodium nitrite solution. The excess nitrite is then removed with amidosulfonic acid solution, and the diazo suspension obtained is pumped, after the end of the first coupling, into the solution of the two monoazo dyes from a).

Then the pH is adjusted to 5-6 at below 25° C. using sodium carbonate, and the dye solution obtained after the end of the second coupling reaction is admixed with 225 parts of a yellow dye of formula (Gf-2). The resultant 69:16:15 mixture of the three disazo dyes (I-3), (II-50), and (Gf-2) can be isolated by concentration under reduced pressure or by spray drying.

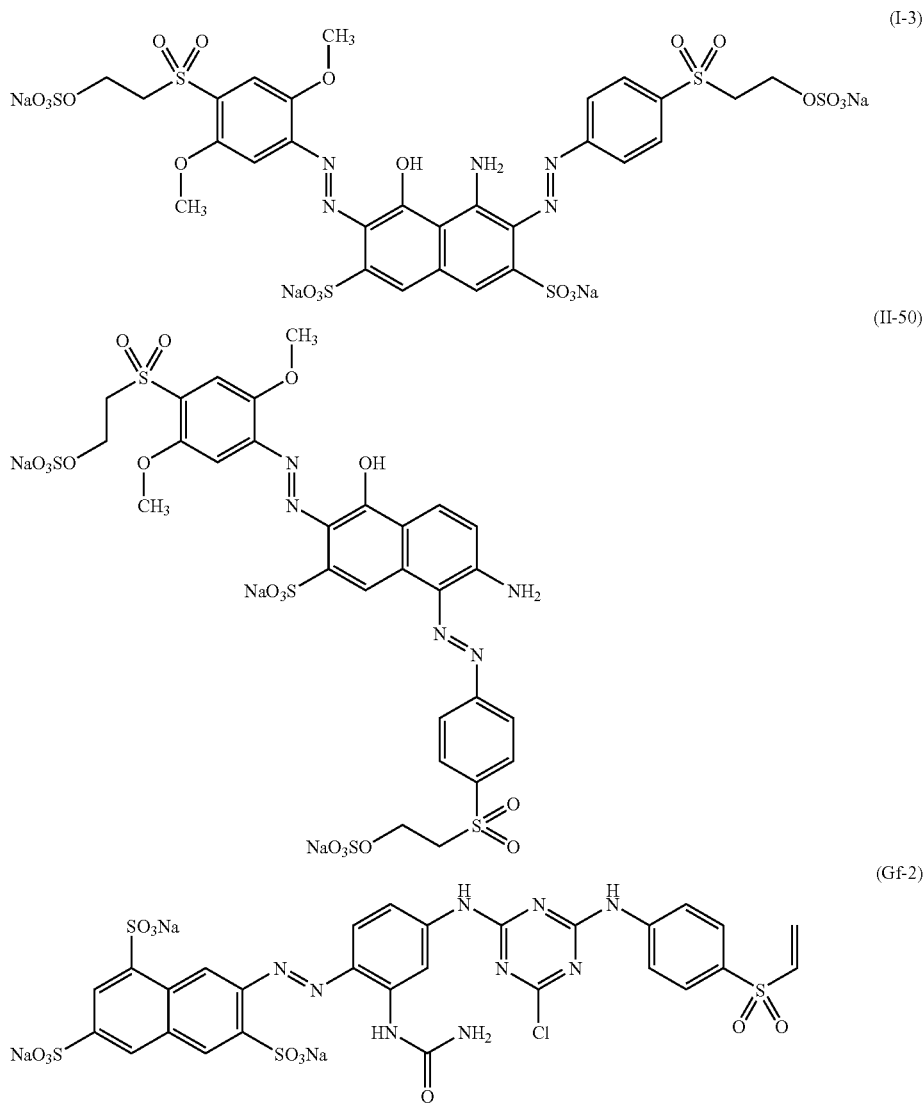
(I-3)
(II-50)
(Gf-2)
The resulting dye mixture of the invention dyes cotton in black shades.
EXAMPLE 826
70 parts of an electrolyte-containing dye powder containing the greenish navy disazo dye of the formula (I-4)
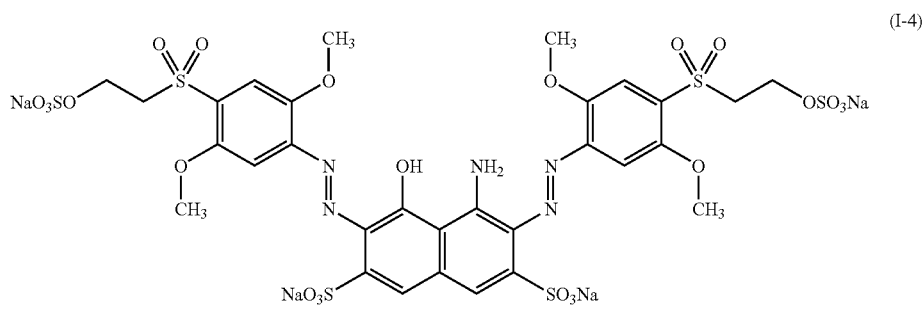
(I-4)

in a 70% fraction and 30 parts of an electrolyte-containing dye powder containing the scarlet disazo dye of the formula (II-12)

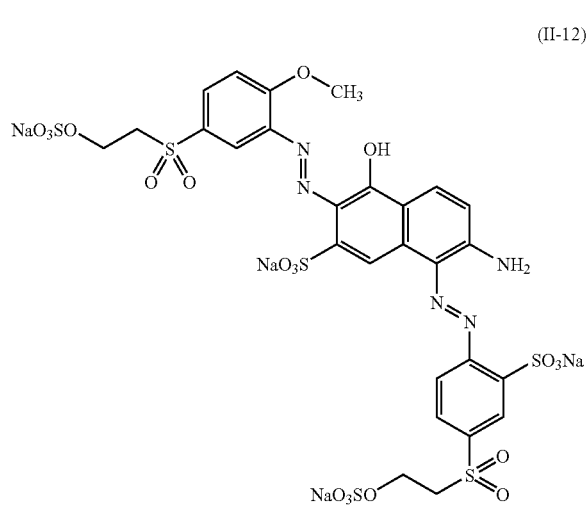
(II-12)

again in a 70% fraction, are dissolved in 600 parts of water and the resulting dye solution is adjusted to a pH of 5.5-6.5. Concentration of this dye solution gives a binary dye mixture which provides jet black dyeings and prints on cotton under the dyeing conditions customary for reactive dyes.

EXAMPLE 827 a) 341 parts of 2,5-dimethoxy-4-(β-sulfatoethylsulfonyl) aniline are suspended in 950 parts of ice-water and 180 parts of 30% hydrochloric acid and diazotized by dropwise addition of 173 parts of 40% sodium nitrite solution. 319 parts of 1-amino-8-hydroxy-naphthalene-3,6-disulfonic acid are added and coupling takes place in a first stage at a pH of from 1 to 1.5 and at below 20° C. to give a red monoazo dye of the formula (15-2). The stated pH range is set and maintained during the coupling reaction by addition of solid sodium hydrogen carbonate.

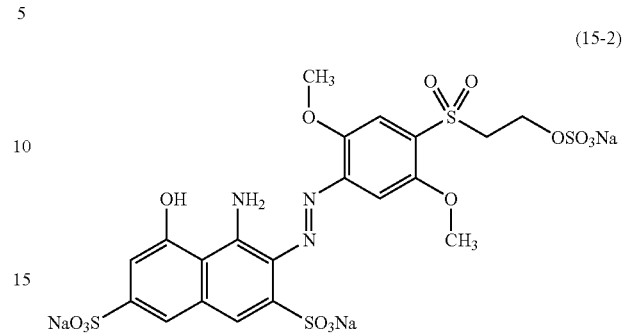
(15-2)

After the end of the first coupling the reaction mixture is admixed with an aqueous solution of 223 parts of the scarlet monoazo dye of the formula (17-4), obtained by diazotizing 119 parts of 2-amino-5-(β-sulfatoethylsulfonyl)benzene-sulfonic acid with 57 parts of 40% sodium nitrite solution in an acidic medium and then coupling the product to 79 parts of 7-amino-4-hydroxynaphthalene-2-sulfonic acid at a pH of 1-2.

b) In a second, separate reaction vessel 433 parts of 2-methoxy-5-methyl-4-(β-sulfatoethylsulfonyl)anilines are suspended in 1250 parts of ice-water and 240 parts of 30% hydrochloric acid and diazotized by dropwise addition of 230 parts of 40% sodium nitrite solution. The excess nitrite is then removed with amidosulfonic acid solution, and the resulting diazo suspension is pumped into the solution of the monoazo dye mixture from a).

The pH is then adjusted to 5-6 at below 25° C. using sodium carbonate, and the 76:24 mixture of the two disazo dyes (I-5) and (II-51) formed after the end of the second coupling reaction is isolated by concentration under reduced pressure or by spray drying.

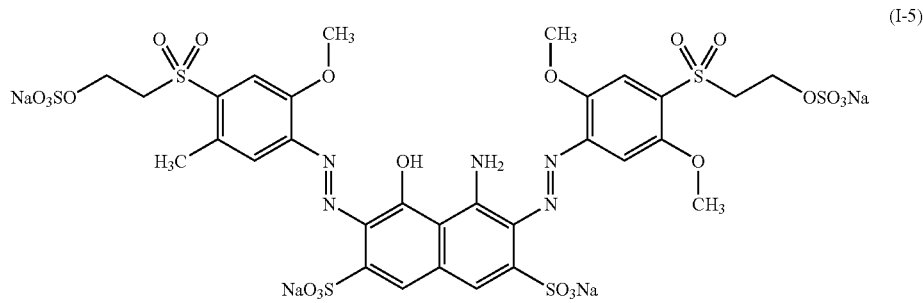
(I-5)

(II-51)

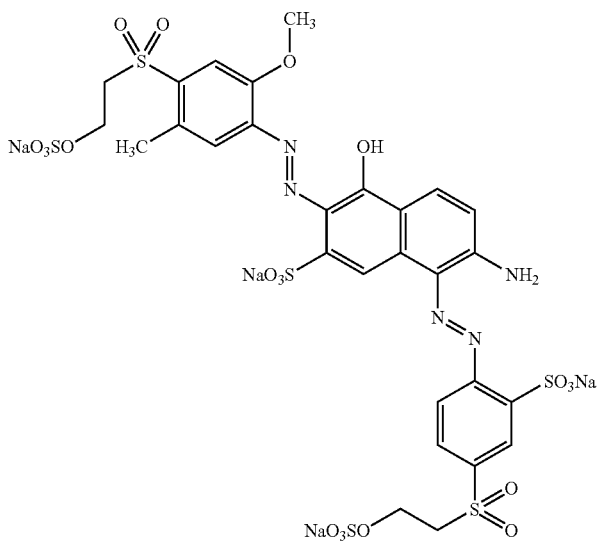

The resulting binary dye mixture of the invention dyes cotton in black shades.

EXAMPLE 828

A binary mixture, prepared in analogy to the procedure described in Example 827, of 1021 parts of the navy disazo dye of the formula (I-23) and 335 parts of the scarlet disazo dye of the formula (II-5) is admixed with 168 parts of the yellow disazo dye of the formula (Ge-1)

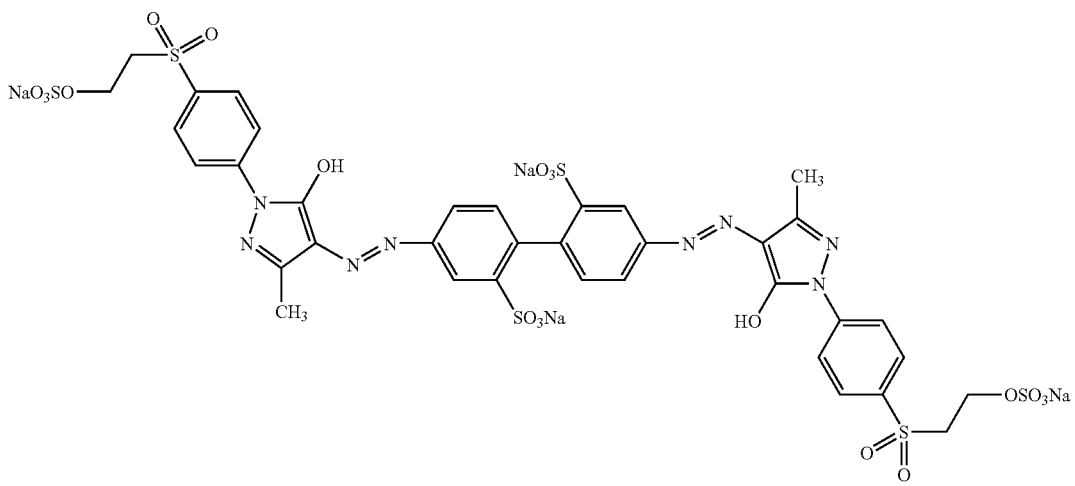

(Ge-1)

the mixture is adjusted to a pH of 5.5-6.5, and the product is isolated by concentrating the aqueous solution. The resulting dye mixture of the invention dyes cotton in black shades.

EXAMPLE 829

70 parts of an electrolyte-containing dye powder containing the navy disazo dye of the formula (I-6)

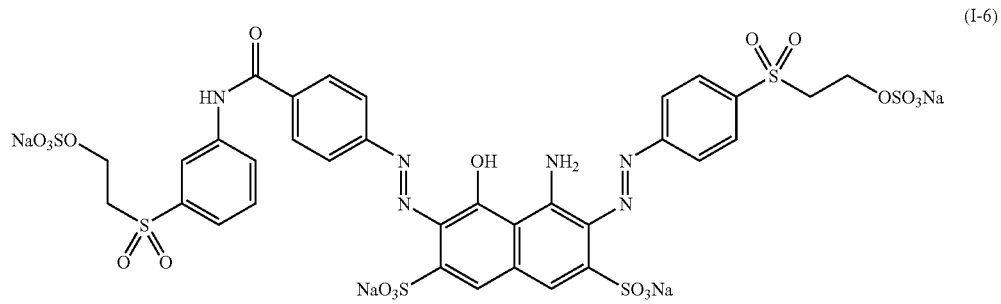
(I-6)

in a 70% fraction, 18 parts of an electrolyte-containing dye powder containing the scarlet disazo dye of the formula (II-9) in a 75% fraction, and 12 parts of an electrolyte-containing dye powder containing the yellow disazo dye of the formula (Gf-3)

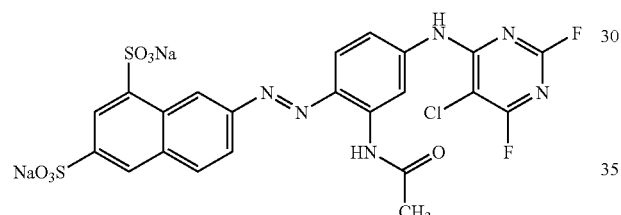
(Gf-3)

in a 70% fraction are mixed with one another as described in Example 820.

The resultant dye mixture of the invention provides jet black dyeings, on cotton for example, under the dyeing conditions customary for reactive dyes and also with an amount of salt reduces as compared with the standard method.

EXAMPLE 830

A binary mixture, prepared in analogy to the procedure described in Example 825, of 1012 parts of the navy disazo dye of the formula (I-7) and 290 parts of the scarlet disazo dye of the formula (II-52) is admixed with 145 parts of the yellow disazo dye of the formula (Ga-2), the mixture is adjusted to a pH of 5.5-6.5, and the product is isolated by concentrating the aqueous solution. The resultant dye mixture of the invention dyes cotton in black shades.

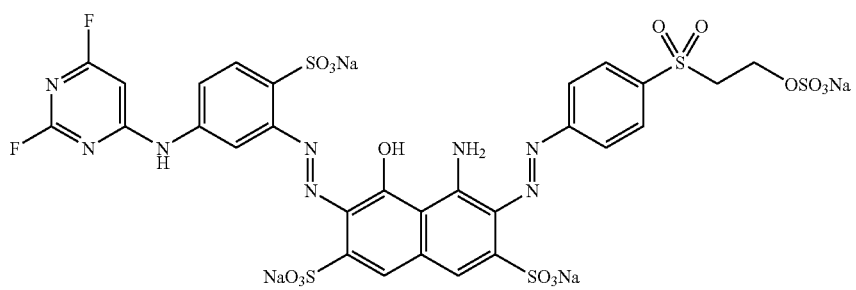
(I-7)

(II-52)

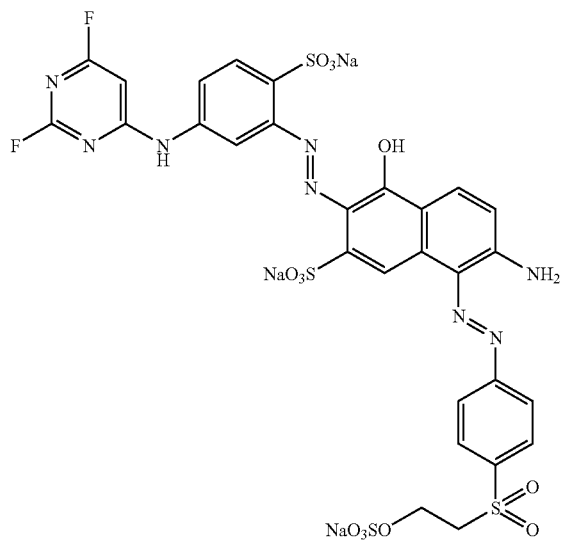

(Ga-2)

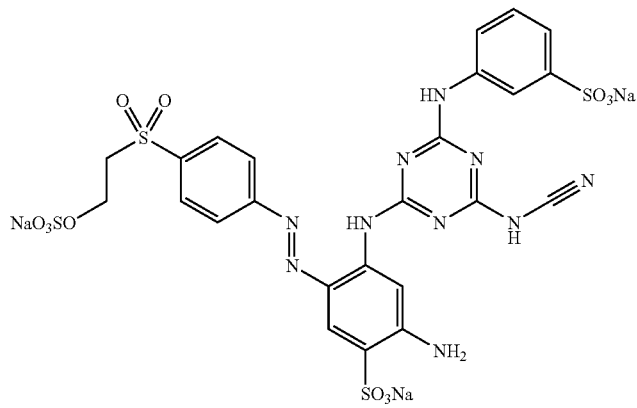

EXAMPLE 831

927 parts of 2-methoxy-5-(β-sulfatoethylsulfonyl)aniline are suspended in 2700 parts of ice-water and 540 parts of 30% hydrochloric acid and diazotized by dropwise addition of 519 parts of 40% sodium nitrite solution. 319 parts of 1-amino-8-hydroxy-naphthalene-3,6-disulfonic acid, 77 parts of 7-amino-4-hydroxynaphthalene-2-sulfonic acid, and 32 parts of 2,4-diaminobenzenesulfonic acid are added and coupling takes place initially in the first stage at a pH of from 1 to 1.3 and at below 20° C. to give a mixture of three monoazo dyes conforming to the formulae (15-3), (17-5), and (Ga-5). The stated pH range is set and maintained during the coupling reaction by addition of solid sodium hydrogen carbonate.

(17-5)

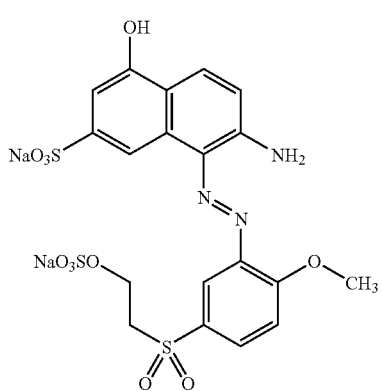

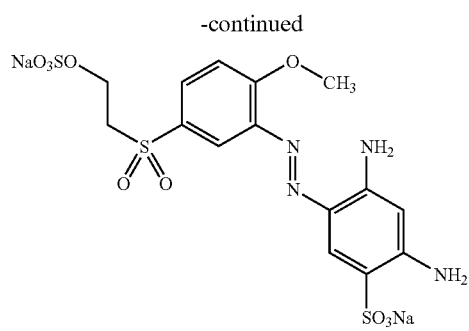
(Ga-5)
After the end of the first coupling, the pH is adjusted to 5-6 at below 25° C. using sodium carbonate, and the 70:20:10 mixture of the three disazo dyes (I-25), (II-66), and (Gb-4) obtained after the end of the second coupling reaction is isolated by spray drying.
The resulting dye mixture of the invention dyes cotton black shades.
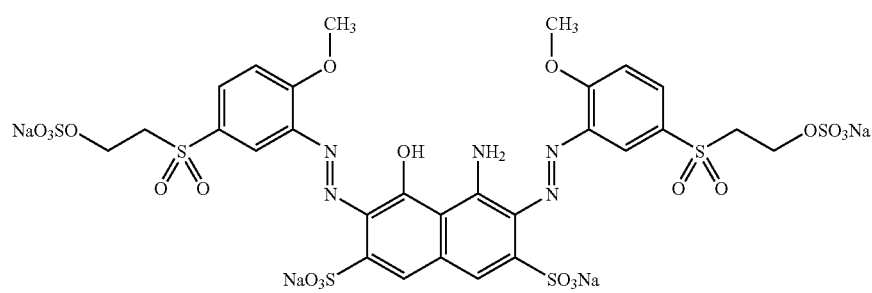
(I-25)
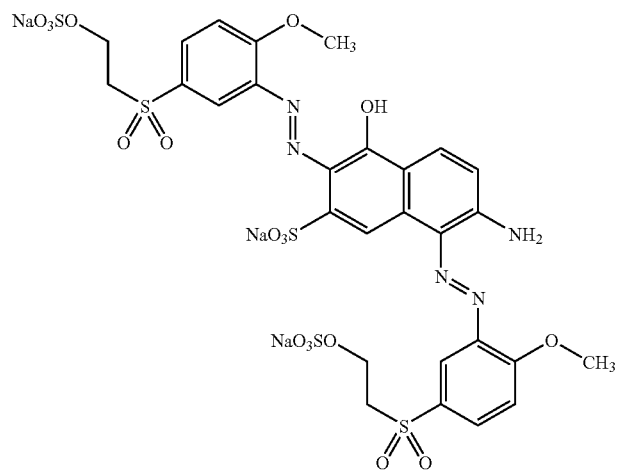
(II-65)
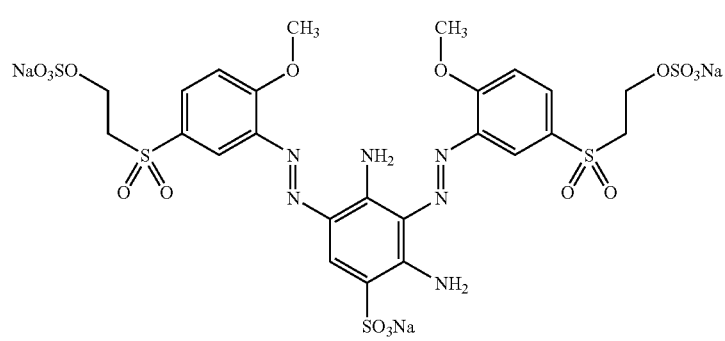
(Gb-4)

EXAMPLES 832 TO 1186

The tabular examples below describe further inventive mixtures of the dyes of the general formulae (I) and (II) or (I), (II) and (G), each recited in the form of the sodium salts. The mixing proportions are indicated in percent by weight. The dye mixtures provide gray to jet black dyeings, on cotton for example, by the dyeing methods customary for reactive dyes.

Dye Mixtures in Accordance with Example 820 or 821

| Example | Dye of gen. formula (I) |
|---|---|
| 832 | (I-2) |
| 833 | (I-2) |
| 834 | (I-2) |
| 835 | (I-2) |
| 836 | (I-2) |
| 837 | (I-2) |
| 838 | (I-2) |
| 839 | (I-2) |
| 840 | (I-2) |
| 841 | (I-2) |
| 842 | (I-2) |
| 843 | (I-2) |
| 844 | (I-2) |
| 845 | (I-2) |
| 846 | (I-2) |
| 847 | (I-2) |
| 848 | (I-2) |
| 849 | (I-2) |
| 850 | (I-2) |
| 851 | (I-2) |
| 852 | (I-2) |
| 853 | (I-2) |
| 854 | (I-2) |
| 855 | (I-2) |
| 856 | (I-2) |
| 857 | (I-2) |
| 858 | (I-2) |
| 859 | (I-2) |
| 860 | (I-2) |
| 861 | (I-2) |
| 862 | (I-2) |
| 863 | (I-2) |
| 864 | (I-2) |
| 865 | (I-2) |
| 866 | (I-2) |
| 867 | (I-2) |
| 868 | (I-2) |
| 869 | (I-2) |
| 870 | (I-2) |
| 871 | (I-2) |
| 872 | (I-2) |
| 873 | (I-2) |
| 874 | (I-2) |
| 875 | (I-2) |
| 876 | (I-2) |
| 877 | (I-2) |
| 878 | (I-2) |
| 879 | (I-2) |
| 880 | (I-2) |
| 881 | (I-2) |
| 882 | (I-2) |
| 883 | (I-2) |
| 884 | (I-2) |
| 885 | (I-2) |
| 886 | (I-2) |
| 887 | (I-2) |
| 888 | (I-2) |
| 889 | (I-2) |
| 890 | (I-2) |
| 891 | (I-2) |
| 892 | (I-2) |
| 893 | (I-2) |
| 894 | (I-2) |
| 895 | (I-2) |
| 896 | (I-2) |
| 897 | (I-2) |
| 898 | (I-2) |
| 899 | (I-2) |
| 900 | (I-2) |
| 901 | (I-2) |

-continued

| | |
|---|---|
| 902 | (I-2) |
| 903 | (I-2) |
| 904 | (I-2) |
| 905 | (I-2) |
| 906 | (I-2) |
| 907 | (I-2) |
| 908 | (I-2) |
| 909 | (I-2) |
| 910 | (I-2) |
| 911 | (I-2) |
| 912 | (I-2) |
| 913 | (I-2) |
| 914 | (I-2) |
| 915 | (I-2) |
| 916 | (I-2) |
| 917 | (I-2) |
| 918 | (I-2) |
| 919 | (I-2) |
| 920 | (I-2) |
| 921 | (I-2) |
| 922 | (I-2) |
| 923 | (I-2) |
| 924 | (I-2) |
| 925 | (I-2) |
| 926 | (I-2) |
| 927 | (I-2) |
| 928 | (I-2) |
| 929 | (I-2) |
| 930 | (I-2) |
| 931 | (I-2) |
| 932 | (I-2) |
| 933 | (I-2) |
| 934 | (I-2) |
| 935 | (I-2) |
| 936 | (I-2) |
| 937 | (I-2) |
| 938 | (I-2) |
| 939 | (I-2) |
| 940 | (I-2) |
| 941 | (I-2) |
| 942 | (I-2) |
| 943 | (I-2) |
| 944 | (I-2) |
| 945 | (I-2) |
| 946 | (I-2) |
| 947 | (I-2) |
| 948 | (I-2) |
| 949 | (I-2) |
| 950 | (I-2) |
| 951 | (I-2) |
| 952 | (I-2) |
| 953 | (I-2) |
| 954 | (I-2) |
| 955 | (I-2) |
| 956 | (I-2) |
| 957 | (I-2) |
| 958 | (I-2) |
| 959 | (I-2) |
| 960 | (I-23) |
| 961 | (I-23) |
| 962 | (I-23) |
| 963 | (I-23) |
| 964 | (I-23) |
| 965 | (I-3) |
| 966 | (I-3) |
| 967 | (I-3) |
| 968 | (I-3) |
| 969 | (I-4) |
| 970 | (I-4) |
| 971 | (I-4) |
| 972 | (I-5) |
| 973 | (I-5) |
| 974 | (I-6) |
| 975 | (I-6) |
| 976 | (I-6) |
| 977 | (I-6) |
| 978 | (I-6) |
| 979 | (I-6) |
| 980 | (I-6) |

-continued
| | |
|---|---|
| 981 | (I-6) |
| 982 | (I-6) |
| 983 | (I-6) |
| 984 | (I-7) |
| 985 | (I-7) |
| 986 | (I-7) |
| 987 | (I-7) |
| 988 | (I-7) |
| 989 | (I-7) |
| 990 | (I-7) |
| 991 | (I-25) |
| 992 | (I-25) |
| 993 | (I-25) |
| 994 | (I-25) |
| 995 | (I-25) |
996
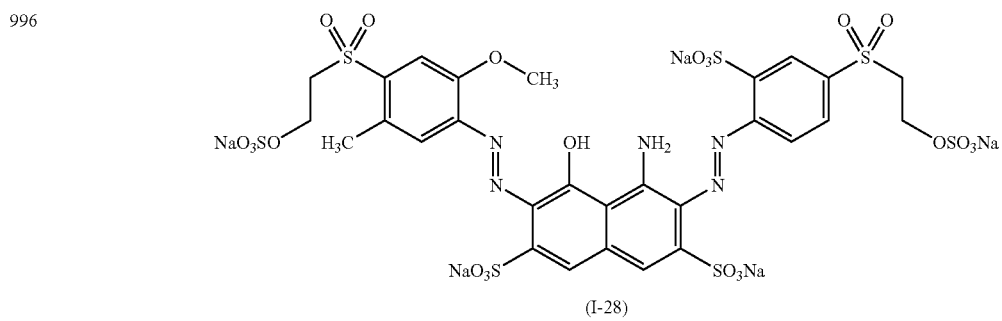
(I-28)
| | |
|---|---|
| 997 | (I-26) |
| 998 | (I-26) |
| 999 | (I-26) |
| 1000 | (I-26) |
1001
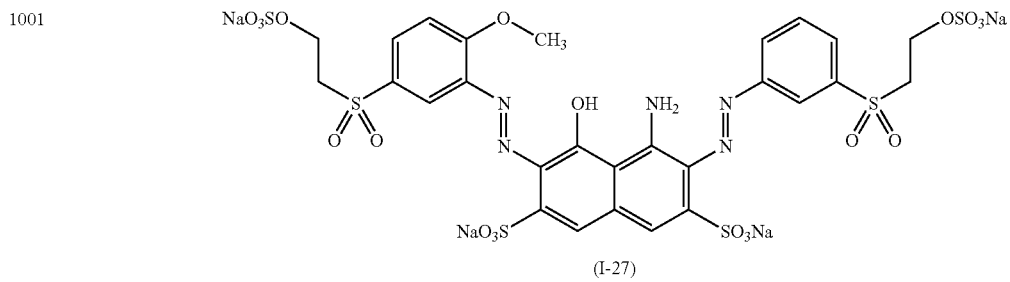
(I-27)
| | |
|---|---|
| 1002 | (I-27) |
| 1003 | (I-27) |
| 1004 | (I-27) |
| 1005 | (I-27) |
1006
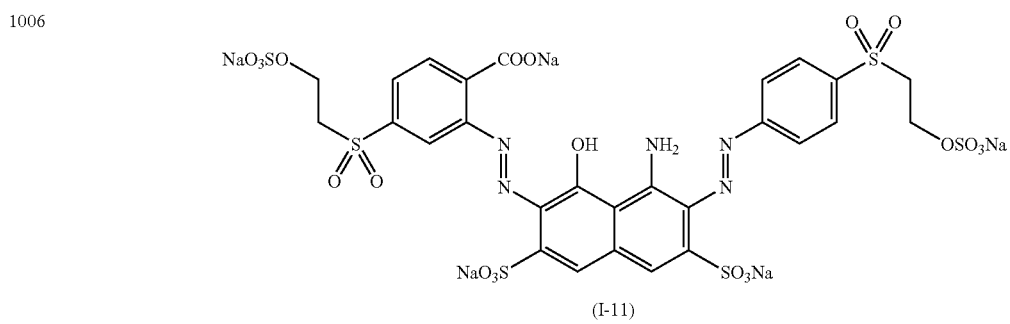
(I-11)
| | |
|---|---|
| 1007 | (I-11) |
| 1008 | (I-11) |
| 1009 | (I-11) |
| 1010 | (I-11) |

-continued
| | |
|---|---|
| 1011 | 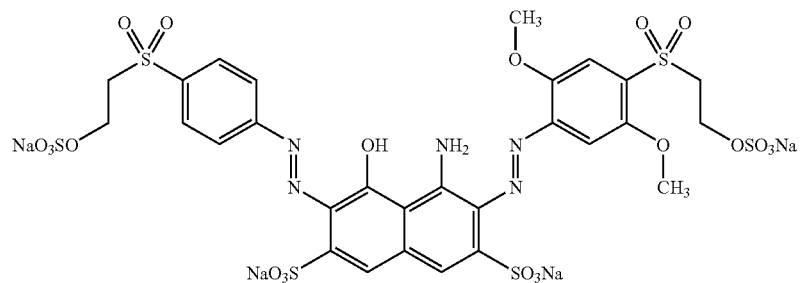<br>(I-12) |
| 1012 | (I-12) |
| 1013 | (I-12) |
| 1014 | (I-12) |
| 1015 | 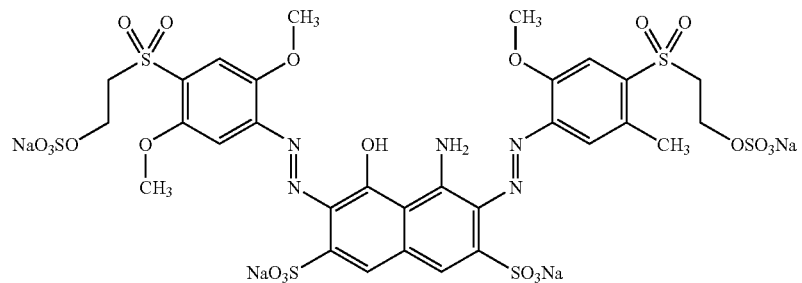<br>(I-13) |
| 1016 | (I-13) |
| 1017 | 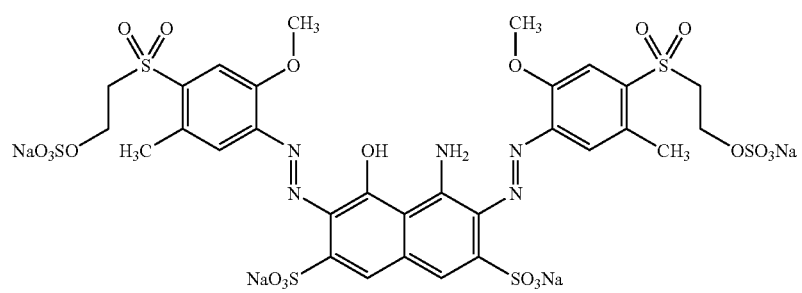<br>(I-14) |
| 1018 | (I-14) |
| 1019 | 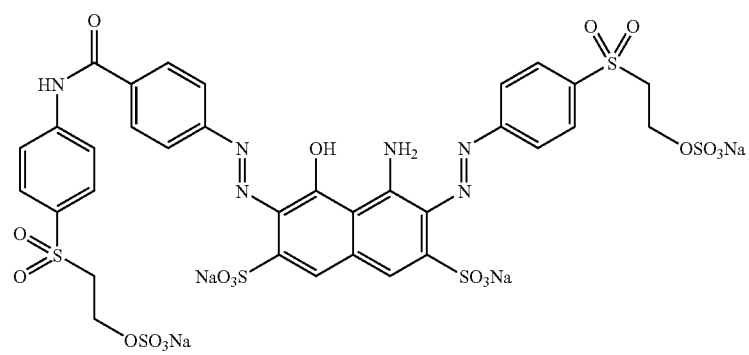<br>(I-15) |
| 1020 | (I-15) |
| 1021 | (I-15) |
| 1022 | (I-15) |

-continued
| 1023 | (I-15) |
| 1024 | (I-15) |
| 1025 | (I-15) |
| 1026 | (I-15) |
| 1027 | (I-15) |
| 1028 | (I-15) |
1029
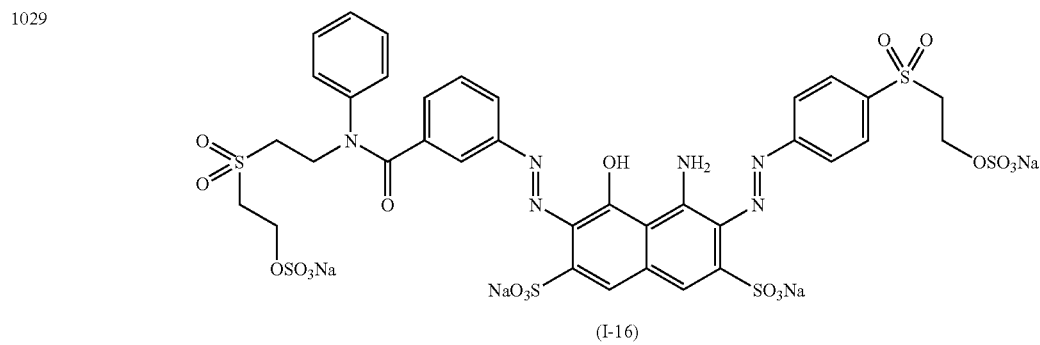
(I-16)
| 1030 | (I-16) |
| 1031 | (I-16) |
| 1032 | (I-16) |
| 1033 | (I-16) |
1034
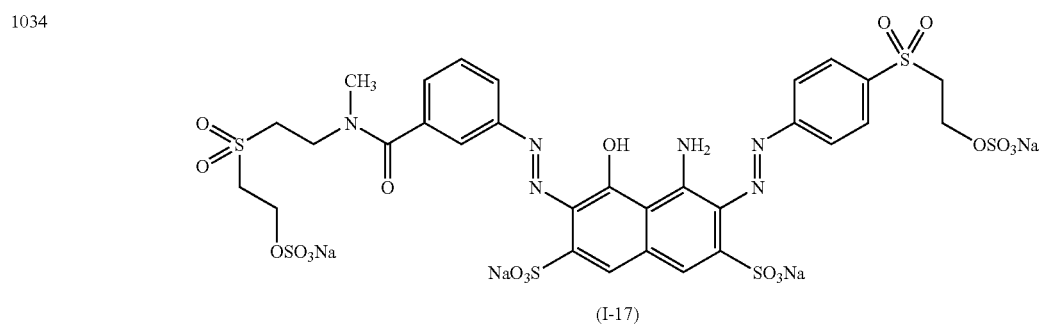
(I-17)
| 1035 | (I-17) |
| 1036 | (I-17) |
| 1037 | (I-17) |
| 1038 | (I-17) |
1039
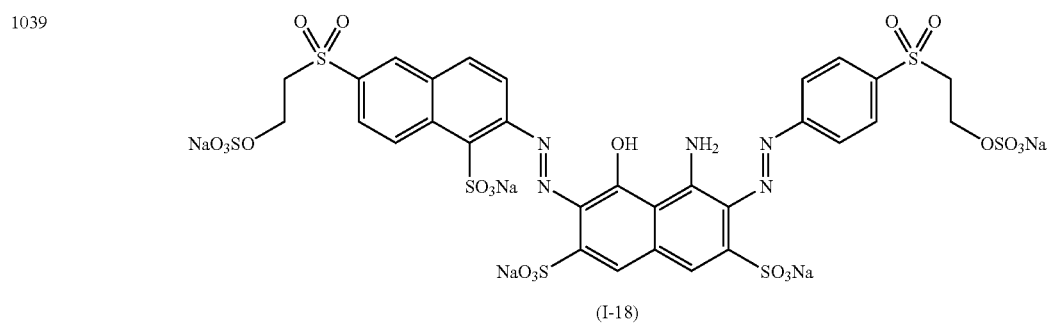
(I-18)
| 1040 | (I-18) |
| 1041 | (I-18) |
| 1042 | (I-18) |
| 1043 | (I-18) |

-continued
1044 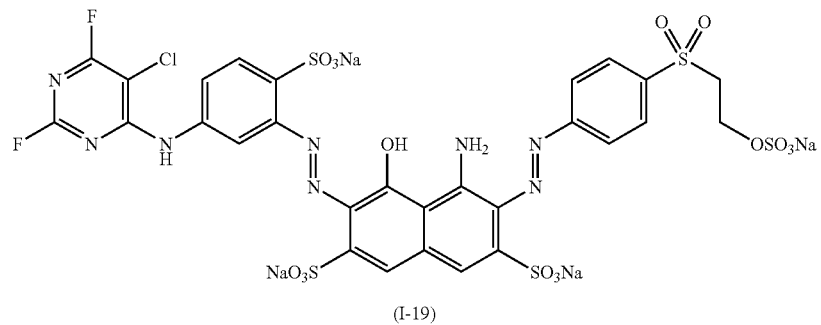
(I-19)
| 1045 | (I-19) |
| 1046 | (I-19) |
| 1047 | (I-19) |
| 1048 | (I-19) |
| 1049 | (I-19) |
| 1050 | (I-19) |
| 1051 | (I-19) |
1052 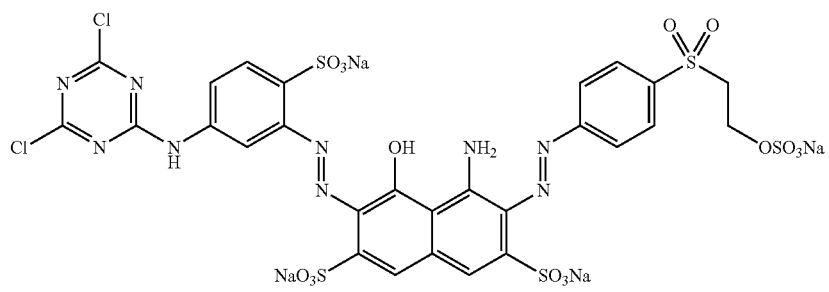
(I-20)
| 1053 | (I-20) |
| 1054 | (I-20) |
| 1055 | (I-20) |
| 1056 | (I-20) |
| 1057 | (I-20) |
1058 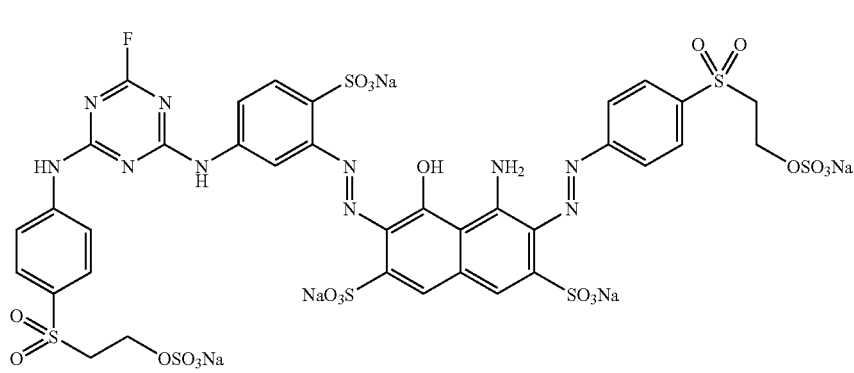
(I-21)
| 1059 | (I-21) |
| 1060 | (I-21) |
| 1061 | (I-21) |
| 1062 | (I-21) |

-continued
| | |
|---|---|
| 1063 | 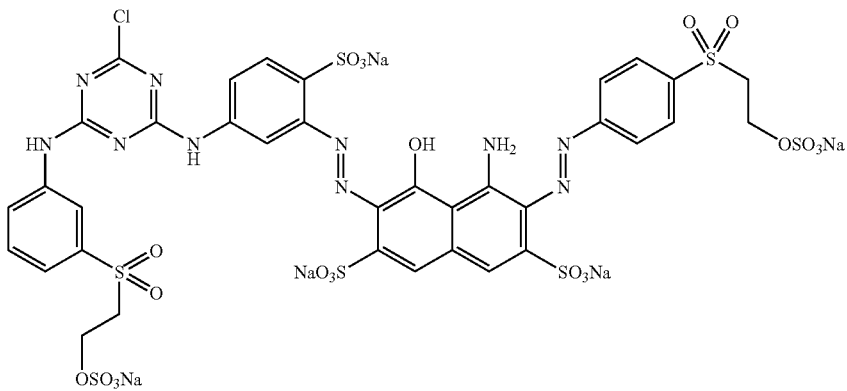<br>(I-22) |
| 1064 | (I-22) |
| 1065 | (I-22) |
| 1066 | (I-22) |
| 1067 | (I-22) |
| 1068 | (I-22) |
| Example | Dye of gen. formula (II) |
|---|---|
| 832 | (II-9) |
| 833 | (II-9) |
| 834 | (II-9) |
| 835 | (II-9) |
| 836 | (II-9) |
| 837 | (II-9) |
| 838 | (II-9) |
| 839 | (II-9) |
| 840 | (II-9) |
| 841 | (II-9) |
| 842 | (II-5) |
| 843 | (II-5) |
| 844 | (II-5) |
| 845 | (II-5) |
| 846 | (II-5) |
| 847 | (II-5) |
| 848 | (II-5) |
| 849 | (II-5) |
| 850 | (II-5) |
| 851 | (II-5) |
| 852 | (II-5) |
| 853 | (II-5) |
| 854 | (II-10) |
| 855 | (II-10) |
| 856 | (II-10) |
| 857 | (II-10) |
| 858 | (II-10) |
| 859 | (II-50) |
| 860 | (II-12) |
| 861 | (II-12) |
| 862 | (II-12) |
| 863 | (II-12) |
| 864 | (II-12) |
| 865 | (II-51) |
| 866 | (II-52) |
| 867 | (II-52) |
| 868 | (II-52) |
| 869 | (II-52) |

-continued
| | | |
|---|---|---|
| 870 | 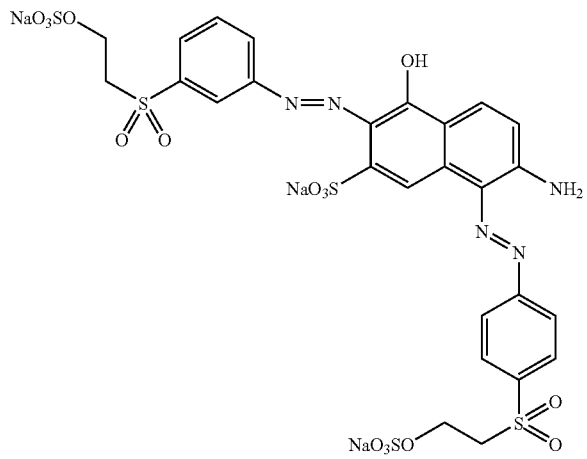 | |
| | (II-53) | |
| 871 | (II-53) | |
| 872 | (II-53) | |
| 873 | 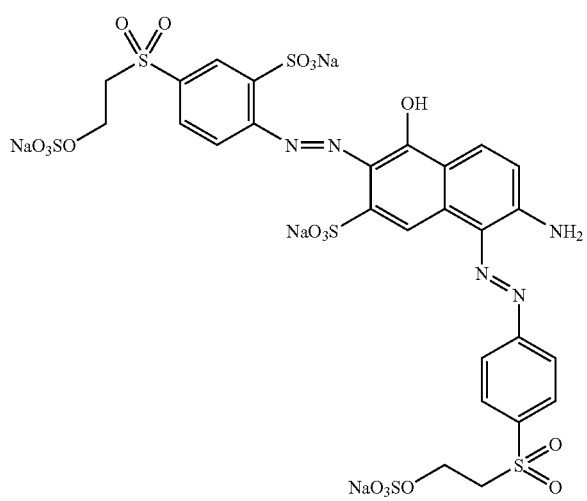 | |
| | (II-16) | |
| 874 | (II-16) | |
| 875 | (II-16) | |
| 876 | (II-16) | |
| 877 | (II-16) | |
| 878 | (II-16) | |
| 879 | (II-16) | |
| 880 | (II-16) | |
| 881 | (II-16) | |
| 882 | (II-16) | |
| 883 | (II-16) | |
| 884 | (II-16) | |

-continued
885 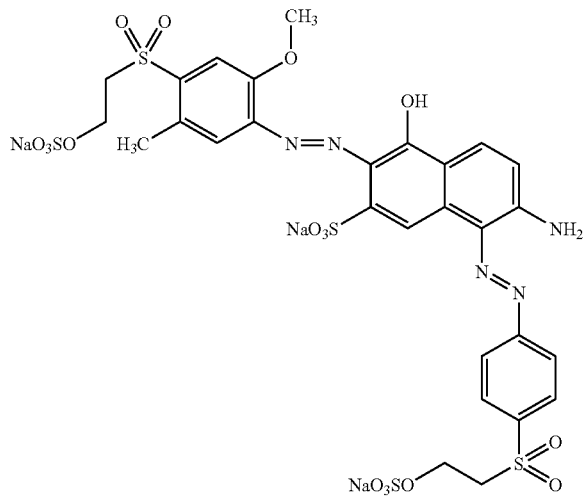
(II-55)
886 (II-55)
887 (II-55)
888 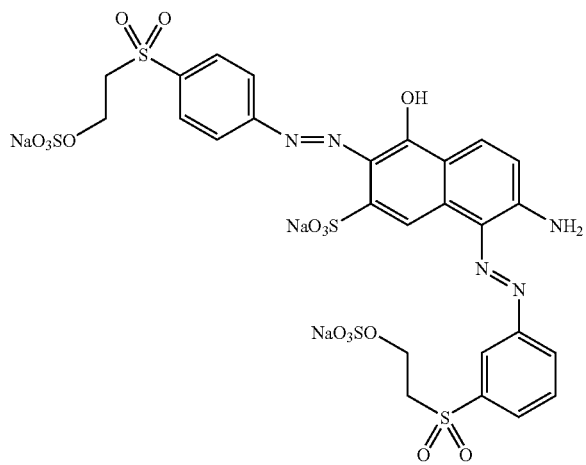
(II-56)
889 (II-56)
890 (II-56)
891 (II-56)

-continued
| | | |
|---|---|---|
| 892 | 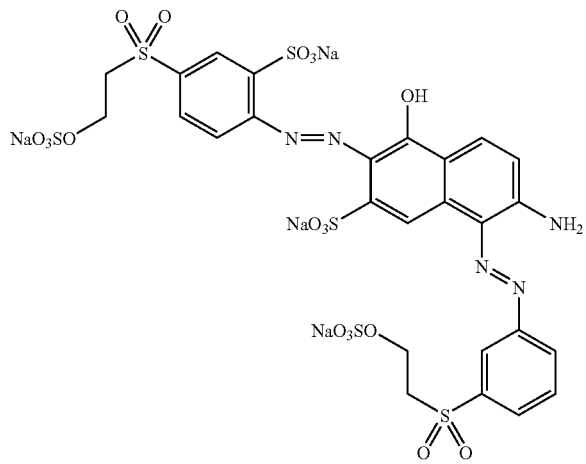 | |
| | (II-19) | |
| 893 | (II-19) | |
| 894 | (II-19) | |
| 895 | (II-19) | |
| 896 | 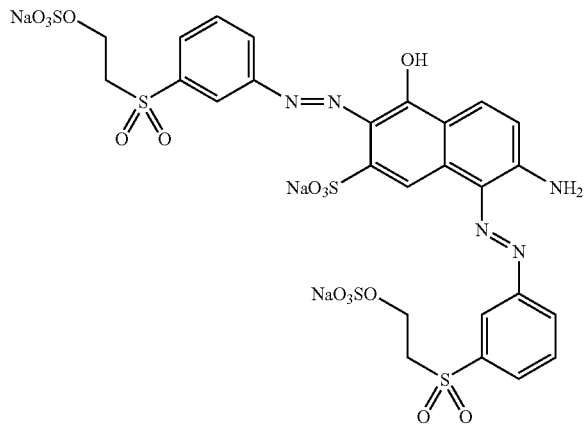 | |
| | (II-58) | |
| 897 | (II-58) | |
| 898 | (II-58) | |
| 899 | (II-58) | |
| 900 | 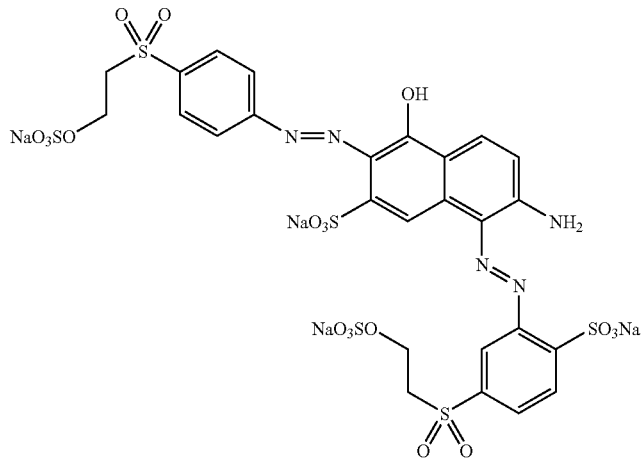 | |
| | (II-21) | |

-continued
| | |
|---|---|
| 901 | (II-21) |
| 902 | (II-21) |
| 903 | (II-21) |
| 904 | 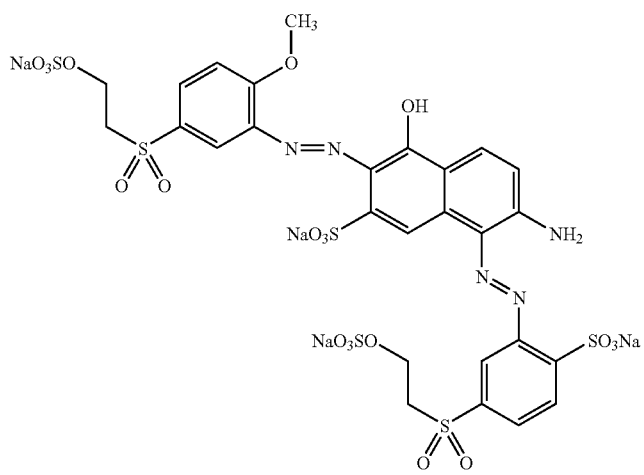<br>(II-61) |
| 905 | (II-61) |
| 906 | (II-61) |
| 907 | (II-61) |
| 908 | 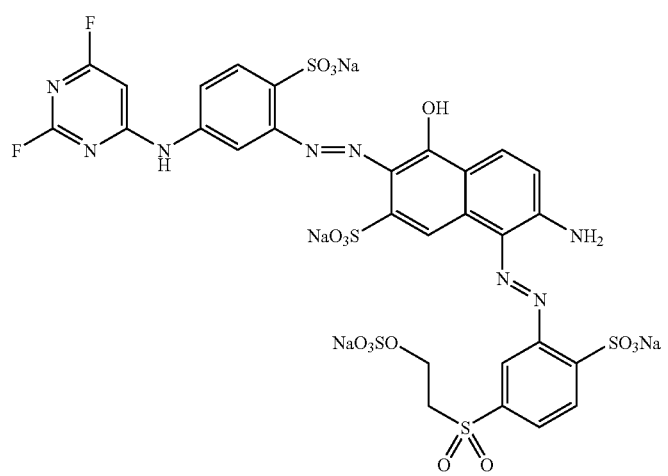<br>(II-23) |
| 909 | 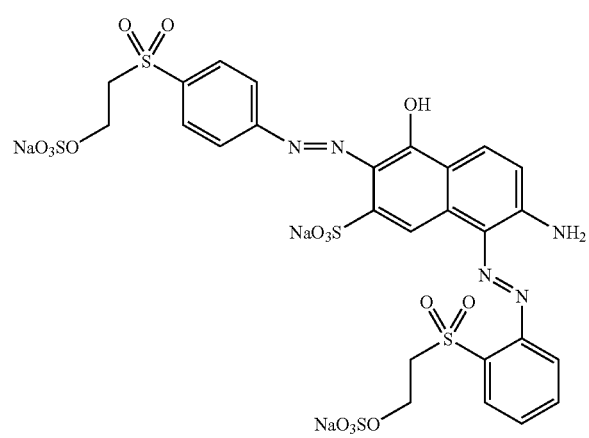<br>(II-64) |

-continued
| | |
|---|---|
| 910 | (II-64) |
| 911 | (II-64) |
| 912 | (II-64) |
913
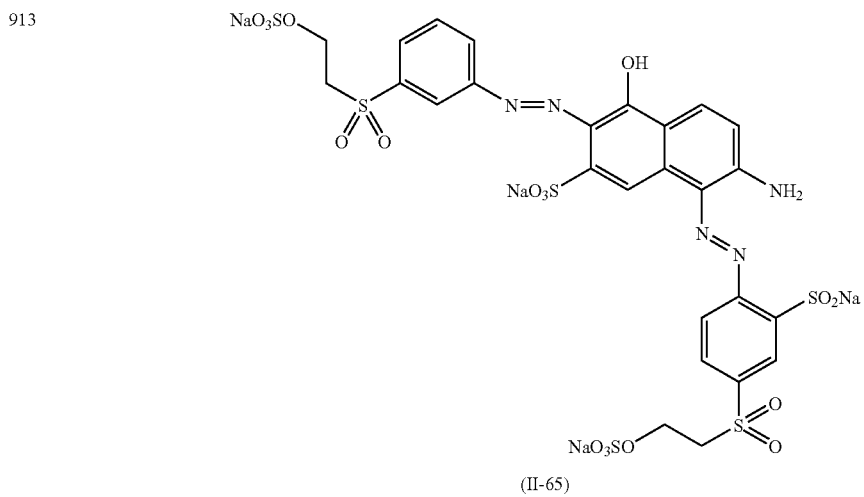
(II-65)
| | |
|---|---|
| 914 | (II-65) |
| 915 | (II-65) |
| 916 | (II-65) |
917
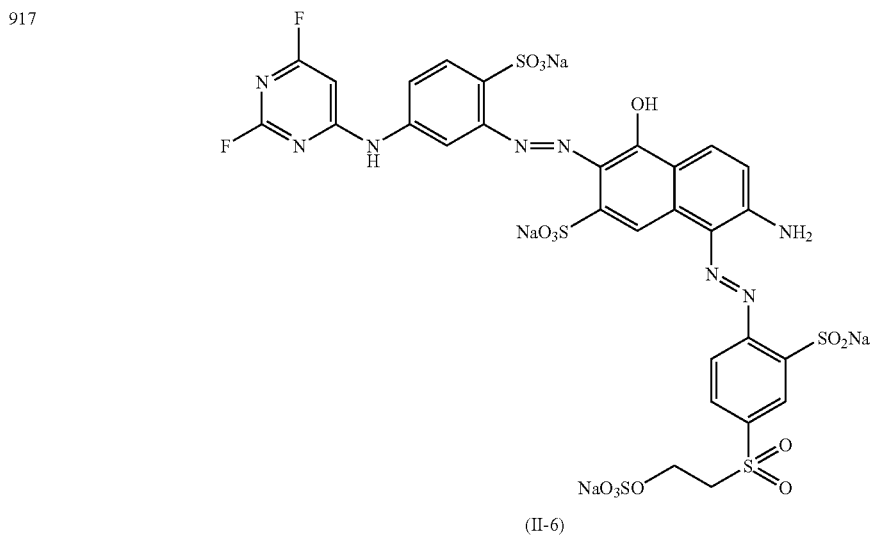
(II-6)
| | |
|---|---|
| 918 | (II-6) |
| 919 | (II-6) |
| 920 | (II-6) |
| 921 | (II-66) |
| 922 | (II-66) |
| 923 | (II-66) |

-continued
924 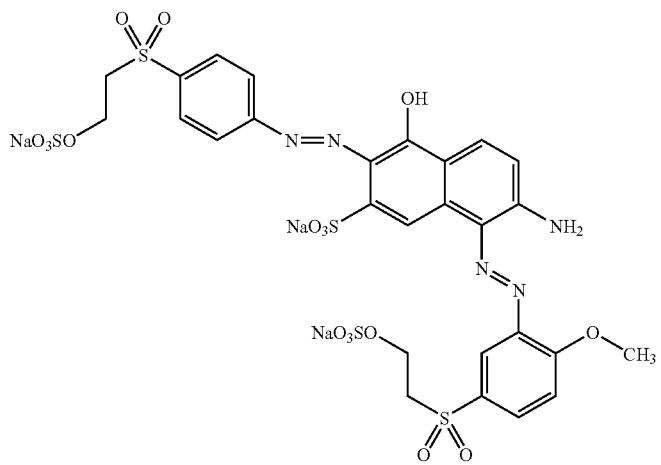
(II-28)
925 (II-28)
926 (II-28)
927 (II-28)
928 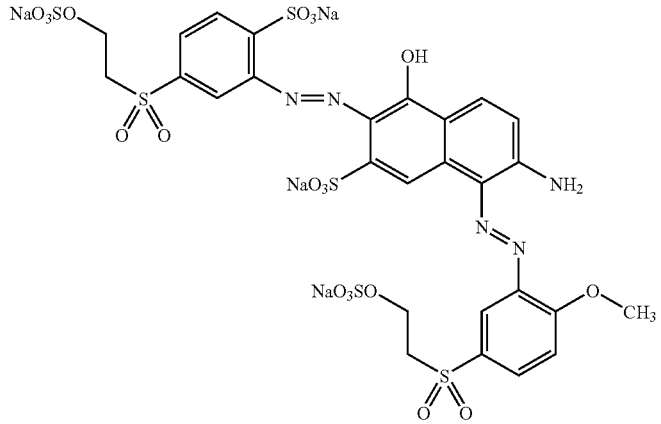
(II-29)
929 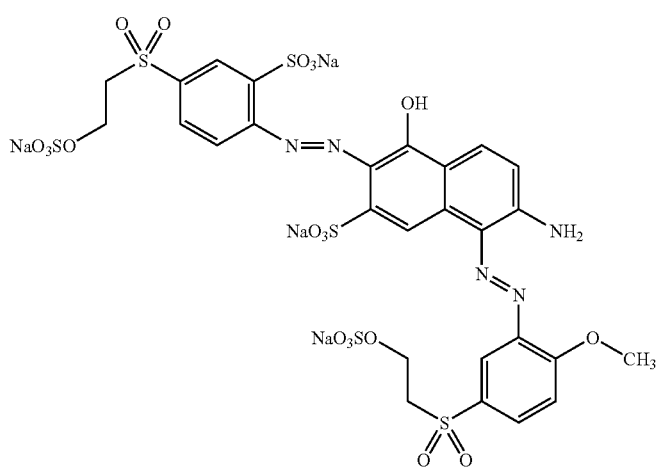
(II-70)
930 (II-70)
931 (II-70)
932 (II-70)

933 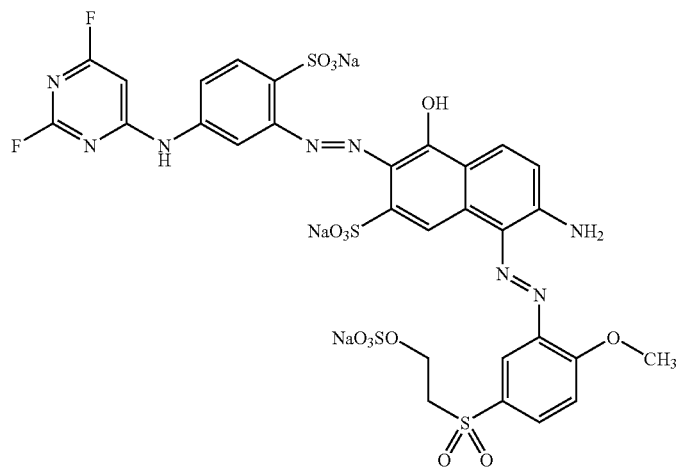
(II-71)
934 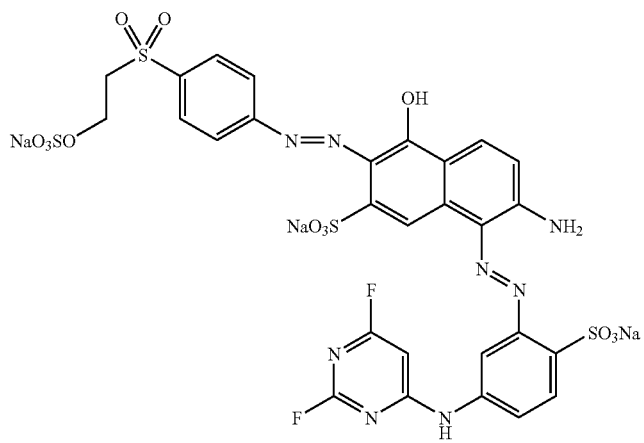
(II-32)
935 (II-32)
936 (II-32)
937 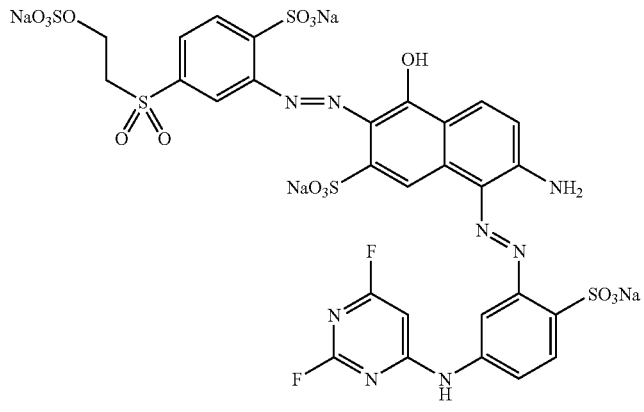
(II-33)

| | |
|---|---|
| 938 | 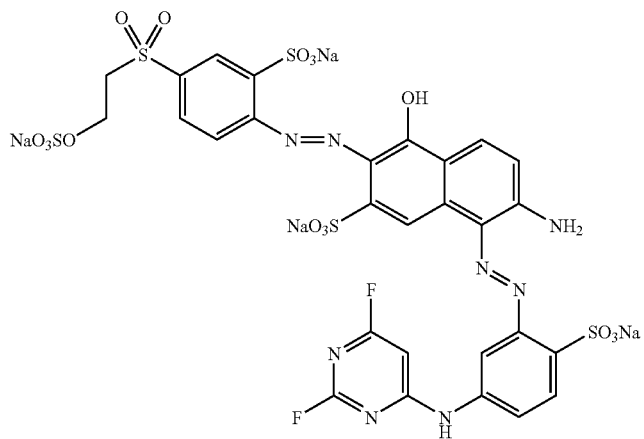<br>(II-34) |
| 939 | (II-34) |
| 940 | (II-34) |
| 941 | 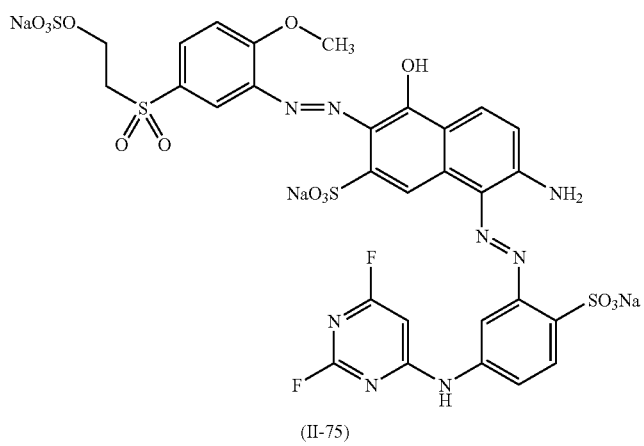<br>(II-75) |
| 942 | 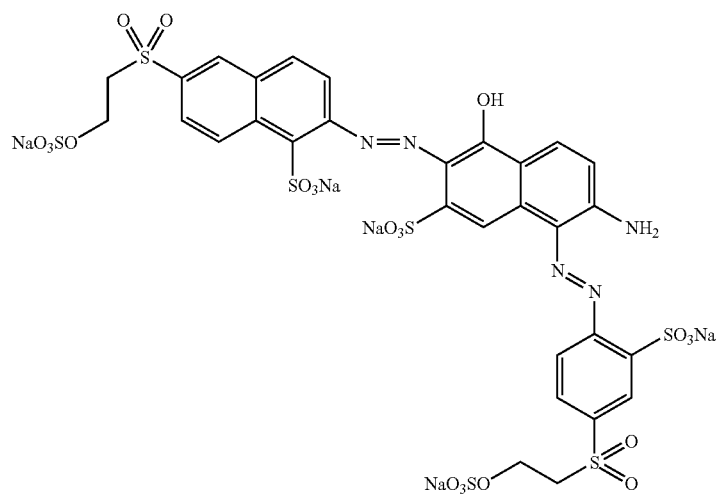<br>(II-36) |

943 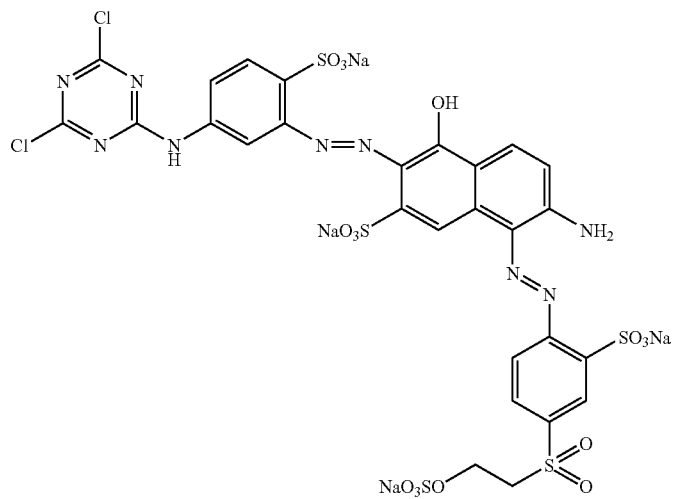
(II-78)
944 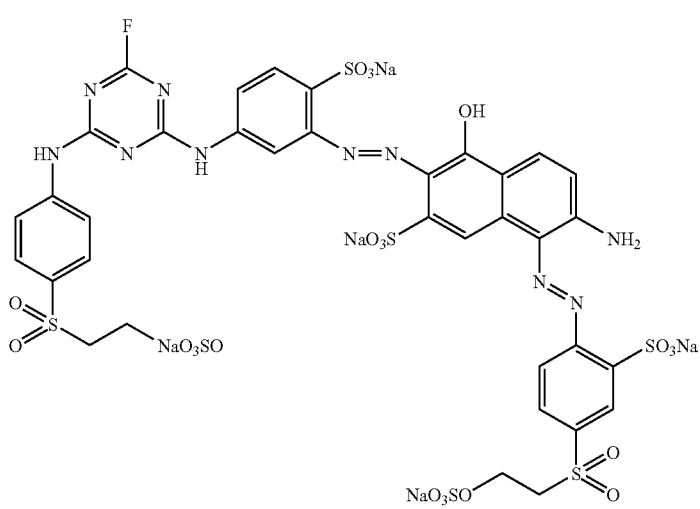
(II-79)
945 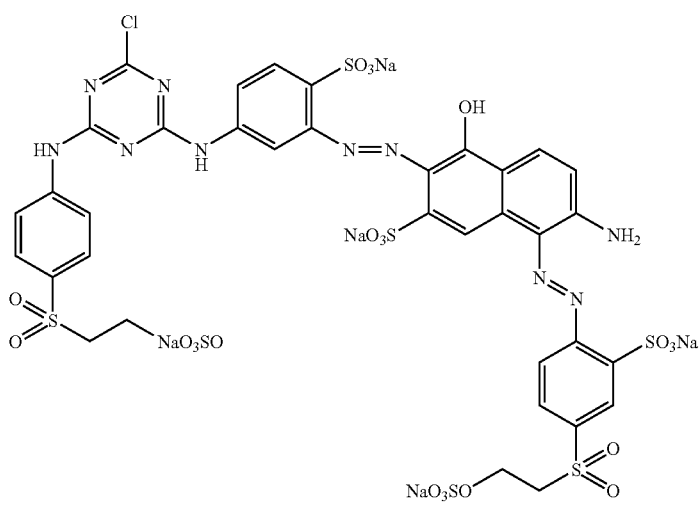
(II-39)

946 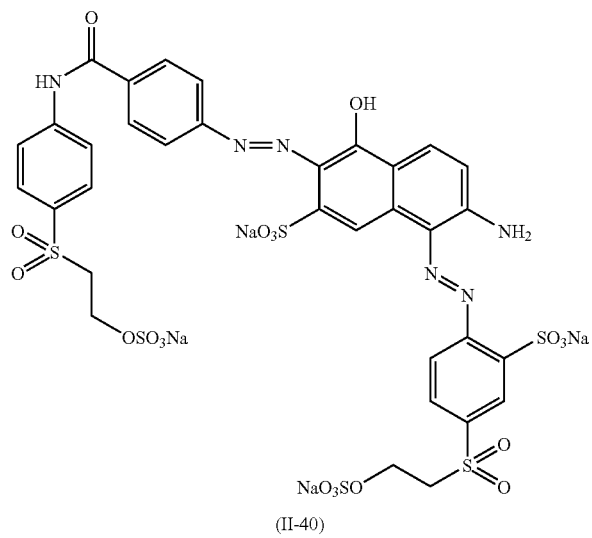
(II-40)
947 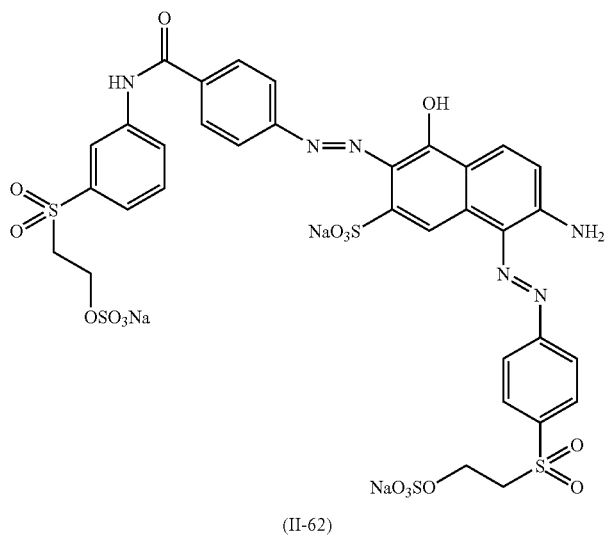
(II-62)
948 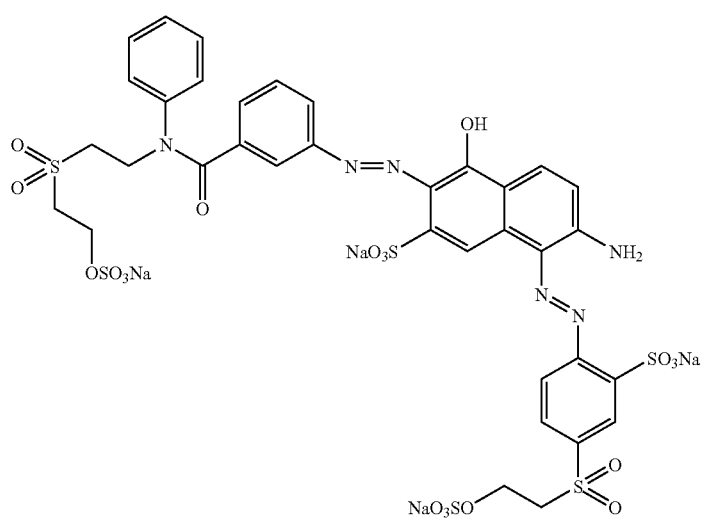
(II-64)

-continued
949 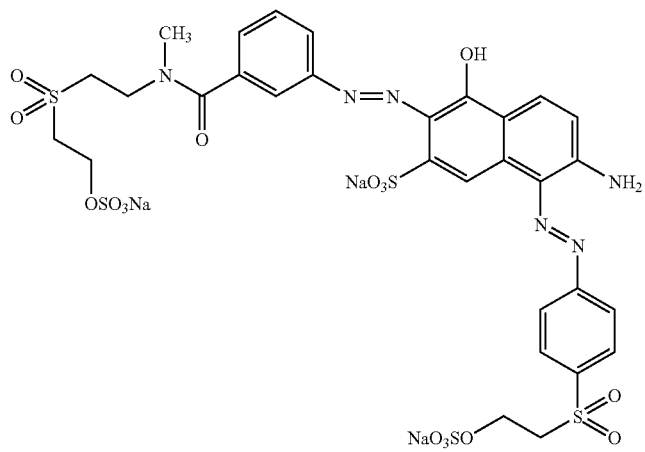
(II-43)
950 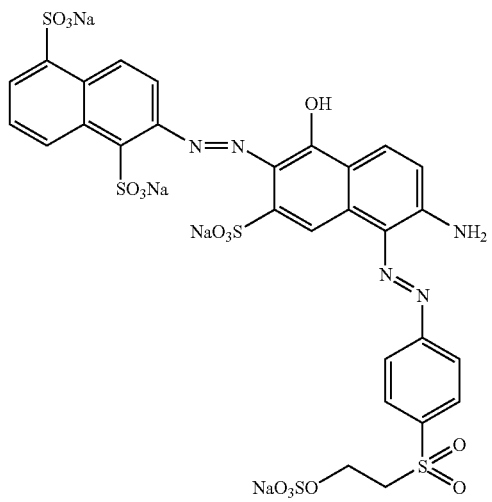
(II-87)
951 (II-87)
952 (II-87)
953 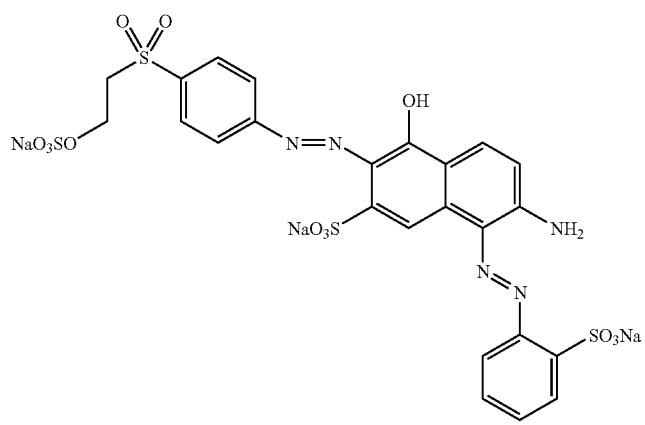
(II-88)
954 (II-88)

955
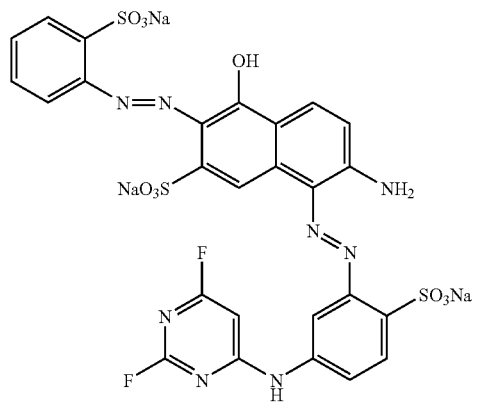
(II-46)
956
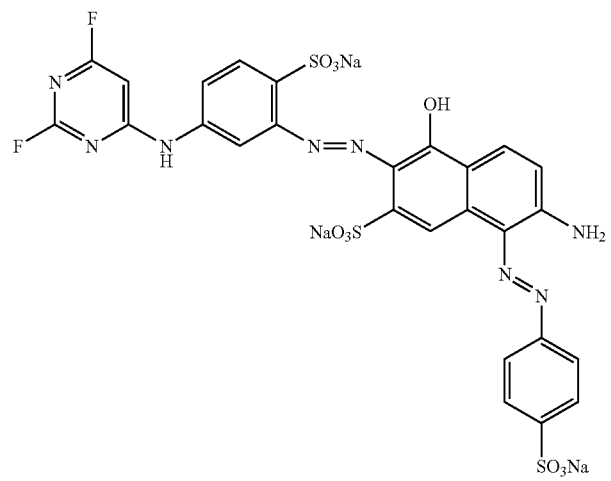
(II-80)
957
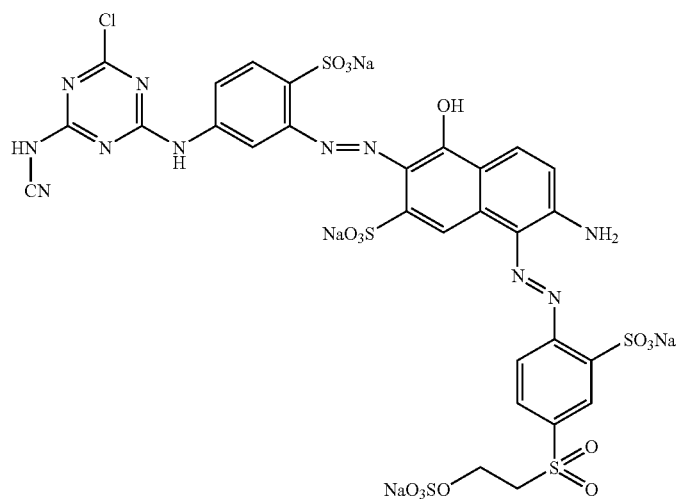
(II-48)

-continued 958 (II-91)

959 (II-92)

| | |
|---|---|
| 960 | (II-12) |
| 961 | (II-16) |
| 962 | (II-19) |
| 963 | (II-65) |
| 964 | (II-70) |
| 965 | (II-10) |
| 966 | (II-12) |
| 967 | (II-66) |
| 968 | (II-87) |
| 969 | (II-50) |
| 970 | (II-51) |
| 971 | (II-55) |
| 972 | (II-50) |
| 973 | (II-55) |
| 974 | (II-9) |
| 975 | (II-10) |
| 976 | (II-53) |
| 977 | (II-66) |
| 978 | (II-28) |
| 979 | (II-32) |
| 980 | (II-75) |
| 981 | (II-78) |
| 982 | (II-79) |
| 983 | (II-40) |
| 984 | (II-9) |
| 985 | (II-5) |
| 986 | (II-12) |
| 987 | (II-16) |
| 988 | (II-65) |

| | |
|---|---|
| | -continued |
| 989 | (II-70) |
| 990 | (II-34) |
| 991 | (II-9) |
| 992 | (II-5) |
| 993 | (II-12) |
| 994 | (II-16) |
| 995 | (II-70) |
| 996 | (II-9) |
| 997 | (II-5) |
| 998 | (II-12) |
| 999 | (II-16) |
| 1000 | (II-70) |
| 1001 | (II-9) |
| 1002 | (II-5) |
| 1003 | (II-16) |
| 1004 | (II-65) |
| 1005 | (II-70) |
| 1006 | (II-9) |
| 1007 | (II-5) |
| 1008 | (II-12) |
| 1009 | (II-16) |
| 1010 | (II-70) |
| 1011 | (II-10) |
| 1012 | (II-12) |
| 1013 | (II-66) |
| 1014 | (II-87) |
| 1015 | (II-51) |
| 1016 | (II-55) |
| 1017 | (II-50) |
| 1018 | (II-51) |
| 1019 | (II-9) |
| 1020 | (II-10) |
| 1021 | (II-53) |
| 1022 | (II-66) |
| 1023 | (II-28) |
| 1024 | (II-32) |
| 1025 | (II-75) |
| 1026 | (II-78) |
| 1027 | (II-79) |
| 1028 | (II-82) |
| 1029 | (I-9) |
| 1030 | (II-5) |
| 1031 | (II-12) |
| 1032 | (II-16) |
| 1033 | (II-70) |
| 1034 | (I-9) |
| 1035 | (II-5) |
| 1036 | (II-12) |
| 1037 | (II-16) |
| 1038 | (II-70) |
| 1039 | (II-9) |
| 1040 | (II-5) |
| 1041 | (II-12) |
| 1042 | (II-16) |
| 1043 | (II-70) |
| 1044 | (II-9) |
| 1045 | (II-5) |
| 1046 | (II-12) |
| 1047 | (II-52) |
| 1048 | (II-16) |
| 1049 | (II-6) |
| 1050 | (II-70) |
| 1051 | (II-34) |
| 1052 | (II-9) |
| 1053 | (II-5) |
| 1054 | (II-12) |
| 1055 | (II-16) |
| 1056 | (II-70) |
| 1057 | (II-39) |
| 1058 | (II-9) |
| 1059 | (II-5) |
| 1060 | (II-12) |
| 1061 | (II-16) |
| 1062 | (II-70) |
| 1063 | (II-9) |
| 1064 | (II-5) |
| 1065 | (II-12) |

-continued
|  |  |  |
|---|---|---|
| 1066 | (II-16) | |
| 1067 | (II-70) | |
| 1068 | (II-39) | |
| Example | Dye of formula (G) | Ratio (I):(II):(G) |
|---|---|---|
| 832 | (Ga-2) | 63:19:18 |
| 833 | (Ga-3) | 68:20:12 |
| 834 | (Ga-6) 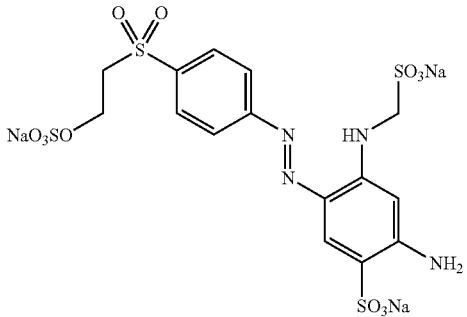 | 64:20:16 |
| 835 | (Gb-2) | 67:20:13 |
| 836 | (Gb-5) 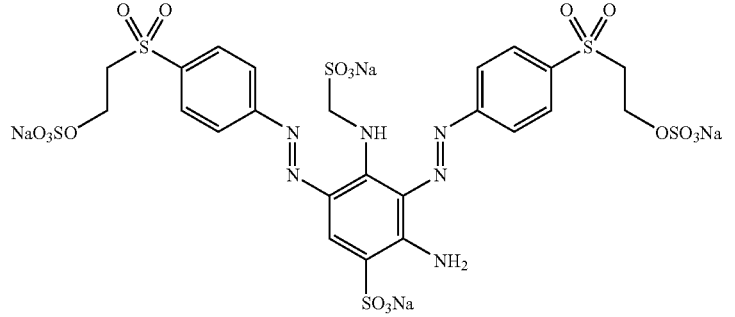 | 70:20:10 |
| 837 | (Gc-1) 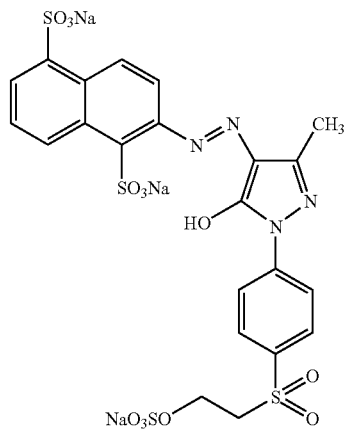 | 65:18:17 |

-continued
| | | |
|---|---|---|
| 838 | 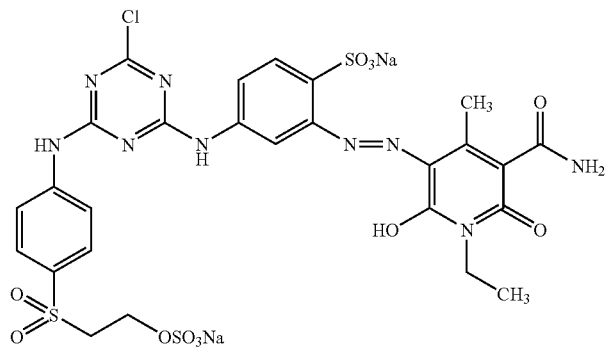<br>(Gd-1) | 65:20:15 |
| 839 | (Ge-1) | 70:20:10 |
| 840 | (Gf-1) | 63:18:19 |
| 841 | 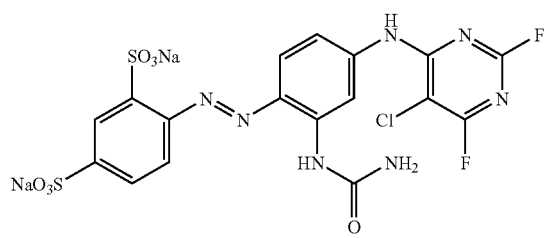<br>(Gf-4) | 70:16:12 |
| 842 | (Ga-1) | 67:20:13 |
| 843 | (Ga-2) | 65:20:15 |
| 844 | (Ga-3) | 67:20:13 |
| 845 | (Ga-6) | 64:20:16 |
| 846 | (Gb-2) | 68:20:12 |
| 847 | (Gb-3) | 70:20:10 |
| 848 | (Gb-5) | 67:20:13 |
| 849 | (Gc-1) | 66:17:17 |
| 850 | (Gd-1) | 65:20:15 |
| 851 | (Ge-1) | 72:18:10 |
| 852 | (Gf-2) | 64:18:18 |
| 853 | (Gf-4) | 68:20:12 |
| 854 | (Ga-1) | 70:18:12 |
| 855 | (Ga-2) | 65:15:20 |
| 856 | (Gb-2) | 67:20:13 |
| 857 | (Ge-1) | 72:18:10 |
| 858 | (Gf-1) | 65:15:20 |
| 859 | 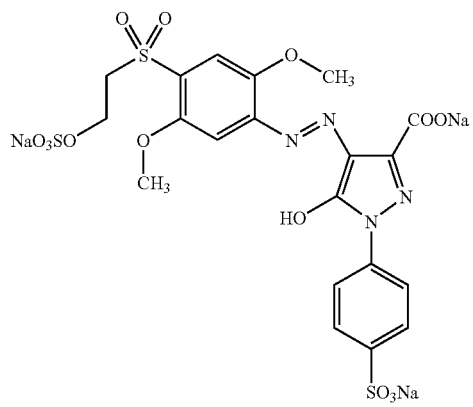<br>(Gc-2) | 67:18:15 |
| 860 | (Ga-1) | 69:19:12 |
| 861 | (Ga-2) | 67:15:18 |
| 862 | (Gb-2) | 68:18:14 |
| 863 | (Ge-1) | 73:17:10 |

-continued
| | | |
|---|---|---|
| 864 | (Gf-1) | 67:16:17 |
| 865 | 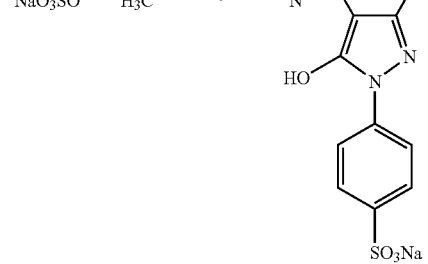<br>(Gc-3) | 66:18:16 |
| 866 | (Ga-1) | 65:20:15 |
| 867 | (Gb-2) | 67:20:13 |
| 868 | (Ge-1) | 70:20:10 |
| 869 | (Gf-2) | 64:20:16 |
| 870 | (Ga-1) | 72:16:12 |
| 871 | (Gb-3) | 75:15:10 |
| 872 | 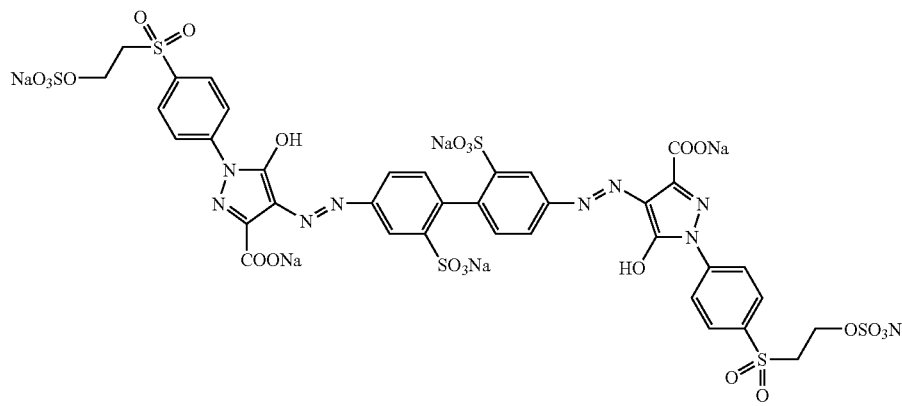<br>(Ga-2) | 70:20:10 |
| 873 | (Ga-1) | 68:20:12 |
| 874 | (Ga-2) | 65:20:15 |
| 875 | (Ga-3) | 67:20:13 |
| 876 | (Ga-6) | 64:20:16 |
| 877 | (Gb-2) | 70:18:12 |
| 878 | (Gb-3) | 70:20:10 |
| 879 | (Gb-5) | 67:20:13 |
| 880 | (Gc-1) | 66:17:17 |
| 881 | (Gd-1) | 65:20:15 |
| 882 | (Ge-1) | 70:20:10 |
| 883 | (Gf-1) | 65:18:17 |
| 884 | (Gf-4) | 68:20:12 |
| 885 | (Ga-3) | 66:18:16 |
| 886 | (Gb-3) | 70:18:12 |
| 887 | (Gc-3) | 67:18:15 |
| 888 | (Ga-1) | 68:20:12 |
| 889 | (Gb-2) | 70:18:12 |
| 890 | (Ge-1) | 70:20:10 |
| 891 | (Gf-2) | 65:18:17 |
| 892 | (Ga-2) | 67:20:13 |
| 893 | (Gb-2) | 72:17:11 |
| 894 | (Ge-1) | 70:20:10 |
| 895 | (Gf-1) | 66:17:17 |
| 896 | (Ga-1) | 68:20:12 |
| 897 | (Gb-2) | 70:18:12 |
| 898 | (Ge-1) | 70:20:10 |

-continued
| | | |
|---|---|---|
| 899 | (Gf-2) | 65:17:18 |
| 900 | (Ga-1) | 67:20:13 |
| 901 | (Gb-2) | 72:16:12 |
| 902 | (Ge-1) | 70:20:10 |
| 903 | (Gf-1) | 65:20:15 |
| 904 | (Ga-2) | 68:20:12 |
| 905 | (Gb-2) | 71:17:12 |
| 906 | (Ge-1) | 70:20:10 |
| 907 | (Gf-1) | 65:18:17 |
| 908 | (Gf-2) | 66:20:14 |
| 909 | (Ga-1) | 67:20:13 |
| 910 | (Gb-2) | 70:18:12 |
| 911 | (Ge-1) | 70:20:10 |
| 912 | (Gf-1) | 66:17:17 |
| 913 | (Ga-2) | 67:20:13 |
| 914 | (Gb-2) | 70:18:12 |
| 915 | (Ge-1) | 70:20:10 |
| 916 | (Gf-2) | 65:18:17 |
| 917 | (Ga-1) | 70:18:12 |
| 918 | (Gb-2) | 73:15:12 |
| 919 | (Ge-1) | 70:20:10 |
| 920 | (Gf-1) | 65:20:15 |
| 921 | (Ga-1) | 67:18:15 |
| 922 | (Ge-1) | 70:18:12 |
| 923 | (Gf-1) | 67:15:18 |
| 924 | (Ga-1) | 66:20:15 |
| 925 | (Gb-2) | 66:22:12 |
| 926 | (Ge-1) | 66:23:11 |
| 927 | (Gf-2) | 66:20:17 |
| 928 | (Ge-1) | 68:22:10 |
| 929 | (Ga-2) | 66:21:13 |
| 930 | (Gb-2) | 68:20:12 |
| 931 | (Ge-1) | 69:20:11 |
| 932 | (Gf-1) | 65:18:17 |
| 933 | (Ga-2) | 67:20:13 |
| 934 | (Ga-2) | 65:20:15 |
| 935 | (Ge-1) | 70:20:10 |
| 936 | (Gf-2) | 65:18:17 |
| 937 | 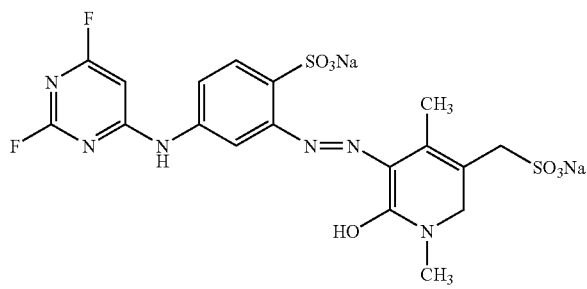<br>(Gd-2) | 67:18:15 |
| 938 | (Ga-1) | 67:18:15 |
| 939 | (Gf-1) | 66:17:17 |
| 940 | (Ge-1) | 72:18:10 |
| 941 | (Ga-1) | 67:18:15 |
| 942 | (Gb-2) | 70:15:15 |
| 943 | (Ge-2) | 75:15:10 |
| 944 | (Gf-1) | 66:20:14 |
| 945 | (Gf-2) | 65:20:15 |
| 946 | (Gf-3) | 70:18:12 |

-continued
| 947 | 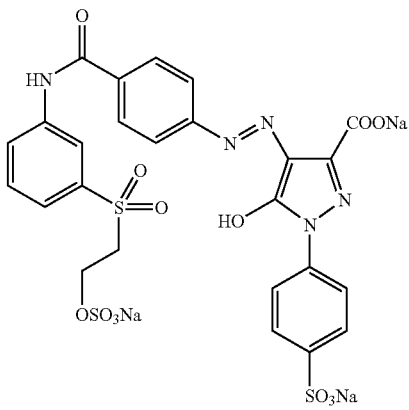 (Gc-4) | 67:18:15 |
|---|---|---|
| 948 | (Ga-3) | 64:20:16 |
| 949 | (Gb-2) | 66:22:12 |
| 950 | (Ga-1) | 65:20:15 |
| 951 | (Ge-1) | 67:22:11 |
| 952 | (Gf-1) | 63:20:17 |
| 953 | (Ga-1) | 60:25:15 |
| 954 | (Ge-1) | 68:22:10 |
| 955 | (Gf-2) | 65:20:15 |
| 956 | (Gb-2) | 67:20:13 |
| 957 | (Ga-2) | 65:20:15 |
| 958 | (Ga-2) | 65:20:15 |
| 959 | (Gf-3) | 70:20:10 |
| 960 | (Ga-1) | 68:20:12 |
| 961 | (Gf-2) | 65:20:15 |
| 962 | (Gf-1) | 65:18:17 |
| 963 | (Ge-2) | 70:20:10 |
| 964 | (Ga-2) | 68:19:13 |
| 965 | (Ge-1) | 72:20:8 |
| 966 | (Gb-2) | 70:20:10 |
| 967 | (Gf-1) | 67:20:13 |
| 968 | (Ga-1) | 68:20:12 |
| 969 | (Gb-2) | 70:22:8 |
| 970 | (Gf-2) | 70:20:10 |
| 971 | (Ge-1) | 72:22:6 |
| 972 | (Ge-1) | 71:21:8 |
| 973 | (Gb-2) | 70:23:7 |
| 974 | (Gb-3) | 70:20:10 |
| 975 | (Gf-3) | 68:21:11 |
| 976 | (Ge-1) | 72:20:8 |
| 977 | (Gb-1) | 68:20:12 |
| 978 | (Ga-3) | 67:17:16 |
| 979 | (Gf-4) | 65:20:15 |
| 980 | (Gc-4) | 67:22:11 |
| 981 | (Gf-3) | 69:22:11 |
| 982 | (Gc-4) | 70:20:10 |
| 983 | (Gf-3) | 68:22:10 |
| 984 | (Ge-1) | 70:20:10 |
| 985 | (Gb-2) | 72:18:10 |
| 986 | (Gf-1) | 67:20:13 |
| 987 | (Ga-2) | 65:22:13 |
| 988 | (Gf-4) | 65:20:15 |
| 989 | (Ga-1) | 67:22:11 |
| 990 | (Gf-3) | 68:20:12 |
| 991 | (Ga-1) | 67:20:13 |
| 992 | (Gb-2) | 67:22:11 |
| 993 | (Ge-1) | 70:20:10 |
| 994 | (Gf-2) | 66:17:17 |
| 995 | (Gf-1) | 65:18:14 |
| 996 | (Ga-1) | 67:22:11 |
| 997 | (Gf-2) | 65:20:15 |
| 998 | (Ge-1) | 70:20:10 |
| 999 | (Ga-2) | 67:20:13 |
| 1000 | (Gb-2) | 68:22:10 |
| 1001 | (Gb-2) | 68:20:12 |
| 1002 | (Gf-1) | 65:20:15 |
| 1003 | (Gf-2) | 66:18:16 |
| 1004 | (Ge-1) | 70:20:10 |

-continued

| | | |
|---|---|---|
| 1005 | (Ga-1) | 67:22:11 |
| 1006 | (Ge-2) | 72:20:8 |
| 1007 | (Gf-1) | 66:20:14 |
| 1008 | (Gb-2) | 72:18:10 |
| 1009 | (Ga-1) | 68:20:12 |
| 1010 | (Ge-1) | 70:20:10 |
| 1011 | (Ge-1) | 70:23:7 |
| 1012 | (Gb-2) | 70:20:10 |
| 1013 | (Gf-1) | 67:20:13 |
| 1014 | (Ga-1) | 68:21:11 |
| 1015 | (Ge-1) | 72:20:8 |
| 1016 | (Gb-2) | 70:20:10 |
| 1017 | (Gb-2) | 70:20:10 |
| 1018 | (Gf-1) | 69:20:11 |
| 1019 | (Gb-3) | 70:20:10 |
| 1020 | (Gf-3) | 68:20:12 |
| 1021 | (Ge-1) | 72:20:8 |
| 1022 | (Gb-1) | 68:20:12 |
| 1023 | (Ga-3) | 68:17:15 |
| 1024 | (Gf-4) | 66:20:14 |
| 1025 | (Gc-4) | 69:20:11 |
| 1026 | (Gf-3) | 70:18:12 |
| 1027 | (Gc-4) | 70:20:10 |
| 1028 | (Gf-3) | 68:22:10 |
| 1029 | (Ga-1) | 68:20:12 |
| 1030 | (Gb-2) | 70:20:10 |
| 1031 | (Ge-1) | 70:20:10 |
| 1032 | (Gf-1) | 66:20:14 |
| 1033 | (Gf-2) | 67:17:16 |
| 1034 | (Ge-2) | 75:17:8 |
| 1035 | (Ge-1) | 70:20:10 |
| 1036 | (Ga-1) | 70:18:12 |
| 1037 | (Gf-2) | 67:20:13 |
| 1038 | (Gb-2) | 72:18:10 |
| 1039 | (Ga-1) | 68:20:12 |
| 1040 | (Gb-2) | 70:20:10 |
| 1041 | (Ge-1) | 72:18:10 |
| 1042 | (Gf-1) | 65:20:15 |
| 1043 | (Ge-2) | 70:20:10 |
| 1044 | (Ga-1) | 69:20:11 |
| 1045 | (Gb-2) | 70:20:10 |
| 1046 | (Gf-1) | 67:20:13 |
| 1047 | (Gf-4) | 68:20:12 |
| 1048 | (Ga-2) | 67:20:13 |
| 1049 | (Gf-3) | 67:20:13 |
| 1050 | (Ge-1) | 68:20:12 |
| 1051 | (Gd-2) | 67:22:11 |
| 1052 | (Ge-2) | 70:20:10 |
| 1053 | (Gf-1) | 65:20:15 |
| 1054 | (Ga-1) | 68:20:12 |
| 1055 | (Gb-2) | 69:20:11 |
| 1056 | (Ge-1) | 68:22:10 |
| 1057 | (Ga-2) | 66:20:14 |
| 1058 | (Ga-1) | 67:20:13 |
| 1059 | (Gf-2) | 66:20:14 |
| 1060 | (Ge-1) | 70:20:10 |
| 1061 | (Gb-2) | 67:22:11 |
| 1062 | (Ge-2) | 68:22:10 |
| 1063 | (Ge-2) | 72:20:8 |
| 1064 | (Gf-1) | 66:20:14 |
| 1065 | (Ge-1) | 69:20:11 |
| 1066 | (Gb-2) | 70:20:10 |
| 1067 | (Ga-1) | 67:22:11 |
| 1068 | (Gd-1) | 65:20:15 |

Further Dye Mixtures in Accordance with Example 820 or 821
| Example | Dye of gen. formula (I) | Dye of gen. formula (II) | Dye of Formula (G) | Ratio (I):(II):(G) |
|---|---|---|---|---|
| 1069 | (I-1) | (II-9) | 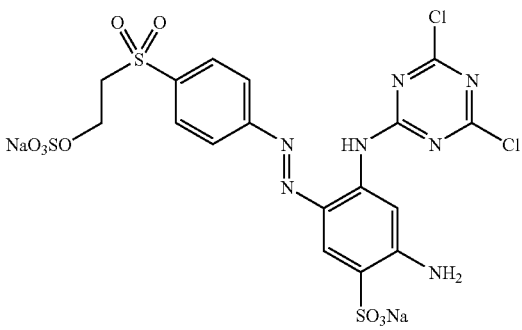<br>(Ga-7) | 72:18:10 |
| 1070 | (I-1) | (II-5) | 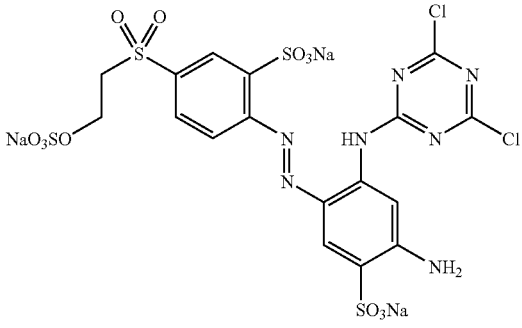<br>(Ga-8) | 68:21:11 |
| 1071 | (I-1) | (II-12) | 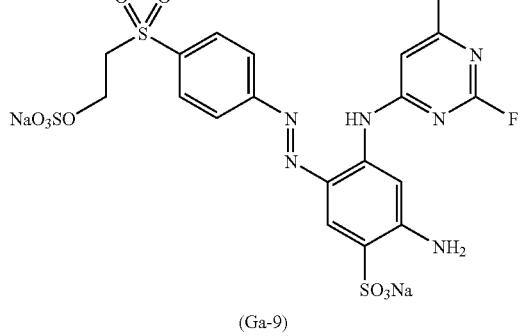<br>(Ga-9) | 70:20:10 |
| 1072 | (I-1) | (II-16) | 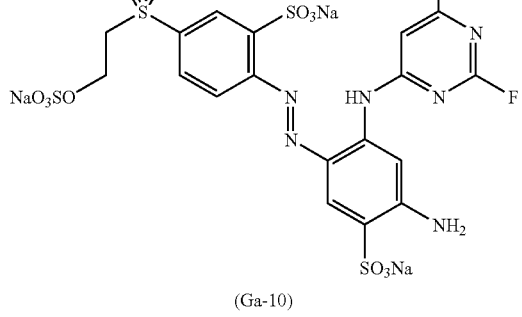<br>(Ga-10) | 70:18:12 |

-continued

| Example | Dye of gen. formula (I) | Dye of gen. formula (II) | Dye of Formula (G) | Ratio (I):(II):(G) |
|---|---|---|---|---|
| 1073 | (I-2) | (II-6) | (Ga-9) | 72:17:11 |
| 1074 | (I-2) | (II-78) | (Ga-7) | 73:18:9 |
| 1075 | (I-4) | (II-9) | (Ga-7) | 72:18:10 |
| 1076 | (I-4) | (II-5) | (Ga-8) | 68:21:11 |
| 1077 | (I-4) | (II-12) | (Ga-9) | 70:20:10 |
| 1078 | (I-4) | (II-16) | (Ga-10) | 70:18:12 |
| 1079 | (I-4) | (II-6) | (Ga-9) | 72:17:11 |
| 1080 | (I-4) | (II-78) | (Ga-7) | 73:18:9 |
| 1081 | (I-7) | (II-9) | (Ga-7) | 72:18:10 |
| 1082 | (I-7) | (II-5) | (Ga-8) | 68:21:11 |
| 1083 | (I-7) | (II-12) | (Ga-9) | 70:20:10 |
| 1084 | (I-7) | (II-16) | (Ga-10) | 70:18:12 |
| 1085 | (I-7) | (II-6) | (Ga-9) | 72:17:11 |
| 1086 | (I-7) | (II-78) | (Ga-7) | 73:18:9 |

Dye Mixtures in Accordance with Example 825

| Example | Dye of gen. formula (I) | Dye of gen. formula (II) | Dye of gen. formula (G) | Ratio (I):(II):(G) |
|---|---|---|---|---|
| 1087 | (I-2) | (II-10) | (Ga-1) | 68:18:14 |
| 1088 | (I-23) | (II-28) | (Ge-1) | 70:20:10 |
| 1089 | (I-3) | (II-50) | (Gb-2) | 70:18:12 |
| 1090 | (I-6) | (II-82) | (Gf-3) | 68:20:12 |
| 1091 | (I-7) | (II-52) | (Gd-2) | 65:22:13 |
| 1092 | (I-26) | (II-51) | (Gf-2) | 67:18:15 |
| 1093 | (I-17) | (II-43) | (Gf-1) | 67:18:15 |
| 1094 | (I-21) | (II-79) | (Gd-1) | 65:20:15 |

Dye Mixtures in Accordance with Example 826

| Example | Dye of gen. formula (I) | Dye of gen. formula (II) | Ratio (I):(II) |
|---|---|---|---|
| 1095 | (I-3) | (II-9) | 70:30 |
| 1096 | (I-3) | (II-5) | 67:33 |
| 1097 | (I-3) | (II-16) | 70:30 |
| 1098 | (I-3) | (II-19) | 73:27 |
| 1099 | (I-3) | (II-65) | 72:28 |
| 1100 | (I-3) | (II-6) | 70:30 |
| 1101 | (I-3) | (II-70) | 75:25 |
| 1102 | (I-3) | (II-34) | 68:32 |
| 1103 | (I-4) | (II-9) | 67:33 |
| 1104 | (I-4) | (II-5) | 65:35 |
| 1105 | (I-4) | (II-12) | 75:25 |
| 1106 | (I-4) | (II-53) | 68:32 |
| 1107 | (I-4) | (II-16) | 70:30 |
| 1108 | (I-4) | (II-19) | 76:24 |
| 1109 | (I-4) | (II-65) | 73:27 |
| 1110 | (I-4) | (II-6) | 72:28 |
| 1111 | (I-4) | (II-66) | 77:23 |
| 1112 | (I-4) | (II-70) | 70:30 |
| 1113 | (I-4) | (II-34) | 70:30 |
| 1114 | (I-4) | (II-87) | 80:20 |
| 1115 | (I-5) | (II-9) | 70:30 |
| 1116 | (I-5) | (II-5) | 67:33 |
| 1117 | (I-5) | (II-12) | 72:28 |
| 1118 | (I-5) | (II-53) | 66:34 |
| 1119 | (I-5) | (II-16) | 68:32 |
| 1120 | (I-5) | (II-19) | 75:25 |
| 1121 | (I-5) | (II-6) | 73:27 |
| 1122 | (I-5) | (II-66) | 75:25 |
| 1123 | (I-5) | (II-28) | 72:28 |
| 1124 | (I-5) | (II-70) | 70:30 |
| 1125 | (I-5) | (II-32) | 70:30 |
| 1126 | (I-5) | (II-87) | 75:25 |
| 1127 | (I-12) | (II-16) | 70:30 |

-continued

| Example | Dye of gen. formula (I) | Dye of gen. formula (II) | Ratio (I):(II) |
|---|---|---|---|
| 1128 | (I-12) | (II-6) | 75:25 |
| 1129 | (I-12) | (II-70) | 68:32 |
| 1130 | (I-13) | (II-9) | 75:25 |
| 1131 | (I-13) | (II-5) | 67:33 |
| 1132 | (I-13) | (II-12) | 72:28 |
| 1133 | (I-13) | (II-53) | 65:35 |
| 1134 | (I-13) | (II-16) | 68:32 |
| 1135 | (I-13) | (II-19) | 73:27 |
| 1136 | (I-13) | (II-65) | 70:30 |
| 1137 | (I-13) | (II-6) | 72:28 |
| 1138 | (I-13) | (II-66) | 75:25 |
| 1139 | (I-13) | (II-70) | 68:32 |
| 1140 | (I-13) | (II-34) | 70:30 |
| 1141 | (I-13) | (II-87) | 74:26 |
| 1142 | (I-14) | (II-9) | 72:28 |
| 1143 | (I-14) | (II-5) | 68:32 |
| 1144 | (I-14) | (II-12) | 70:30 |
| 1145 | (I-14) | (II-53) | 66:34 |
| 1146 | (I-14) | (II-16) | 70:30 |
| 1147 | (I-14) | (II-19) | 75:25 |
| 1148 | (I-14) | (II-65) | 72:28 |
| 1149 | (I-14) | (II-6) | 72:28 |
| 1150 | (I-14) | (II-66) | 74:26 |
| 1151 | (I-14) | (II-70) | 68:32 |
| 1152 | (I-14) | (II-34) | 72:28 |
| 1153 | (I-14) | (II-87) | 75:25 |

Dye Mixtures in Accordance with Example 827

| Example | Dye of gen. formula (I) | Dye of gen. formula (II) | Ratio (I):(II) |
|---|---|---|---|
| 1154 | (I-4) | (II-50) | 70:30 |
| 1155 | (I-5) | (II-55) | 75:25 |
| 1156 | (I-12) | (II-9) | 73:27 |
| 1157 | (I-12) | (II-5) | 70:30 |
| 1158 | (I-12) | (II-56) | 72:28 |
| 1159 | (I-12) | (II-21) | 68:32 |
| 1160 | (I-12) | (II-64) | 70:30 |
| 1161 | (I-12) | (II-28) | 73:27 |
| 1162 | (I-12) | (II-32) | 72:28 |
| 1163 | (I-12) | (II-88) | 65:35 |
| 1164 | (I-13) | (II-50) | 75:25 |
| 1165 | (I-14) | (II-55) | 77:23 |

Dye Mixtures in Accordance with Example 828

| Example | Dye of gen. formula (I) | Dye of gen. formula (II) | Dye of gen. formula (G) | Ratio (I):(II):(G) |
|---|---|---|---|---|
| 1166 | (I-2) | (II-12) | (Gf-2) | 64:20:16 |
| 1167 | (I-2) | (II-61) | (Ga-1) | 67:20:13 |
| 1168 | (I-2) | (II-75) | (Gf-1) | 62:22:16 |
| 1169 | (I-23) | (II-56) | (Ge-1) | 70:20:10 |
| 1170 | (I-23) | (II-21) | (Ga-1) | 65:22:13 |
| 1171 | (I-23) | (II-64) | (Gb-2) | 70:20:10 |
| 1172 | (I-23) | (II-32) | (Gf-2) | 61:18:15 |
| 1173 | (I-23) | (II-88) | (Ga-2) | 65:20:15 |
| 1174 | (I-7) | (II-23) | (Ge-1) | 70:22:8 |
| 1175 | (I-7) | (II-6) | (Gb-2) | 70:20:10 |
| 1176 | (I-7) | (II-71) | (Gd-2) | 67:20:13 |
| 1177 | (I-7) | (II-90) | (Gf-1) | 63:22:15 |
| 1178 | (I-26) | (II-55) | (Gf-1) | 65:20:15 |
| 1179 | (I-27) | (II-10) | (Ga-1) | 68:20:12 |
| 1180 | (I-27) | (II-12) | (Gb-2) | 70:20:10 |
| 1181 | (I-27) | (II-61) | (Ge-1) | 72:18:10 |
| 1182 | (I-27) | (II-75) | (Gf-2) | 66:20:14 |
| 1183 | (I-15) | (II-40) | (Gf-3) | 68:20:12 |
| 1184 | (I-16) | (II-84) | (Gb-2) | 68:22:10 |
| 1185 | (I-18) | (II-36) | (Ga-2) | 67:20:13 |
| 1186 | (I-20) | (II-78) | (Gf-3) | 70:20:10 |

EXAMPLE 1187

70 parts of an electrolyte-containing dye powder containing the navy disazo dye of the formula (I-1) in a 70% fraction, 8 parts of an electrolyte-containing dye powder containing the scarlet disazo dye of the formula (II-2) in a 75% fraction, 12 parts of an electrolyte-containing dye powder containing the orange-colored azo dye of the formula (III-21) in an 80% fraction, and 10 parts of an electrolyte-containing dye powder containing the yellow azo dye of the formula (Ga-1) in a 75% fraction are dissolved in 700 parts of water and the resulting dye solution is adjusted to a pH of 5.5-6.5. Concentration of this dye solution gives a dye mixture which provides jet black dyeings and prints on cotton under the dyeing conditions customary for reactive dyes.

Alternatively the dye solution obtained can be buffered at a pH of 5.5-6 by addition of a phosphate buffer and adjusted by further dilution or concentration to give a liquid brand of defined strength.

EXAMPLE 1188

An aqueous solution prepared in analogy to Example 2 of the three dyes (I-1), (II-2), and (III-1) in a ratio of 65:15:10 is admixed with 10 parts of an electrolyte-containing dye powder containing the orange-colored azo dye of the formula (III-21) in an 80% fraction, and the resulting dye solution is adjusted to a pH of 5.5-6.5. Concentration of this dye solution gives a dye mixture which provides jet black dyeings and prints on cotton under the dyeing conditions customary for reactive dyes.

EXAMPLE 1189

An aqueous solution prepared in analogy to Example 2 of the three dyes (I-1), (II-1), and (III-1) in a ratio of 66:17:7 is admixed with 10 parts of an electrolyte-containing dye powder containing the yellow azo dye of the formula (Ga-1) in an 75% fraction, and the resulting dye solution is adjusted to a pH of 5.5-6.5. Concentration of this dye solution gives a dye mixture which provides jet black dyeings and prints on cotton under the dyeing conditions customary for reactive dyes.

Further Dye Mixtures in Accordance with Example 1187

| Example | Dye of gen. formula (I) | Dye of gen. formula (II) | Dye of gen. formula (III) | Dye of Formula (G) | Ratio |
|---|---|---|---|---|---|
| 1190 | (I-1) | (II-1) | (III-21) | | 70:10:10:10 |
| 1191 | (I-1) | (II-2) | (III-22) | (Ga-1) | 66:12:10:12 |
| 1192 | (I-1) | (II-6) | (III-23) | (Ga-2) (Ga-9) | 70:11:12:7 |

-continued

| Example | Dye of gen. formula (I) | Dye of gen. formula (II) | Dye of gen. formula (III) | Dye of Formula (G) | Ratio |
|---|---|---|---|---|---|
| 1193 | (I-1) | (II-7) | (III-24) | (Gf-1) | 68:8:10:14 |
| 1194 | (I-1) | (II-24) | (III-27) | (Ga-1) | 67:11:12:10 |

-continued

| Example | Dye of gen. formula (I) | Dye of gen. formula (II) | Dye of gen. formula (III) | Dye of Formula (G) | Ratio |
|---|---|---|---|---|---|
| 1195 | (I-1) | (II-26) | (III-21) | (Gf-3) | 70:12:10:8 |
| 1196 | (I-1) | (II-34) | (III-29) | (Gd-2) | 69:11:8:12 |
| 1197 | (I-1) | (II-37) | (III-24) | (Ga-7) | 70:10:10:10 |

| Example | Dye of gen. formula (I) | Dye of gen. formula (II) | Dye of gen. formula (III) | Dye of Formula (G) | Ratio |
|---|---|---|---|---|---|
| 1198 | (I-1) | (II-44) | (III-26) | (Ga-3) | 64:13:10:13 |
| 1199 | (I-1) | (II-45) | (III-22) | (Ga-6) | 60:15:10:15 |

| Example | Dye of gen. formula (I) | Dye of gen. formula (II) | Dye of gen. formula (III) | Dye of Formula (G) | Ratio |
|---|---|---|---|---|---|
| 1200 | (I-1) | (II-46) | (III-26) | (Gc-2) | 62:15:10:13 |
| 1201 | (I-2) | (II-48) | (III-23) | (Gb-3) | 69:13:10:8 |

-continued
| Example | Dye of gen. formula (I) | Dye of gen. formula (II) | Dye of gen. formula (III) | Dye of Formula (G) | Ratio |
|---|---|---|---|---|---|
| 1202 | (I-2) | (II-5) | (III-27) | (Gb-2) | 70:10:10:10 |
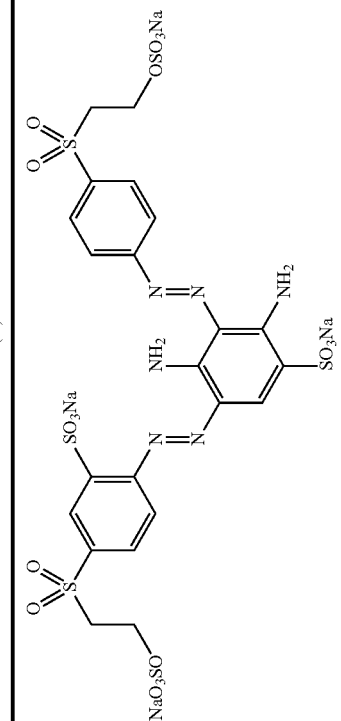

Further Dye Mixtures in Accordance with Example 1188

| Example | Dye of gen. formula (I) | Dye of gen. formula (II) | Dye of gen. formula (III) | Dye of gen. Formula (III) | Ratio |
|---|---|---|---|---|---|
| 1203 | (I-1) | (II-1) | (III-21) | (III-7) | 70:10:10:10 |
| 1204 | (I-1) | (II-2) | (III-22) | (III-1) | 66:12:12:10 |
| 1205 | (I-1) | (II-6) | (III-23) | (III-13) | 70:11:11:8 |
| 1206 | (I-1) | (II-7) | (III-24) | (III-8) | 68:10:10:12 |
| 1207 | (I-1) | (II-24) | (III-27) | (III-4) | 65:11:12:12 |
| 1208 | (I-1) | (II-26) | (III-21) | (III-10) | 70:12:10:8 |
| 1209 | (I-1) | (II-34) | (III-29) | (III-14) | 70:11:8:11 |
| 1210 | (I-1) | (II-37) | (III-24) | (III-7) | 70:10:10:10 |
| 1211 | (I-1) | (II-44) | (III-26) | (III-5) | 65:13:10:12 |
| 1212 | (I-1) | (II-45) | (III-22) | (III-2) | 60:15:10:15 |
| 1213 | (I-1) | (II-46) | (III-26) | (III-6) | 64:15:10:11 |
| 1214 | (I-1) | (II-48) | (III-23) | (III-3) | 66:12:10:12 |
| 1215 | (I-2) | (II-5) | (III-27) | (III-1) | 70:10:10:10 |

Further Dye Mixtures in Accordance with Example 1189

| Example | Dye of gen. formula (I) | Dye of gen. formula (II) | Dye of gen. formula (III) | Dye of Formula (G) | Ratio |
|---|---|---|---|---|---|
| 1216 | (I-1) | (II-1) | (III-7) | (Ga-2) | 67:10:11:12 |
| 1217 | (I-1) | (II-2) | (III-1) | (Ga-1) | 67:12:10:11 |
| 1218 | (I-1) | (II-6) | (III-13) | (Ga-9) | 70:11:12:7 |
| 1219 | (I-1) | (II-7) | (III-8) | (Gf-1) | 67:8:10:15 |
| 1220 | (I-1) | (II-24) | (III-4) | (Ge-1) | 67:11:12:10 |
| 1221 | (I-1) | (II-26) | (III-10) | (Gf-3) | 69:12:10:9 |
| 1222 | (I-1) | (II-34) | (III-14) | (Gd-2) | 67:11:10:12 |
| 1223 | (I-1) | (II-37) | (III-7) | (Ga-7) | 70:10:10:10 |
| 1224 | (I-1) | (II-44) | (III-5) | (Ga-3) | 65:13:10:12 |
| 1225 | (I-1) | (II-45) | (III-2) | (Ga-6) | 60:15:10:15 |
| 1226 | (I-1) | (II-46) | (III-6) | (Gc-2) | 62:15:10:13 |
| 1227 | (I-2) | (II-48) | (III-3) | (Gb-3) | 69:13:10:8 |
| 1228 | (I-2) | (II-5) | (III-1) | (Gb-2) | 70:10:10:10 |

Use Example 1

2 parts of a dye mixture obtained in accordance with Example 1-10, 449, 468-481, 820 to 832, 1187-1189 and 50 parts of sodium chloride are dissolved in 999 parts of water, and 5 parts of sodium carbonate, 0.7 part of sodium hydroxide (in the form of a 32.5% aqueous solution) and optionally 1 part of a wetting agent are added. This dyebath is entered with 100 g of a cotton fabric. The temperature of the dyebath is first maintained at 25° C. for 10 minutes, then raised over 30 minutes to the final temperature (40-80° C.) and maintained at that level for a further 60-90 minutes. Thereafter, the dyed material is rinsed initially with tap water for 2 minutes and then with demonized water for 5 minutes. The dyed material is neutralized at 40° C. in 1000 parts of an aqueous solution containing 1 part of 50% acetic acid for 10 minutes. It is subsequently rinsed with demonized water at 70° C. and thereafter soaped at the boil with a detergent for 15 minutes, rinsed once more, and dried. This gives a strong navy to gray dyeing having very good fastness properties.

Use Example 2

6 parts of a dye mixture in accordance with Example 1-10, 449, 468-481, 820 to 831, 1187-1189 and 50 parts of sodium chloride are dissolved in 998 parts of water, and 7 parts of sodium carbonate, 2 parts of sodium hydroxide (in the form of 32.5% aqueous solution) and optionally 1 part of a wetting agent are added. This dyebath is entered with 100 g of a cotton fabric. Further operation is as indicated in Use Example 1. The result is a jet black dyeing having very good fastness properties.

Use Example 3

2 parts of a dye mixture in accordance with Example 9, 128-147, 275-294, 436 or 444, 477, 601-607, 645-652, 719, 829, 974-983, 1019-1028, 1090, 1183 are dissolved in 999 parts of water, and 5 parts of sodium carbonate, 0.7 part of sodium hydroxide (in the form of 32.5% aqueous solution) and optionally 1 part of a wetting agent are added. This dyebath is entered with 100 g of a cotton fabric. Further operation is as indicated in Use Example 1. The result is a strong navy to gray dyeing having very good fastness properties.

Use Example 4

4 parts of a dye mixture in accordance with Example 9, 128-147, 275-294, 436 or 444, 477, 601-607, 645-652, 719, 829, 974-983, 1019-1028, 1090, 1183 and 5 parts of sodium chloride are dissolved in 999 parts of water, and 7 parts of sodium carbonate, 0.7 part of sodium hydroxide (in the form of 32.5% aqueous solution) and optionally 1 part of a wetting agent are added. This dyebath is entered with 100 g of a cotton fabric. Further operation is as indicated in Use Example 1. The result is a strong grayish blue to black dyeing having very good fastness properties.

Use Example 5

8 parts of a dye mixture in accordance with Example 9, 128-147, 275-294, 436 or 444, 477, 601-607, 645-652, 719, 829, 974-983, 1019-1028, 1090, 1183 and 10 parts of sodium chloride are dissolved in 997 parts of water, and 10 parts of sodium carbonate, 1.3 parts of sodium hydroxide (in the form of 32.5% aqueous solution) and optionally 1 part of a wetting agent are added. This dyebath is entered with 100 g of a cotton fabric. Further operation is as indicated in Use Example 1. The result is a jet black dyeing having very good fastness properties.

The invention claimed is:

1. Reactive dye mixtures comprising one or more dyes, of the general formula (I),

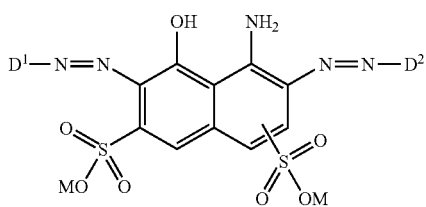
(I)

in an amount of 30 to 95% by weight,
one or more, dyes of the general formula (II),

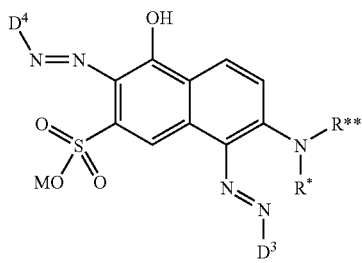
(II)

in an amount of 1 to 65% by weight,
and one or more dyes of the general formula (Ga)

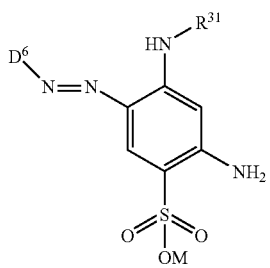
(Ga)

in an amount of 1 to 65% by weight,
where:
$D^1$, $D^2$, $D^3$, $D^4$ and $D^6$ are independently each a group of the general formula (1)

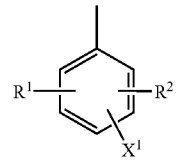
(1)

where
$R^1$ and $R^2$ are each hydrogen,
$X^1$ is hydrogen or a group of the formula —$SO_2$—Z,
where
Z is —CH=$CH_2$, or β-sulfatoethyl;
R* is hydrogen;
R** is
a group of the formula (14)

—$CH_2$—$SO_3M$ (14);

$R^{31}$ hydrogen and
M is hydrogen, an alkali metal or an equivalent of an alkaline earth metal.

2. Reactive dye mixtures as claimed in claim 1, comprising one or more monoazo dyes of the general formulae (17) to (18), each in an amount of 0-10% by weight

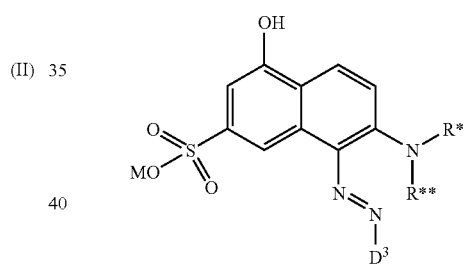
(17)

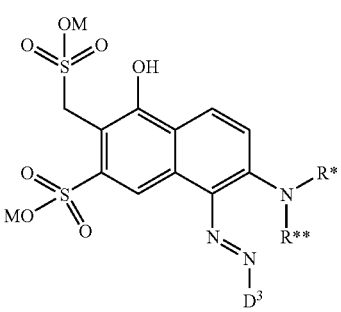
(18)

where M, R*, R and $D^3$ are as defined in claim 1**.

3. The reactive dye mixture as claimed in claim 1, further comprising
one or more monoazo dyes of the formula (15),
one or more monoazo dyes of the formula (16),
or a mixture of one or more monoazo dyes of the formula (15) and one or more monoazo dyes of the formula (16)

(15)

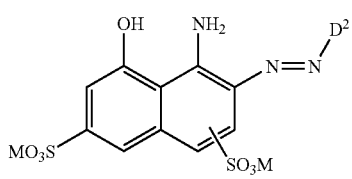

(16)

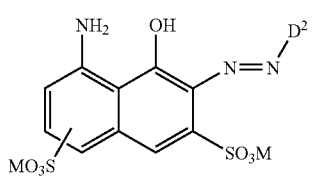

where $D^2$ and M are as defined in claim 1.

4. An aqueous liquid preparation comprising a dye mixture as claimed in claim 1 with a total dye content of 5-50% by weight.

5. A process for dyeing which comprises contacting the reactive dye mixtures as claimed in claim 1 with a hydroxyl- and/or carboxamido-containing fiber material.

6. A process for producing the reactive dye mixture as claimed in claim 1, which comprises mixing the individual dyes of the formulae (I), (II) and (Ga) with one another mechanically in solid form or in the form of an aqueous solution.

* * * * *